(12) United States Patent
Annunziata

(10) Patent No.: US 10,192,267 B2
(45) Date of Patent: Jan. 29, 2019

(54) SYSTEM FOR TRADING COMMODITIES AND THE LIKE

(75) Inventor: Vincent P. Annunziata, Greenwich, CT (US)

(73) Assignee: TRADECAPTURE OTC Corp., Stamford, CT (US)

(*) Notice: Subject to any disclaimer, the term of this patent is extended or adjusted under 35 U.S.C. 154(b) by 1840 days.

(21) Appl. No.: 13/023,860

(22) Filed: Feb. 9, 2011

(65) Prior Publication Data
US 2011/0173114 A1 Jul. 14, 2011

Related U.S. Application Data

(60) Division of application No. 12/070,138, filed on Feb. 15, 2008, which is a continuation-in-part of application No. 09/764,574, filed on Jan. 18, 2001, now Pat. No. 8,554,659.

(60) Provisional application No. 60/177,275, filed on Jan. 21, 2000.

(51) Int. Cl.
G06Q 50/04 (2012.01)
G06Q 40/04 (2012.01)

(52) U.S. Cl.
CPC .................... G06Q 40/04 (2013.01)

(58) Field of Classification Search
CPC ............... G06Q 40/00; G06Q 40/04
USPC ...................................... 705/35–45
See application file for complete search history.

(56) References Cited

U.S. PATENT DOCUMENTS

| | | | |
|---|---|---|---|
| 3,573,747 A | 4/1971 | Adams et al. | |
| 4,264,782 A | 4/1981 | Konheim | |
| 4,266,775 A | 5/1981 | Chitnis et al. | |
| 4,412,287 A | 10/1983 | Barddock, III | |
| 4,538,816 A | 9/1985 | Figueroa | |
| 4,677,552 A | 6/1987 | Sibley, Jr. | |
| 4,903,201 A | 2/1990 | Wagner | |

(Continued)

FOREIGN PATENT DOCUMENTS

GB 2358768 12/2001

OTHER PUBLICATIONS

TradeCapture, "ICTS Symphony;" http://www.tradecapture.com/products/pro_symphony.html (viewed Oct. 2005).

(Continued)

*Primary Examiner* — William E Rankins
(74) *Attorney, Agent, or Firm* — DLA Piper LLP (US)

(57) ABSTRACT

The present invention provides a system for trading commodities and the like. A computer, a communications link between the computer and the Internet, and a database, accessible by the computer are provided. The database includes a plurality of user files. Each of the user files corresponds to a specified user of the system. Each of the user files contains exchange permissions corresponding to exchanges to which the specified user may access. At least one computerized exchange transacts specified commodities executing on the computer accessible by selected users having proper exchange permissions for each exchange. A display is provided for pooling liquidity that permits users to post and view bids and offers and negotiate and consummate transactions on common commodities from one or more groups or exchanges. By such liquidity pooling, the liquidity of transactions of commodities between various exchanges and users is improved.

7 Claims, 143 Drawing Sheets

(56) References Cited

U.S. PATENT DOCUMENTS

| | | | |
|---|---|---|---|
| 5,077,665 A | 12/1991 | Silverman et al. | |
| 5,136,501 A | 8/1992 | Silverman et al. | |
| 5,168,446 A | 12/1992 | Wiseman | |
| 5,297,032 A | 3/1994 | Trojan et al. | |
| 5,715,402 A | 2/1998 | Popolo | |
| 5,873,071 A * | 2/1999 | Ferstenberg | G06Q 40/00 705/36 R |
| 6,029,146 A | 2/2000 | Hawkins et al. | |
| 6,134,535 A | 10/2000 | Belzberg | |
| 6,161,099 A | 12/2000 | Harrington et al. | |
| 6,195,647 B1 | 2/2001 | Martyn et al. | |
| 6,272,474 B1 | 8/2001 | Garcia | |
| 6,278,982 B1 * | 8/2001 | Korhammer | G06Q 40/06 705/36 R |
| 6,304,858 B1 | 10/2001 | Mosler et al. | |
| 6,317,727 B1 | 11/2001 | May | |
| 6,317,728 B1 | 11/2001 | Kane | |
| 6,418,419 B1 | 7/2002 | Nieboer et al. | |
| 6,493,683 B1 | 12/2002 | David et al. | |
| 6,601,044 B1 | 7/2003 | Wallman | |
| 6,625,583 B1 | 9/2003 | Silverman et al. | |
| 6,647,373 B1 | 11/2003 | Carlton-Foss | |
| 6,766,304 B2 | 7/2004 | Kemp, II et al. | |
| 6,772,132 B1 | 8/2004 | Kemp, II et al. | |
| 6,938,011 B1 | 8/2005 | Kemp, II et al. | |
| 6,985,883 B1 | 1/2006 | Togher et al. | |
| 6,993,504 B1 | 1/2006 | Friesen et al. | |
| 6,995,540 B2 | 2/2006 | Maruyama et al. | |
| 7,107,240 B1 | 9/2006 | Silverman et al. | |
| 7,177,833 B1 | 2/2007 | Marynowski et al. | |
| 7,181,424 B1 | 2/2007 | Ketchum et al. | |
| 7,184,984 B2 | 2/2007 | Glodjo et al. | |
| 7,194,468 B1 | 3/2007 | Bacila et al. | |
| 7,212,994 B2 | 5/2007 | Howell et | |
| 7,251,629 B1 | 7/2007 | Marynowski et al. | |
| 7,389,258 B2 | 6/2008 | Brumfield et al. | |
| 7,389,268 B1 | 6/2008 | Kemp, II et al. | |
| 7,424,303 B2 | 9/2008 | Al-Sarawi | |
| 7,424,452 B2 | 9/2008 | Feilbogen et al. | |
| 7,426,491 B1 | 9/2008 | Singer et al. | |
| 7,516,196 B1 | 4/2009 | Madan et al. | |
| 7,533,052 B2 | 5/2009 | Tilfors et al. | |
| 7,610,239 B1 | 10/2009 | Silverman et al. | |
| 7,617,149 B2 | 11/2009 | Rosenthal et al. | |
| 7,624,064 B2 | 11/2009 | Rosenthal et al. | |
| 7,624,066 B2 | 11/2009 | Janowski et al. | |
| 7,627,517 B2 | 12/2009 | Badenhorst et al. | |
| 7,685,048 B1 | 3/2010 | Hausman et al. | |
| 7,778,919 B2 | 8/2010 | Waelbroeck et al. | |
| 2001/0034688 A1 | 10/2001 | Annunziata | |
| 2001/0049651 A1 | 12/2001 | Selleck | |
| 2002/0004774 A1 | 1/2002 | Defarlo | |
| 2002/0026403 A1 | 2/2002 | Tambay et al. | |
| 2002/0032632 A1 | 3/2002 | Sernet | |
| 2002/0069156 A1 | 6/2002 | Adam et al. | |
| 2002/0091615 A1 | 7/2002 | Salvani | |
| 2002/0120555 A1 | 8/2002 | Lerner | |
| 2002/0138390 A1 | 9/2002 | May | |
| 2002/0169703 A1 | 11/2002 | Lutnick et al. | |
| 2002/0188555 A1 | 12/2002 | Lawrence | |
| 2003/0018569 A1 | 1/2003 | Eisenthal et al. | |
| 2005/0160024 A1 | 7/2005 | Soderborg et al. | |
| 2006/0085310 A1 | 4/2006 | Mylet et al. | |
| 2006/0184444 A1 | 8/2006 | McConaughy et al. | |
| 2006/0253371 A1 | 11/2006 | Rutt et al. | |
| 2006/0282369 A1 | 12/2006 | White | |
| 2007/0083458 A1 * | 4/2007 | Rosenthal et al. | 705/37 |
| 2007/0088658 A1 | 4/2007 | Rosenthal et al. | |
| 2007/0118456 A1 | 5/2007 | Glinberg et al. | |
| 2007/0168275 A1 | 7/2007 | Busby et al. | |
| 2008/0059353 A1 | 3/2008 | Ronk | |
| 2008/0097892 A1 | 4/2008 | Yohai-Giochais | |
| 2008/0109379 A1 | 5/2008 | Cofnas et al. | |
| 2009/0171832 A1 | 7/2009 | Busby | |
| 2010/0010937 A1 | 1/2010 | Rosenthal | |

OTHER PUBLICATIONS

TradeCapture, "About TradeCapture;" http://www.tradecapture.com/company/cmpny_about.html (view Oct. 2005).

Lux, Hal, "Amex Specialists Send Pledge in Unusual Pitch to Brokers," The Investment Dealers' Digest: IID, Proquest, Nov. 1993.

* cited by examiner

```
┌─────────────────────────────────────────────────────────┐
│ EXCHANGE TOOLS ADMIN APP                        □ ▣ ⊠ │
│ FILE  MANAGEMENT  HELP                                  │
│ ┌─ SEARCH / VIEW / EDIT ─────────────────────────────┐ │
│ │  [◄] [◄] /COMMODITIES & TRADING PERIODS/VANILLA COMMODITIES ▽ │
│ └─────────────────────────────────────────────────────┘ │
│ ┌─ SEARCH FOR VANILLA COMMODITIES ───────────────────┐ │
│ │ NAME: [        ]      │ NAME            │PRICE UOM│ │
│ │                       │ 21 DAY BFO      │ BBL    △│ │
│ │ PRICE UOM: [<ANY>  ▽] │ 21 DAY BFO MOP  │ BBL     │ │
│ │         ( O )         │ ANR OKLAHOMA BASIS SWAP(NE)│MMBTU│ │
│ │                       │ ALBERTA BASIS SWAP (NA)│MMBTU│ │
│ │   244 RECORDS FOUND   │ BFQ             │ BBL     │ │
│ │                       │ BFO PARTIAL MOP │ BBL    ▽│ │
│ └─────────────────────────────────────────────────────┘ │
│ ┌─ VIEW / EDIT VANILLA COMMODITY ────────────────────┐ │
│ │  NEW  │ COPY │ DELETE │ EDIT │ SAVE │ CANCEL      │ │
│ │ ┌GEN│QTY & PRICE│MISC│GROUPS│EXCHGS│TRADING PRDS│UOMS│CONTRACT┐│
│ │ │ OID:                    [220             ]     △││
│ │ │ NAME:                   [21 DAY BFO      ]     ││
│ │ │ SHORT NAME:             [21 DAY BFO      ]     ││
│ │ │ ABBREVIATED NAME:       [21DE            ]     ││
│ │ │ CONTRACT TYPE:          [ENERGY          ▽]    ││
│ │ │ ALLOW AGGREGATION ON PRICE:       ☑            ││
│ │ │ ALLOW CROSSING BIDS & OFFERS:     ☐            ││
│ │ │ ALLOW AUTOMATIC ORDER MATCHING:   ☐            ││
│ │ │ ALLOW NEGOTIATIONS:               ☑            ││
│ │ │ MUST BE CLEARED:                  ☐            ││
│ │ │ PARTIAL FILLS TYPE:     [ALLOW PARTIAL FILLS ▽]││
│ │ │ SHOW SPOT TRADING PERIOD DATE IN NAME: ☐       ││
│ │ │ SHOW VALID CPTY ORDERS ONLY:      ☐            ││
│ │ │ ALLOW PRIVATE TRADES:             ☑           ▽││
│ │ [◄]                                          [►] │ │
│ └─────────────────────────────────────────────────────┘ │
│ 03:05:45 PM GMT WELCOME TO EXCHANGE TOOLS ADMIN VERSION 3.9.0.3 │TCADMIN│03:48:18 PM GMT│
└─────────────────────────────────────────────────────────┘
```

FIG. 18

```
┌─────────────────────────────────────────────────────────┐
│ EXCHANGE TOOLS ADMIN APP                       □ ▣ ⊠    │
│ FILE  MANAGEMENT  HELP                                  │
│ ┌─ SEARCH /VIEW /EDIT ────────────────────────────────┐│
│ │    [≡]  [≡] /COMMODITIES & TRADING PERIODS/VANILLA COMMODITIES ▽ ││
│ ├─────────────────────────────────────────────────────┤│
│ │ SEARCH FOR VANILLA COMMODITIES                      ││
│ │ NAME: [        ]        ┌──NAME──────────┬─PRICE UOM─┐│
│ │                         │21 DAY BFO      │BBL       △││
│ │ PRICE UOM: [<ANY>    ▽] │21 DAY BFO MOP  │BBL        ││
│ │             ◯           │ANR OKLAHOMA BASIS SWAP(NE)│MMBTU│
│ │        244 RECORDS FOUND│ALBERTA BASIS SWAP (NA)│MMBTU│
│ │                         │BFO             │BBL        ││
│ │                         │BFO PARTIAL MOP │BBL       ▽││
│ ├─────────────────────────────────────────────────────┤│
│ │ VIEW /EDIT VANILLA COMMODITY                        ││
│ │ ┌─NEW──┬─COPY──┬─DELETE──┬─EDIT──┬─SAVE──┬─CANCEL─┐ ││
│ │ ├──────┴───────┴─────────┴───────┴───────┴────────┤ ││
│ │ │GEN│QTY & PRICE│MISC│GROUPS│EXCHGS│TRADING PRDS│UOMS│CONTRACT│△│
│ │ │ TRADE IN MULTIPLES OF LOT:    [✓]                │ ││
│ │ │ LOT SIZE:                     [600.0000       ]  │ ││
│ │ │ LOT CHOICES COUNT:            [               ]  │ ││
│ │ │ DEFAULT QUANTITY:             [600.0000       ]  │ ││
│ │ │ QUANTITY SCALE:               [0              ]  │ ││
│ │ │ QUANTITY MULTIPLIER:          [               ]  │ ││
│ │ │ QUANTITY UOM:                 [MD             ]  │ ││
│ │ │ DEFAULT PRICE:                [             ▽ ]  │ ││
│ │ │ ALLOW POSITIVE PRICES ONLY:   [✓]                │ ││
│ │ │ PRICE VARIANCES EXCEPTION AMOUNT: [           ]  │ ││
│ │ │ PRICE SCALE:                  [2              ]  │ ││
│ │ │ PRICE TICK SIZE:              [               ]  │ ││
│ │ │ CONSTRAIN PRICES TO TICK SIZE:[ ]                │ ││
│ │ │ PRICE UOM:                    [BBL          ▽]  │▽││
│ │ │ ◁                                              ▷ │ ││
│ ├─────────────────────────────────────────────────────┤│
│ │03:05:45 PM GMT WELCOME TO EXCHANGE TOOLS ADMIN VERSION 3.9.0.3│TCADMIN│03:49:59 PM GMT││
└─────────────────────────────────────────────────────────┘
```

| EXCHANGE TOOLS ADMIN APP | | | | |
|---|---|---|---|---|
| FILE  MANAGEMENT  HELP | | | | |

SEARCH / VIEW / EDIT
/COMMODITIES & TRADING PERIODS / VANILLA TRADING PERIODS

SEARCH FOR VANILLA TRADING PERIODS

| NAME: | | NAME | COMMODITY |
|---|---|---|---|
| COMMODITY: | | FEB06 | BRENT DFL SWAP |
| CATEGORY: | <ANY> | FEB06 | BRENT SWAP |
| TRADING START: | | MARCH06 | BRENT DFL SWAP |
| PRICING START: | | MARCH06 | BRENT SWAP |
| | | APRIL06 | BRENT SWAP |
| | | APRIL06 | BRENT SWAP |

25 RECORDS FOUND

VIEW / EDIT VANILLA TRADING PERIOD

| NEW | COPY | DELETE | EDIT | SAVE | CANCEL |
|---|---|---|---|---|---|

| OID: | 20098 |
|---|---|
| NAME: | FEB06 |
| COMMODITY: | BRENT DFL SWAP |
| CATEGORY: | MONTHLY |
| SORTING PRIORITY: | 1 |
| PRICING START DATE: | 01-FEB-06-12:00 AM GMT |
| PRICING END DATE: | 01-MAR-06-12:00 AM GMT |
| TRADING START DATE: | 13-DEC-05-12:00 AM GMT |
| TRADING END DATE: | 01-FEB-06-12:00 AM GMT |
| AT THE MONEY PRICE: | |
| STRIKES ABOVE ATM COUNT: | |
| STRIKES BELOW ATM COUNT: | |
| STRIKE PRICE STEP SIZE: | |
| ICTS QUOTE STRING ONE: | |
| ICTS QUOTE STRING TWO: | |
| VALID QTY PERIODICITY TYPES: | |

| AVAILABLE | | ASSIGNED | |
|---|---|---|---|
| PER HOUR | | TOTAL | |
| PER HOUR PEAK | | | |

03:05:45 PM GMT WELCOME TO EXCHANGE TOOLS ADMIN VERSION 3.9.0.3  TCADMIN 04:14:41 PM GMT

```
┌─────────────────────────────────────────────────────────┐
│ EXCHANGE TOOLS ADMIN APP                         □ ▣ ⊠ │
│ FILE  MANAGEMENT  HELP                                  │
│ ┌─SEARCH /VIEW /EDIT──────────────────────────────────┐ │
│ │ ◄  ►  /COMMODITIES & TRADING PERIODS/VANILLA TRADING PERIODS ▽│ │
│ │ ┌─────────────────────────────────────────────────┐ │ │
│ │ │SEARCH FOR VANILLA TRADING PERIODS               │ │ │
│ │ │NAME: [        ]        │ NAME  │ COMMODITY  │▲│ │ │
│ │ │COMMODITY: [BRENT]      │ Q100  │ BRENT SWAP │ │ │ │
│ │ │CATEGORY: [<ANY>      ▽]│ 2006  │ BRENT SWAP │ │ │ │
│ │ │TRADING START: [ ▽][ ▽] │ 2007  │ BRENT SWAP │ │ │ │
│ │ │PRICING START: [ ▽][ ▽] │ 2008  │ BRENT SWAP │ │ │ │
│ │ │              [○]       │ 2009  │ BRENT SWAP │ │ │ │
│ │ │        88 RECORDS FOUND│ 2010  │ BRENT SWAP │▽│ │ │
│ │ └─────────────────────────────────────────────────┘ │ │
│ │ ┌─────────────────────────────────────────────────┐ │ │
│ │ │VIEW /EDIT VANILLA TRADING PERIOD                │ │ │
│ │ │  NEW  │ COPY │ DELETE │ EDIT │ SAVE │ CANCEL    │ │ │
│ │ │OID:              [19786]                        │ │ │
│ │ │NAME:             [2006]                         │ │ │
│ │ │COMMODITY:        [BRENT SWAP]             [○]   │ │ │
│ │ │CATEGORY:         [ANNUAL                    ▽]  │ │ │
│ │ │SORTING PRIORITY: [3                         ▽]  │ │ │
│ │ │PRICING START DATE:  [01-JAN-06 05:00 AM GMT ▽]  │ │ │
│ │ │PRICING END DATE:    [01-JAN-07 05:00 AM GMT ▽]  │ │ │
│ │ │TRADING START DATE:  [01-JAN-06 05:00 AM GMT ▽]  │ │ │
│ │ │TRADING END DATE:    [01-JAN-06 05:00 AM GMT ▽]  │ │ │
│ │ │AT THE MONEY PRICE:                              │ │ │
│ │ │STRIKES ABOVE ATM COUNT:                         │ │ │
│ │ │STRIKES BELOW ATM COUNT:                         │ │ │
│ │ │STRIKE PRICE STEP SIZE:                          │ │ │
│ │ │ICTS QUOTE STRING ONE:                           │ │ │
│ │ │ICTS QUOTE STRING TWO:                           │ │ │
│ │ │VALID QTY PERIODICITY TYPES:                     │ │ │
│ │ │  ┌──AVAILABLE──┐   ┌──ASSIGNED──┐               │ │ │
│ │ │  │TOTAL      ▲│   │PER MONTH  ▲│               │ │ │
│ │ │  │PER HOUR    │   │            │               │ │ │
│ │ │  └────────────┘   └────────────┘               │ │ │
│ │ └─────────────────────────────────────────────────┘ │ │
│ │ │01:41:19 PM GMT WELCOME TO EXCHANGE TOOLS ADMIN VERSION 3.9.0.4│ TCADMIN 02:05:42 PM GMT│
│ └─────────────────────────────────────────────────────┘ │
└─────────────────────────────────────────────────────────┘
```

| TEST RESULTS | | | | | | | |
|---|---|---|---|---|---|---|---|
| NAME | COMMODITY | CATEGORY | SORT. | PRICING START DATE | PRICING END DATE | TRADING START DATE | TRADING END DATE | ...ICTS QUOTE | PERIODICITY TYPES |
| JAN06 | OSEBERG | MONTHLY | 1 | 01-JAN-06 12:00:00 AM EST | 01-FEB-06 12:00:00 AM EST | 01-JAN-06 12:00:00 AM EST | 01-JAN-06 12:00:00 AM EST | | TOTAL_PER_MONTH |
| FEB06 | OSEBERG | MONTHLY | 1 | 01-FEB-06 12:00:00 AM EST | 01-MAR-06 12:00:00 AM EST | 01-JAN-06 12:00:00 AM EST | 01-FEB-06 12:00:00 AM EST | | TOTAL_PER_MONTH |
| MAR06 | OSEBERG | MONTHLY | 1 | 01-MAR-06 12:00:00 AM EST | 01-APR-06 12:00:00 AM EST | 01-JAN-06 12:00:00 AM EST | 01-MAR-06 12:00:00 AM EST | | TOTAL_PER_MONTH |
| APR06 | OSEBERG | MONTHLY | 1 | 01-APR-06 12:00:00 AM EST | 01-MAY-06 12:00:00 AM EST | 01-JAN-06 12:00:00 AM EST | 01-APR-06 12:00:00 AM EST | | TOTAL_PER_MONTH |
| MAY06 | OSEBERG | MONTHLY | 1 | 01-MAY-06 12:00:00 AM EST | 01-JUN-06 12:00:00 AM EST | 01-JAN-06 12:00:00 AM EST | 01-MAY-06 12:00:00 AM EST | | TOTAL_PER_MONTH |
| JUN06 | OSEBERG | MONTHLY | 1 | 01-JUN-06 12:00:00 AM EST | 01-JUL-06 12:00:00 AM EST | 01-JAN-06 12:00:00 AM EST | 01-JUN-06 12:00:00 AM EST | | TOTAL_PER_MONTH |
| JUL06 | OSEBERG | MONTHLY | 1 | 01-JUL-06 12:00:00 AM EST | 01-AUG-06 12:00:00 AM EST | 01-JAN-06 12:00:00 AM EST | 01-JUL-06 12:00:00 AM EST | | TOTAL_PER_MONTH |

| MARKET DETAILS | CTRL+D |
| MARKETS SUMMARIES | CTRL+M |
| MARKET GRID | CTRL+K |
| MARKET PROFILE BUILDER | CTRL+F |
| SPREAD MATRIX | CTRL+S |
| MY ORDERS | |
| ACTIVE ORDERS | |
| PLACE MULTIPLE /OPT ORDERS | CTRL+P |
| PLACE BATCH ORDERS | CTRL+Y |
| PRICE INDICES | CTRL+D |
| ICTS POSITION GRID | CTRL+I |
| SHOPPING CART | CTRL+G |
| ICTS TRADE SEARCH | CTRL+T |
| HEADLINES | CTRL+H |
| PREFERENCES | |
| CONFIRMATION LANGUAGE | |
| QUIT | CTRL+Q |

FIG. 57

| SEARCH | | |
|---|---|---|
| SEARCH: FIRST NAME OR LAST NAME OR USER NAME ||||
| FIRST NAME | LAST NAME | USER NAME |
| VINNIE | ANNUNZIATA | VANNUNZIA |
| BROKER | 1 | BROKER 1 |
| VINCENT | ANNUNZIATA | VANNUNZ |
| JOHN | ROWLAND | JRJR |

OK    CANCEL

FIG. 63

PREFERENCES
FILE   WINDOW   HELP

TRADER 1                          POWERED BY
04:05:50 PM GMT              TRADECAPTURE INC.

DEFAULTS | MISCELLANEOUS | PREFERRED | PREFERRED BROKERS | ACCOUNTS

THE FOLLOWING DEFAULTS ALLOW YOU TO MANAGE BROKERS WHO ARE LISTED AS APPROVED BROKERS FOR YOUR COMPANY. IF YOU CHOOSE A DEFAULT BROKER, WHENEVER YOU PLACE A NEW ORDER, THE DEFAULT BROKER WILL BE ASSOCIATED WITH THE ORDER, MEANING THE BROKER HAS PERMISSION TO ACT ON THAT ORDER ON YOUR BEHALF. IF YOU CONFIGURE A PREFERRED BROKERS LIST, THE LIST WILL BE USED WHEN YOU ARE PLACING NEW ORDERS TO PROVIDE YOU WITH QUICK ACCESS TO YOUR MOST FREQUENTLY USED BROKERS.

DEFAULT BROKER

BROKER 1 (BROKER 1)

BROKER (BROKER 1)
MARCO DUNAND (B) (MERCURIA)
VINCENT ANNUNZIATA (MERCURIA)
JOHN ROWLAND (SEMPRA ENERGY TRADING)
DANIEL JAEGGI (MERCURIA)
GLEN OZTEMEL (SEMPRA ENERGY TRADING)
KURT CHAPMAN (SEMPRA ENERGY TRADING)
JOHN PETTI (SEMPRA ENERGY TRADING)

OK    CANCEL

FIG. 64

BULLET SWAPS MARKET GRID-NYMEX CLEARPORT VIA TRADE CAPTURE

FILE   WINDOW   HELP

TRADER 1
01:33:48 PM EST

POWERED BY
TRADECAPTURE INC.

VIEW: BULLET SWAPS ▽  BEST ▽  ALL ▽  ☐ PRICE AGG  ☐ HIDE INACTIVE

| | | BRENT BULLET SWAP (BB) | | | | | | | WTI BULLET SWAP (WS) | | | | | |
|---|---|---|---|---|---|---|---|---|---|---|---|---|---|---|
| | | BIDS | | | OFFERS | | | | BIDS | | | OFFERS | | |
| | HIT | QTY | PRICE | PRICE | QTY | LIFT | | HIT | QTY | PRICE | PRICE | QTY | LIFT | |
| MAR06 | 1 | – | 10 | 60.00 | 61.00 | 25 | – | | SELF | 50 | 63.25 | 63.92 | 75 | SELF |
| APR06 | 1 | – | 10 | 61.00 | 62.00 | 25 | – | | SELF | 50 | 62.25 | 62.35 | 77 | SELF |
| MAY06 | 1 | – | 10 | 62.00 | 63.00 | 25 | – | | – | 50 | 62.15 | 62.38 | 50 | SELF |
| JUN06 | 1 | – | 10 | 63.00 | 64.00 | 25 | – | | – | 50 | 63.15 | 63.18 | 50 | – |
| JUL06 | 1 | – | 10 | 63.00 | 65.00 | 25 | – | | – | 65 | 63.82 | 63.97 | 50 | – |
| AUG06 | 1 | – | 10 | 64.00 | 66.00 | 25 | – | | – | 50 | 64.23 | 64.27 | 50 | – |

| | | | PANHANDLE EASTERN | | | | | | CHICAGO CITY GATE | | | | | | NORTHWEST ROCKIES | | | |
|---|---|---|---|---|---|---|---|---|---|---|---|---|---|---|---|---|---|---|
| | | BIDS | | | OFFERS | | | BIDS | | | OFFERS | | | BIDS | | | OFFERS | |
| | | HIT | QTY | PRICE | PRICE | QTY | LIFT | HIT | QTY | PRICE | PRICE | QTY | LIFT | HIT | QTY | PRICE | PRICE | QTY | LIFT |
| JUL06 | 1 | Co1 | | 6.522 | 6.850 | | Co2 | Co3 | | 6.010 | 6.014 | | Co2 | - | | | 7.250 | | - |
| | 2 | Co1 | 1 | 6.522 | 6.880 | 7 | Co3 | Co1 | 25 | 5.800 | 6.020 | 5 | Co1 | | ADD BID | | | | |
| | 3 | Co1 | 1 | 6.522 | 6.900 | 7 | Co3 | Co1 | 3 | 5.800 | 6.200 | 8 | Co1 | | EDIT BID-CANCEL FIRST | | | | |
| AUG06 | 1 | - | | | 6.990 | 2 | Co1 | Co3 | 1 | 6.020 | 6.100 | 3 | Co1 | | EDIT BID-KEEP ACTIVE | | | | |
| | 2 | - | | | 6.990 | 1 | Co1 | Co3 | 1 | 6.000 | 6.120 | 3 | Co2 | | CANCEL BID | | | | |
| | 3 | - | | | 6.999 | 5 | Co2 | Co1 | 4 | 6.000 | 6.130 | 5 | Co1 | | HOLD BID | | | | |
| SEP06 | 1 | Co2 | 4 | 8.000 | | | - | - | | | | | - | - | +0.004 | | | | |
| | 2 | - | | | | | - | - | | | | | - | - | +0.003 | | | | |
| | 3 | - | | | | | - | - | | | | | - | - | +0.002 | | | | |
| OCT06 | 1 | - | | | | | - | - | | | | | - | - | +0.001 | | | | |
| | 2 | - | | | | | - | - | | | | | - | - | -0.001 | | | | |
| | 3 | - | | | | | - | - | | | | | - | - | -0.002 | | | | |
| NOV06 | 1 | - | | | | | - | - | | | | | - | - | -0.003 | | | | |
| | 2 | - | | | | | - | - | | | | | - | - | -0.004 | | | | |

```
ADD BID
EDIT BID-CANCEL FIRST
EDIT BID-KEEP ACTIVE
CANCEL BID
HOLD BID
+0.04
+0.03
+0.02
+0.01
-0.01
-0.02
-0.03
-0.04
```

| ADD BID | | | ☐◫⊠ |
|---|---|---|---|
| BRENT CALENDAR SWAP (CY) APR06 ||||
| BEST BID || BEST OFFER ||
| QTY | PRICE | PRICE | QTY |
|  |  |  |  |

PRICE: ☐ $/BBL
QUANTITY: 1.00 ▽ MB
⊕ OK ⊗ CANCEL
▷DETAILS

| PLEASE CONFIRM PURCHASE & SALES: | | | | | |
|---|---|---|---|---|---|
| COMMODITY | TRADING PRD | OPTY | QTY | B/O | PRICE |
| WTI BULLET SWAP(WS) | APR06 | + | 75 MB | B | 62.00 $ / BBL |
| WTI BULLET SWAP(WS) | MAY06 | + | 75 MB | B | 62.50 $ / BBL |
| BRENT BULLET SWAP(BB) | MAY06 | + | 150 MB | O | 60.00 $ / BBL |

COMMODITY: BRENT BULLET SWAP(BB)
TRADING PERIOD: MAY06
COUNTERPARTY: +
PRICE: 60.00 $ / BBL
QUANTITY: 150 MB
NO ADDITIONAL TERMS
ACCOUNT: 22-6464370 (CLR)  [MORE]
PASSWORD: ******

WARNING: YOU ARE ABOUT TO TRADE A LINKED ORDER CHAIN!

[OK LINKED] [ADD TO CART] [NEGOTIATE] [SWEEP] [CANCEL]

FIG. 101

| TRADE NOTIFICATION | | | | | |
|---|---|---|---|---|---|
| TRADE DATE: | 02-MAR-06 06:00:44 PM EST | TRADE DATE: | 02-MAR-06 06:00:44 PM EST | TRADE DATE: | 02-MAR-06 06:00:44 PM |
| TRADE#: | 309 | TRADE#: | 310 | TRADE#: | 310 |
| INPT. ORDER #: | 283230 | INPT. ORDER #: | 283231 | INPT. ORDER #: | 283231 |
| ACCPT. ORDER #: | 283344 | ACCPT. ORDER #: | 283345 | ACCPT. ORDER #: | 283345 |
| BUYER: | FOR CLEARING WITH NYMEX | BUYER: | FOR CLEARING WITH NYMEX | BUYER: | FOR CLEARING WITH NYME |
| BUYER CONTACT: | FOR CLEARING WITH NYMEX | BUYER CONTACT: | FOR CLEARING WITH NYMEX | BUYER CONTACT: | FOR CLEARING WITH NYME |
| BUYER ACCOUNT: | | BUYER ACCOUNT: | | BUYER ACCOUNT: | |
| SELLER: | CENTAURUS ENERGY L.P. | SELLER: | CENTAURUS ENERGY L.P. | SELLER: | CENTAURUS ENERGY L.P. |
| SELLER CONTACT: | JOHN ARNOLD 832-615-8650... | SELLER CONTACT: | JOHN ARNOLD 832-615-8650... | SELLER CONTACT: | JOHN ARNOLD 832-615-86 |
| SELLER ACCOUNT: | 22-6464370 (CLR) | SELLER ACCOUNT: | 22-6464370 (CLR) | SELLER ACCOUNT: | 22-6464370 (CLR) |
| COMMODITY: | WTI BULLET SWAP (WS) | COMMODITY: | WTI BULLET SWAP (WS) | COMMODITY: | WTI BULLET SWAP (WS) |
| TRADING PERIOD: | APR06 | TRADING PERIOD: | MAY06 | TRADING PERIOD: | MAY06 |
| TYPE: | SALE | TYPE: | SALE | TYPE: | SALE |
| PRICE: | 62.00 $ / BBL | PRICE: | 62.50 $ / BBL | PRICE: | 62.50 $ / BBL |
| QUANTITY: | 75 MB | QUANTITY: | 75 MB | QUANTITY: | 75 MB |
| TOTAL QUANTITY: | 75 MB | TOTAL QUANTITY: | 75 MB | TOTAL QUANTITY: | 75 MB |
| NET COST: | 4,650,000.00 $ | NET COST: | 4,687,500.00 $ | NET COST: | 4,687,500.00 $ |

[ OK ]  [ ALL OK ]

FIG. 102

```
ADD BID
ADD LINKED ORDERS
EDIT LINKED ORDERS - CANCEL FIRST
EDIT LINKED ORDERS - KEEP ACTIVE
CANCEL LINKED ORDERS
HOLD LINKED ORDERS
```

ADD BID
ADD LINKED ORDERS
EDIT LINKED ORDERS - CANCEL FIRST
EDIT LINKED ORDERS - KEEP ACTIVE
CANCEL LINKED ORDERS
HOLD LINKED ORDERS

| PLEASE CONFIRM THE FOLLOWING SALE: | | | | |
|---|---|---|---|---|
| WTI BULLET SWAP(WS)AUG06 | | | | |
| BEST BID | | BEST OFFER | | |
| QTY | PRICE | PRICE | QTY | |
| 75 | 63.75 | 64.00 | 250 | |

COUNTERPARTY: +
PRICE: 63.75 $ / BBL
QUANTITY: 75 MB
NO ADDITIONAL TERMS:
ACCOUNT: 537-BILATERAL (BIL OR.. ▽ [MORE]
MIN PARTIAL FILL QTY: 1 MB
PARTIAL FILL QTY: 75 MB
PASSWORD: ******

[HIT] [ADD TO CART] [NEGOTIATE] [SWEEP] [CANCEL]

FIG. 110

| TRADE NOTIFICATION | |
|---|---|
| TRADE DATE: | 02-MAR-06 10:29:23 PM EST |
| TRADE #: | 314 |
| INPT. ORDER #: | 283467 |
| ACCPT. ORDER #: | 283469 |
| BUYER: | FOR CLEARING WITH NYMEX |
| BUYER CONTACT: | FOR CLEARING WITH NYMEX |
| BUYER ACCOUNT: | |
| SELLER: | SEMPRA ENERGY TRADING |
| SELLER CONTACT: | TRADER 1 |
| SELLER ACCOUNT: | 537-BILATERAL (BIL OR CLR) |
| COMMODITY: | WTI BULLET SWAP (WS) |
| TRADING PERIOD: | AUG06 |
| TYPE: | SALE |
| PRICE: | 63.75 $ /BBL |
| QUANTITY: | 75 MB |
| TOTAL QUANTITY: | 75 MB |
| NET COST: | 4,781,250.00 $ |

FIG. 111

PLEASE CONFIRM THE FOLLOWING SALE:

WTI BULLET SWAP(WS)AUG06

| QTY | BEST BID | | BEST OFFER | |
|---|---|---|---|---|
| | PRICE | | PRICE | QTY |
| 75 | 63.75 | | 64.00 | 250 |

COUNTERPARTY: +
PRICE: 63.75 $/BBL
QUANTITY: 75 MB
NO ADDITIONAL TERMS
ACCOUNT: 537-BILATERAL (BIL OR CLR)
MIN PARTIAL FILL QTY: 1 MB
PARTIAL FILL QTY: 75                    ▽    MORE
PASSWORD: ******                             MB

HIT    ADD TO CART    NEGOTIATE    SWEEP    CANCEL

FIG. 112

| TRADE DATE: | 02-MAR-06 10:30:46 PM EST |
|---|---|
| TRADE #: | 315 |
| INPT. ORDER #: | 283471 |
| ACCPT. ORDER #: | 283473 |
| BUYER: | FOR CLEARING WITH NYMEX |
| BUYER CONTACT: | FOR CLEARING WITH NYMEX |
| BUYER ACCOUNT: | |
| SELLER: | SEMPRA ENERGY TRADING |
| SELLER CONTACT: | TRADER 1 |
| SELLER ACCOUNT: | 537-BILATERAL (BIL OR CLR) |
| COMMODITY: | WTI BULLET SWAP (WS) |
| TRADING PERIOD: | AUG06 |
| TYPE: | SALE |
| PRICE: | 63.75 $ / BBL |
| QUANTITY: | 25 MB |
| TOTAL QUANTITY: | 25 MB |
| NET COST: | 1,593,750.00 $ |

[ OK ]  [ ALL OK ]

FIG. 113

| PLEASE CONFIRM THE FOLLOWING SALE: | | | | | |
|---|---|---|---|---|---|
| | | WTI BULLET SWAP(WS)MAY06 | | | |
| BEST BID | | | BEST OFFER | | |
| QTY | PRICE | | | PRICE | QTY |
| 75 | 62.50 | | | 62.38 | 50 |

COUNTERPARTY: +
PRICE: 62.38 $ / BBL
QUANTITY: 50 MB
NO ADDITIONAL TERMS
ACCOUNT: [22-6464370 (CLR)]
MIN PARTIAL FILL QTY: [1 MB]
PARTIAL FILL QTY: [50] ▽ MORE MB
PASSWORD: [*****]

[ HIT ] [ ADD TO CART ] [ NEGOTIATE ] [ SWEEP ] [ CANCEL ]

FIG. 115

PLEASE CONFIRM THE FOLLOWING PURCHASE:

WTI BULLET SWAP(WS)MAY06

| BEST BID | | | BEST OFFER | |
|---|---|---|---|---|
| QTY | PRICE | | PRICE | QTY |
| 75 | 62.50 | | 62.38 | 50 |

COUNTERPARTY: +
PRICE: 62.38 $ / BBL
QUANTITY: 50 MB
NO ADDITIONAL TERMS
ACCOUNT: 2-123455 (BIL OR CLR)
 22-646370 (CLR)
 2-123455 (BIL OR CLR)          MORE
MIN PARTIAL FILL QTY:
PARTIAL FILL QTY: 50                MB
PASSWORD: *****

[HIT]  [ADD TO CART]  [NEGOTIATE]  [SWEEP]  [CANCEL]

FIG. 117

| TRADE NOTIFICATION | |
|---|---|
| TRADE DATE: | 03-MAR-06 02:07:47 PM EST |
| TRADE #: | 317 |
| INPT. ORDER #: | 282591 |
| ACCPT. ORDER #: | 283483 |
| BUYER: | CENTAURUS ENERGY L.P. |
| BUYER CONTACT: | JOHN ARNOLD 832-615-8650 CENT... |
| BUYER ACCOUNT: | 2-123455 (BIL OR CLR) |
| SELLER: | SEMPRA ENERGY TRADING |
| SELLER CONTACT: | GLEN OZTEMEL 203-355-5301 SEM... |
| SELLER ACCOUNT: | |
| COMMODITY: | WTI BULLET SWAP (WS) |
| TRADING PERIOD: | MAY06 |
| TYPE: | PURCHASE |
| PRICE: | 62.38 $ / BBL |
| QUANTITY: | 50 MB |
| TOTAL QUANTITY: | 50 MB |
| NET COST: | 3,119,000.00 $ |

OK    ALL OK

FIG. 118

| | |
|---|---|
| TRADE DATE: | 03-MAR-06 02:07:47 PM EST |
| TRADE #: | 317 |
| INPT. ORDER #: | 282591 |
| ACCPT. ORDER #: | 283483 |
| BUYER: | CENTAURUS ENERGY L.P. |
| BUYER CONTACT: | JOHN ARNOLD 832-615-8650 CENT... |
| BUYER ACCOUNT: | 2-123455 (BIL OR CLR) |
| SELLER: | SEMPRA ENERGY TRADING |
| SELLER CONTACT: | GLEN OZTEMEL 203-355-5301 SEM... |
| SELLER ACCOUNT: | 270-SEMPRA (BIL OR CLR) |
| COMMODITY: | WTI BULLET SWAP (WS) |
| TRADING PERIOD: | MAY06 |
| TYPE: | |
| PRICE: | 62.38 $/BBL |
| QUANTITY: | 50 MB |
| TOTAL QUANTITY: | 50 MB |
| NET COST: | 3,119,000.00 $ |

FIG. 119

| PLEASE CONFIRM PURCHASE & SALES: | | | | | |
|---|---|---|---|---|---|
| COMMODITY | TRADING PRD | CPTY | QTY | B/O | PRICE |
| WTI BULLET SWAP(WS) | APR06 | + | 75 MB | B | 62.00 $ / BBL |
| WTI BULLET SWAP(WS) | MAY06 | + | 75 MB | B | 62.50 $ / BBL |
| BRENT BULLET SWAP(BB) | MAY06 | + | 150 MB | O | 60.00 $ / BBL |

COMMODITY: BRENT BULLET SWAP(BB)
TRADING PERIOD: MAY06
COUNTERPARTY: +
PRICE: 60.00 $ / BBL
QUANTITY: 150 MB
NO ADDITIONAL TERMS
ACCOUNT: 22-6464370 (CLR) ▽ [MORE]
PASSWORD: ******

WARNING: YOU ARE ABOUT TO TRADE A LINKED ORDER CHAIN!

[OK LINKED] [ADD TO CART] [NEGOTIATE] [SWEEP] [CANCEL]

FIG. 122

| TRADE NOTIFICATION | | | | | |
|---|---|---|---|---|---|
| TRADE DATE: | 06-MAR-06 12:50:13 AM EST | TRADE DATE: | 06-MAR-06 12:50:13 AM EST | TRADE DATE: | 06-MAR-06 12:50:13 AM |
| TRADE #: | 334 | TRADE #: | 335 | TRADE #: | 336 |
| INPT. ORDER #: | 283350 | INPT. ORDER #: | 283351 | INPT. ORDER #: | 283352 |
| ACCPT. ORDER #: | 283687 | ACCPT. ORDER #: | 283688 | ACCPT. ORDER #: | 283689 |
| BUYER: | FOR CLEARING WITH NYMEX | BUYER: | FOR CLEARING WITH NYMEX | BUYER: | CENTAURUS ENERGY L.P. |
| BUYER CONTACT: | FOR CLEARING WITH NYMEX | BUYER CONTACT: | FOR CLEARING WITH NYMEX | BUYER CONTACT: | JOHN ARNOLD 832-615-86 |
| BUYER ACCOUNT: | | BUYER ACCOUNT: | | BUYER ACCOUNT: | 22-6464370 (CLR) |
| SELLER: | CENTAURUS ENERGY L.P. | SELLER: | CENTAURUS ENERGY L.P. | SELLER: | FOR CLEARING WITH NYME |
| SELLER CONTACT: | JOHN ARNOLD 832-615-8650.. | SELLER CONTACT: | JOHN ARNOLD 832-615-8650.. | SELLER CONTACT: | FOR CLEARING WITH NYME |
| SELLER ACCOUNT: | 22-6464370 (CLR) | SELLER ACCOUNT: | 22-6464370 (CLR) | SELLER ACCOUNT: | |
| COMMODITY: | WTI BULLET SWAP (WS) | COMMODITY: | WTI BULLET SWAP (WS) | COMMODITY: | BRENT BULLET SWAP (BB) |
| TRADING PERIOD: | APR06 | TRADING PERIOD: | MAY06 | TRADING PERIOD: | MAY06 |
| TYPE: | SALE | TYPE: | SALE | TYPE: | PURCHASE |
| PRICE: | 62.00 $ / BBL | PRICE: | 62.50 $ / BBL | PRICE: | 60.00 $ / BBL |
| QUANTITY: | 75 MB | QUANTITY: | 75 MB | QUANTITY: | 150 MB |
| TOTAL QUANTITY: | 75 MB | TOTAL QUANTITY: | 75 MB | TOTAL QUANTITY: | 150 MB |
| NET COST: | 4,650,000.00 $ | NET COST: | 4,687,500.00 $ | NET COST: | 9,000,000.00 $ |

[ OK ] [ ALL OK ]

FIG. 123

| TRADE NOTIFICATION | | | |
|---|---|---|---|
| TRADE DATE: | 06-MAR-06 12:50:13 AM EST | 06-MAR-06 12:50:13 AM EST | 06-MAR-06 12:50:13 AM EST |
| TRADE #: | 334 | 335 | 336 |
| INPT. ORDER #: | 283350 | 283351 | 283352 |
| ACCPT. ORDER #: | 283687 | 283688 | 283689 |
| BUYER: | SEMPRA ENERGY TRADING | SEMPRA ENERGY TRADING | FOR CLEARING WITH NYME |
| BUYER CONTACT: | TRADER 1 | TRADER 1 | FOR CLEARING WITH NYME |
| BUYER ACCOUNT: | 537-BILATERAL (BIL OR CLR) | 537-BILATERAL (BIL OR CLR) | |
| SELLER: | FOR CLEARING WITH NYMEX | FOR CLEARING WITH NYMEX | SEMPRA ENERGY TRADING |
| SELLER CONTACT: | FOR CLEARING WITH NYMEX | FOR CLEARING WITH NYMEX | TRADER 1 |
| SELLER ACCOUNT: | | | 537-BILATERAL (BIL OR CRL) |
| COMMODITY: | WTI BULLET SWAP (WS) | WTI BULLET SWAP (WS) | BRENT BULLET SWAP (BB) |
| TRADING PERIOD: | APR06 | MAY06 | MAY06 |
| TYPE: | PURCHASE | PURCHASE | SALE |
| PRICE: | 62.00 $ / BBL | 62.50 $ / BBL | 60.00 $ / BBL |
| QUANTITY: | 75 MB | 75 MB | 150 MB |
| TOTAL QUANTITY: | 75 MB | 75 MB | 150 MB |
| NET COST: | 4,650,000.00 $ | 4,687,500.00 $ | 9,000,000.00 $ |

OK    REPEAT CHAIN

ALL OK

| OPTIONS MARKET SUMMARIES – NYMEX CLEARPORT VIA TRADECAPTURE | | | | | | | | | |
|---|---|---|---|---|---|---|---|---|---|
| FILE WINDOW HELP | | | | | | | | | |

TRADER 1
12:02:02 PM EST

POWERED BY
TRADECAPTURE INC.

VIEW: OPTIONS

☐ PRICE AGG  ☑ HIDE INACTIVE

TOP 3

| COMMODITY | TRADING PRD | ADD'L TRMS | BIDS | | | OFFERS | | | |
|---|---|---|---|---|---|---|---|---|---|
| | | | HIT | QTY | PRICE | PRICE | QTY | LIFT | ADD'L TRMS |
| WTI APO OPTIONS(AO) | APR06 $65.00 PUT | | SELF | 3.0/D | 0.58 | | | | |
| WTI APO OPTIONS(AO) | APR06 $65.00 CALL | | SELF | 2.0/D | 0.50 | | | | |
| WTI APO OPTIONS(AO) | Q3-06 $62.00 CALL | | | | | 0.75 | 100.0/Q | SELF | |
| WTI APO OPTIONS(AO) | Q3-06 $62.00 CALL | | | | | 0.75 | 25.0/M | SELF | |

PLEASE CONFIRM THE FOLLOWING SALE:

WTI APO Options(AO)Apr06 $65.00 Call

| Best Bid | | Best Offer | |
|---|---|---|---|
| Qty | Price | Price | Qty |
| 2.0/D | 0.50 | | |

Counterparty:

Price: 0.50 USD/BBL

Quantity: 2.0 MB/D

No Additional Terms

Account: 22-6464370 (CLR)

Private Trade: No

Password: *****

[Hit] [Add to Cart] [Negotiate] [Sweep] [Cancel]  [More ▼]

| Trade Notification | |
|---|---|
| Trade Date: | 10-Mar-06 02:13:19 PM EST |
| Trade #: | 439 |
| Inpt. Order #: | 293552 |
| Accpt. Order #: | 293554 |
| Buyer: | For Clearing |
| Buyer Contact: | For Clearing |
| Buyer Account: | |
| Seller: | Centaurus Energy L.P. |
| Seller Contact: | John Arnold 832-615-8650 Cent... |
| Seller Account: | 22-6464370 (CLR) |
| Commodity: | WTI APO Options (AO) |
| Trading Period: | Apr06 |
| Type: | Sale |
| Strike Price: | $65.00 |
| Put/Call: | Call |
| Price: | 0.50 USD/BBL |
| Quantity: | 2.0 MB/D |
| Total Quantity: | 60.0 MB |
| Net Cost: | 30,000.00 USD |

[OK]  [All OK]

FIG. 134

| Trade Notification | |
|---|---|
| Trade Date: | 10-Mar-06 02:05:04 PM EST |
| Trade #: | 438 |
| Inpt. Order #: | 293528 |
| Accpt. Order #: | 293550 |
| Buyer: | Sempra Energy Trading |
| Buyer Contact: | Trader 1 |
| Buyer Account: | 537-BILATERAL (BIL or CLR) |
| Seller: | For Clearing |
| Seller Contact: | For Clearing |
| Seller Account: | |
| Commodity: | WTI APO Options (AO) |
| Trading Period: | Apr06 |
| Type: | Purchase |
| Strike Price: | $65.00 |
| Put/Call: | Call |
| Price: | 0.50 USD/BBL |
| Quantity: | 2.0 MB/D |
| Total Quantity: | 60.0 MB |
| Net Cost: | 30,000.00 USD |

[OK]  [Repeat Order]

[All OK]

ICTS TRADE SEARCH – NYMEX CLEARPORT VIA TRADECAPTURE
FILE  WINDOW  HELP

JOHN
11:29:04 AM EST

TRADES DONE BY: ALL

COMMODITY GROUP: ALL

COMMODITY: ALL

COUNTER PARTY: ALL

TRADING PERIOD CATEGORY: ALL

TRADE TYPE: ALL

POWERED BY
TRADECAPTURE INC.

| BUYER CONTACT | BUYER ACCT | BUYER COMM | A/I | SELLER | SELLER CONTACT | SELLER ACCT | SELLER COMM | TRADE DATE | TRADE # | INPT ORDER # | ACCPT ORDER # |
|---|---|---|---|---|---|---|---|---|---|---|---|
| FOR CLEARING | | | A | CENTAURUS | JOHN ARNOLD | 22-6464370 | | 13-MAR-06 11:27:18 AM EST | 480 | 293779 | 293789 |
| JOHN ARNOLD | 22-6464370 | | A | FOR CLEARING | FOR CLEARING | | | 13-MAR-06 11:26:43 AM EST | 479 | 293548 | 293783 |
| JOHN ARNOLD | 22-6464370 | | I | FOR CLEARING | FOR CLEARING | | | 13-MAR-06 11:26:35 AM EST | 478 | 293545 | 293781 |
| FOR CLEARING | | | A | CENTAURUS | JOHN ARNOLD | 22-6464370 | | 13-MAR-06 11:26:06 AM EST | 477 | 293527 | 293777 |
| FOR CLEARING | | | A | FOR CLEARING | FOR CLEARING | | | 12-MAR-06 09:43:46 PM EST | 474 | 293759 | 293762 |
| FOR CLEARING | | | A | FOR CLEARING | FOR CLEARING | | | 12-MAR-06 09:43:46 PM EST | 475 | 293757 | 293763 |
| FOR CLEARING | | | A | FOR CLEARING | FOR CLEARING | | | 12-MAR-06 09:43:04 PM EST | 471 | 293746 | 293751 |
| FOR CLEARING | | | A | FOR CLEARING | FOR CLEARING | | | 12-MAR-06 09:43:04 PM EST | 472 | 293742 | 293752 |
| FOR CLEARING | | | A | FOR CLEARING | FOR CLEARING | | | 12-MAR-06 09:43:04 PM EST | 473 | 293744 | 293753 |

ICTS POSITION INSPECTOR

BRENT BULLET SWAP(BB): MAY06
BOUGHT TRADES

| TRADE # | COUNTERPARTY | DATE | QTY | PRICE |
|---|---|---|---|---|
| 339 | FOR CLEARING WITH NYMEX | 06-MAR-06 | 150 | 60.00 |
| 336 | FOR CLEARING WITH NYMEX | 06-MAR-06 | 150 | 60.00 |
| 311 | FOR CLEARING WITH NYMEX | 02-MAR-06 | 150 | 60.00 |
| TOTAL BUYS | | | 450 | 60.00 |

BRENT BULLET SWAP(BB): MAY06
SOLD TRADES

| TRADE # | COUNTERPARTY | DATE | QTY | PRICE |
|---|---|---|---|---|
| 26 | FOR CLEARING WITH NYMEX | 10-FEB-06 | (75) | 65.00 |
| 24 | FOR CLEARING WITH NYMEX | 10-FEB-06 | (20) | 65.00 |
| TOTAL SELLS | | | (95) | 65.00 |

FIG. 144

| | |
|---|---|
| TRADE DATE: | 06-MAR-06 12:50:13 AM EST |
| TRADE #: | 336 |
| INPT. ORDER #: | 283352 |
| ACCPT. ORDER #: | 283689 |
| BUYER: | CENTAURUS ENERGY L.P. |
| BUYER CONTACT: | JOHN ARNOLD 832-515-8650 CENT... |
| BUYER ACCOUNT: | 22-6464370 (BIL OR CLR) |
| SELLER: | FOR CLEARING WITH NYMEX |
| SELLER CONTACT: | FOR CLEARING WITH NYMEX |
| SELLER ACCOUNT: | |
| COMMODITY: | BRENT BULLET SWAP(BB) |
| TRADING PERIOD: | MAY06 |
| TYPE: | PURCHASE |
| PRICE: | 60.00 $/BBL |
| QUANTITY: | 150 MB |
| TOTAL QUANTITY: | 150 MB |
| NET COST: | 9,000,000.00 $ |

FIG. 145

ICTS POSITION INSPECTOR

WTI BULLET SWAP FUTURES (WS): JUL06
BOUGHT TRADES

| TRADE # | COUNTERPARTY | DATE | QTY | PRICE |
|---|---|---|---|---|
| 183 | FOR CLEARING WITH NYMEX | 15-JUN-06 | 25 | 75.08 |
| 182 | FOR CLEARING WITH NYMEX | 15-JUN-06 | 100 | 76.00 |
| 178 | FOR CLEARING WITH NYMEX | 15-JUN-06 | 100 | 76.00 |
| 177 | FOR CLEARING WITH NYMEX | 15-JUN-06 | 100 | 76.00 |
| TOTAL BUYS | | | 325 | 75.93 |

WTI BULLET SWAP FUTURES (WS): JUL06
SOLD TRADES

| TRADE # | COUNTERPARTY | DATE | QTY | PRICE |
|---|---|---|---|---|
| 196 | FOR CLEARING WITH NYMEX | 15-JUN-06 | (45) | 75.00 |
| 195 | FOR CLEARING WITH NYMEX | 15-JUN-06 | (20) | 75.00 |
| 194 | FOR CLEARING WITH NYMEX | 15-JUN-06 | (20) | 75.00 |
| 193 | FOR CLEARING WITH NYMEX | 15-JUN-06 | (25) | 75.00 |
| 192 | FOR CLEARING WITH NYMEX | 15-JUN-06 | (10) | 75.00 |
| 191 | FOR CLEARING WITH NYMEX | 15-JUN-06 | (20) | 75.01 |
| 190 | FOR CLEARING WITH NYMEX | 15-JUN-06 | (10) | 75.02 |
| 189 | FOR CLEARING WITH NYMEX | 15-JUN-06 | (25) | 75.03 |
| 188 | FOR CLEARING WITH NYMEX | 15-JUN-06 | (25) | 75.04 |
| 187 | FOR CLEARING WITH NYMEX | 15-JUN-06 | (25) | 75.05 |
| 186 | FOR CLEARING WITH NYMEX | 15-JUN-06 | (25) | 75.06 |
| TOTAL SELLS | | | (250) | 75.02 |

FIG. 146

PENDING NEGOTIATION

WAITING FOR OTHER PARTY

ORDER TYPE: FIRM OFFER
COMMODITY: BRENT BULLET SWAP(BB)
TRADING PERIOD: MAY06
PRICE: 52.00 $ / BBL
QUANTITY: 600 MB

⊗ CANCEL

FIG. 148

PENDING NEGOTIATION

COUNTERPARTY HAS PROPOSED NEGOTIATION FOR:

ORDER TYPE: FIRM OFFER
COMMODITY: BRENT BULLET SWAP(BB)
TRADING PERIOD: MAY06
PRICE: 52.00 $ / BBL
QUANTITY: 600 MB

☑ HOLD ORIGINAL ORDER

⊕ ACCEPT    ⊗ CANCEL

| TRADE NOTIFICATION | |
|---|---|
| TRADE DATE: | 15-MAR-06 02:12:56 PM EST |
| TRADE #: | 574 |
| INPT. ORDER #: | 294455 |
| ACCPT. ORDER #: | 294456 |
| BUYER: | SEMPRA ENERGY TRADING |
| BUYER CONTACT: | TRADER 1 |
| BUYER ACCOUNT: | 537-BILATERAL (BIL OR CLR) |
| SELLER: | FOR CLEARING WITH NYMEX |
| SELLER CONTACT: | FOR CLEARING WITH NYMEX |
| SELLER ACCOUNT: | |
| COMMODITY: | BRENT BULLET SWAP(BB) |
| TRADING PERIOD: | MAY06 |
| TYPE: | PURCHASE |
| PRICE: | 62.00 $ /BBL |
| QUANTITY: | 600 MB |
| TOTAL QUANTITY: | 600 MB |
| NET COST: | 37,200,000.00 $ |

ADDITIONAL TERMS:
CAN YOU DO 2 CARGOS THERE?

[ OK ]   [ ALL OK ]

| HIT/LIFT | | COMMODITY | TRADING PERIOD | | B/O | PRICE | QTY | | FILLED QTY | ACCOUNT # | |
|---|---|---|---|---|---|---|---|---|---|---|---|
| ⊗ + | ... | HENRY HUB NATUR... | AUG06 | | YES B | 7.350 | 25 | 2,500 MMBTU | 25 | 22-6464370 | (CLR) |
| ⊗ + | ... | HENRY HUB NATUR... | JUL06 | | YES B | 7.150 | 25 | 2,500 MMBTU | 25 | 22-6464370 | (CLR) |
| ⊗ + | ... | HENRY HUB NATUR... | JUN06 | | YES B | 7.000 | 25 | 2,500 MMBTU | 25 | 22-6464370 | (CLR) |
| ⊗ + | ... | HENRY HUB NATUR... | MAY06 | | YES B | 6.800 | 25 | 2,500 MMBTU | 25 | 22-6464370 | (CLR) |
| ⊗ + | ... | HENRY HUB NATUR... | APR06 | | YES B | 6.600 | 25 | 2,500 MMBTU | 25 | 22-6464370 | (CLR) |

SYSTEM FOR TRADING COMMODITIES AND THE LIKE

CROSS-REFERENCE TO RELATED PATENT APPLICATIONS

This application is a divisional of U.S. patent application Ser. No. 12/070,138 filed Feb. 15, 2008, which is a continuation-in-part of U.S. patent application Ser. No. 09/764,574 filed Jan. 18, 2001, which claims benefit of U.S. Provisional Patent Application No. 60/177,275 filed Jan. 21, 2000.

FIELD OF THE INVENTION

The invention relates to a system for trading commodities and the like over the Internet.

BACKGROUND OF THE INVENTION

The commodities market is a constantly evolving market covering a wide variety of tradable goods. There are three basic segments of the commodities market: agricultural, natural resources, and financial instruments. The agricultural segment is a broad segment covering everything from grains, such as corn and wheat, to oils and meal, such as soybeans and sunflower seed oil, to livestock such as live cattle and pork bellies. The agricultural segment also includes forest products, such as lumber and plywood, textiles such as cotton, and foodstuffs such as coffee and sugar. The natural resources segment covers metals and petroleum, such as gold, copper, crude oil, and natural gas. The financial instruments segment is another broad market covering everything from interest bearing assets, such as government treasury bills to municipal bonds, to foreign currencies, such as the yen and Euro, to futures on most major indexes, such as the S&P 500 and New York Stock Exchange Composite. For each of these commodities there are different contract months, grades, amounts, and types available for trading and the available commodities and contracts expands on nearly a daily basis.

Trading in such over-the-counter ("OTC") commodities markets generally involves commodity traders and commodity brokers placing bids to buy physical commodities or derivatives, consisting of contracts known in the commodities industry as "swaps" and "options", the value of which are based upon the fluctuating prices of one or more underlying commodities that are the subject of such contract, and offers to sell commodities and derivatives, in the various forms. Such bids and offers are often designated as firm or non-firm. Firm bids and offers are generally non-negotiable while non-firm bids may be negotiable. Trading of exchange traded futures and options are also extremely active in the commodities industry.

There has been an increasing desire in the various commodities markets to move toward Internet-based systems to cultivate the vast capabilities and possibilities of the Internet in order to attract new clientele and to expedite and process transactions between parties. Currently, OTC physicals and derivatives are traded dominantly via a phone based system of Party A calling Party B. Regulated futures contracts have been trading via a "pit" and electronic "non-internet" basis. However, the actual trading of the OTC physical and derivative commodities is generally left to brokers and traders using relatively traditional means of telephone, fax, and telex. In this regard, various industry entities comprised of commodity traders, commodity brokers, and combinations thereof, have been forming groups to study the use of the Internet as a tool to "pool order liquidity" and "streamline transactions and workflow". However, when multiple groups form a major problem occurs as liquidity is thus divided up or spread out amongst the groups. Certain groups may have dominant liquidity in commodities specific to that group. However, commodities that are common to various groups have liquidity drained by splitting the liquid pool provided by users amongst the multiple groups.

When used herein, the term "exchange" refers broadly to various industry entities comprised of commodity traders, commodity brokers, and combinations thereof formed as groups to "pool order liquidity" and is not limited to official exchanges such as for example the New York Mercantile Exchange (NYMEX), World Financial Center, One North End Avenue, New York, N.Y. 10282, the Chicago Mercantile Exchange (CME), 20 South Wacker Drive, Chicago, Ill. 60606 or the Intercontinental Exchange, Inc. (ICE), Fifth Floor, 2100 River Edge Parkway, Atlanta, Ga. 30328.

What is desired, therefore, is a system for trading commodities and the like in an Internet-driven environment that enables various exchanges to create and share commodities within a unified database. What would be further desired is a system for trading commodities and the like in an Internet-driven environment that permits member traders and brokers of various groups to post and view bids and offers and negotiate and consummate transactions on commodities from one or more exchanges in an integrated presentation that pools order liquidity from the various exchanges.

SUMMARY OF THE INVENTION

The system for trading commodities and the like in accordance with the principles of the present invention provides trading in an Internet-driven environment that enables various exchanges to create and share commodities within a unified database. The present invention provides a system for trading commodities and the like. A computer, a communications link between the computer and the Internet, and a database, accessible by the computer, are provided. The database includes a plurality of user files. Each of the user files corresponds to a specified user of the system. Each of the user files contains exchange permissions corresponding to exchanges to which the specified user may access. At least one computerized exchange transacts specified commodities executing on the computer accessible by selected users having proper exchange permissions for each exchange. A display is provided for pooling liquidity that permits users to post and view bids and offers and negotiate and consummate transactions on common commodities from one or more groups or exchanges. By such liquidity pooling, the liquidity of transactions of commodities between various exchanges and users is improved.

BRIEF DESCRIPTION OF THE DRAWINGS

FIGS. 17-27 show a vanilla commodities and trading period application of the present invention.

FIGS. 28-30 show a clearing, trading limits, and accounts application of the present invention.

FIGS. 31-34 show a companies, brokers, and traders application of the present invention.

FIGS. 35 and 36 show a management shows trading period templates shows and trading period generation application of the present invention.

FIGS. 37-45 show a setting up a series of trading period application of the present invention.

FIG. 57 shows the 'file' menu of the present invention.

FIGS. 58-66 show the user preferences set-up application of the present invention.

FIGS. 70 and 71 show the market grid screen of the present invention.

FIGS. 79-89 show bids and offers for an example commodity that is common across the three broker exchanges.

FIGS. 91-94 show the placing an order application of the present invention.

FIGS. 95-102 show the placing a linked order chain application of the present invention.

FIGS. 103 and 104 show the edit, cancel, hold show, and reinstate a linked order chain application of the present invention.

FIGS. 105-108 show the placing an OCO order chain application of the present invention.

FIGS. 109-111 show the trading an order without single click trading selected application of the present invention.

FIGS. 112 and 113 show the partial fills application of the present invention.

FIGS. 114-120 show the 'trade notification' panel with 'repeat order' function application of the present invention.

FIGS. 121-124 show the trading a linked order application of the present invention.

FIGS. 125-129 show the place an option order application of the present invention.

FIGS. 130 and 131 show the edit, hold, cancel, and reinstate an option order application of the present invention.

FIGS. 132-135 show the trade an option order application of the present invention.

FIGS. 136 and 137 show the active order and my orders application of the present invention.

FIG. 142 shows the ICTS trade search application of the present invention.

FIGS. 143-145 show the ICTS position grid application of the present invention.

FIG. 146 shows the position inspector of the present invention.

FIGS. 147-153 show the headlines application of the present invention.

FIGS. 154-156 show the shopping cart application of the present invention.

FIG. 157 shows the confirmation language screen application of the present invention.

Figures 159, 160:
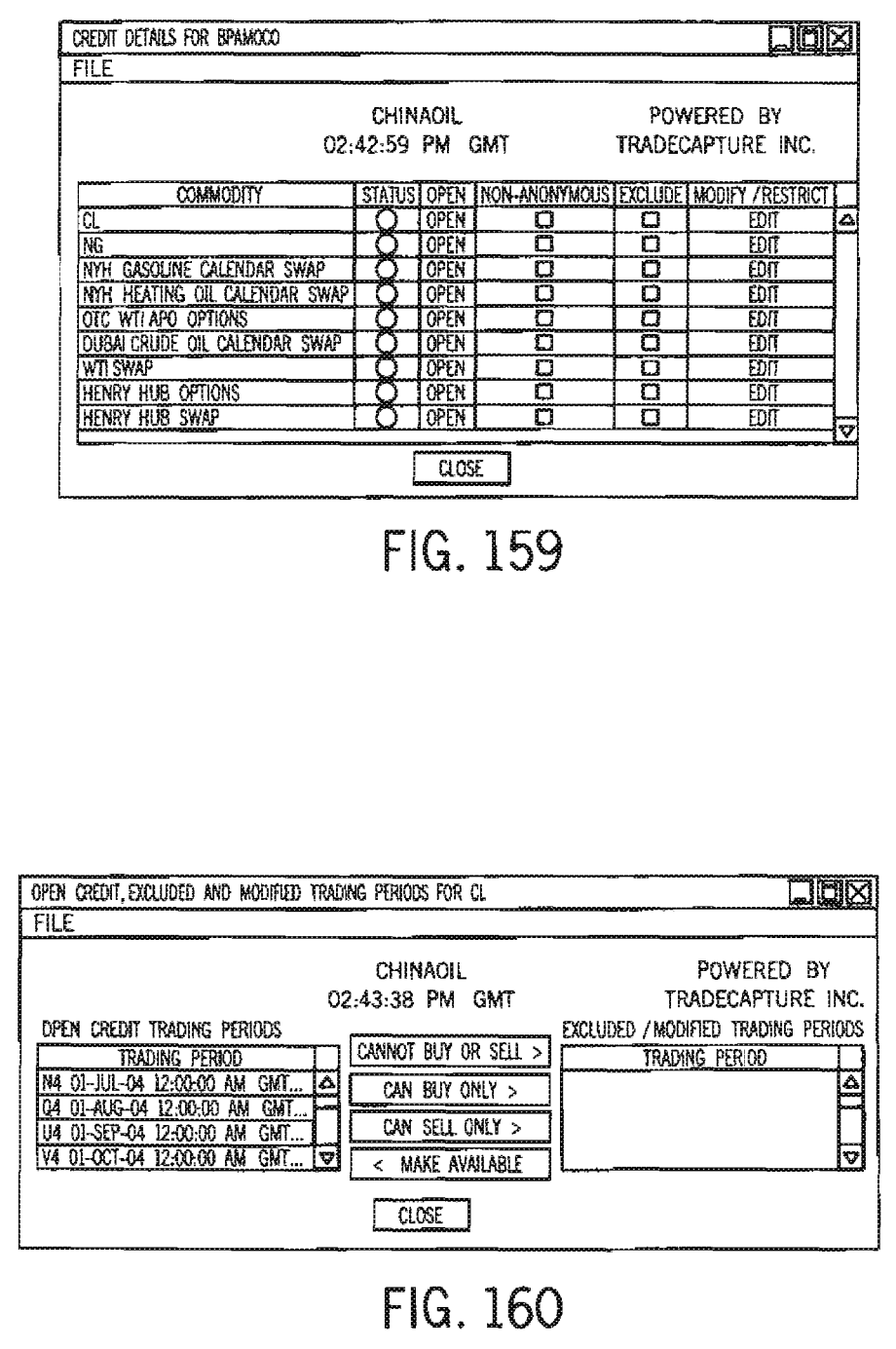

FIGS. 158-160 show the credit administration application of the present invention.

DETAILED DESCRIPTION OF THE PREFERRED EMBODIMENTS

Figure 1:
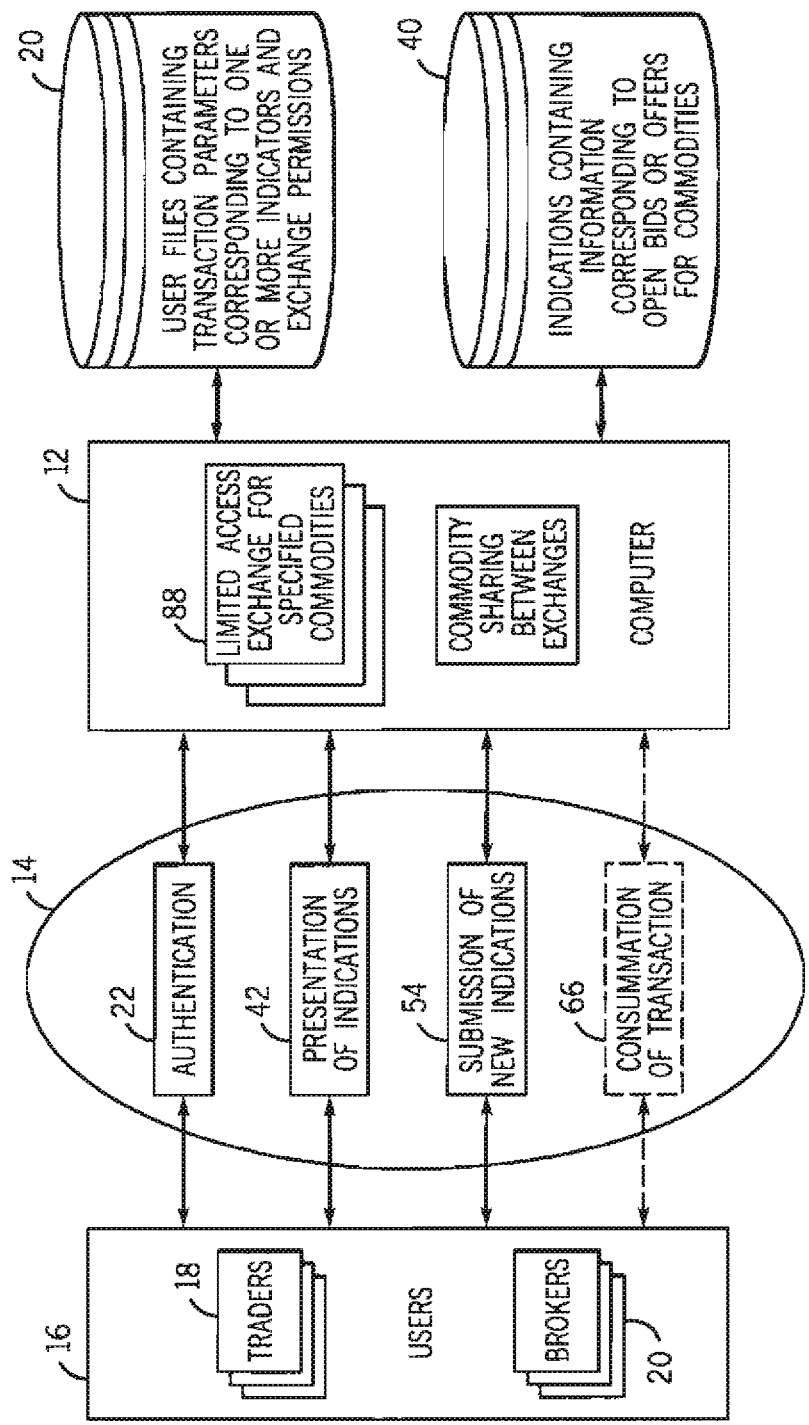
FIG. 1 is a schematic of a system for trading commodities and the like in accordance with the principles of the present invention.

FIG. 1 depicts a system 10 for trading commodities and the like in accordance with the principles of the present invention. The system 10 includes a computer 12 and a communications link 14 between the computer 12 and the users 16 of the system. The computer 12 may be any type of computing device capable of performing the functions described herein. For example, the computer 12 may be a personal computer, minicomputer, mainframe, supercomputer, web server or any combination thereof. The communications link 14 may take any suitable form that permits communication between the users 16 and the computer 12, such as for example direct-dial modem, DSL, satellite or hardwire connection. Preferably, the communications link 13 comprises an appropriate connection between the computer 12 and the Internet and software executing on the computer 12 for operating and maintaining an interactive website for facilitating communication between the computer 12 and users 16. Users 16 of the system 10 will generally include commodity traders 18 seeking to place offers or bids and/or professional commodity brokers 20 seeking to do the same on behalf of their clients.

Figure 2:
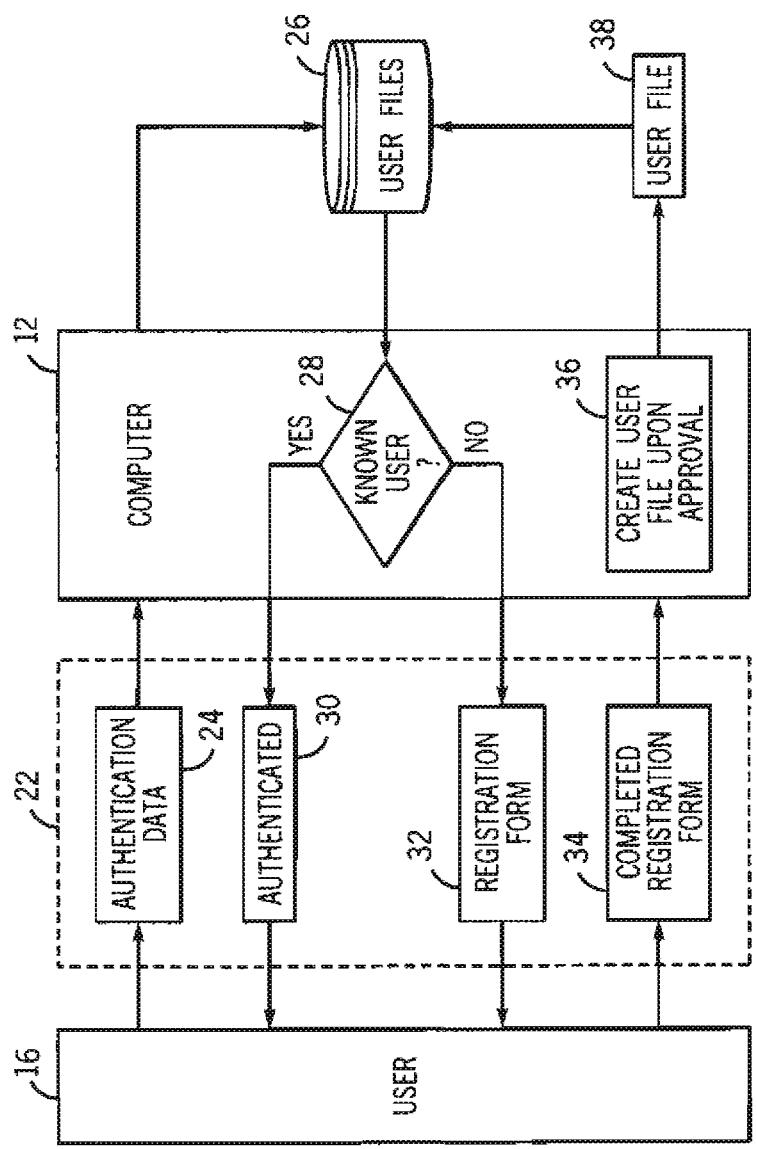
FIG. 2 is a schematic of the authentication process of the system depicted in FIG. 1.

A user 16 of the system 10 of the present invention is first authenticated 22 before he or she can enter and utilize the system 10. The authentication process 22, shown in FIG. 2, generally includes the submission of authentication data 24 associated with the user 16 that permits the computer 12 to recognize the user 16, such as a username and password. Software executing on the computer 12 may transmit a prompt to the user 16 over the communications link 14 requesting the user's authenticating data. The user 16 then submits 24 his or her data to the computer 12 over the communications link 14. Upon receipt, software executing on the computer 12 accesses a database 26 containing a plurality of user files 38 to verify 28 the submitted authentication data 24. The user file 38 acts as a depository for information related to the user. Once verified, the user 16 has been authenticated 30 and can proceed to use the system 10. Alternately, the system 10 may include cookie technology that permits the computer 12 to immediately identify and recognize the user 16 once the user accesses the system 10 or the system 10 may include software executing on the computer 12 that recognizes the user based on the user's Internet Protocol (IP) address. These alternatives would allow the user 16 to be immediately recognized without having to actively submit authentication data.

If the user 16 does not have authentication data 24, he or she may request to register with the system 10. In such a case, software executing on the computer 12 transmits a registration form 32 to the user 16. The registration form 32 may also be transmitted to a prospective user via other means such as for example e-mail or postal service. Preferably, though, the registration form 32 is electronic and is received and completed 34 by the user 16 and returned electronically via a website to expedite and simplify the process. The registration form 32 may request information deemed to be necessary by the administrators of the system 10 to determine whether the user 16 is eligible to perform trades on the system 10 and any preferences the user may have regarding various options described herein. Once the registration form has been submitted 34 and approved, the user 16 is assigned authentication data 24, such as a username and password, and a user file 38 related to the user 16. The user file 38 contains the authentication data 24 and any other information provided by the user in the registration form and is created 36 and stored in the user database 26. It is to be understood that authentication data 24 such as user names and passwords can be chosen by the user 16 as opposed to being assigned by the computer 16.

Once an authenticated user 16 accesses the system 10, software executing on the computer 12 accesses an indication database 40 containing a plurality of open bids and offers currently available for trading that have been previously submitted by other users 16 of the system 10. Such open offers and bids can generally be referred to as indications of interest, or indications for short. Each indication contains relevant information pertaining to the bid or offer such as the type of commodity involved, the amount of commodity available, the price of the commodity, and/or the contact information required, if any, to complete a transaction related to the indication. The software retrieves the indications from the database and presents 42 them to the user 16 over the communications link 14. Generally, the indications can be presented to the user 16 as a list or table that permits the user 16 to select specific bid or offer.

Preferably, each of the user files 38 in the user database 26 contains a plurality of transaction parameters corresponding to one or more indications associated with the user file 38. These transaction parameters govern the presentation and acceptance of indications associated therewith. The transaction parameters may enable a submitter of an indication to remain anonymous to specific users 16 of the system 10 that have been predetermined by the submitter. For example, the submitter may wish to post his indications anonymously to certain other users for various reasons. The transaction parameters may also permit the submitter of an indication to grant specific users preferred status over other users of the system with respect to actions concerning indications submitted by the submitter. For example, a submitter may have had good relations with particular user and may wish to give them preference over other users of the system such as for credit purposes or otherwise. In essence, the transaction parameters permit the submitter of an indication to control to how the indication is presented and acted upon by other users. Other examples of transaction parameters may include whether the indication is firm or not or the desired contact person regarding the indication.

The transaction parameters can be predetermined by the user and may be submitted to the computer 12 by a user 16 within a completed indication submission form 58. The transaction parameters may also be determined by the user 16 and submitted to the computer 12 within the completed registration form 32. Software executing on the computer would retrieve the transaction parameters submitted within the completed indication submission form 58 or completed registration form 32 and store the transaction parameters in a user file 38 corresponding to the user 16.

Figure 3:
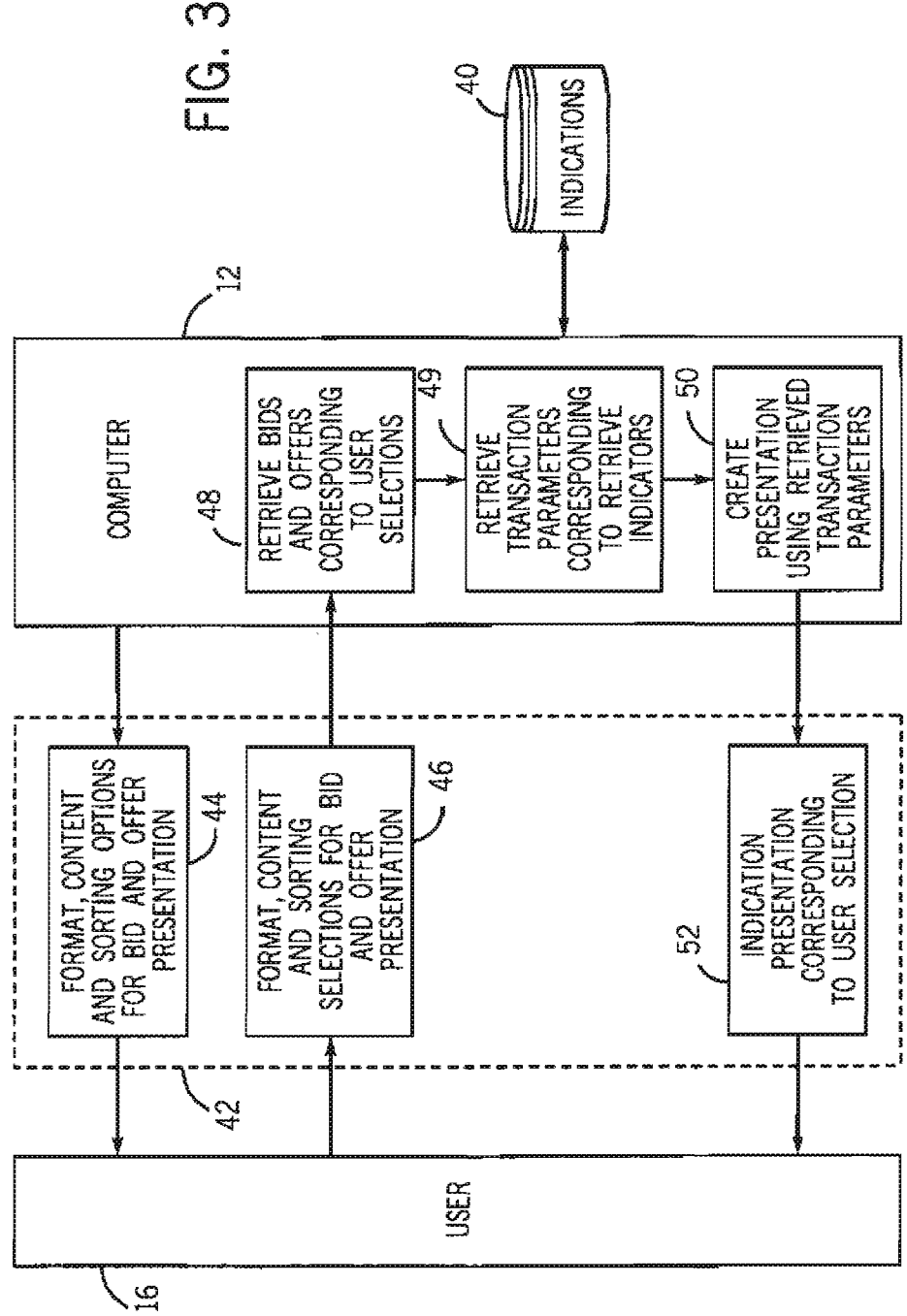
FIG. 3 is a schematic of the indication presentation process of the system depicted in FIG. 1.

Preferably, the presentation 42 of the indications can be completely sortable and interactive to permit the user 16 to quickly and easily access desired indications or information that is available, as shown in FIG. 3. Software executing on the computer 12 may transmit a plurality of format, content, and/or sorting options 44 to the user 16 over the communications link 14. Such format options may include the format in which the bids and offers can be presented to the user 16, such as in tabular or graphical format. Content options may allow a user 16 to retrieve indications for specific bids or offers having certain parameters, such as commodity type, bid versus offer or other discernible difference ascertainable from information submitted with the indication. For example, the user may seek only open offers on Brent Crude Oil or firm bids from a specific trader or broker. The software may also transmit a plurality of sorting options to the user over the communications link. Such sorting options could include options to sort by date posted, highest/lowest price, quantity available, etc.

It is to be understood that the format, content, and sorting options of the presentation of the indications can be closely interrelated and can be presented to the user 16 simultaneously. Upon receipt of the customer selections 46, if any, software executing on the computer 12 queries the indication database 40 to retrieve 48 any indications corresponding to the user's selections 46. The software then queries 49 the user files 38 associated with the retrieved indications to determine the transaction parameters related to each indication. The software then creates 50 a presentation of the retrieved indications based on the user's selections 46 and determined transaction parameters. The created presentation can be then transmitted and displayed 52 to the user 16 over the communications link 14. Preferably, during the registration process or otherwise, the user submits the user's preferred format, content, and sorting options to the system and the preferred options can be stored in the user's user file 38. As such, the user may be presented with a display corresponding to their preferred options whenever the user accesses the system. For example, the user may primarily trade in three types of commodities and only desire to see the five indications in each commodity having the lowest offer price. The user would still be able to modify the presentation upon accessing the system and could modify the preferred options from time to time as needed or desired.

In practice, the user 16 may be presented with a menu permitting the user 16 to select which commodities for which he or she would like to view indications and in what order the display would be organized. For example, the user 16 may wish to be presented with a table displaying the currently open offers on Brent Crude Oil arranged according to number of barrels available. Additionally, the user 16 may search for a particular offer matching specific parameters, such as bids on Brent Crude Oil for a specified price, submitted by the user 16 to the computer 12 over the communications link 14. Preferably, the system 10 further includes software executing on the computer 12 for refreshing and updating the user's presentation 52 of indications to reflect new bids and offers as other users of the system submit them. Therefore, the user 16 can be apprised on a real-time basis of the current bids and offers available for trading within the system 10.

Regardless of the format or style of the presentation 52 of indications chosen by the user 16, it is important that the user 16 be presented with sufficient information to make a determination as to whether or not the user 16 would like to pursue the bid or offer further. As such, initial displays 52 may only present a limited summary of the bid or offer in order to conserve space and facilitate quicker perusal of larger number of bids and offers. The user 16 may then request more detailed information regarding specific bids and offers, if desired.

Figure 4:
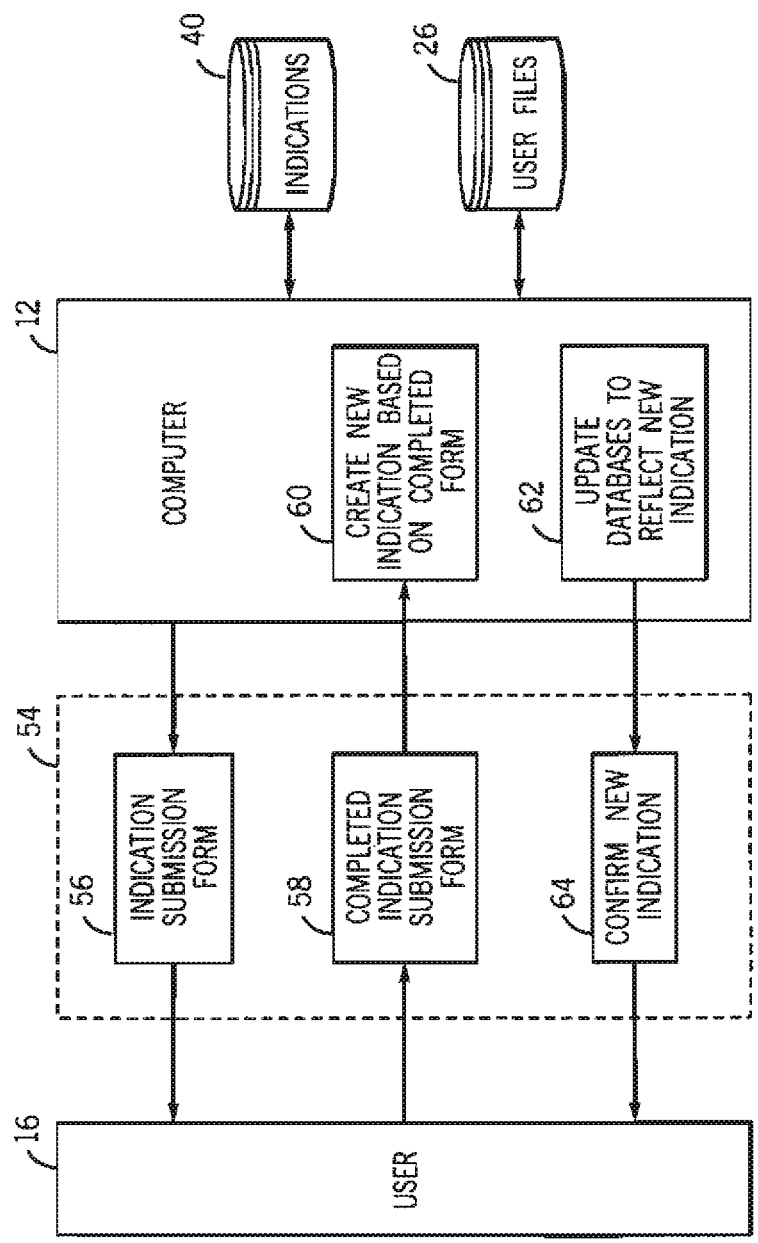
FIG. 4 is a schematic of the indication submission process of the system depicted in FIG. 1.

As shown in FIG. 4, in order to submit 54 a bid or offer to the system 10, the user 16 completes and submits an indication submission form 56. Software executing on the computer may transmit the submission form 56 to the user 16 over the communications link 14. Alternately, the submission form 56 may be incorporated into the indication presentation 52 to permit the user 16 to quickly view the existing market depth and submit a bid or offer. The submission form 56 requests necessary information for permitting a trade to be accomplished, for example the commodity type, number of units, cash price, term of open bid or offer, delivery month, contact information, if applicable, etc. Upon receipt of a completed submission form 58, software executing on the computer 12 creates 60 a new indication based on the information provided by the user 16 in the completed registration form 58 and stores 62 the new indication in the indication database 40. Preferably, the software also updates the user's associated user file 38 in the user database 26 to reflect the submitted indication. This readily permits the user 16 to access the indications he or she has submitted. Once stored in the indication database 40, the new indication may be accessed and presented to current and subsequent users 16 of the system 10 for their perusal and action. Additionally, software executing on the computer may permit the users 16 to withdraw or cancel a bid or offer if such a bid or offer were not firm or had not been accepted as of the time of withdrawal.

Figure 5:
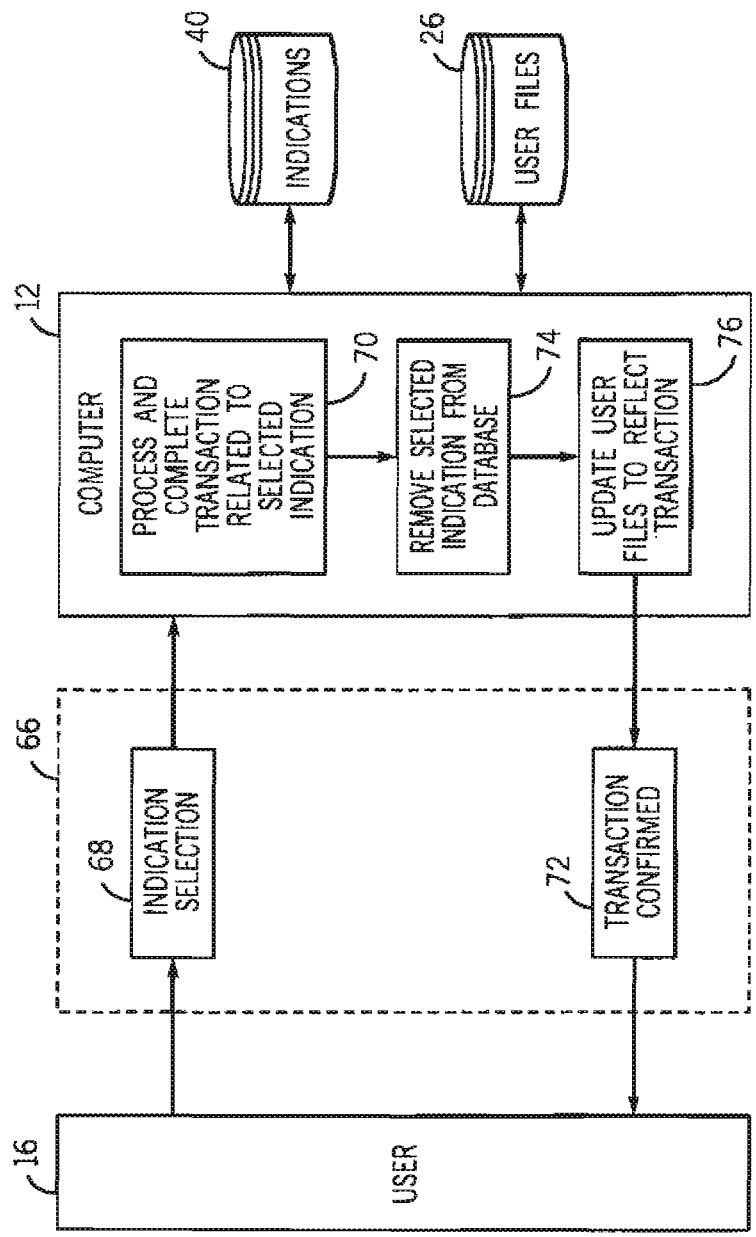
FIG. 5 is a schematic of an embodiment of the consummation of transaction process of the system depicted in FIG. 1.

The process for completing 66 a trade or transaction depends on the capabilities of the specific system and the type of indications being presented to the user 16, namely whether the system 10 processes firm or non-firm bids and offers. If the system 10 is capable and certified to process and transact firm offers, the consummation of the transaction can be accomplished very easily, as shown in FIG. 5. Once the user 16 finds an indication that he desires to accept, the user may select the indication from the presentation 52 and submit 68 the selection to the computer 12 over the communications link 14. Software executing on the computer 12 would receive the indication selection and process and complete 70 the transaction appropriately and in accordance with any transaction parameters that may be associated with the selected indication 68. Once completed, a confirmation that the transaction was successful can be transmitted 72 to the user 16 and the submitter of the selected indication over the communications link 14 by the software. The software may also remove 74 the selected bid or offer from the indication database 40 and update 76 the appropriate user files 38 in the user databases 26 to reflect the transaction. Thus, through a simple process, such as a point and click operation on a website, the user may complete a transaction when the system 10 includes firm bids and offers.

In practice, a submitter would enter a firm bid to buy, or firm offer to sell commodities or derivatives at a specific price for a particular delivery date, both of which were designated by the submitter in the respective completed indication submission form. If the user 16 desires to accept a firm offer or bid, the user 16 need only click on the desired firm indication using a mouse or keyboard or other appropriate input device, at which point the transaction would be considered final and binding between the user 16 and the submitter. The system 10 then would automatically generate a trade confirmation and transmit it to both parties to the trade over the communications link.

Figure 6:
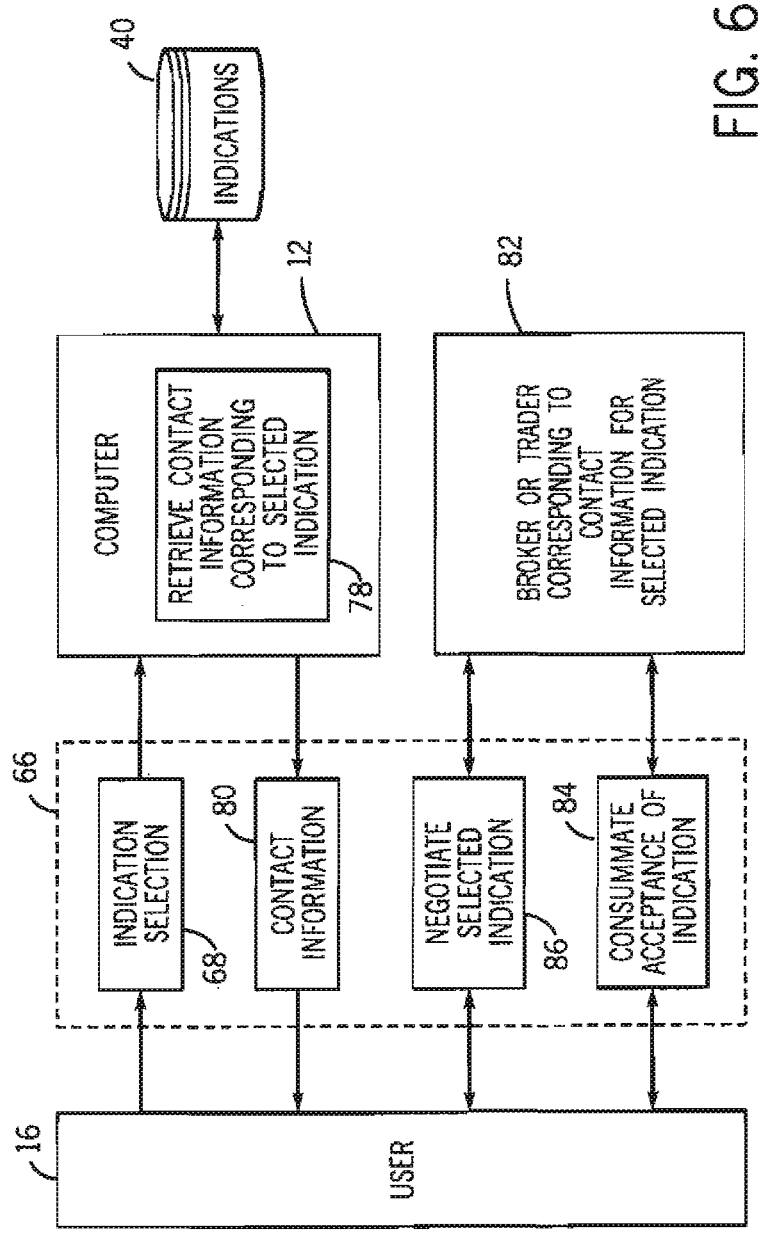
FIG. 6 is a schematic of another embodiment of the consummation of transaction process of the system depicted in FIG. 1.

In the instance where non-firm bids and offers are presented to the user 16 by the system 10, as shown in FIG. 6, the consummation process is more interactive and involved. As before, the user 16 selects and submits 68 the indication desired to be accepted to the computer 12 over the communications link 14. Software executing on the computer 12 receives the user selection 68 and retrieves 78 contact information corresponding to the selected bid or offer 68 from the indication database 40. The contact information 80 identifies a person 82, generally another broker or trader, to be contacted regarding the selected indication who has the authority and capability to complete the transaction. The contact information 80 also contains appropriate information on how to communicate with the person 82, such as a phone number or email address. The submitter of the indication may provide the contact information 80 of the desired contact person 82 during the bid or offer submission process 54, for example within the indication submission form 56. Alternatively, the appropriate contact information 80 may be obtained during the authentication process 22, included in the user file 38, and added automatically to the bid or offer when a user 16 makes a submission.

The retrieved contact information 80 can then be transmitted to the user 16 over the communications link 14. Upon receipt, the user 16 contacts the person 82 accordingly depending on the content of the contact information 80 to complete 84 the transaction. The system 10 may provide for some flexibility of the indications submitted permitting the user and the contact person to negotiate 86 various aspects of the bid or offer prior to consummating the trade. As can be seen, in instances of transactions involving non-firm bids and offers, the user 16 contacts a third party apart from the computer 12, such as by phone or otherwise to complete the deal. However, the system could be readily modified to include software executing on the computer 12 for providing users 16 of the system 10 a computerized means for real time communication, such as a dedicated secure chat room, in which the various parties to the transaction may directly communicate to negotiate or otherwise complete the transaction. Nonetheless, the consummation of non-firm indications may be completed off-line from the computer 12. This aspect is indicated in FIG. 1 by the dashed lines.

In practice, a submitter, whether it be a trader or broker, would submit to the computer 12 an indication at a specific price for a particular delivery or settlement date, both of which can be designated by the submitter in the respective completed bid or offer submission form. If the user sees the submitter's bid or offer, he may select it if he is interested in negotiating a transaction based upon that indication. Once the user clicks on the bid or offer, the computer transmits the contact information for the submitter to the user over the communication link. For example, the computer would transmit the name of a broker and how to contact him. The user may then, independent of the system or otherwise, contact the submitter and attempt to negotiate a firm and binding agreement based upon the original terms presented by non-firm bid or offer submitted.

Indications submitted by brokers may show the name of the broker and how to contact him and often the underlying client on whose behalf the broker is working. However, depending on the transaction parameters selected by the broker, he or she may elect to submit bids and offers anonymously for his client, i.e. that a client's name or other identification information not be provided with any bids or offers submitted to the system 10. Alternatively, the user 16 may permit the broker to submit indications under the user's name. Thus, the broker may submit a bid for a commodity and the indication could be shown under the user's contact information and according the user's desired transaction parameters. It is to be understood that any other user of the system 10 designated by the user 16 may utilize this feature and the other user need not be a broker. The feature may also be integrated as a transaction parameter. The broker may also provide a list of traders and brokers having a preferred status with his or her client as part of the transaction parameters. Traders and brokers with the preferred status would be able to identify the client 10 as the submitter of the indication and/or have other benefits regarding action on the indication.

The system 10 may also collect information regarding each transaction performed by the user 16. Software executing on the computer 12 would track submissions, actions, and trades performed by the user 16 and store the collected information in the user's user file 38 in the user database 26. Thus, a user may access and view his or her personal trading history. The trading history could be sortable and searchable to permit the user 16 to access and display desired or specific types of trades performed. For example, the user 16 may wish to view completed trades for a specific time period or cancelled trades for a specific commodity or his or her position in a particular commodity. This feature may be extended to permit an administrator to monitor and track transactions of a specific group of traders. In such an instance, the administrator would be granted permission by the system 10 to access and view the user files 38 of specified users. For example, a brokerage firm may have twelve traders working for it using the system 10. This feature would allow the manager to monitor and review the transactions and performance of each of the twelve traders or view the firm's position in various markets. Software executing on the computer could permit the administrator to sort and view the desired information in a selected format, similar to the options provided in the presentation process 42.

Figure 7:
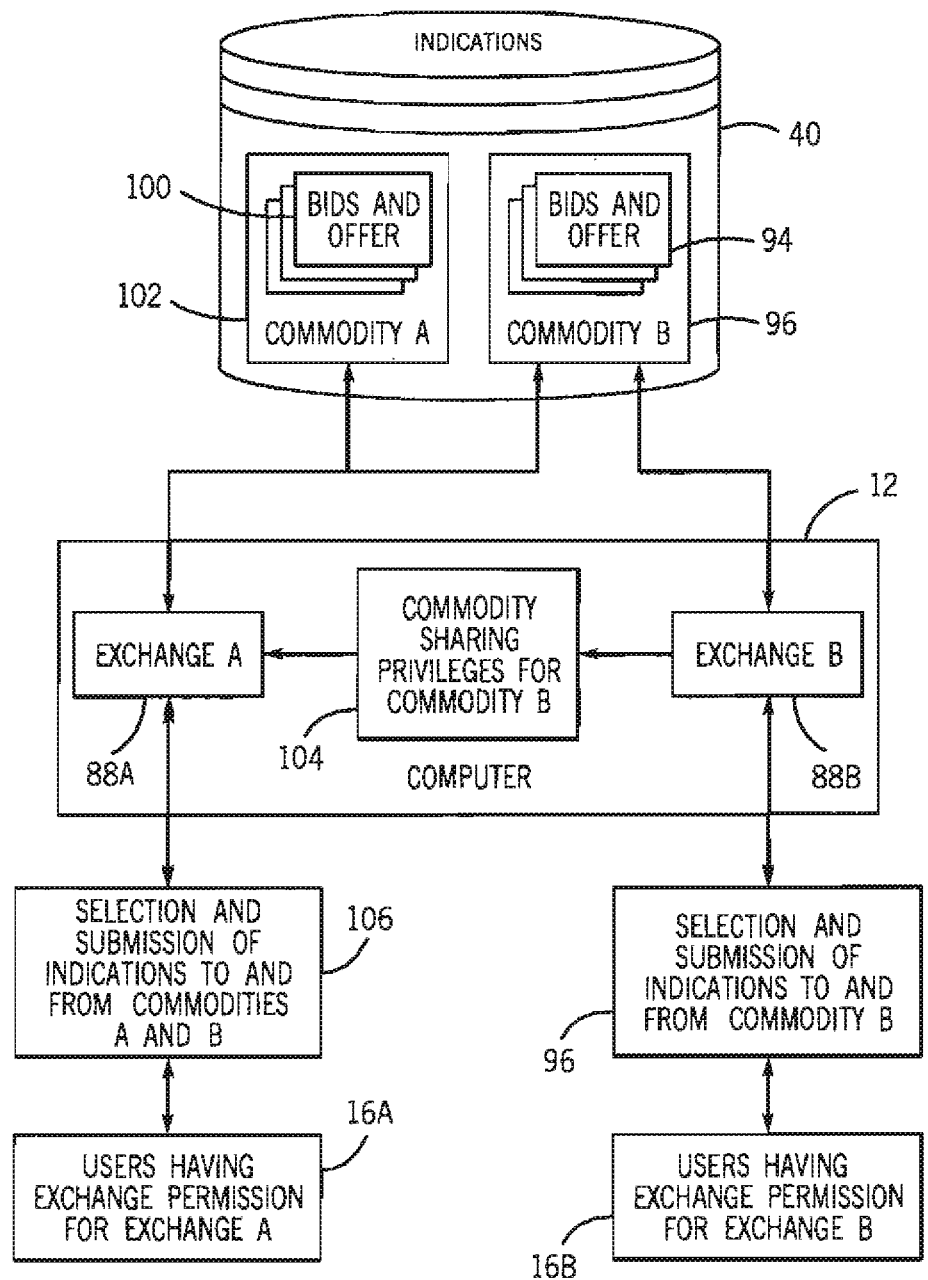
FIG. 7 is a schematic of the exchange and commodity-sharing features of the system depicted in FIG. 1.

The system 10 may further include software executing on the computer 12 for operating and maintaining a plurality of different exchanges 88, as shown in FIG. 7. The exchanges 88 permit the transaction of predetermined commodities and can be accessible by only selected users 16 having proper exchange permissions corresponding to each exchange. Indications involving the commodities associated with an exchange can be solely accessible by users 16 who have access to the exchange. Likewise, any indications submitted by users 16 having access to the exchange 88 would be stored in the database under the commodity associated with the exchange. Accordingly, indications within the indication database 40 may be organized according to the commodity to which the indication relates to facilitate and expedite access to the indication by the exchanges 88 and ultimately, the users 16. The exchanges 88 may be created by the system administrators or any other entity desiring to create an exchange. The party that creates the exchange may also decide and/or create the commodities associated with the exchange 88. Preferably, the exchanges 88 utilize and retrieve information from a common indication database 40 that can be shared by the exchanges in the system 10.

The exchange feature is shown by way of example in FIG. 7. Exchange B 88b is associated with Commodity B 94 in the indication database 40. Users 16b having exchange permissions for Exchange B 88b may view and select 96 bids and offers from indications stored under Commodity B 94 in the indication database 40. Any indication submissions submitted by the users 16b would be stored in the indication database 40 under Commodity B 94. However, as can be seen, users 16b having access to Exchange B may not view or transact indications that may be stored in other commodities in the indication database 40, such as the bids and offers 100 stored in Commodity A 102.

In many instances, it may be desirable to grant commodity-sharing privileges 104 to other exchanges to improve the liquidity of transaction of commodities between various exchanges 88 and users 16. Such privileges would permit multiple exchanges to transact indications within a single commodity in the indication database 40. As shown in FIG. 7, Exchange A 88a is associated with Commodity A 102. If Exchange B grants commodity-sharing privileges 104 to Exchange A 88a, users 16a having exchange privileges for Exchange A 88a may now view and transact 106 bids and offers 94 in Commodity B 96 in addition to indications 100 within Commodity A 102. However, when users 16a of Exchange A submit indications relating to Commodity A 102, the indication would be stored under Commodity A 102 in the indication database 40. Such commodity-sharing privileges are generally agreed to between the various creators of the exchanges 88. It is to be understood that any number of exchanges 88 may agree to grant commodity-sharing privileges 104 between them for any number of commodities. While FIG. 7 illustrates a unilateral commodity-sharing privilege, it is to be understood that such commodity-sharing privileges may also be bilateral permitting both exchanges to view and transact indication within the other's related commodities.

The exchanges 88 may be accessed through the authentication process 30 to permit the user to directly access exchanges 31 to which the user 16 may have access. Software executing on the computer 12 would query the user's user file 38 to verify proper exchange permissions. Additionally, the registration form may permit the user 16 to select which exchanges he or she would like to have access. The system may grant permissions directly to the user 16 if the desired guidelines have provided to the system administrators by the exchange creator or the request may be appropriately forwarded to the creator for independent decision. It is to be understood that users 16 may directly contact an exchange creator and seek permissions and the creator may contact the system administrators to grant the exchange permissions. Regardless, if a user is granted access to an exchange, the exchange permissions can be preferably stored in the user's user file 38 in the user database 26.

In the instance of exchanges 88, when presenting 42 indications to the users 16 of an exchange, software executing on the computer 12 may query the user database 26 to retrieve and/or verify the exchange permissions from a user file 38 corresponding to the user 16 and retrieve indications from the indication database 40 corresponding to the predetermined commodities within the exchanges 88 to which the user has been determined to have access. The software may then generate a presentation 52 of the retrieved indications and transmit the presentation to the user 16 over the communications link 14.

The system may further include software executing on the computer for tracking and storing information corresponding to the transactions that are completed on the system. Such information may include for example the commodity, the number of units, the unit price, etc. Such tracked information may then be downloaded or otherwise transferred to a desired third party database or system for further processing or use.

The previous description and figures encompasses specific embodiments of the present invention. More specifically, the description and figures refer to the trading of commodities. While the description refers to commodity trading, it is to be understood that the system is applicable to all types of trading of tangibles and/or intangibles, including, but not limited to, trading of products, things, services, stocks, securities, futures, and bonds.

Figure 8:
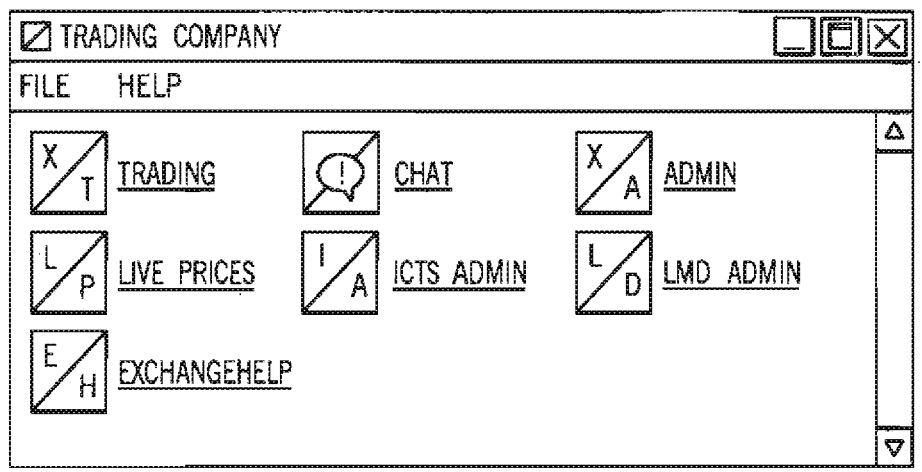
FIGS. 8-10 show the application setup introduction of the present invention.

Referring now to FIGS. 8-160, a graphical user interface implementing the exchange and commodity-sharing features of the system for trading commodities and the like in accordance with the principles of the present invention is seen. Referring to FIGS. 8-57, an application setup is described. The application set-up can include: an introduction; setting up an exchange; setting up vanilla commodities and trading periods; clearing, trading limits, and accounts; companies, brokers, and traders; using management, trading period templates, and trading period generation; and inter-market spreads, inter-market spread commodities, and inter-market spread trade periods.

Figure 9:
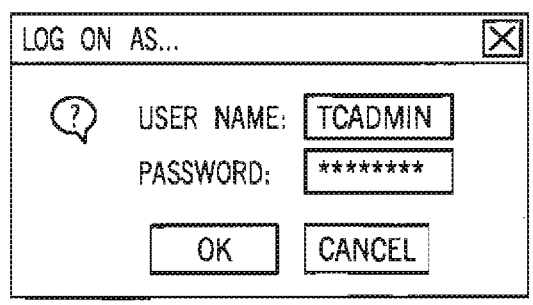
Figure 10:
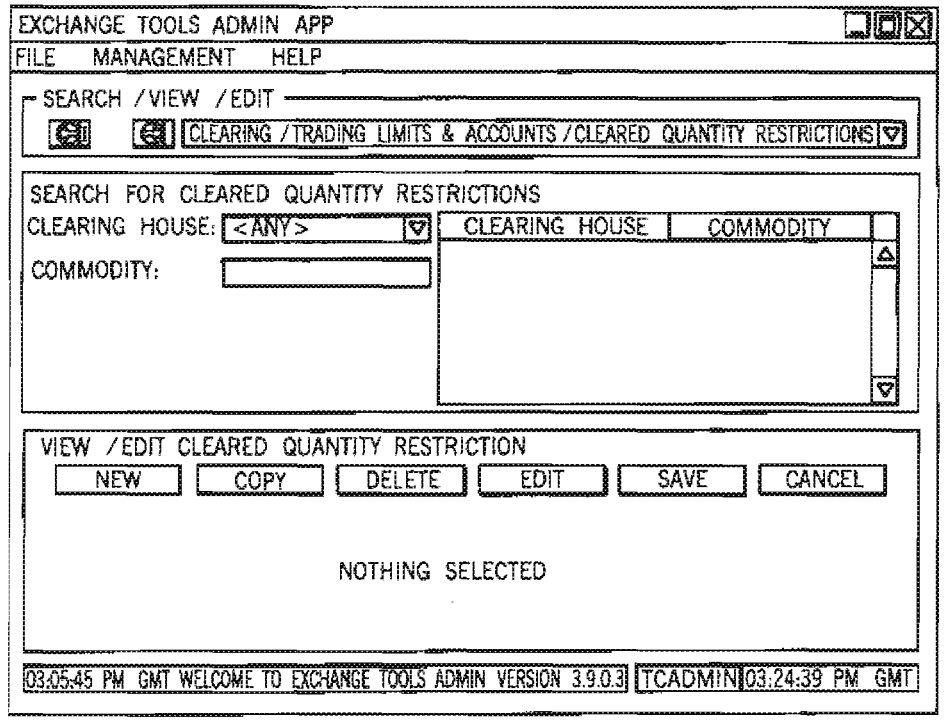

Referring to FIGS. 8-10, the setup introduction application is described. FIG. 8 is an example of an applications launch page. The applications launch page can include a 'trading' link, a 'live prices' link, an 'exchange help' link, a 'chat' link, an 'ICTS admin' link, an 'admin' link, and an 'LMD admin' link. To log into the administration application from the applications launch screen, the 'admin link' can be clicked. FIG. 9 shows an example of a user log screen having as inputs 'user name' and 'password.' Upon a successful log in, an exchange tools administration application screen can be presented, an example of which is seen in FIG. 10.

Figure 11:
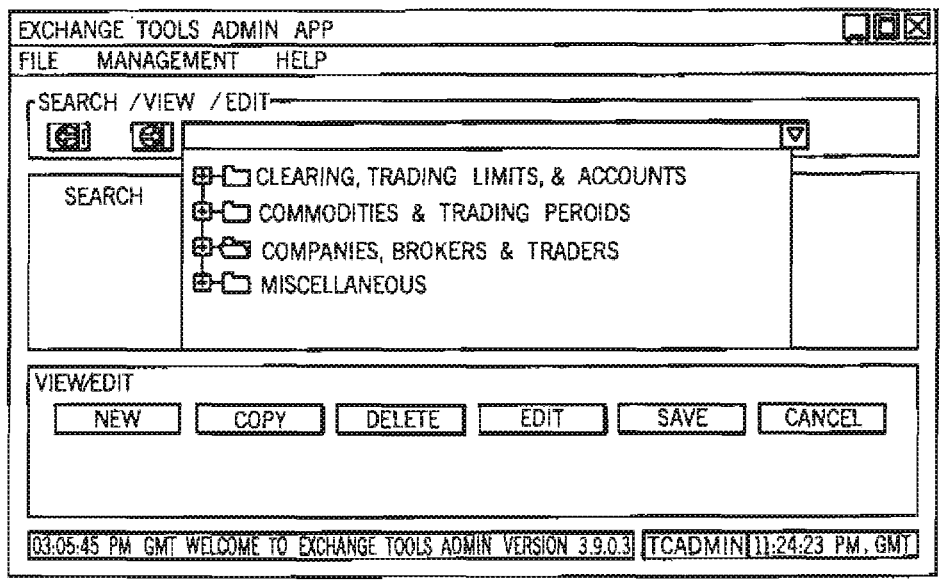
FIGS. 11-16 show setting up an exchange application of the present invention.
Figure 12:
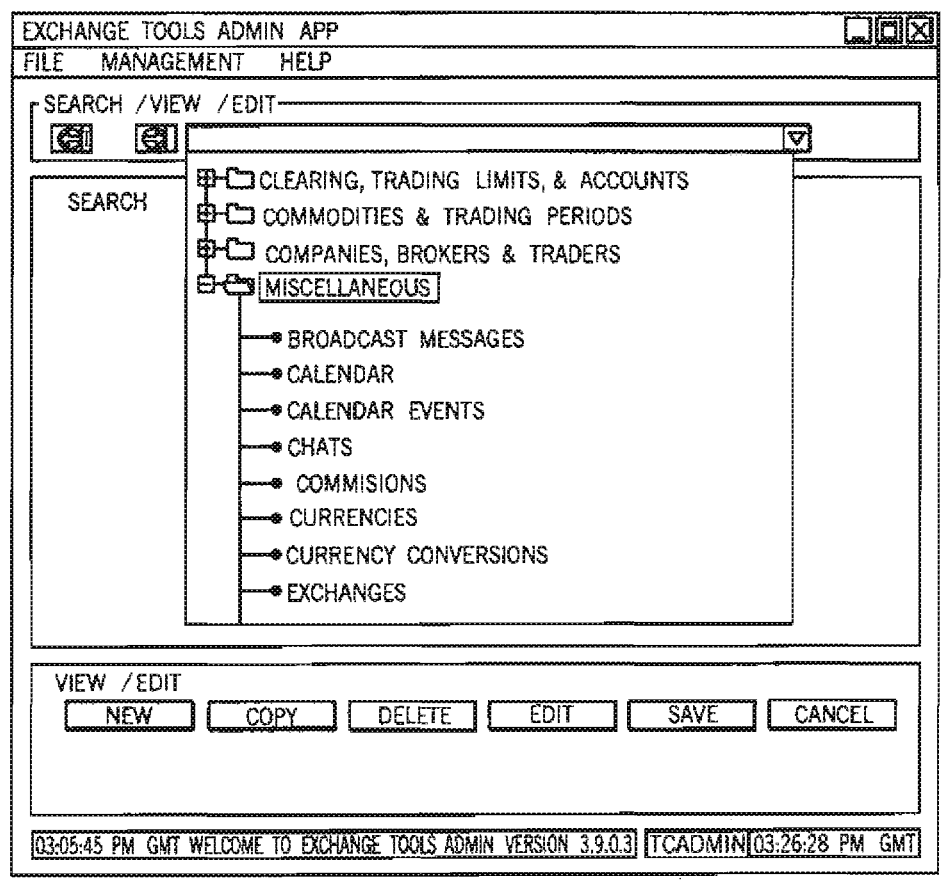
Figure 13:
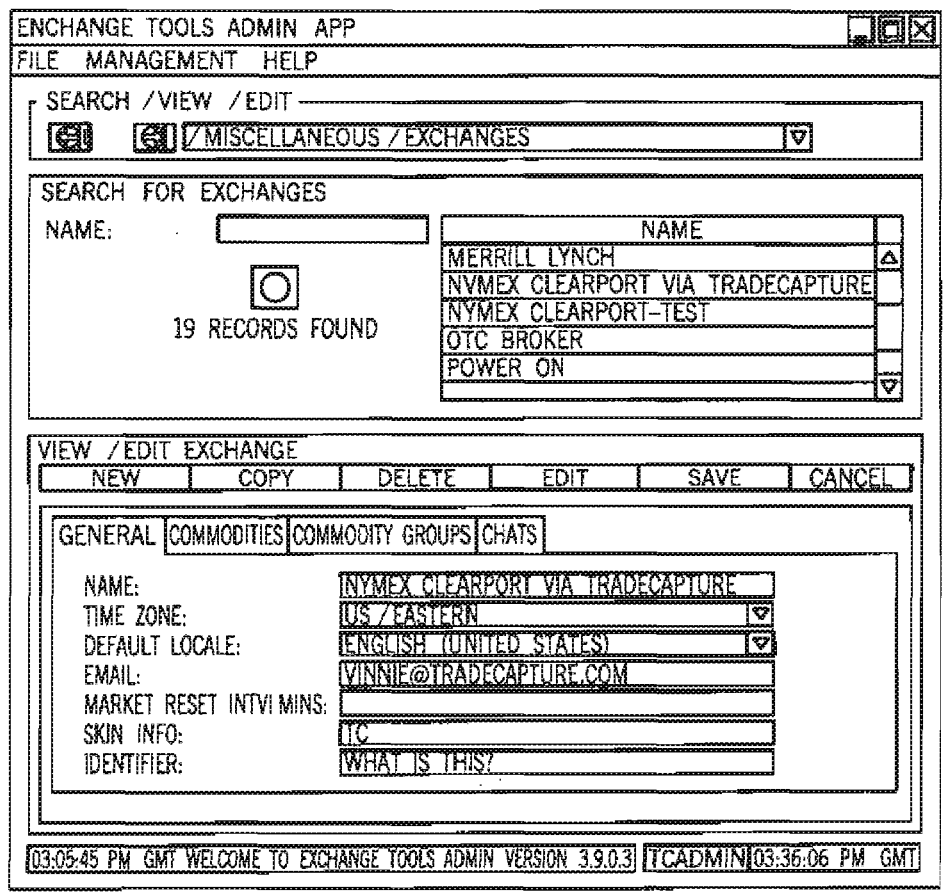

Referring to FIGS. 11-16, the setting up an exchange application is described. To set up a new exchange, a 'search/view/edit' drop-down menu can be selected from the exchange tools administration application screen of FIG. 10. As seen in FIG. 11, files presented can include: 'clearing, trading limits & accounts'; 'commodities & trading periods'; 'companies, brokers & traders'; and 'miscellaneous'. Selecting the 'miscellaneous' file can present in a drop-down menu 'broadcast messages'; 'calendar'; 'calendar events'; 'chats'; 'commissions'; 'currencies'; 'currency conversions'; 'exchanges'; 'price index temples'; 'price indexes'; 'settlements'; and 'settlement prices', as seen in FIG. 12. Selecting 'exchanges" allows the user to search for existing exchanges by selecting a 'search' icon, an example of which is seen in FIG. 13.

In the 'view/edit exchanges' section a 'new' or 'copy' button can be clicked for a new exchange. On the 'general' information tab, fields for the new exchange can be filled in. The fields can include: 'name'—a name for the exchange can be selected; 'time zone'—selected from a drop-down menu; 'default locale'—selected from a drop-down menu; ' e-mail'; 'skin info'; and 'identifier'.

Figure 14:
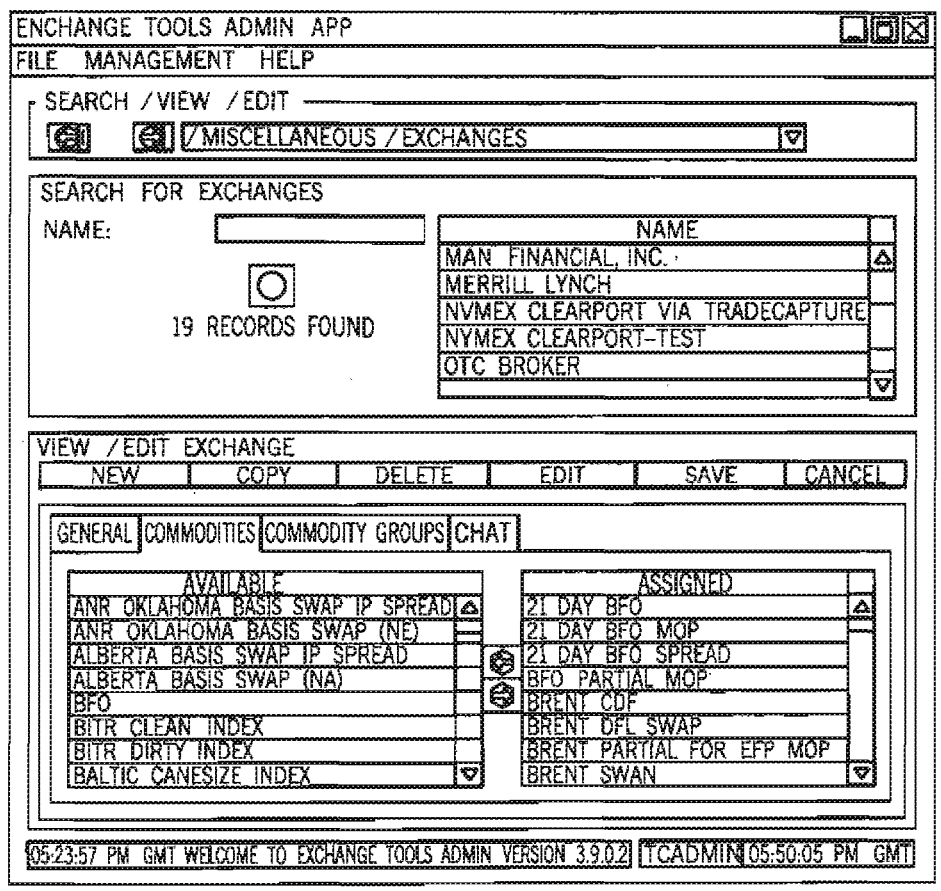
Figure 15:
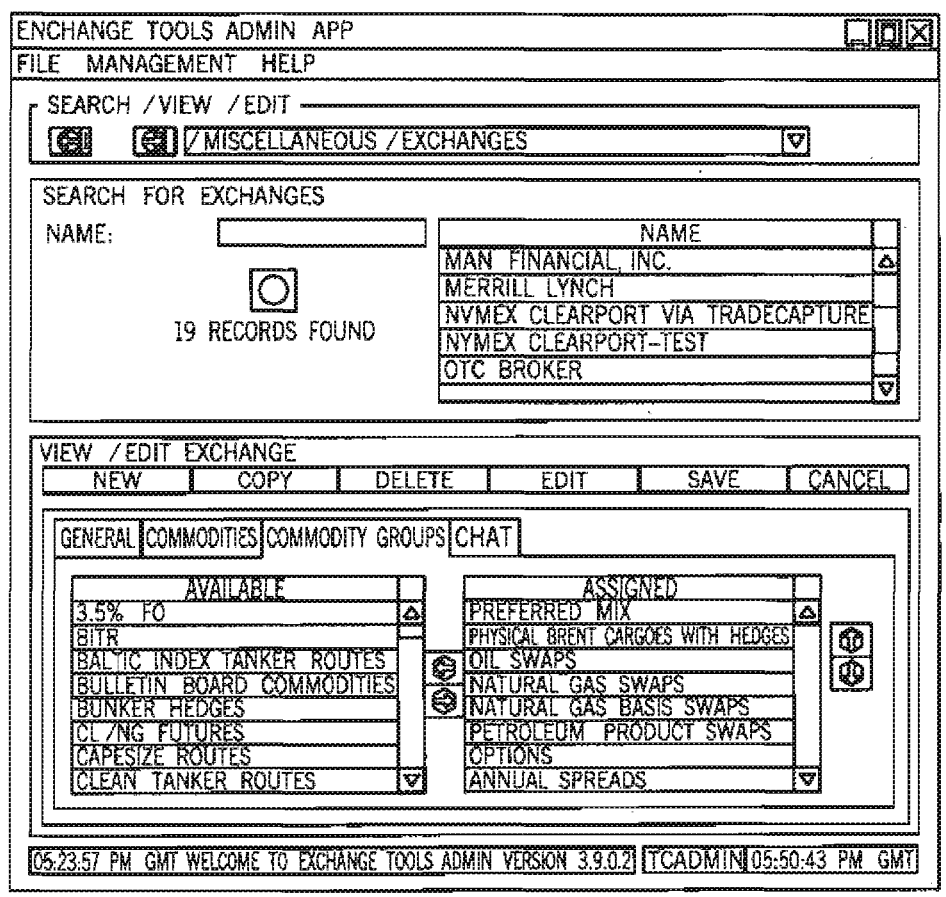
Figure 16:
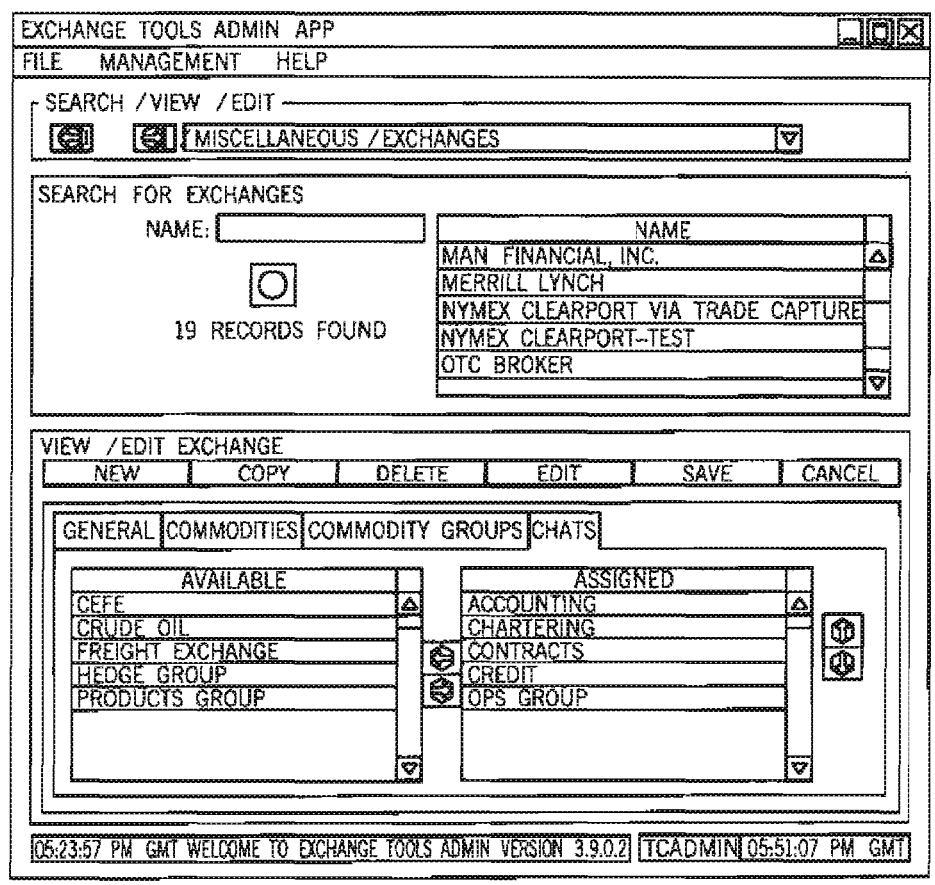

Commodities', 'commodity groups', and 'chat groups' can be associated with exchanges. 'Commodities/commodity groups/chats' to be associated with the exchange can be selected from each of their respective tabs. Referring to FIG. 14, an example of the 'commodities' tab is seen. An item from the available list can be highlighted and assigned to the exchange for example with the 'right' arrow. To remove an assigned item from an exchange, the item to be removed can be highlight in the 'assigned' column and for example the 'left' arrow can remove it. FIG. 15 shows an example of the 'commodities groups' tab while FIG. 16 shows an example of the 'chat groups' tab.

Figure 17:
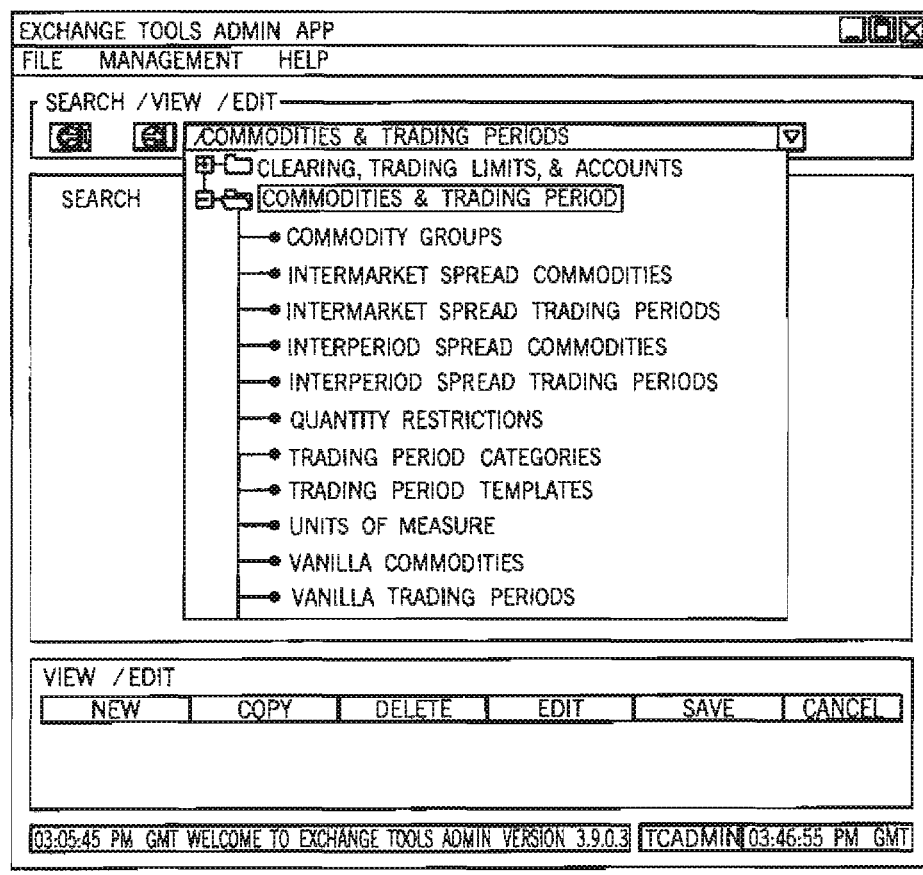

Referring to FIGS. 17-27, the vanilla commodities and trading period application is described. To set up new commodities and trading periods, the 'commodities & trading periods' file can be selected from the 'search/view/edit' drop-down menu of the exchange tools administration application screen seen in FIG. 11. Selecting the 'commodities & trading periods' file in the commodities groups screen can present: 'commodity groups'; 'inter-market spread commodities'; 'inter-market spread trading periods'; 'inter-period spread trading commodities'; 'inter-period spread trading periods'; 'quantity restrictions'; 'trading period categories'; 'trading period templates'; 'units of measure'; 'vanilla commodities'; and 'vanilla trading periods', an example of which is seen in FIG. 17.

Vanilla commodity can be selected. Several tabs of information can be provided for a vanilla commodity, which can include: 'gen' (general); 'qty & price' (quantity and price); and 'misc' (miscellaneous). An example of the 'gen' tab is seen in FIG. 18. The 'gen' tab can include: 'name—the commodity name displayed in trading screens; 'short name'; 'abbreviated name'—the clearing code used for automated clearing; 'allow aggregation on prices' flag—allows commodity to be shown in a trading screen with bids/offers at a certain price to be combined to show total volume as well as by counterparty; 'allow crossing bids & offers' flag—permits bids better than best offer and offers better than best bid for this commodity; 'allow automatic order matching' flag—will not be enabled; 'allow negotiations' flag—permits traders/brokers to negotiate transactions on the commodity; 'must be cleared' flag—prevents bilateral transactions and allows only cleared trades for the commodity; 'partial fills type' flag—has three choices: to allow, require or disallow partial fills; 'show spot trading period date in . . . ' flag; 'show valid counterparty orders only' flag—allows a view which eliminates bids/offers from counterparties with whom viewers are not approved for trading; and 'allow private trades' flag—permits this commodity to have private trades.

An example of the 'qty & price' (quantity & price) tab is seen in FIG. 19. For a vanilla commodity, the following tabs can be provided: 'trade in multiples of lot' flag—determines if only quantities which are multiples of specified lot size for the commodity are allowed; 'lot size' field—filled if 'trade in multiples of lot' is flagged; 'lot choices count'; 'default quantity' field—minimum lot size; 'quantity scale' field—refers to the number of decimal places allowed in the 'quantity' field: zero in this field would indicate that whole numbers only be allowed in 'quantity' fields; 'quantity multiplier; quantity UOM'—selects unit of measure (e.g. bbl, gal) from a drop-down menu; 'default price'; 'allow positive prices only' flag—prevents the commodity from being able to accept negative prices for bids/offers: spread or basis commodities are examples where negative prices are acceptable; 'price variance exception amount'; 'price scale'—the number of decimal places in price for commodity; 'price tick size'; 'constrain prices to tick size'; and 'price UOM'—selects unit of measure to be used for commodity price (e.g. bbl, gal).

Figure 20:
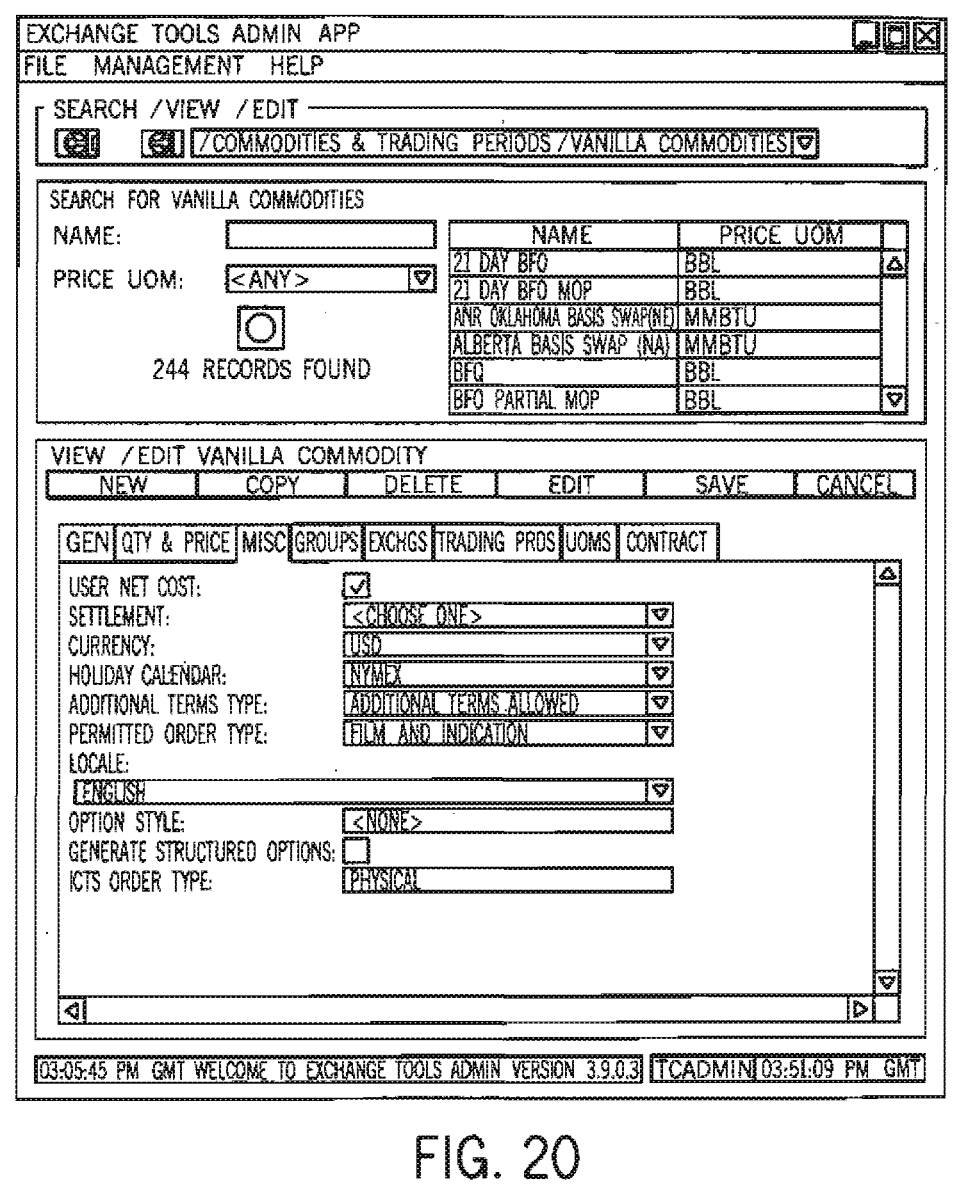

An example of the 'misc' (miscellaneous) tab is seen in FIG. 20. For a vanilla commodity, the following tabs can be provided: 'uses net costs'—when flagged, commodity shows net prices on confirms; 'settlement'—selected from a drop-down menu; 'currency'—selected from a drop-down menu; 'holiday calendar'—selected from a drop-down menu; 'additional terms type'—selected from a drop-down menu; 'permitted order types'—selected from a drop-down menu; 'locale'—selected from a drop-down menu; 'option style'—selected from a drop-down menu; 'generate structured options'—when flagged; 'ICTS order type'—selected from a drop-down menu.

Figure 21:
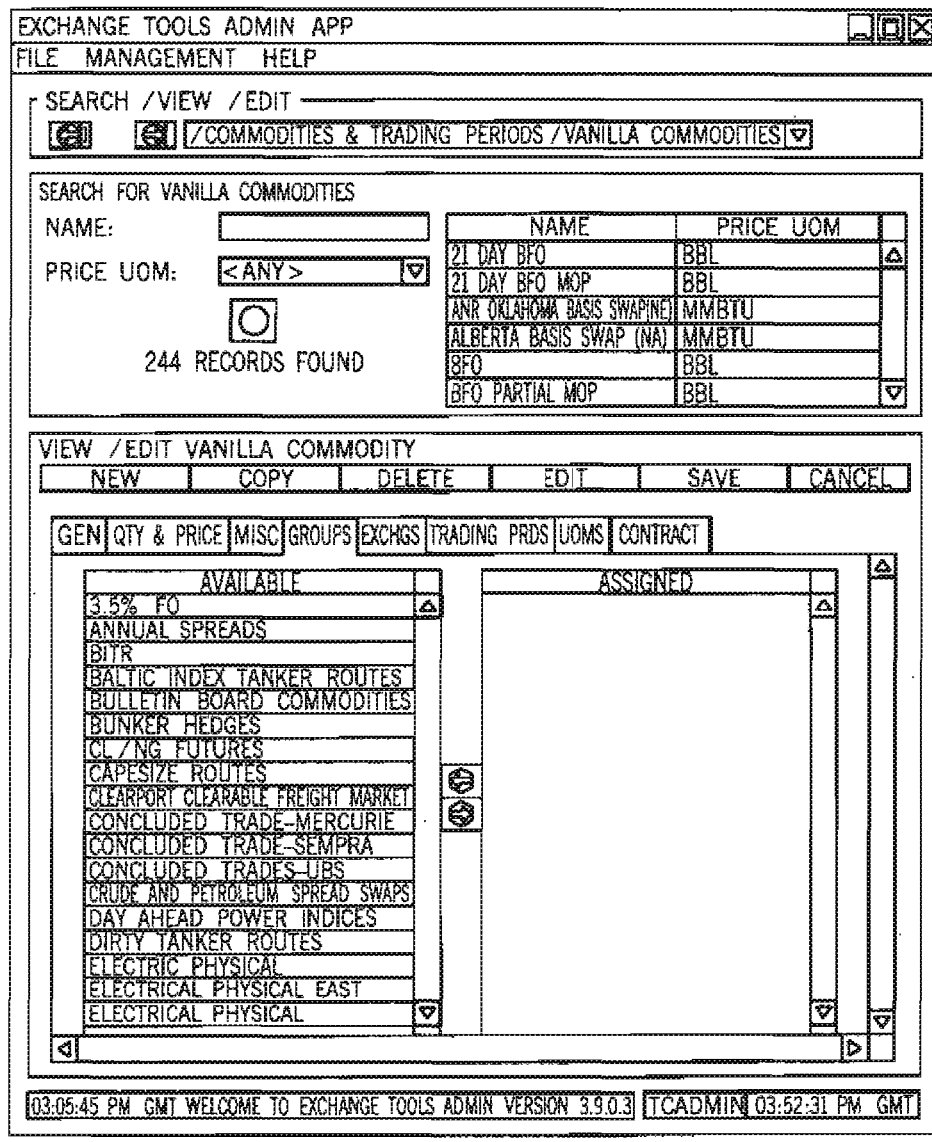
Figure 22:
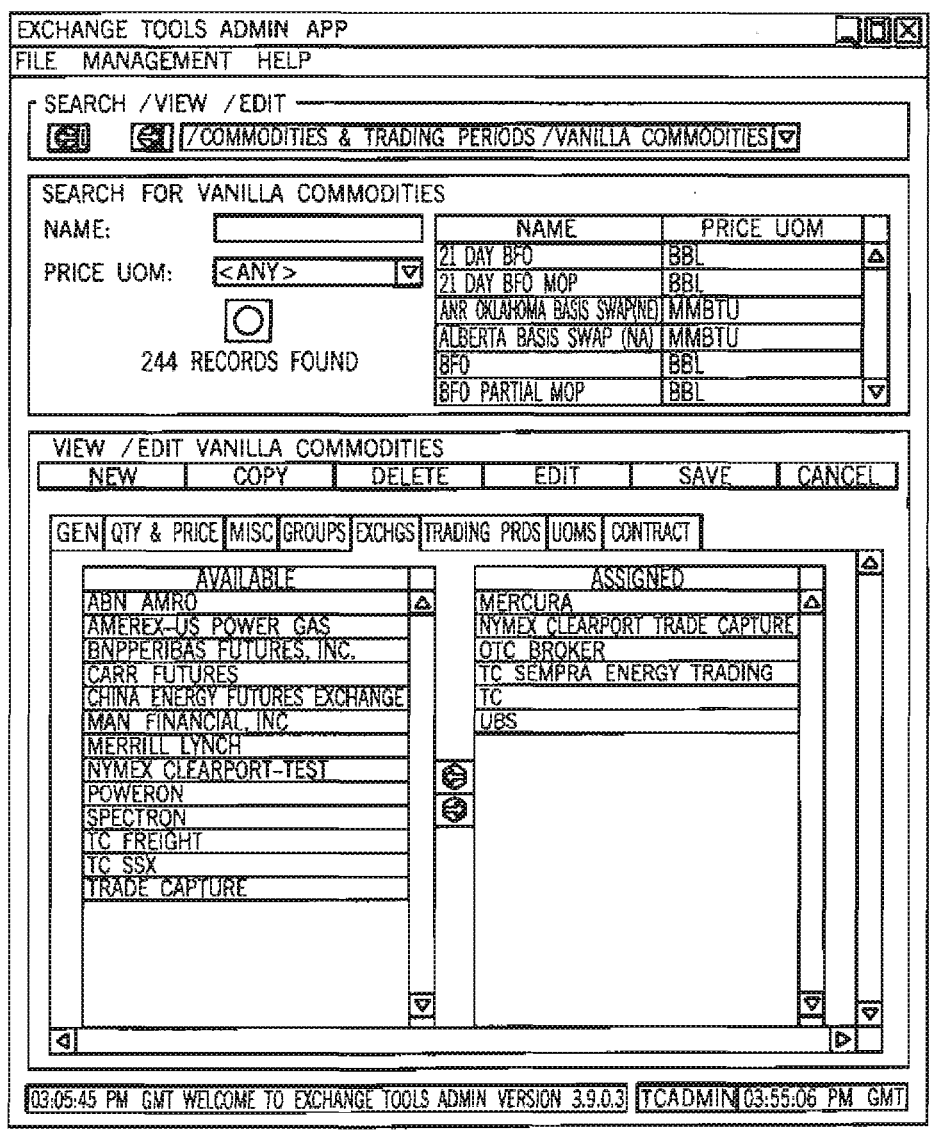
Figure 23:
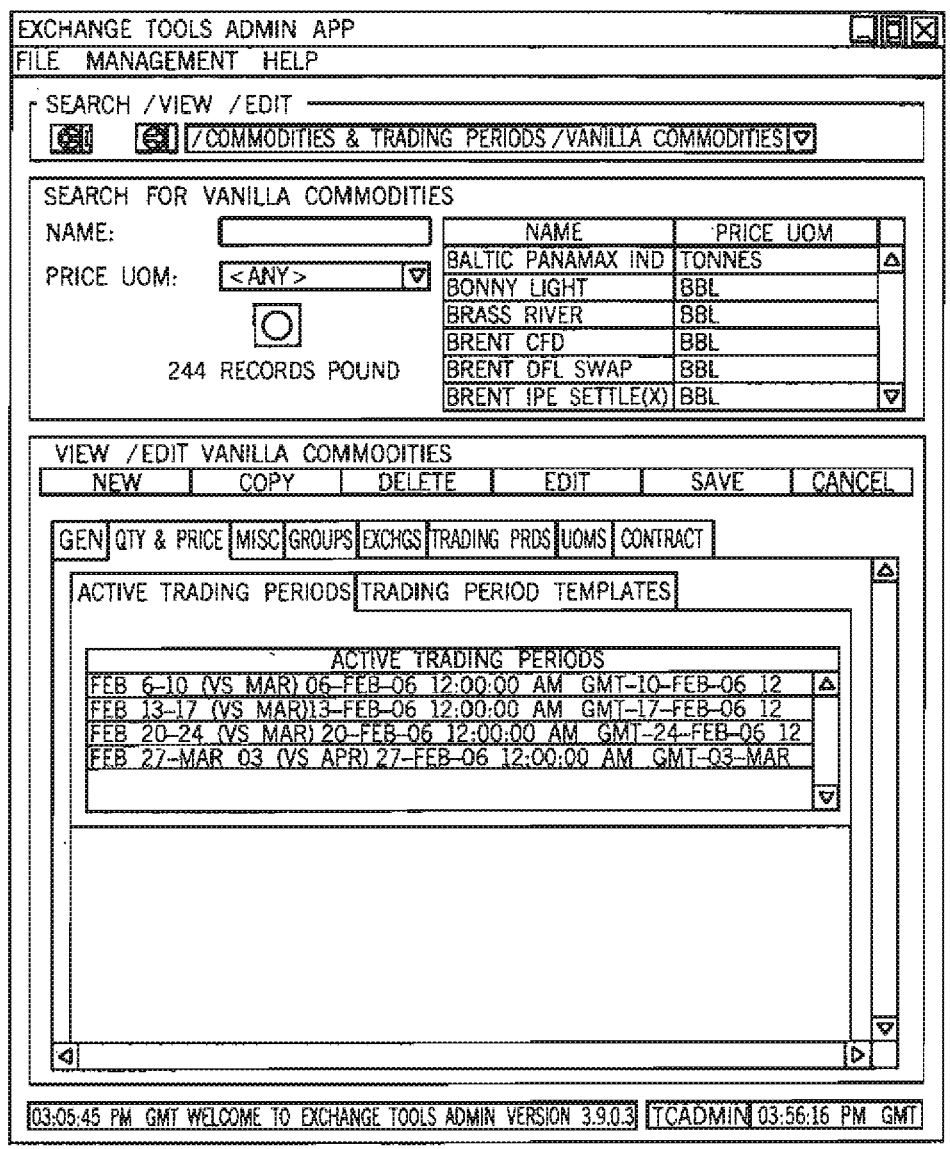
Figure 24:
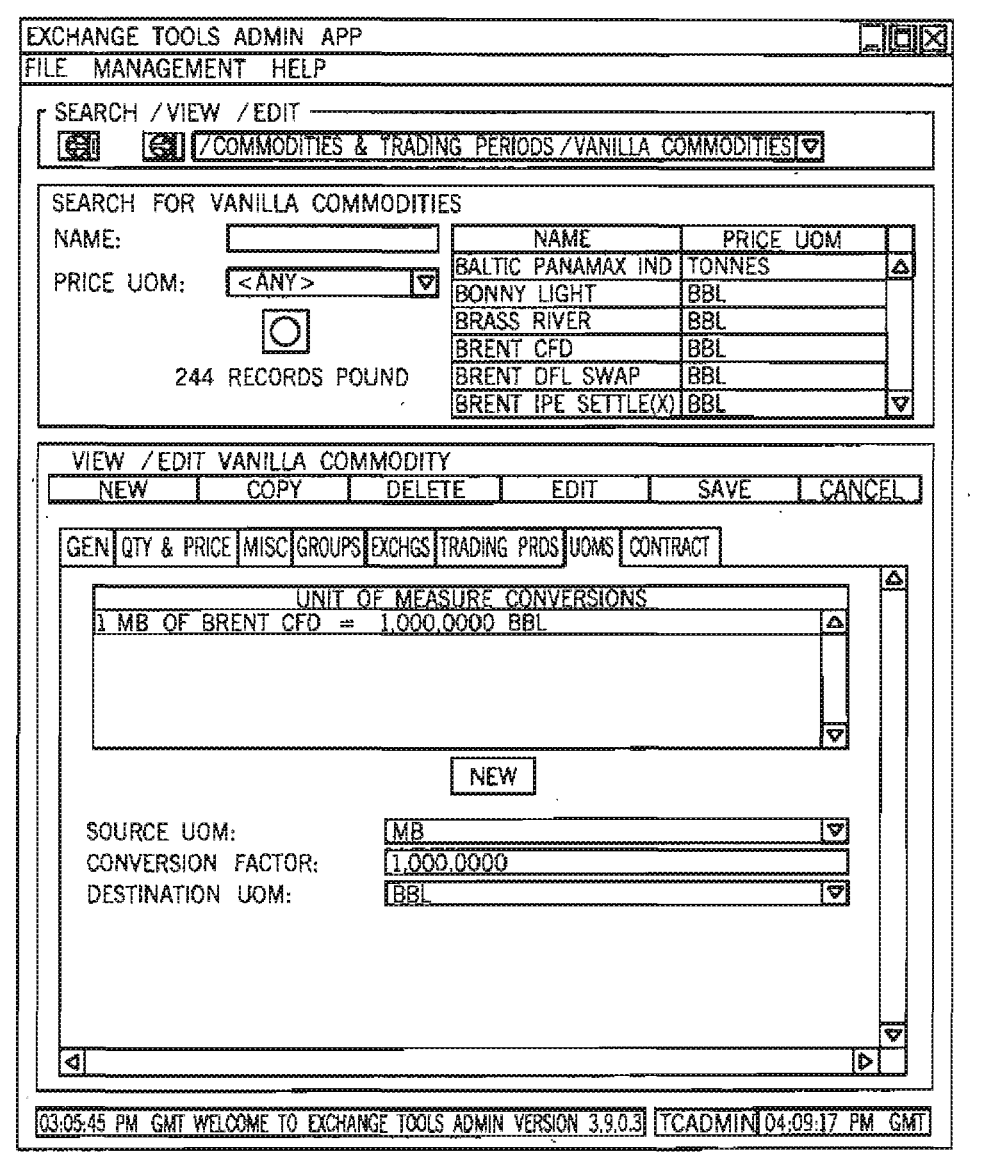
Figure 25:
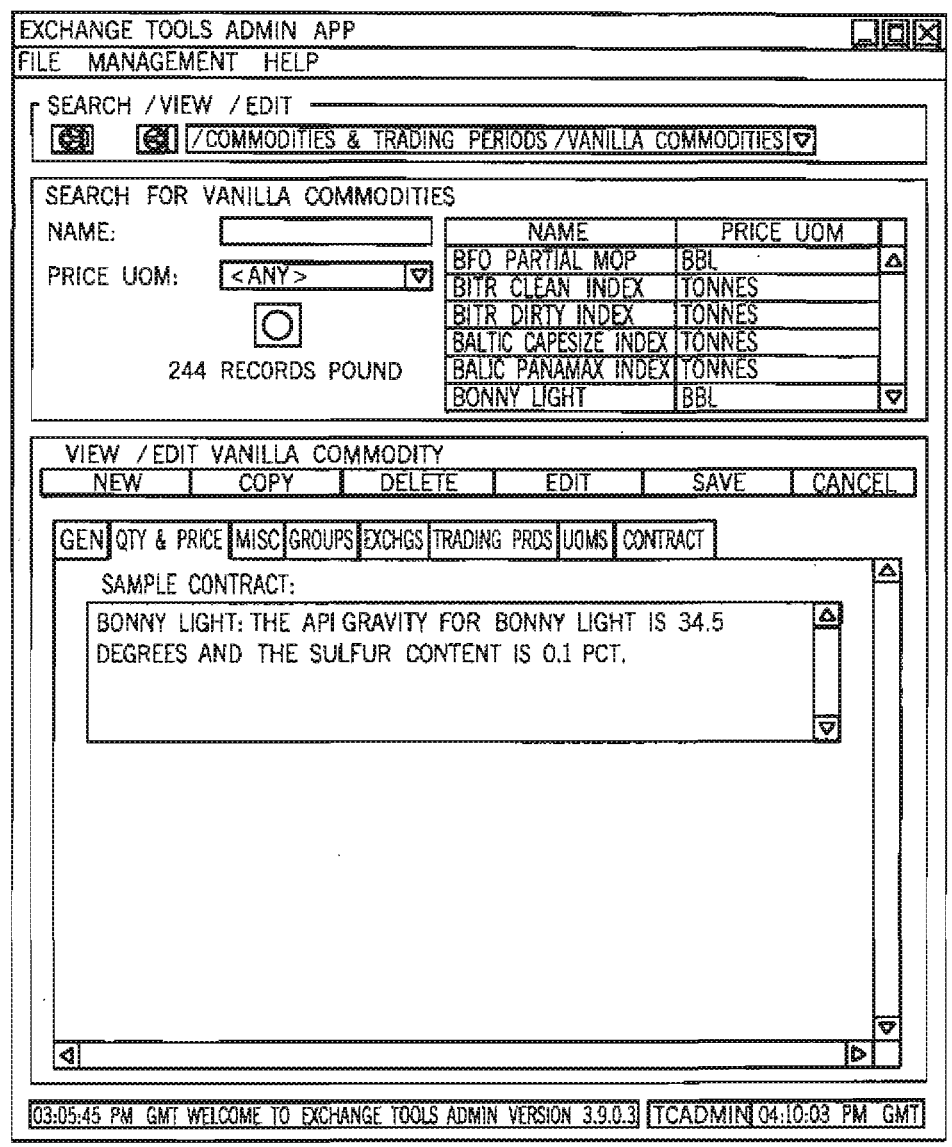

Referring to FIGS. 21-25, additional tabs for a vanilla commodity can be seen, which can include: 'groups';

'exchanges'; trading prds'; 'UOM' (unit of measure); and 'contract'. FIG. 21 shows an example of a 'groups' tab in which vanilla commodities can be added to a commodity group(s); FIG. 22 shows an example of an 'exchanges' tab in which vanilla commodities can be added to an exchange; FIG. 23 shows an example of a 'trading period' tab in which active trading periods for the selected commodity can be displayed; FIG. 24 shows an example of a 'UOM' tab in which the conversion factor between two units of measure can be defined; and FIG. 25 shows an example of a 'contracts' tab in which contract terms for commodity can be entered. In the 'UOM' tab a drop-down menu can be used to select units of measure for selected commodity and a conversion factor can be entered which sets source measure equivalent to destination measure.

Referring to FIG. 26, an example of the commodities and trading period screen is seen. The commodities and trading period screen defines trading periods associated with commodities. The commodities and trading period screen can include: 'name'—name of trading period being created; 'commodity'—the commodity that uses the trading period (the commodity pre-exists); 'category'—selected from a drop-down menu; 'sorting priority'—used to sort trading period categories, i.e. where monthly, quarterly, annual trading periods exist for same commodity; 'pricing start date'; 'pricing end date'—sets pricing terms for the trade period being named; 'trading start date'; and 'trading end date'—sets dates when trading period rolls on and off.

Figure 27:
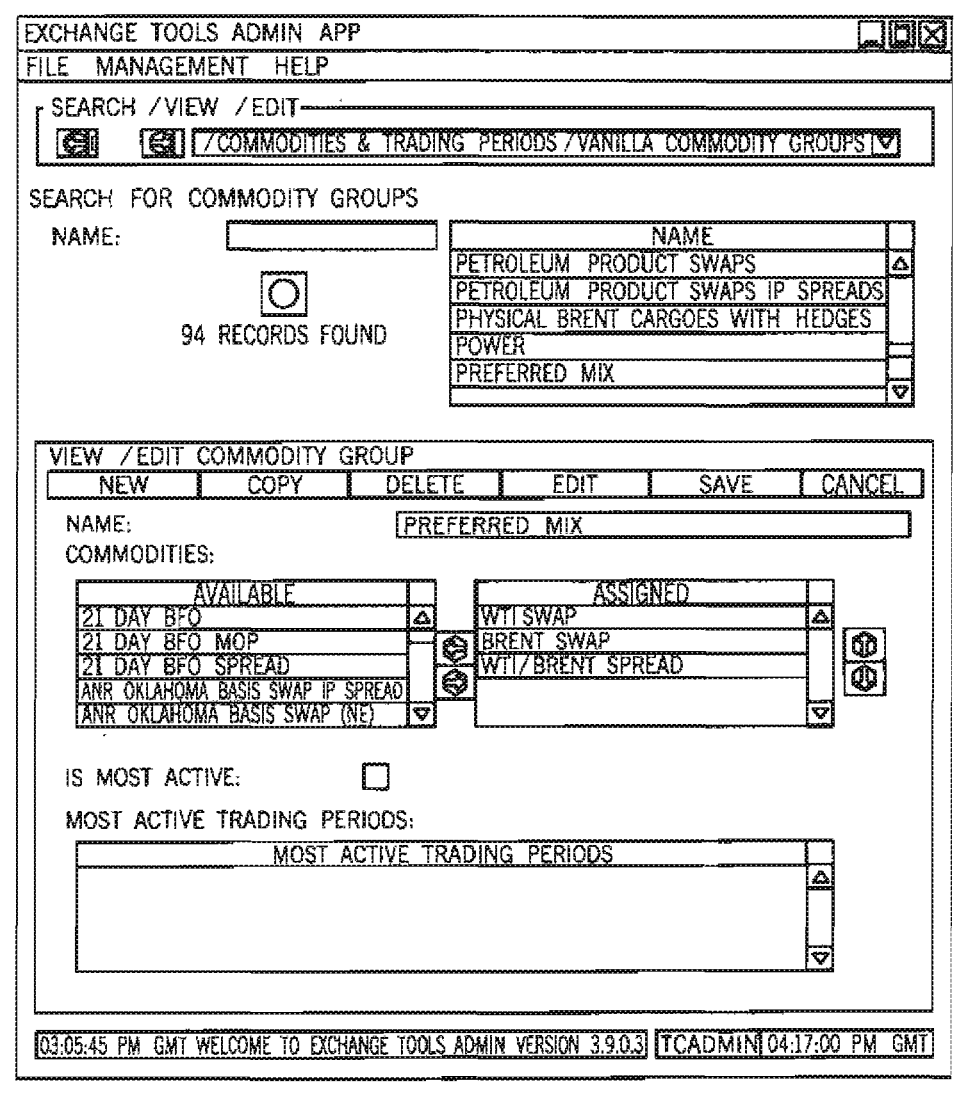

Referring to FIG. 27, an example of the commodities groups screen is seen. On the commodities groups screen, commodities can be assigned to one or more commodity groups. New commodity groups also can be created and commodities can be added or removed from groups. To define a new group, an existing group can be selected and edited or 'select new' can be selected. 'Left' and 'right' arrows can be used to add or remove commodities.

Figure 28:
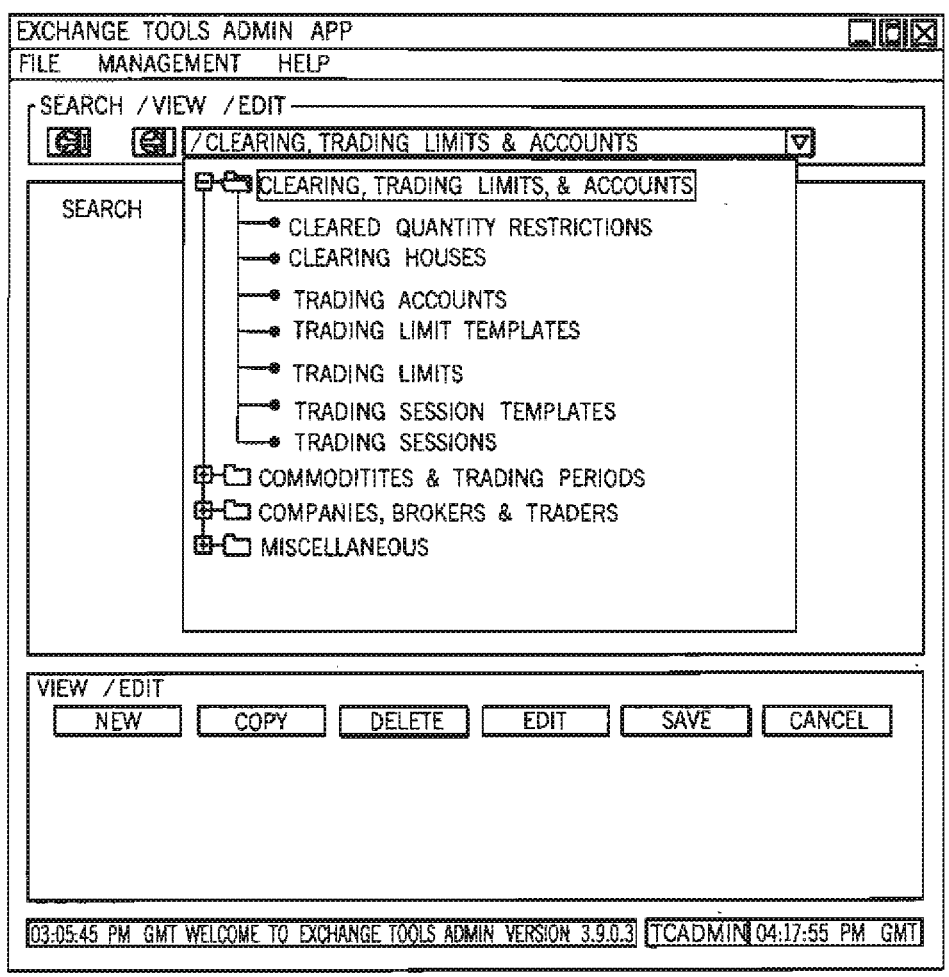
Figure 29:
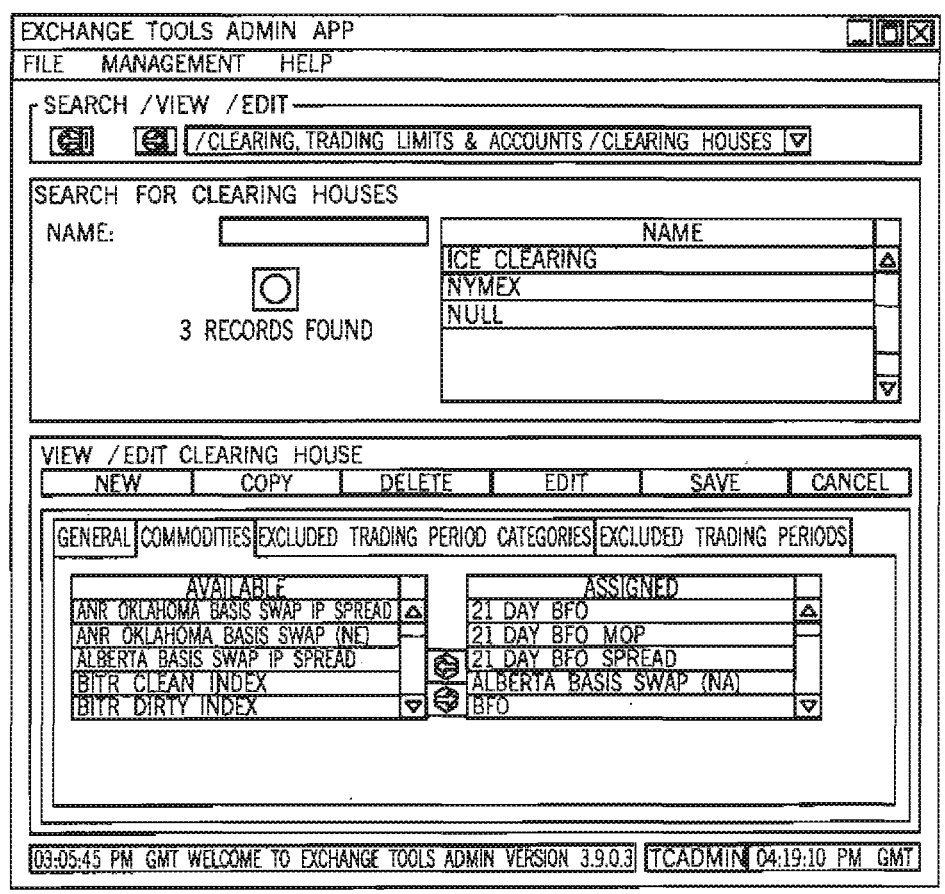
Figure 30:
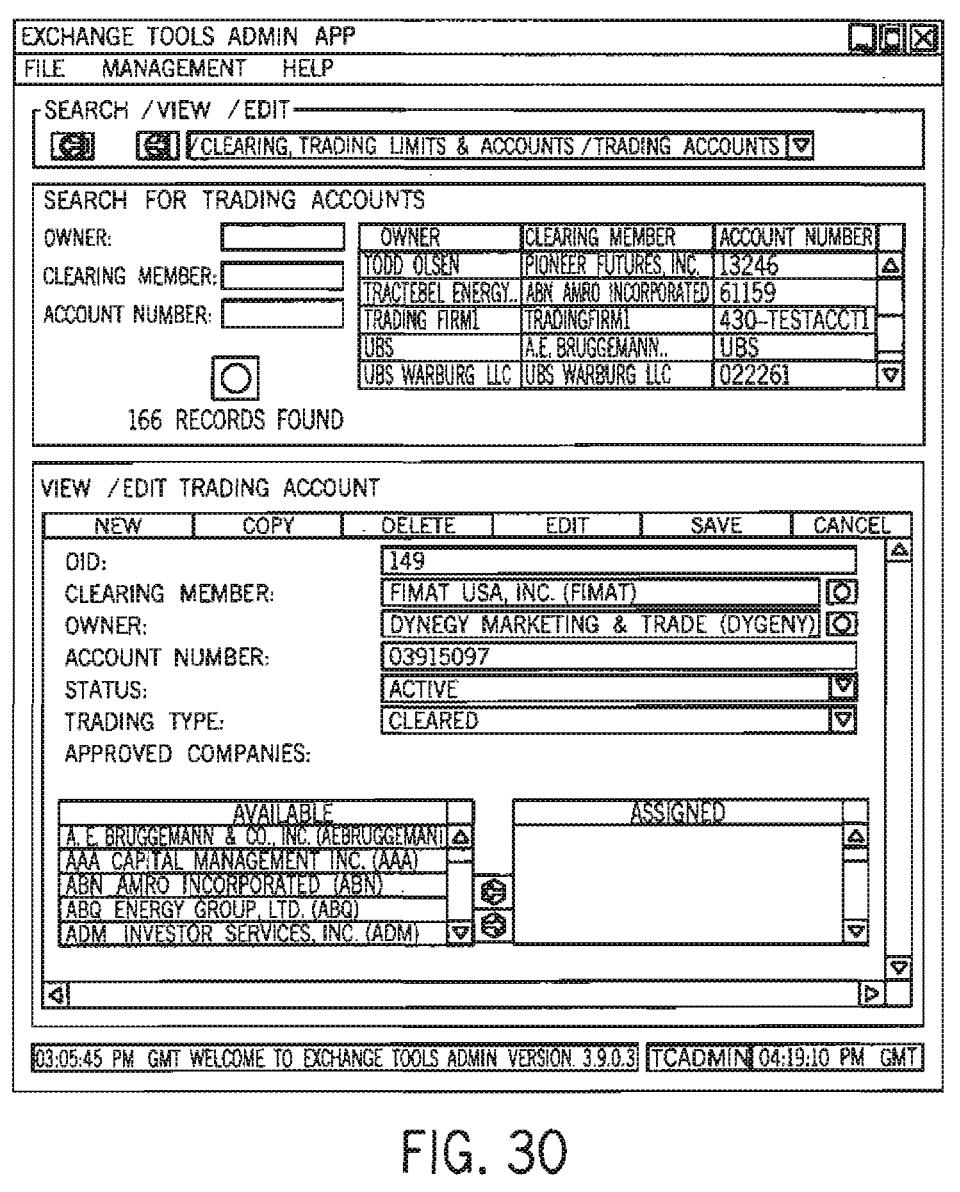
Figure 31:
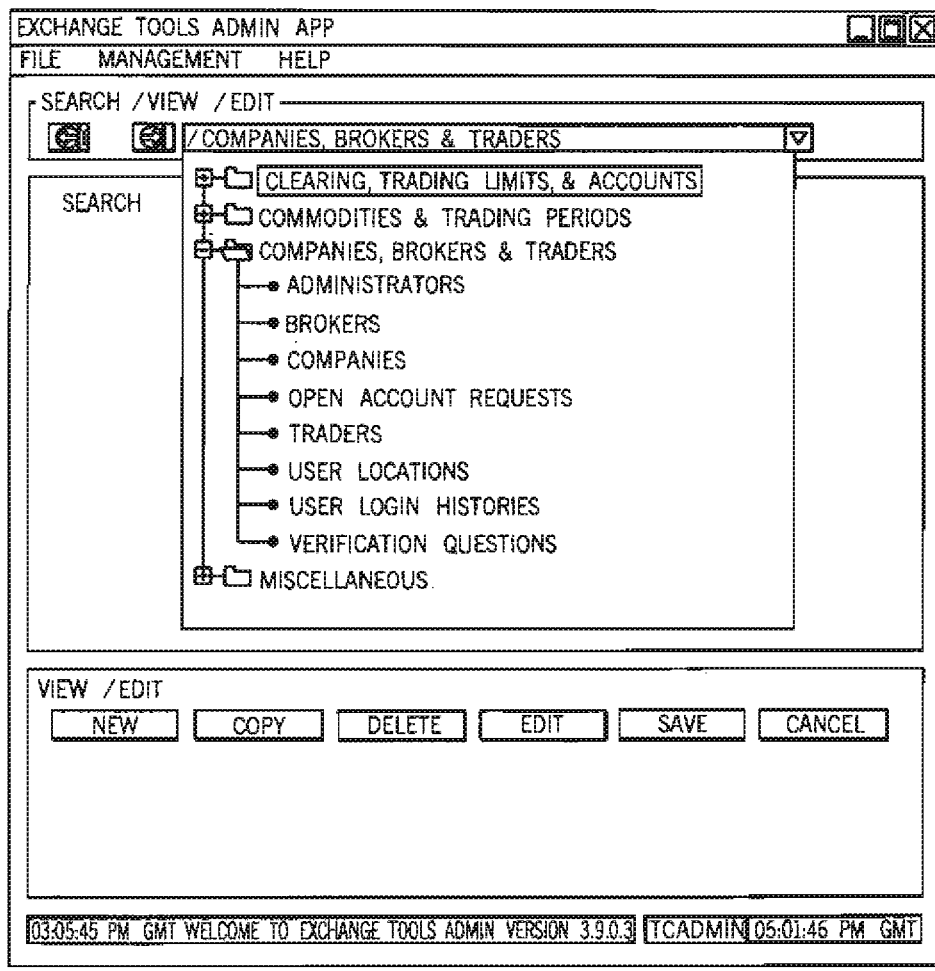

Referring to FIGS. 28-30, the clearing, trading limits, and accounts application is described. To set up new commodities and trading periods, the 'commodities groups' file can be selected from the 'search/view/edit' drop-down menu of the exchange tools administration application screen seen in FIG. 11. Selecting the 'clearing, trading limits & accounts' file in the commodities groups screen can present: 'cleared quantity restrictions'; 'clearing houses'; 'trading accounts'; 'trading limit templates'; 'trading limits'; 'trading session templates'; and 'trading sessions', an example of which is seen in FIG. 28. Commodities can be assigned to a clearing house by selecting 'clearing houses', an example of which screen is seen in FIG. 29. Trading accounts can be associated with 'clearing members and owners (companies)', an example of which screen is seen in FIG. 31.

Referring to FIGS. 31-34, the companies, brokers, and traders application is described. To set up companies, brokers, and traders, the 'commodities & trading periods' file can be selected from the 'search/view/edit' drop-down menu of the exchange tools administration application screen seen in FIG. 11. Selecting the 'companies, brokers, and traders' file in the commodities groups screen can present: 'administrators'; 'brokers'; 'companies'; 'open account requests'; 'traders'; 'user locations'; 'user login histories'; and 'verification questions', an example of which is seen in FIG. 30.

Figure 32:
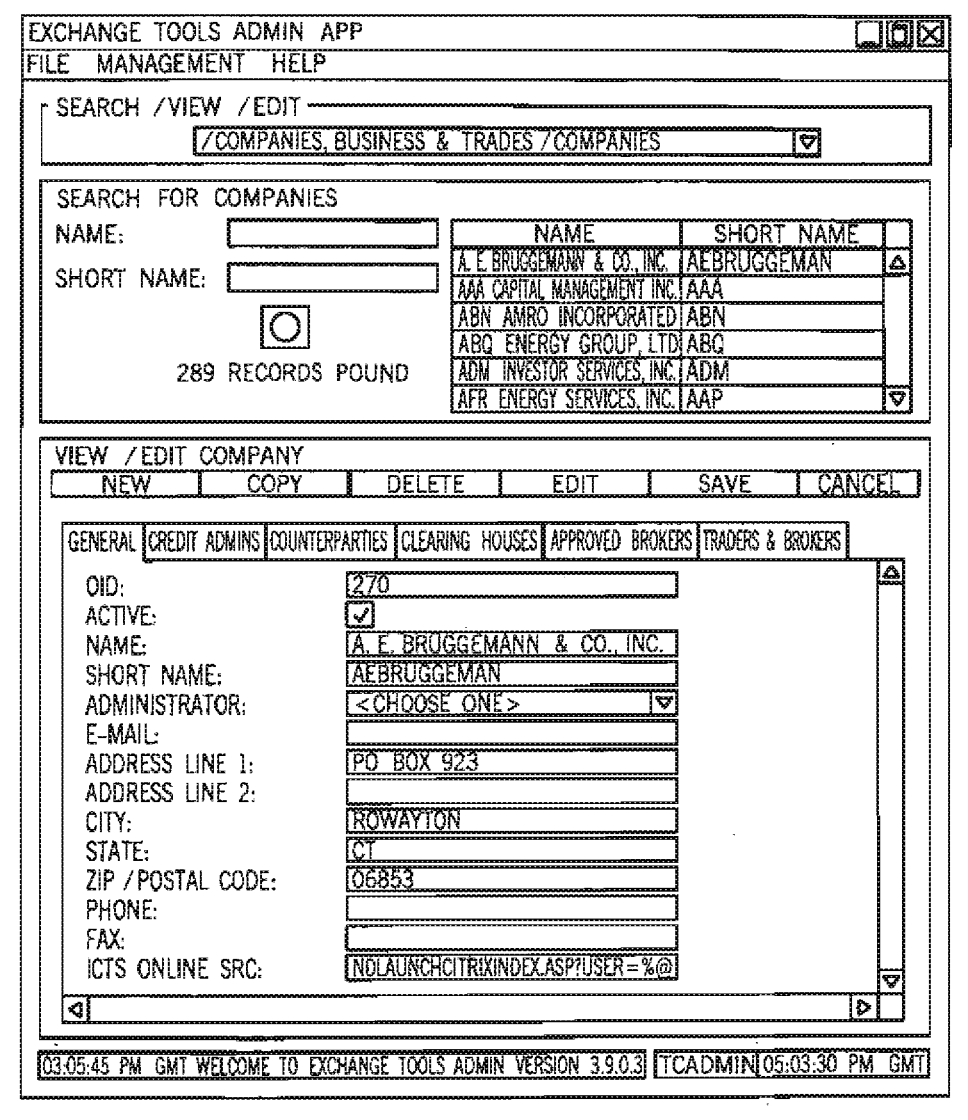
Figure 33:
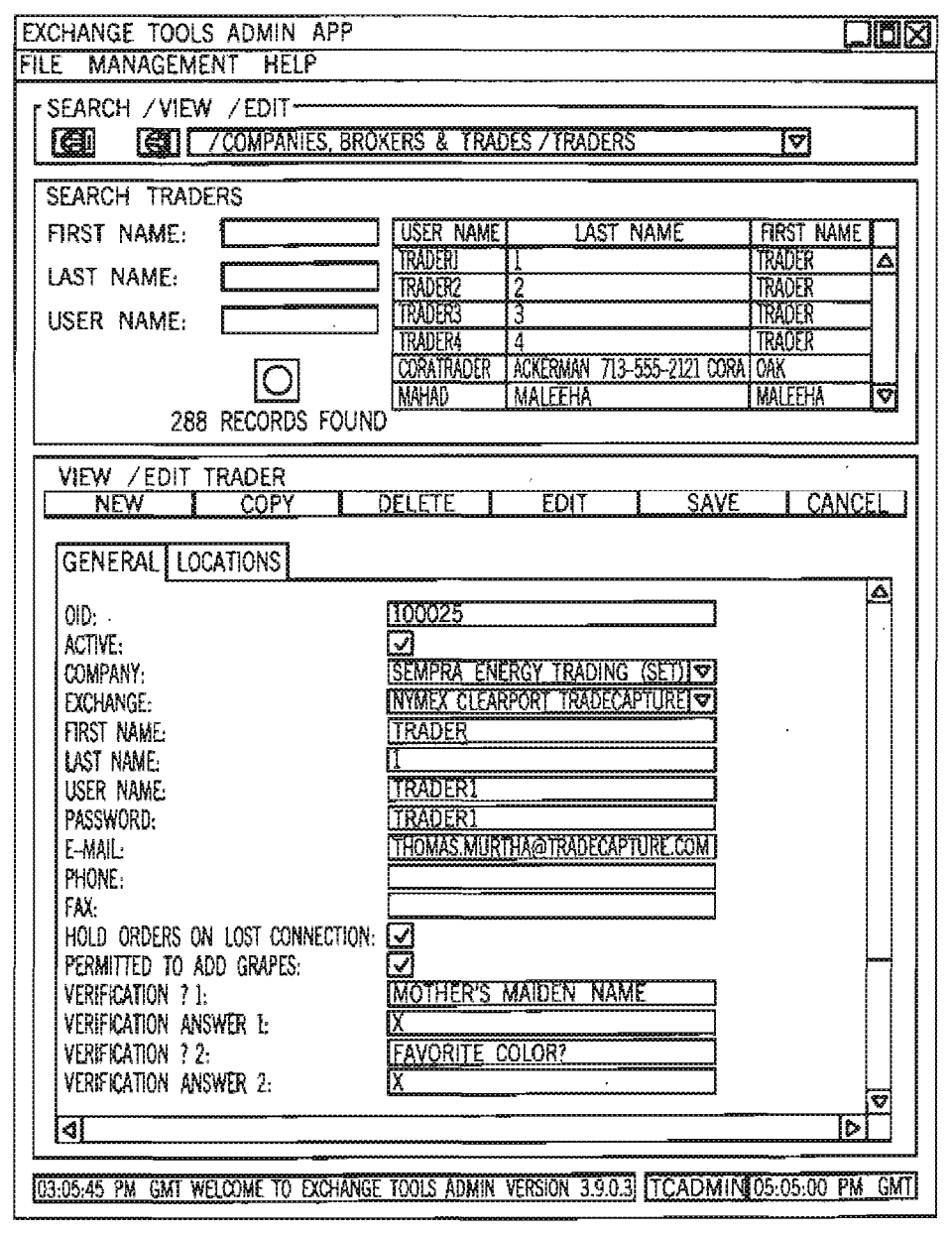
Figure 34:
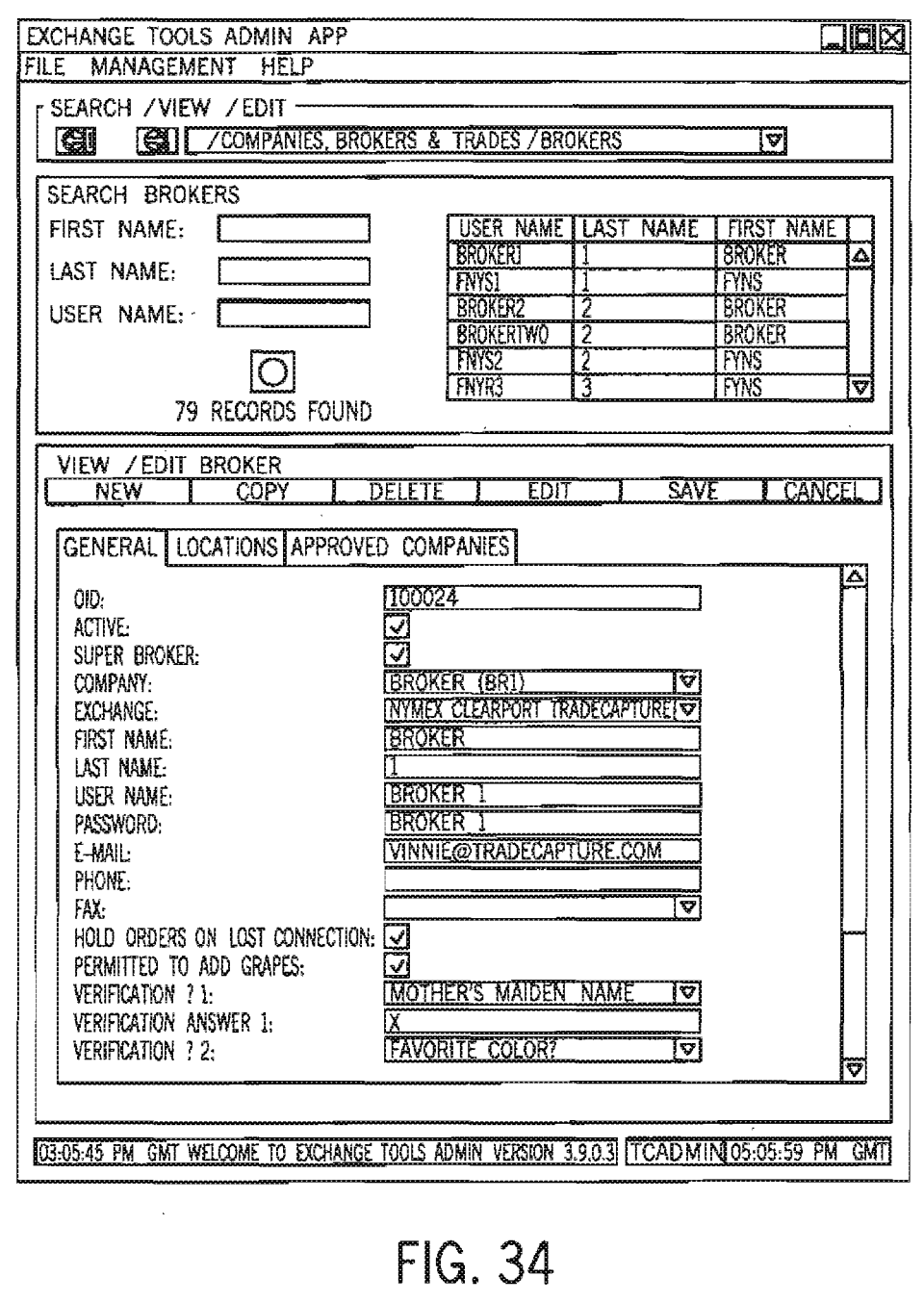

Companies can be associated with counterparties and clearing houses, and have traders and brokers by selecting 'companies', an example screen of which is seen in FIG. 32. Traders can be associated with companies by selecting 'traders', an example screen of which is seen in FIG. 33. Brokers can be affiliated with exchanges and companies by selecting 'brokers', an example screen of which is seen in FIG. 34. In addition, as seen in FIGS. 33 and 34, a "Permitted to Add Grapes" feature can be provided. This feature allows users to add people to their contact list for chatting with and instant messaging via a chat application (a la "heard it through the grape-vine"). Users can also enter RFQs and other orders, which will appear in the headlines window.

Figure 35:
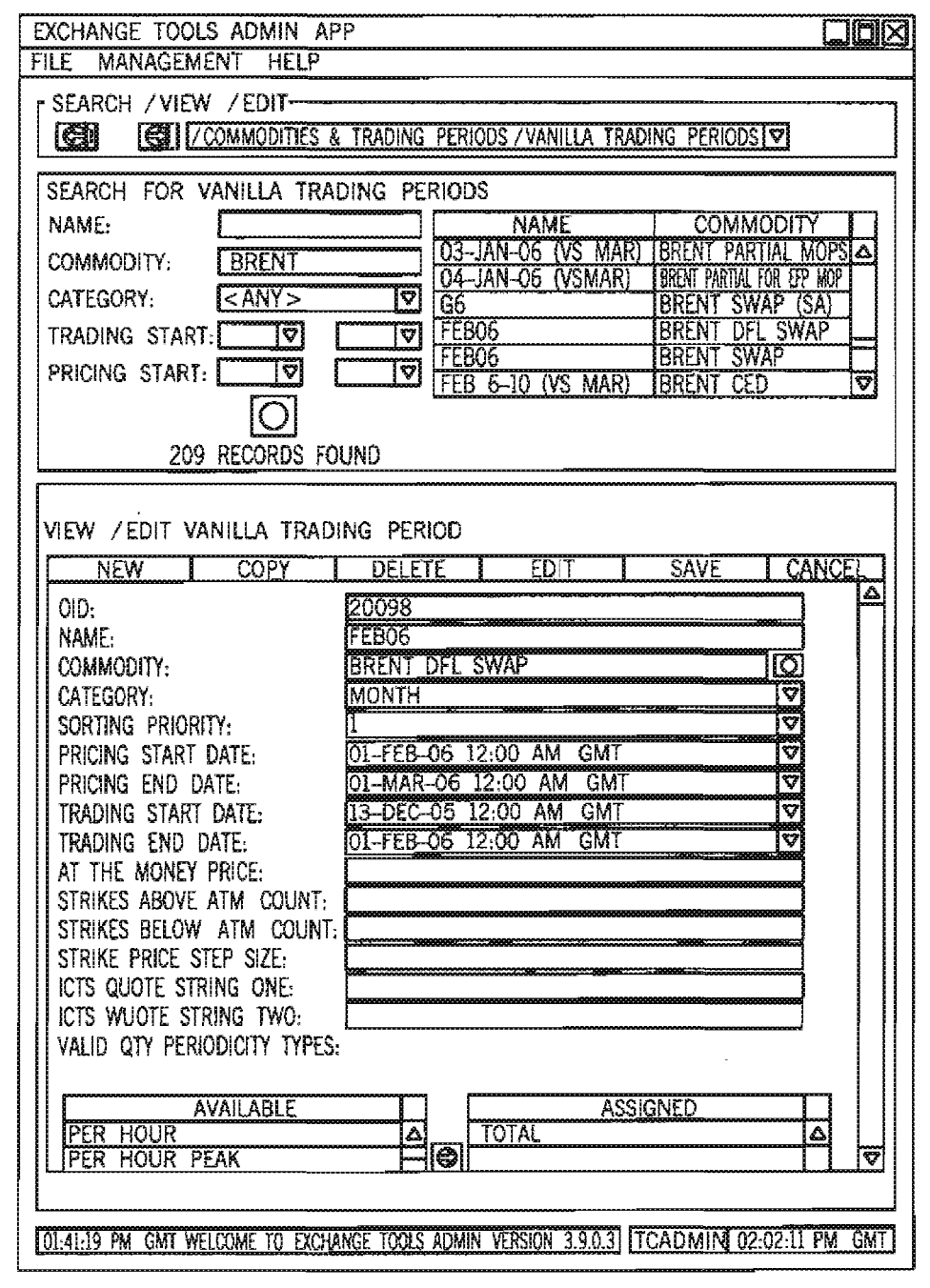

Referring to FIGS. 35-36, the management, trading period templates, and trading period generation application is described. Referring back to FIG. 17, the 'commodities & trading periods' file in the commodities groups screen is seen. Two ways can be provided to set up vanilla trading periods. In the 'search/view/edit' drop-down menu for commodities & trading periods, an individual trading period (or a small number of trading periods) can be set up in vanilla trading periods. Referring to FIG. 35, an example of a vanilla trading periods screen is seen. Once a new trading period has been set, the trading period screen is generated, an example of which is seen in FIG. 36.

Figure 37:
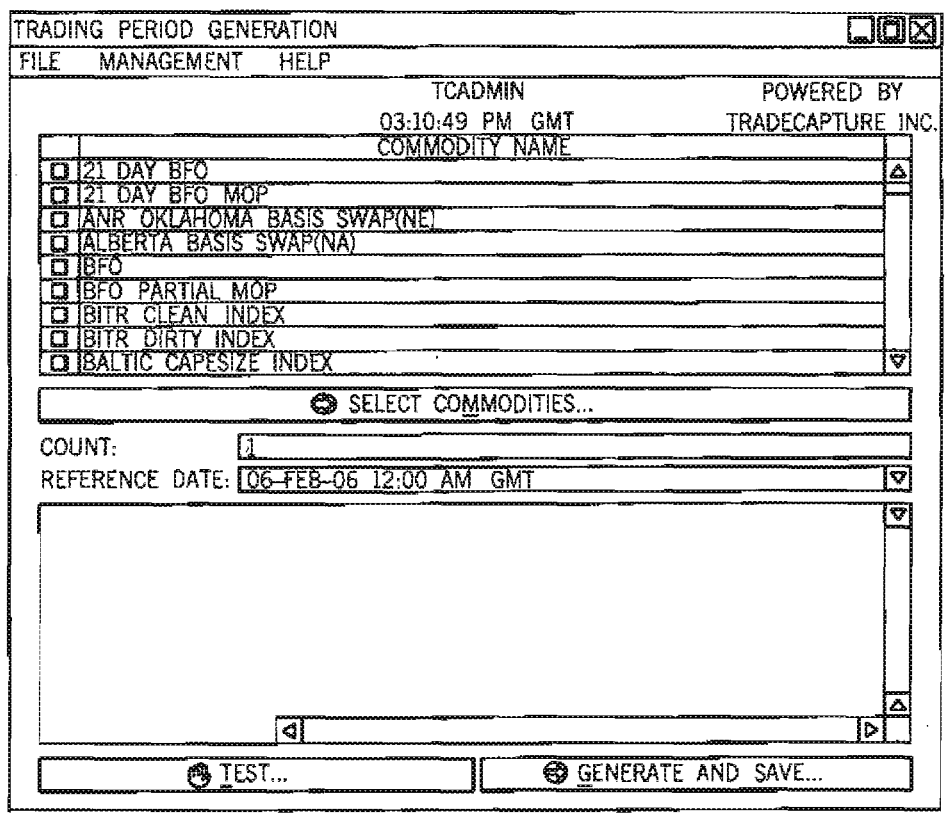
Figure 38:
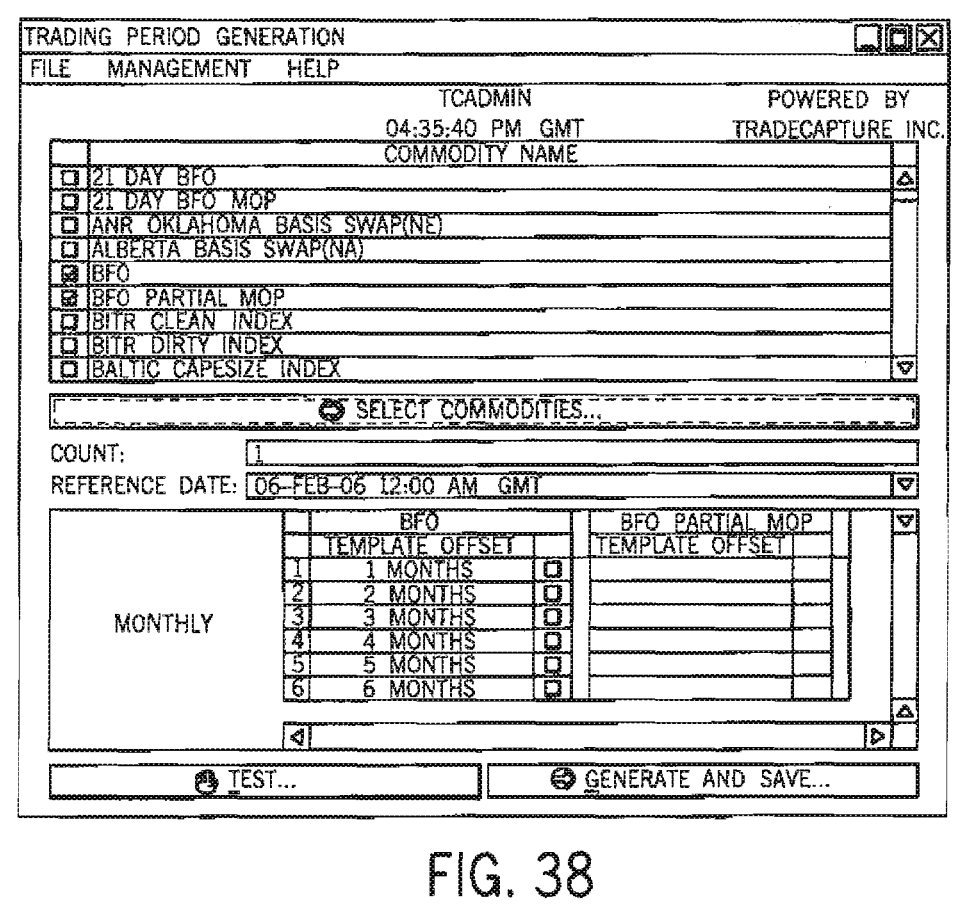

Referring to FIGS. 37-45, the setting up a series of trading period application is described. To set up a series of trading periods, from the 'menu' bar the 'trading period generation' function can be selected from the 'management' drop-down menu. Trading period templates are needed to use the trading period generation method. Referring to FIG. 37, the commodities for which trading periods will be generated can be selected with a check mark. Then, the 'select commodities' button can be clicked. Existing templates/offsets can be listed, an example of which is seen in FIG. 38.

Figure 39:
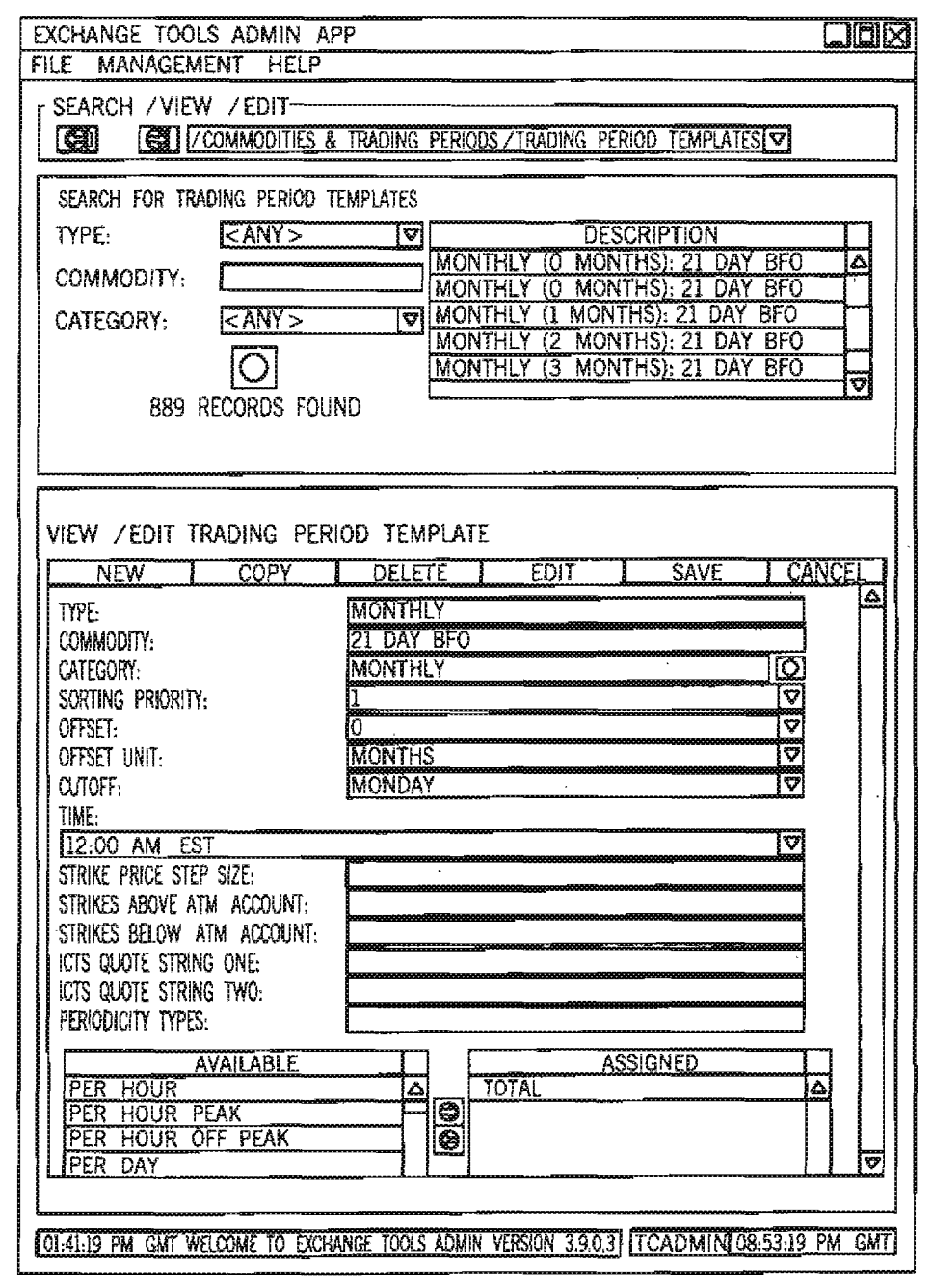
Figure 40:
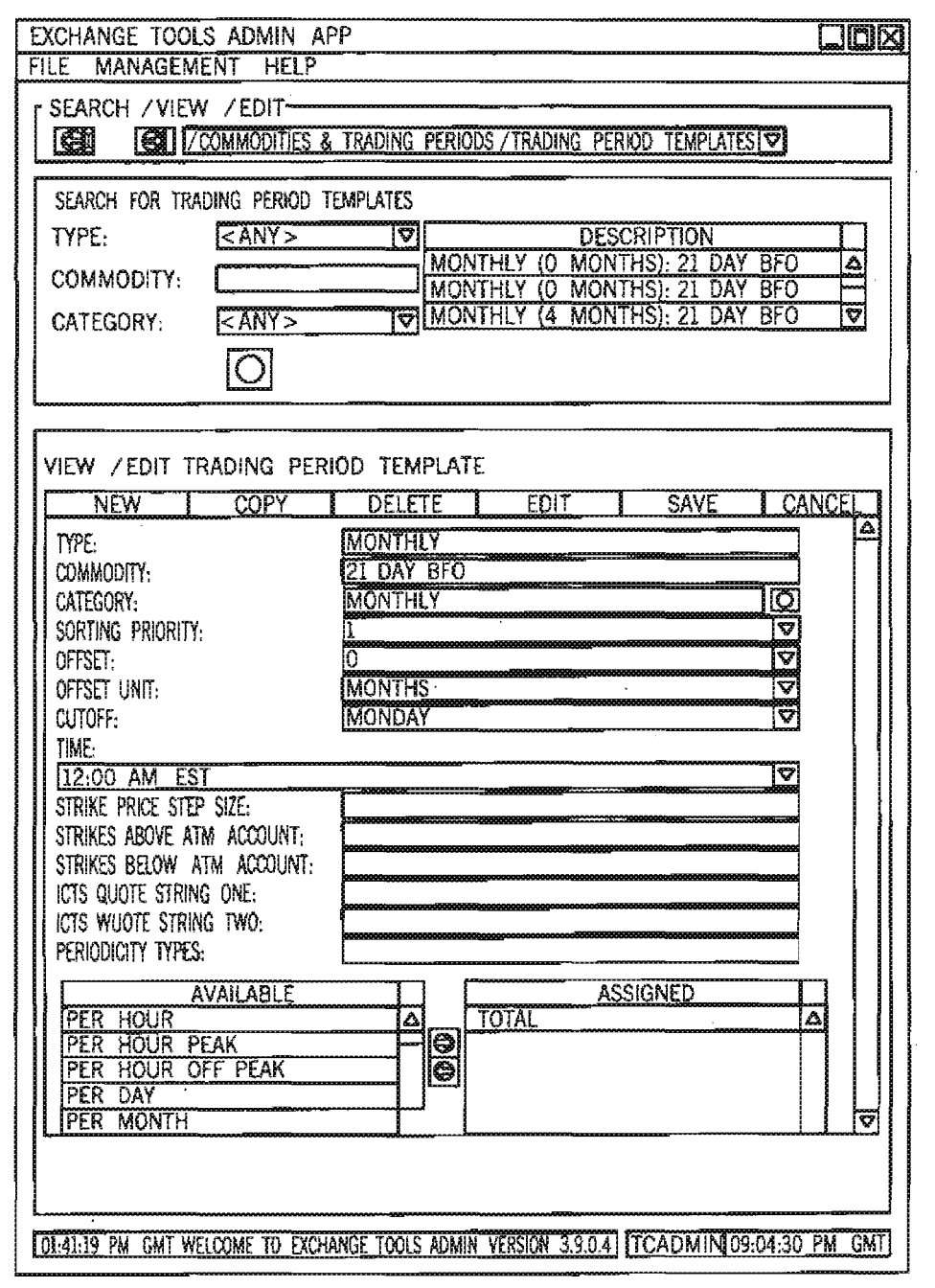
Figure 41:
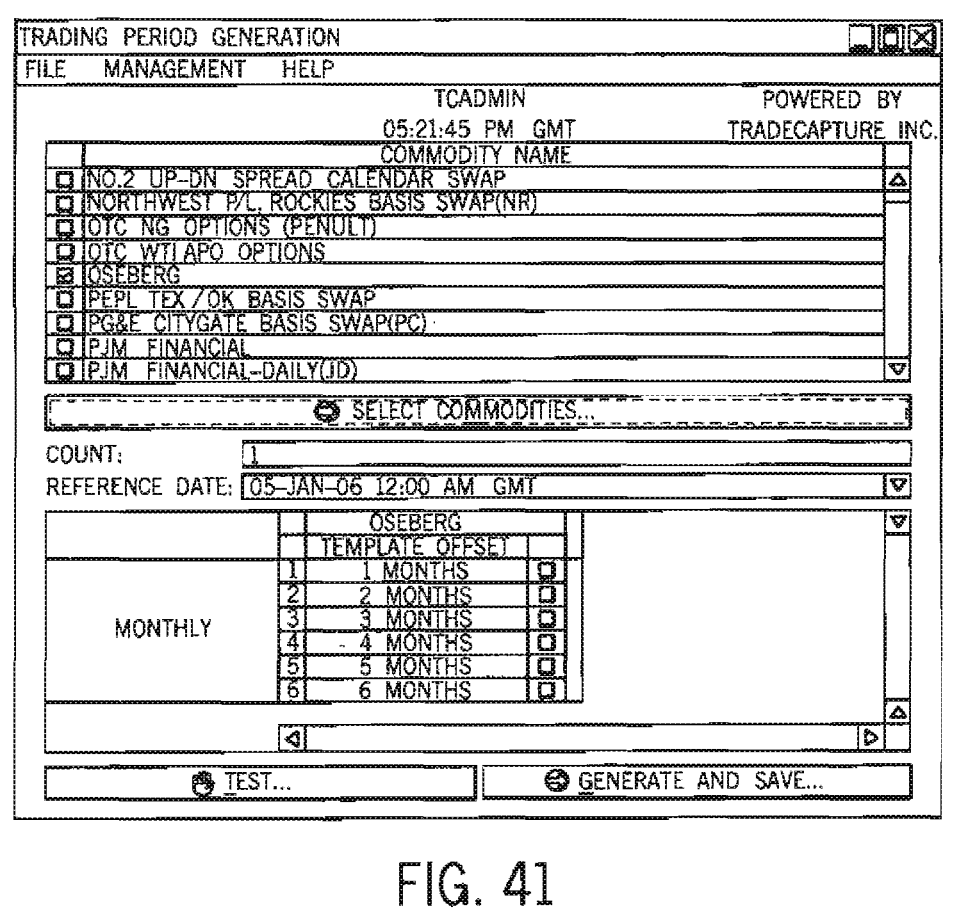

Alternatively, referring back to FIG. 17 a user can check for 'trading period templates' in 'commodities & trading periods' in the 'search/view/edit' drop-down menu. An example of a trading period template is seen in FIG. 39. The trading period template is where new templates to be used in generation can be defined. A trading period template can be set up for each trading period for which a commodity is to be generated, an example of which is seen in FIG. 40. The 'new' and or 'copy' buttons can be used to enter/amend appropriate information in each field, including: 'type (of template)'—selected from a drop-down menu (e.g. monthly, quarterly, monthly strips, peak); 'commodity'—selected from a drop-down menu (vanilla commodities listed); 'category'—selected from a drop-down menu (e.g. BOY, BOM, BOW, daily, day ahead, monthly, qtly, annual); 'sorting priority'—refers to priority in which a category can be sorted when displayed in trading screen; 'offset'—the number of time units which the trading periods pricing start date can be offset from the reference date and time shown in the generation screen; 'offset unit'—selected from a drop-down menu; 'cutoff'—selected day of the week from a drop-down menu; 'time'—selected from a drop-down menu; 'strike price step size'—the price difference required between consecutive option strike prices; 'strikes above/below ATM a count'—the number of out of the money option strikes required; 'ICTS quote string'; and 'periodicity'—time interval at which quantity traded repeats, factor of total quantity. Once the desired number of templates for the commodity has been defined, from the 'menu' bar 'trading period generation' can be selected from the 'management drop-down menu, the 'commodities' can be selected, and the 'select commodities' can be selected to return the available templates for the selected commodities, an example of which is seen in FIG. 41.

Figure 42:
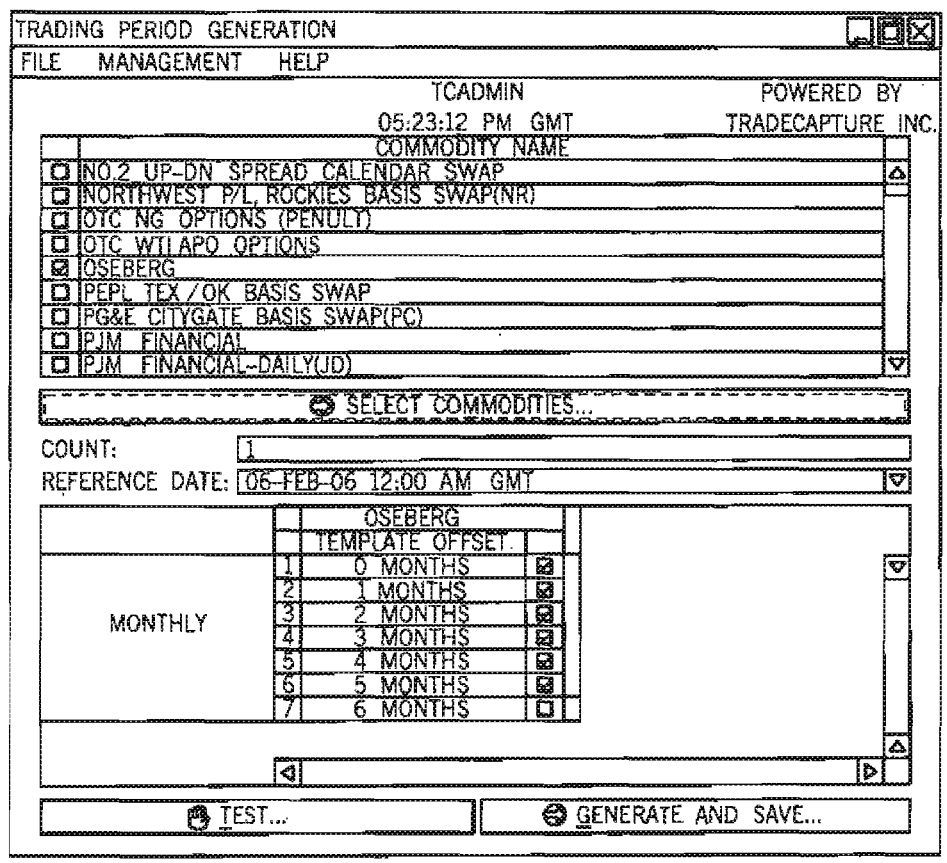

Referring to FIG. 42, to begin generating trading periods, the reference date is amended appropriately to produce the desired pricing start dates based on monthly offset numbers, and the templates for each period to be generated can be checked off. For instance, if the first month is desired to have a pricing period that starts 1 Jan. 2006, then the reference date is set to that date. The 'test' button can be used before 'generate and save' to ensure the information returns the desired results, an example of which is seen in FIG. 43. If the test information is correct, then 'generate and save' can be used to create new active trading periods.

Figure 44:
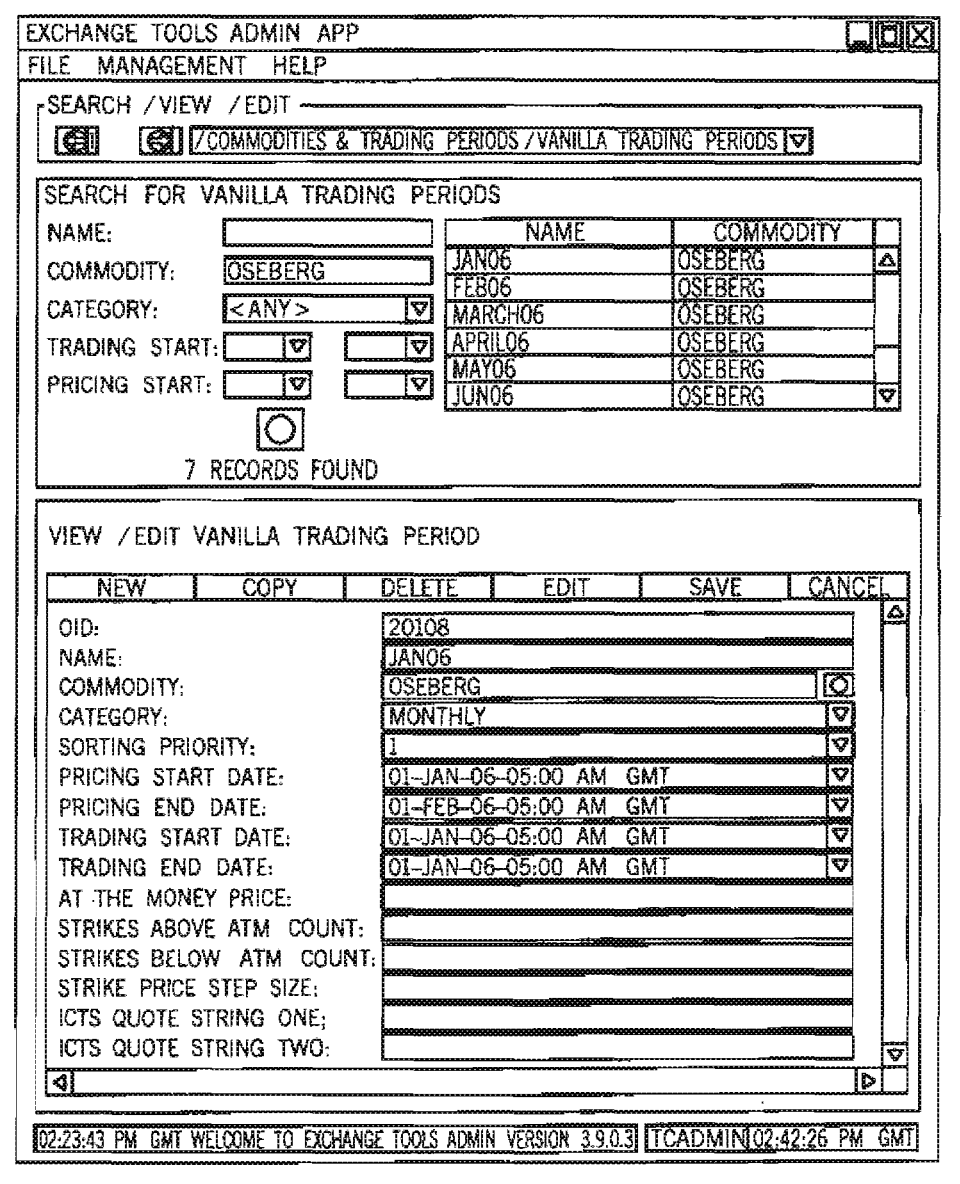
Figure 45:
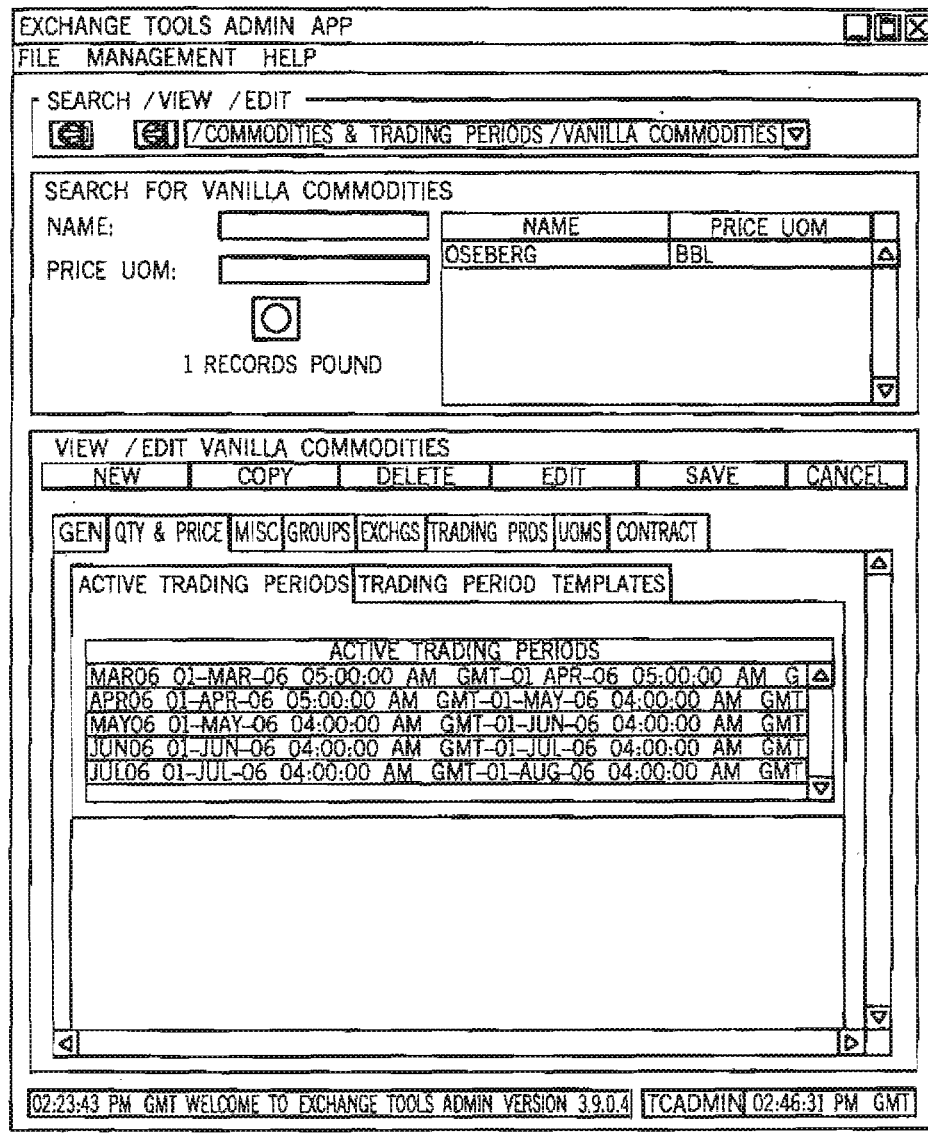
Figure 46:
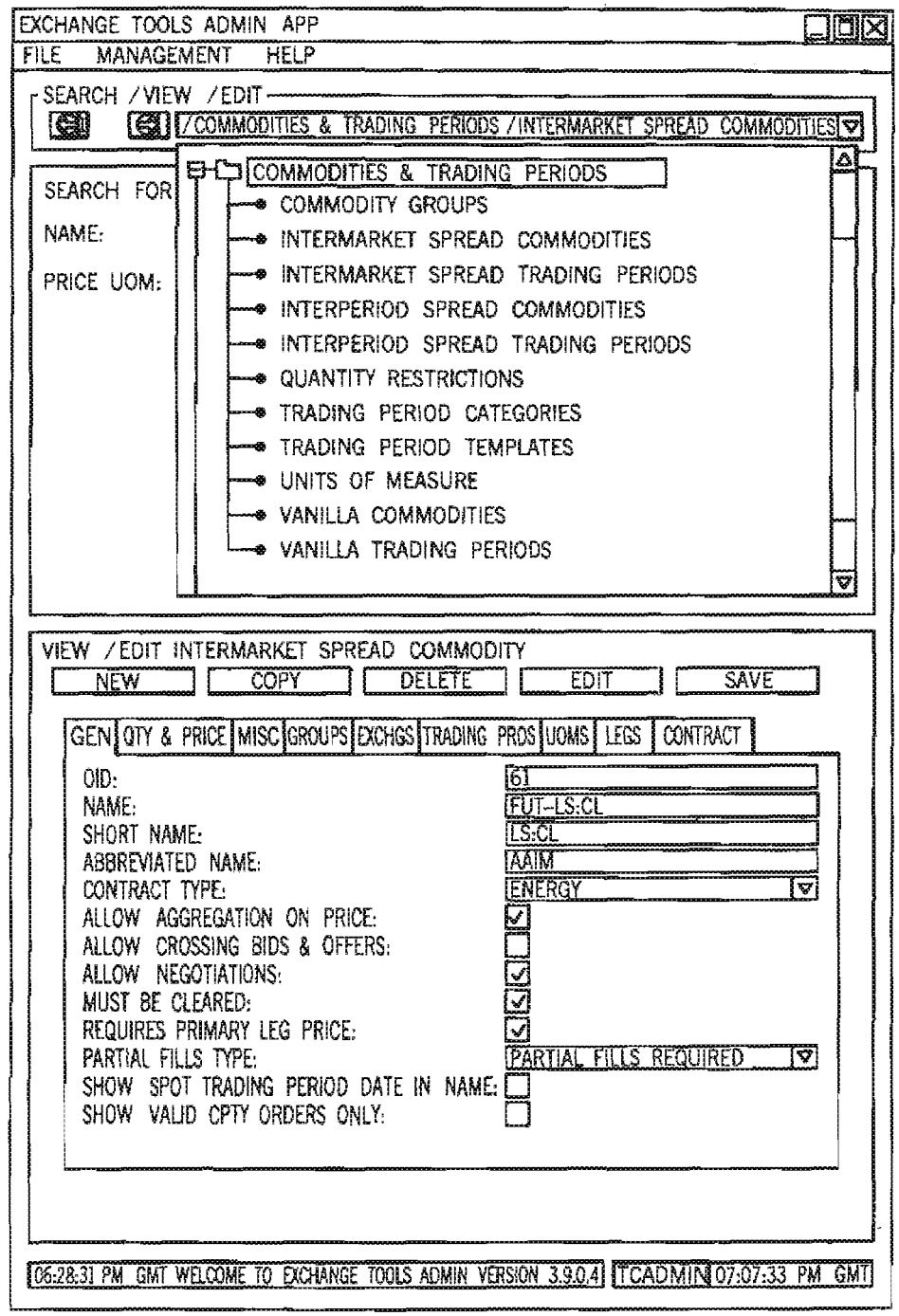
FIGS. 46-56 show the setting up for inter-market spreads application of the present invention.

Referring to FIG. 44, an example of the 'commodities & trading periods' in the 'search/view/edit' drop-down menu is seen. An 'active trading periods' tab can be reviewed. If adjustments need to be made, then an 'edit' function in the vanilla trading periods can be used to make changes. 'Active trading periods' tab can also be viewed in vanilla commodities, an example of which is seen in FIG. 45.

Referring to FIGS. 46-56, setting up for inter-market spreads application is described. To create a spread between two commodities, the 'inter-market spread commodities' function can be selected from 'search/view/edit' drop-down menu of FIG. 17, which displays the view/edit inter-market spread commodity seen in FIG. 46. 'Commodities & trading periods' can be selected. Individual legs for each of the commodities to be spread already exist; if the individual legs do not exist, then the individual legs are created in vanilla commodities first. If both commodities needed for the spread exist, then set-up can be started by clicking the 'new' button and filling in information on tabs.

Figure 47:
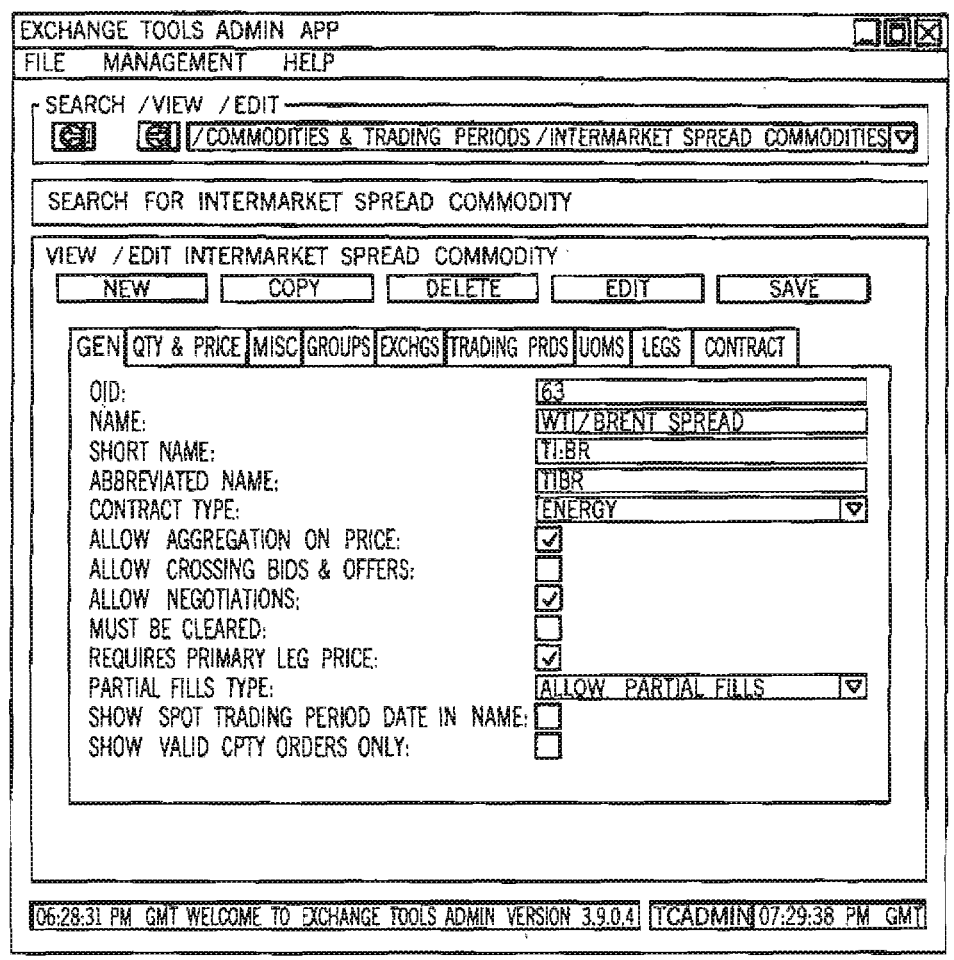

FIG. 47 shows an example of a 'general' tab. The 'general' tab can include as input: 'name'—a name to be displayed on trading screens; 'short name'—short version; 'abbreviated name'—two character code used for clear port clearing; 'allow aggregation on price'—when flagged permits volume from orders at the same price but from different traders to be combined in 'quantity' field on trading screens; 'allow crossing of bids and offers'—not applicable; 'allow negotiations'—when flagged permits negotiation capability from trading screen; 'must be cleared'—when flagged bilateral trades are not allowed, trades are sent to 'clearing'; 'requires primary leg price'—spread include outright price for one leg as well as the differential; 'partial fills type'—selected from 'required/allowed/not allowed'; 'show spot trading period date in name'; and 'show valid counterparty orders only'—when flagged trading screens only displays bids/offers from counterparties approved for trading with user.

Figure 48:
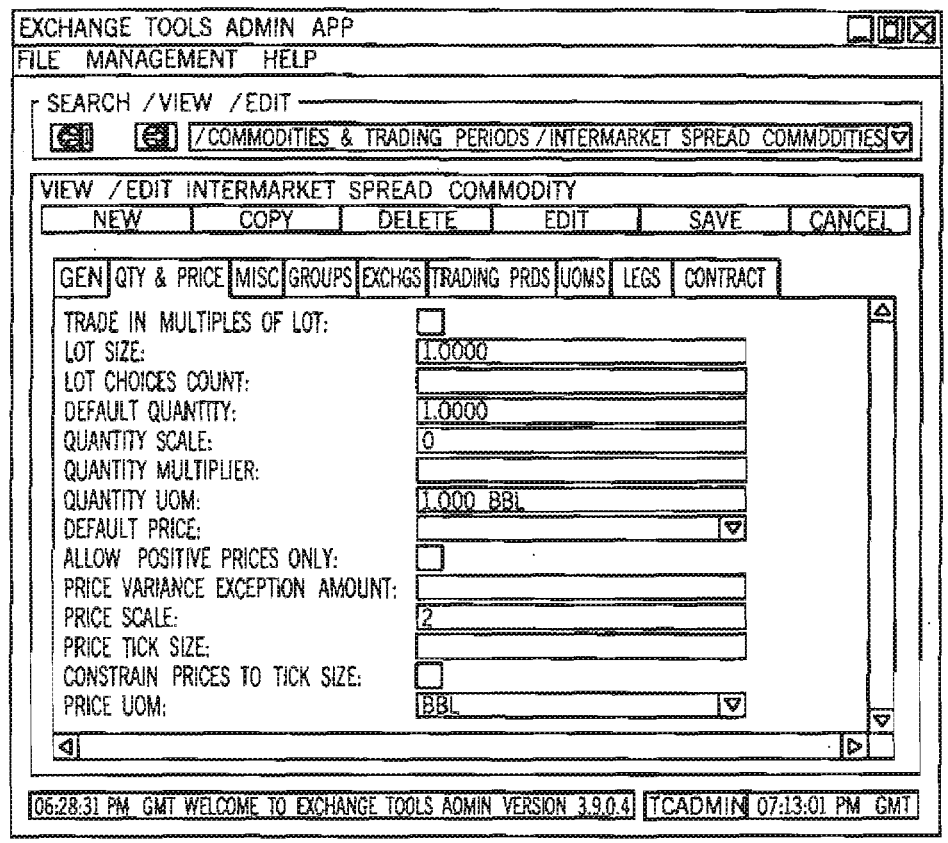

FIG. 48 shows an example of a 'quantity and price' tab. Tabs for the 'quantity and price' tab can include: 'trade in multiples of lot'—when flagged only allows quantities which are multiples of specified lot; 'lot size'—contract size traded; 'lot choices count'—the number of lot size multiples; 'default quantity'; 'quantity scale'—number of decimal places allowed in quantity; 'quantity multiplier'—used for weather contracts; 'quantity UOM'—selected unit of measure for commodity from pull-down menu; 'default price'; 'allow positive prices only'—when flagged will not accept negative spread prices; 'price variance exception amount'—a bid/offer away from the current market by the variance amount can be flagged with a notice; 'price scale'—the number of decimal places allowed in commodity price; 'price tick size'—minimum price tick; 'constrain prices to tick size'—when flagged will not allow prices not conforming to tick size; and 'price UOM'—unit of measure for commodity price.

Figure 49:
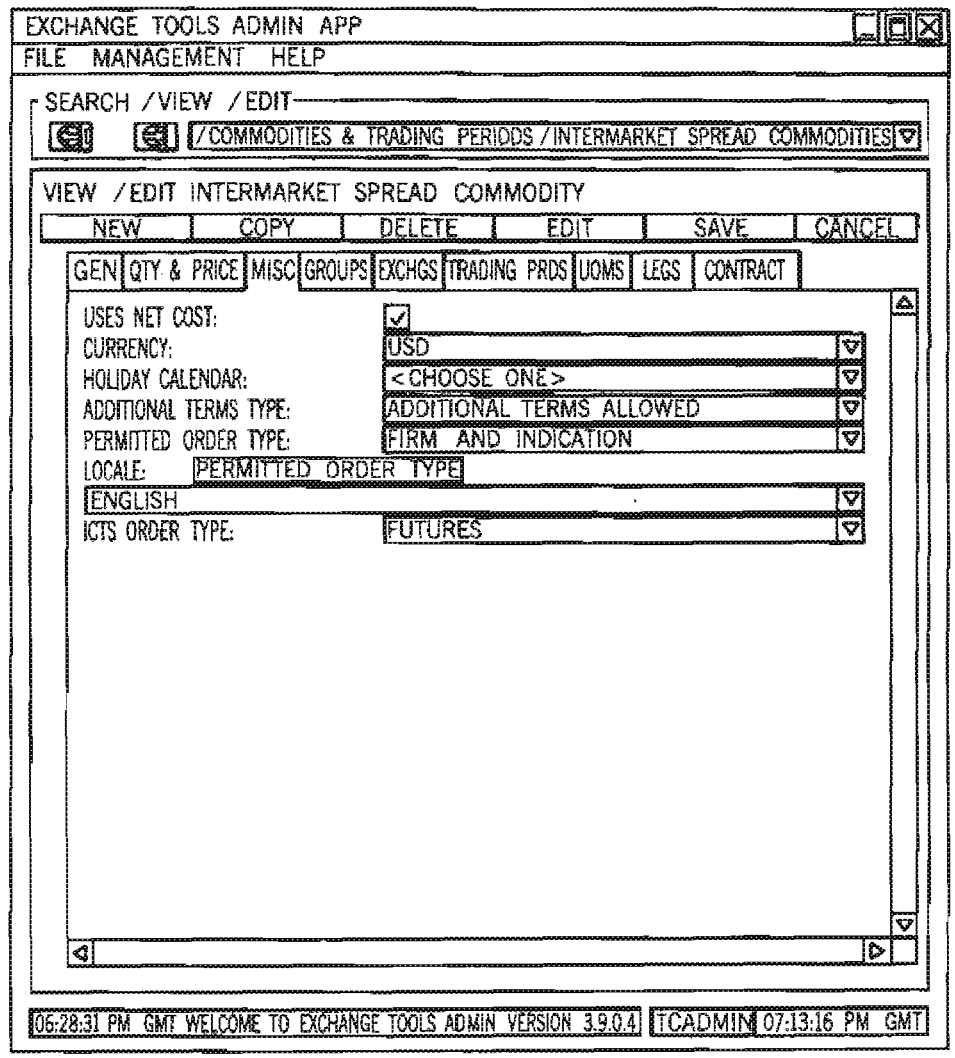
Figure 50:
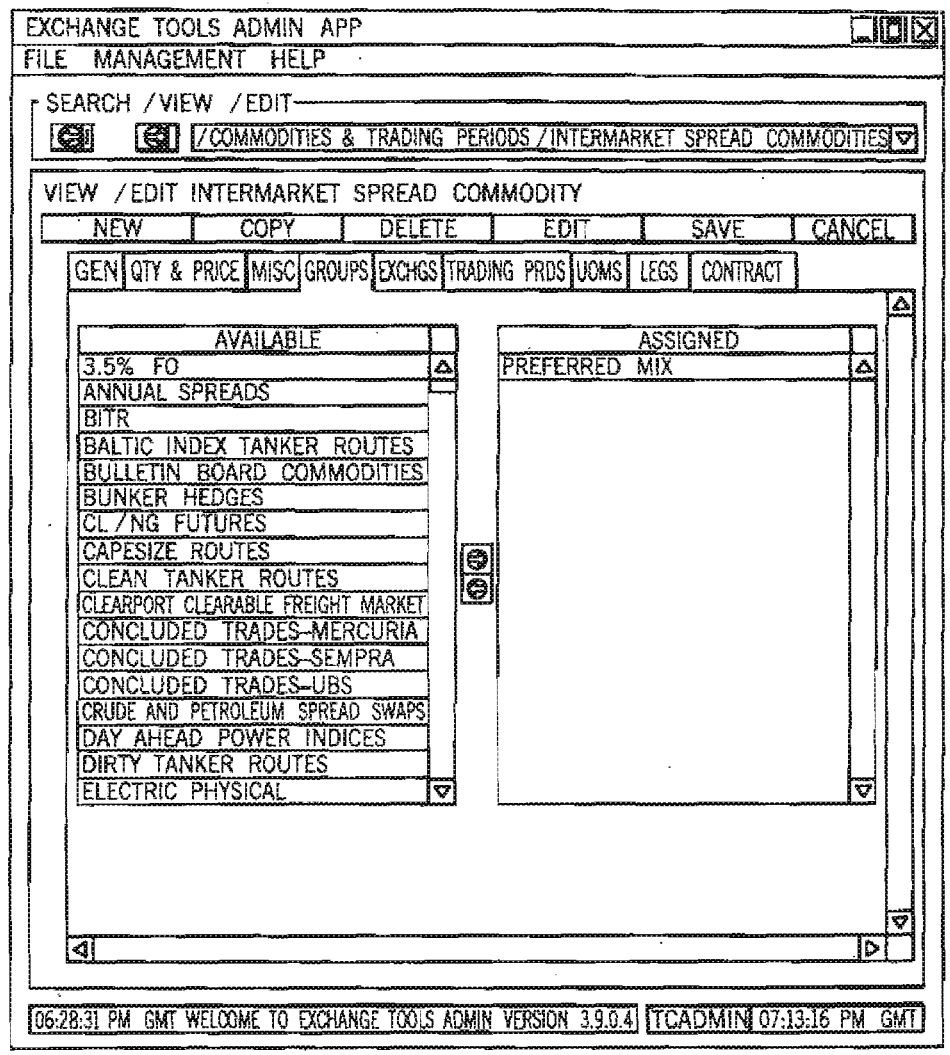
Figure 51:
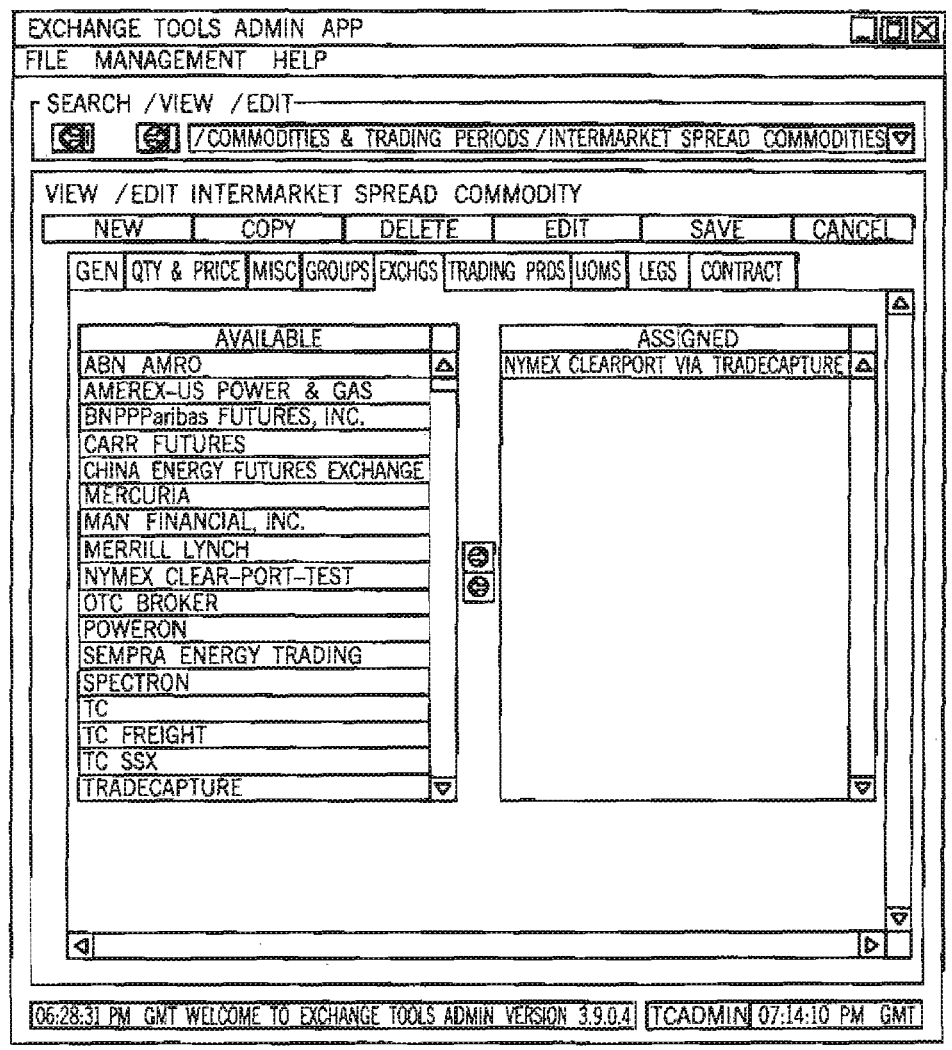
Figure 52:
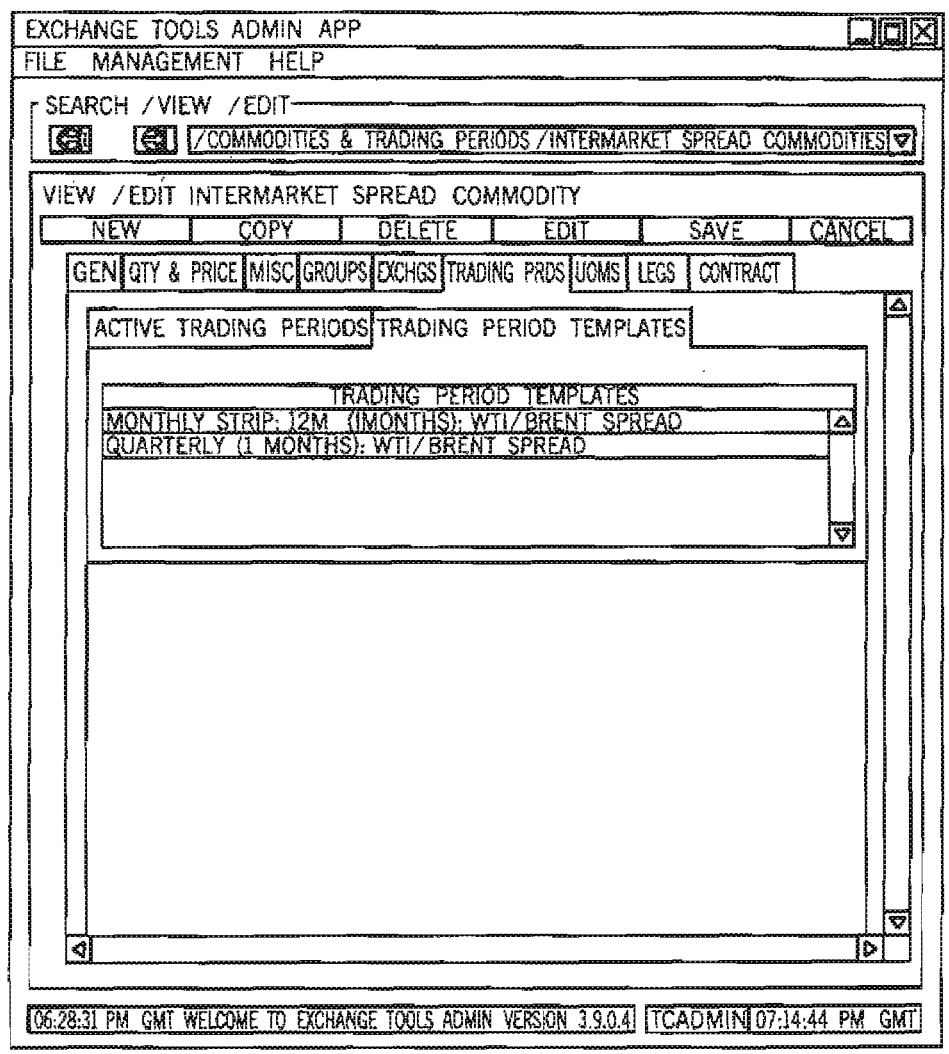
Figure 53:
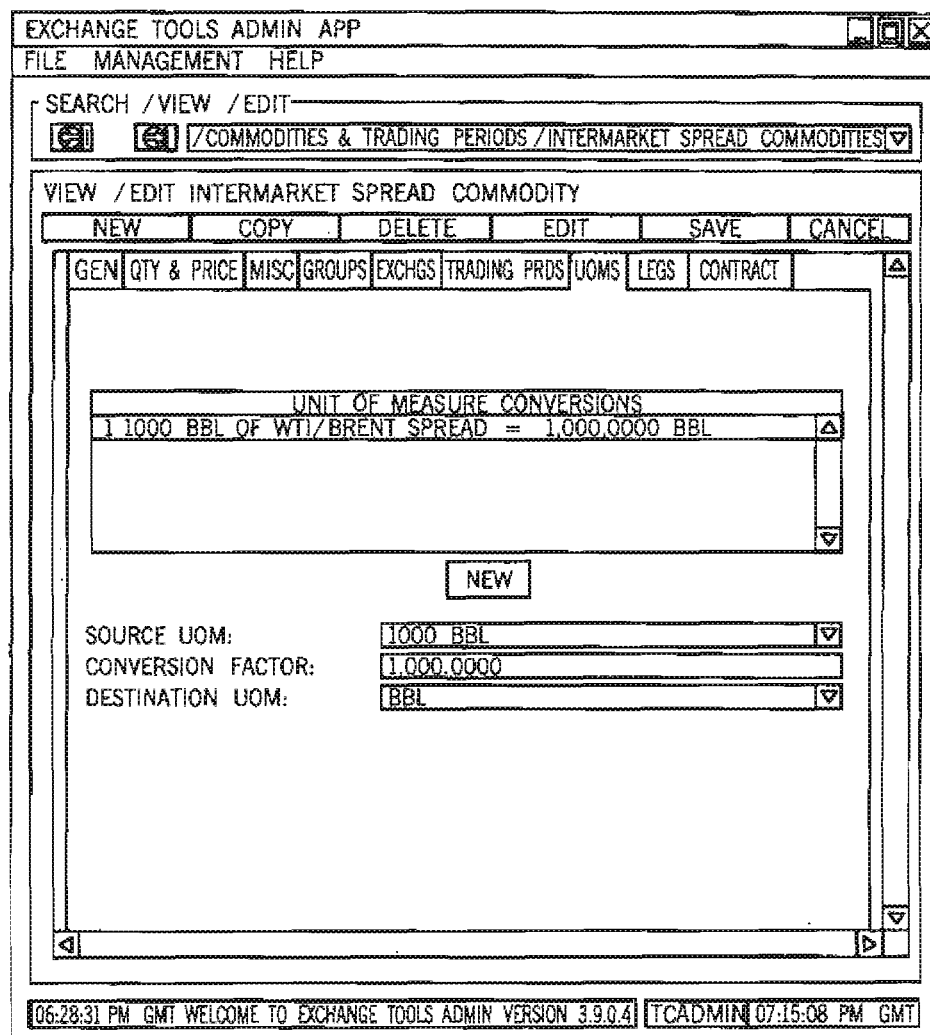

FIGS. 49-53 show additional tabs. FIG. 49 shows an example of a 'miscellaneous' tab; FIG. 50 shows an example of the 'groups' tab where spreads can be assigned to groups; FIG. 51 shows an example of the 'exchanges' tab where spreads can be assigned to exchanges; FIG. 52 shows an example of the 'trading periods' tab where active trading periods and defined templates can be displayed; FIG. 53 shows an example of the 'unit of measure' tab where conversion rates can be set-up for spread unit of measure.

Figure 54:
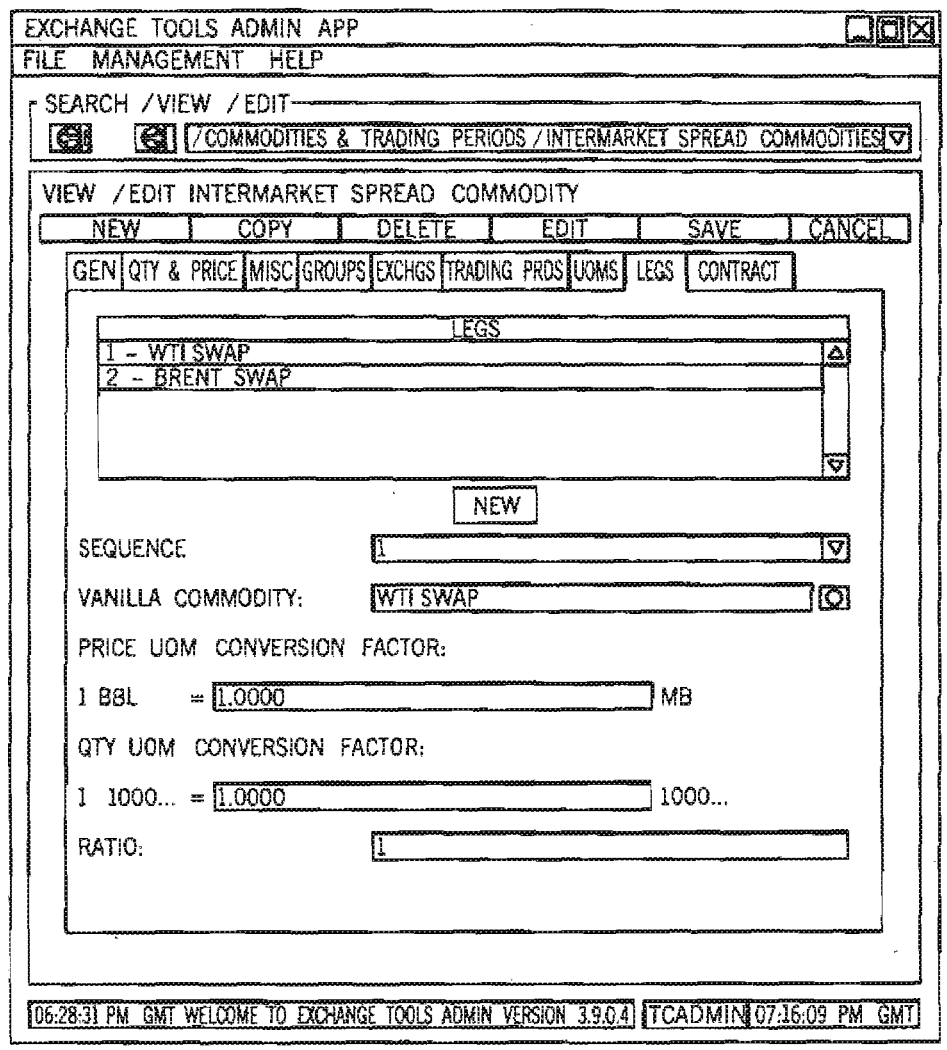
Figure 55:
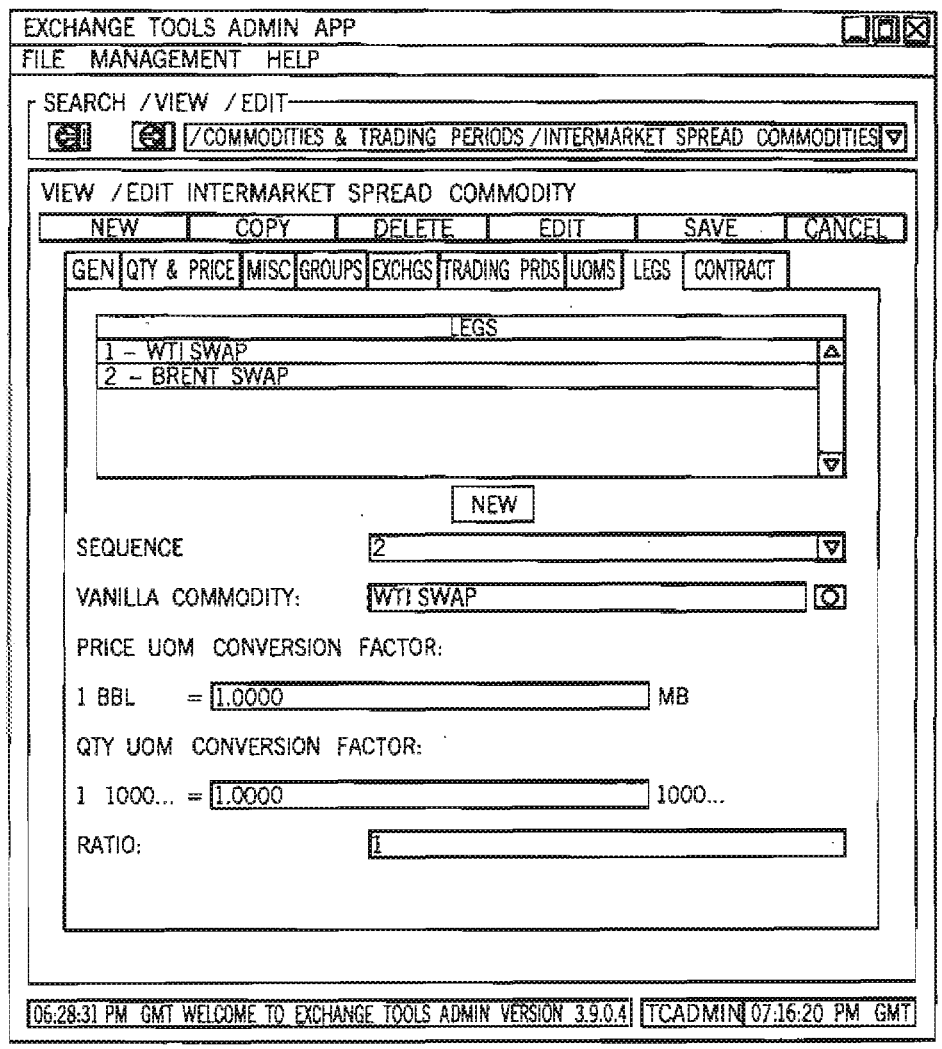
Figure 56:
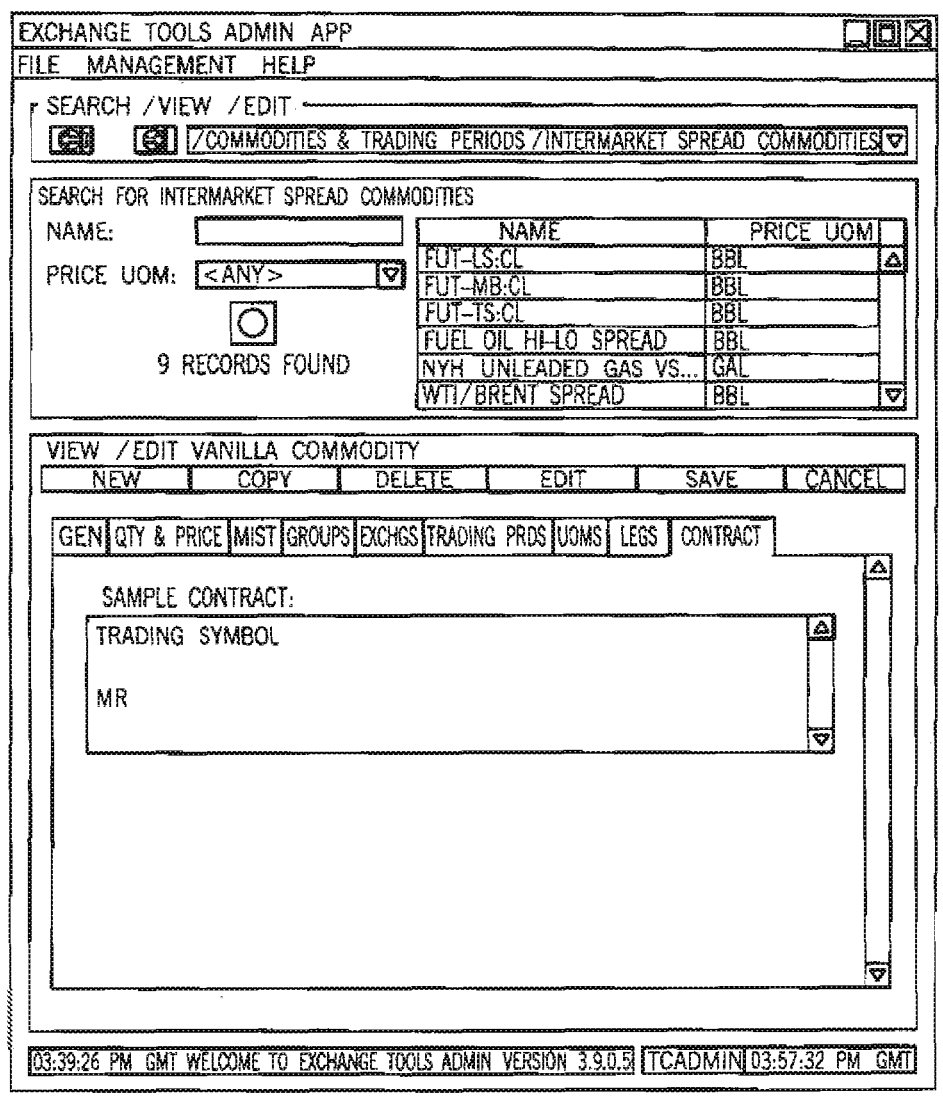

Referring to FIGS. 54 and 55, the 'contract legs' tab is described: FIG. 54 is a first leg while FIG. 55 is a second leg. The order of commodity legs in the spread is defined and conversion rates can be assigned to each leg of the spread. FIG. 56 shows an example of a 'contract' tab. Contract terms can be entered in the 'contract' tab. 'Save' can be clicked to save the new spread commodity.

Referring to FIGS. 57-160, the user interaction is described. The user interaction can include multiple applications, which can include: user preferences set-up application; placing an order application; placing a linked order chain application; edit, cancel, hold, and reinstate a linked order chain application; placing an OCO order chain application; trading an order without single click trading selected application; partial fills application; the 'trade notification' panel with 'repeat order' function application; trading a linked order application; place an option order application; edit, hold, cancel and reinstate an option order application; trade an option order application; active order and my orders application; trade an option order application; active order and my orders; market profile builder application; ICTS trade search application; ICTS position grid application; headlines application; shopping cart application; and credit administration application.

Referring to FIG. 57, an example of the 'file' drop-down menu from the 'menu' bar is seen. The 'file' drop-down menu is available from the user interaction screens. The 'file' menu can include: 'market details'; 'market summaries'; 'markets grid'; 'market profile builder'; 'spread matrix'; 'my orders'; 'active order's; 'place multiple/opt orders'; 'place batch orders'; 'price indices'; 'ICTS position grid'; 'shopping cart'; 'ICTS trade search'; 'headlines'; preferences'; 'confirmation language'; and 'quit'.

Figure 58:
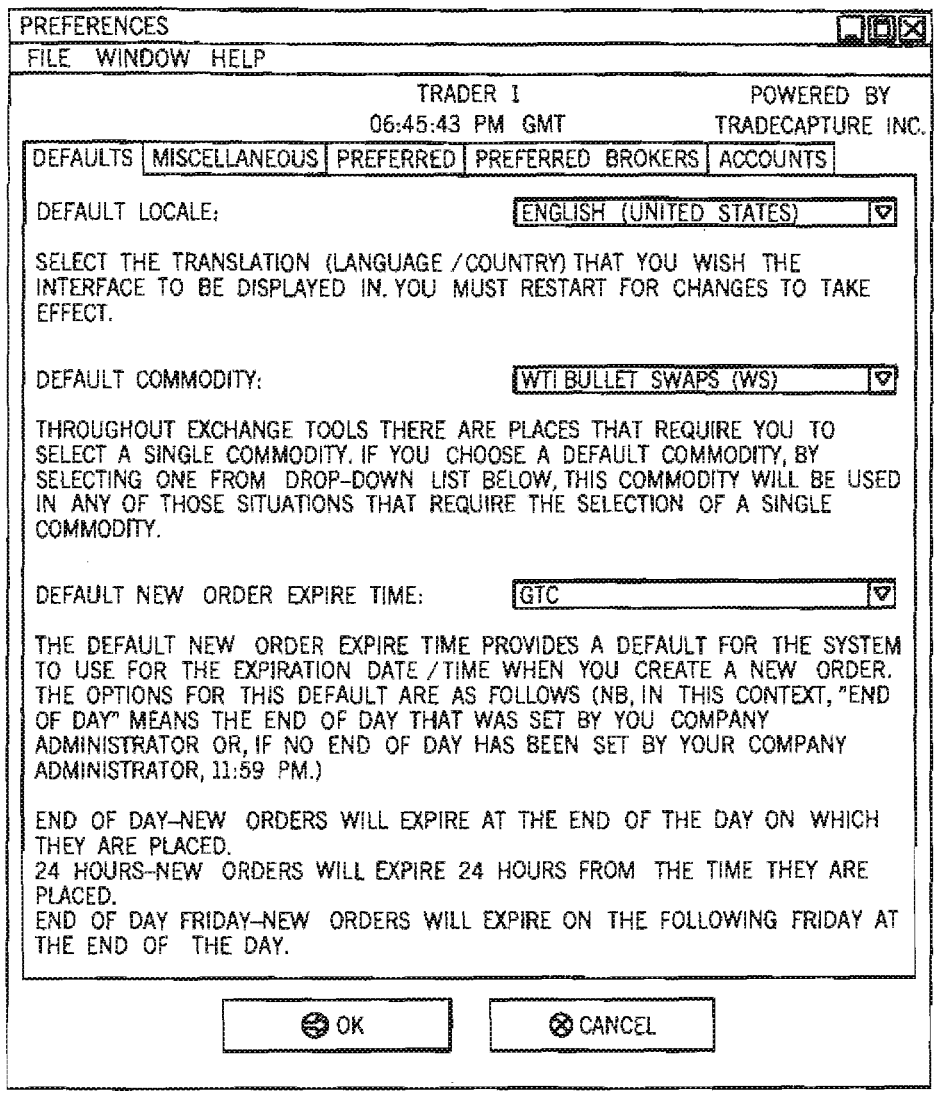

Upon first logging in, a new user should go to the 'file' menu and select the 'preference' panel to set their preferences. Referring to FIGS. 58-66, the user preferences set-up application is described. An example of the 'preference' panel is seen in FIG. 58. The 'preference' panel can include as pull-down menus: 'default locales', 'default commodities', and 'default new order expire times'. Users can change their preference settings. Selections or changes take effect in real time. The 'default' tab gives user the ability to select a 'default locale', 'default commodity', and 'default new order expiry time'. The 'preferences' panel can include a 'miscellaneous' tab, a 'preferred' tab, a 'preferred brokers' tab, and an 'accounts' tab.

Figure 59:
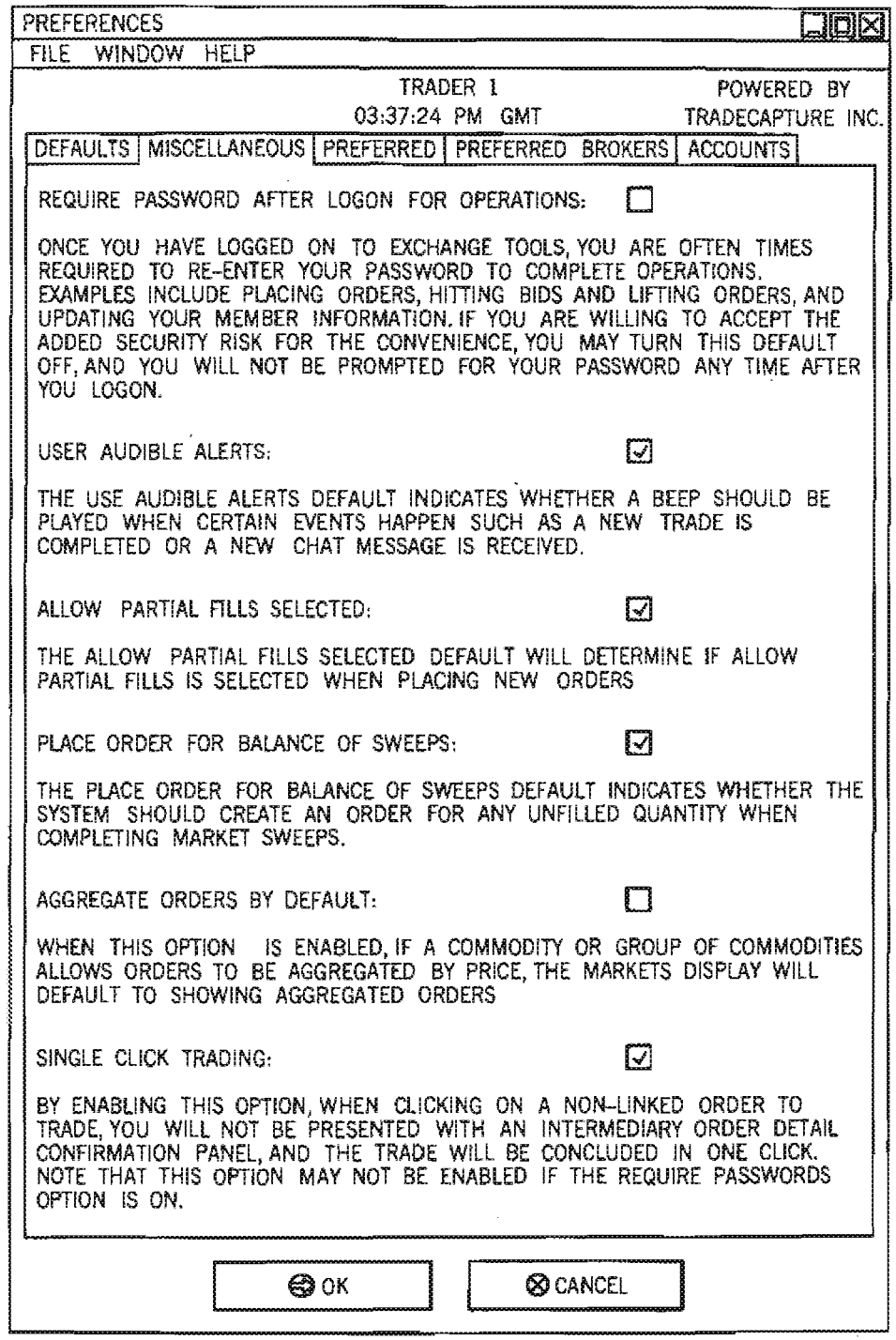

An example of the 'miscellaneous' tab of the 'preferences' panel is seen in FIG. 59. The 'miscellaneous' tab gives users a checkbox for choosing their setting in several areas, which can include: 'require password after logon for operation'; 'use audible alerts'; 'allow partial fills selected'; 'place order for balance of sweeps'; 'aggregate orders by default'; and 'single click trading'. When 'require password after logon for operation' is checked, the user is required to re-enter their password before they can perform significant functions on the exchange. When 'use audible alerts' option is checked and the user has speakers attached to his or her computer, the user hears a "ping" when trades are concluded on the exchange and when the user receives messages from other exchange users. When 'allow partial fills selected' is checked orders placed by the user automatically allows partial fills; the user has the option of changing the partial fill requirement with each order when it is entered (a user's preference with respect to partial fills will not override the commodity setup. In other words, if a commodity requires partial fills, then a user can not enter an "all or none" order or an order requiring a minimum fill quantity). When 'place order for balance of sweeps' is checked, this setting permits a user to automatically place an order for the unfilled portion of a 'market sweep order'; users have the ability to change the status if each market sweep order at the time the order is placed. When 'aggregate orders by default' is flagged commodities which are enabled to be aggregated default to aggregated prices on trading screens. When 'single click trading' is flagged, 'trade confirmation' panel will not be displayed prior to concluding transaction. Many of these settings give users the ability to reduce the number of keystrokes required to perform certain trading functions on the system; however, the system does provide users with the ability to make changes to specific orders when those orders are entered into the system.

Figure 60:
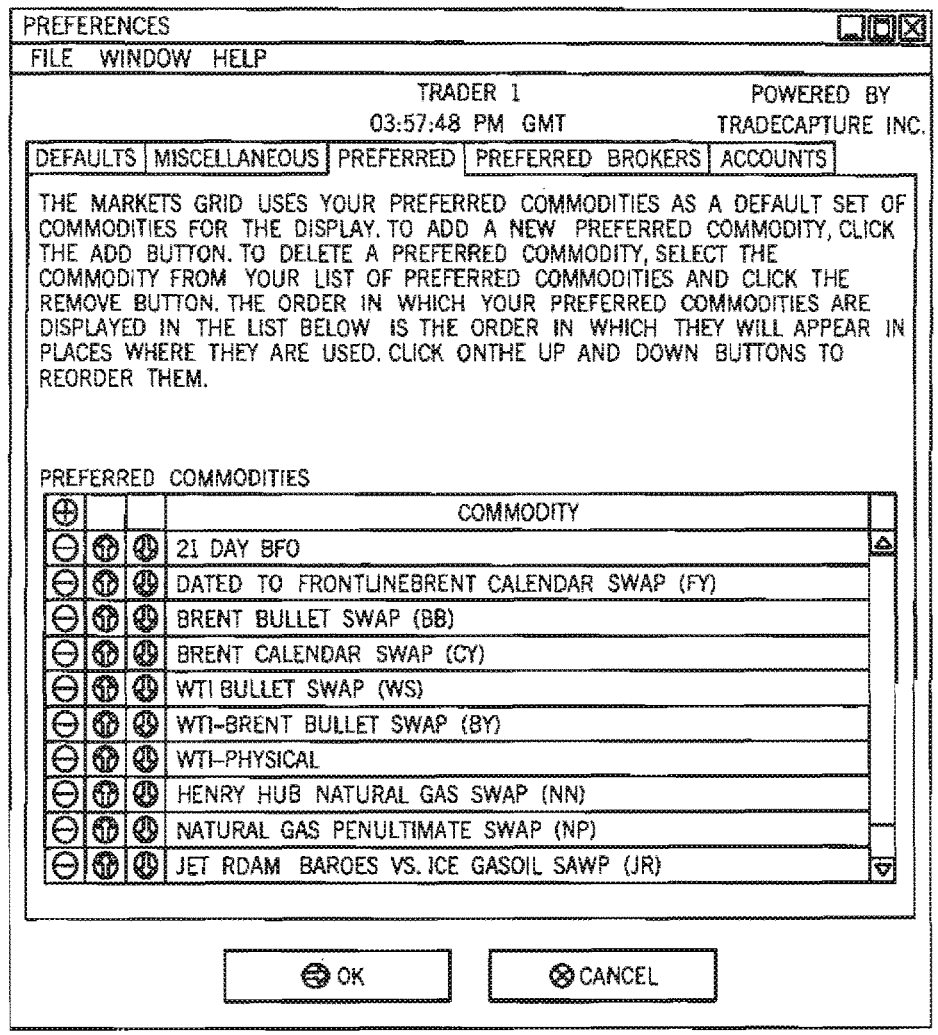
Figure 61:
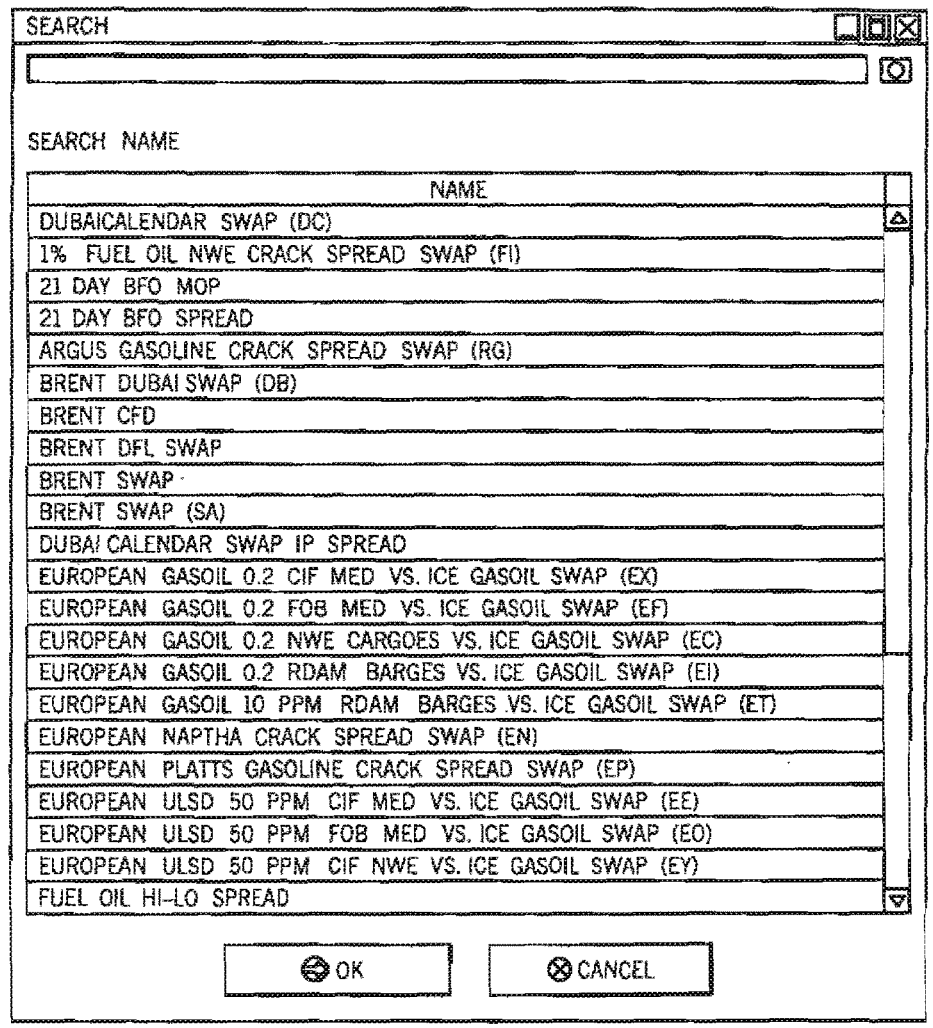

An example of the 'preferred' tab of the 'preferences' panel is seen in FIG. 60. The 'preferred' tab allows users to select and sort their preferred commodities. The preferred commodities can be displayed as the default commodities viewed in the markets grid and markets summaries screens, as well as listed at the top of the commodity list throughout the trading platform. To select preferred commodities, the '+' icon can be clicked and a panel opens with a list of commodities available on the user's exchange, an example of which is seen in FIG. 61. The commodities to add can be highlighted, and the 'OK' button clicked. To highlight multiple commodities, a commodity can be clicked, and the shift key can be held down to highlight a string of consecutively listed commodities or the control key hold down can be used to highlight commodities that are not listed consecutively. To remove a commodity from the preferred list, that commodity can be highlighted and the 'remove' button clicked. To resort the list of preferred commodities, a commodity can be highlighted and either the 'up' or 'down' arrow clicked.

Figure 62:
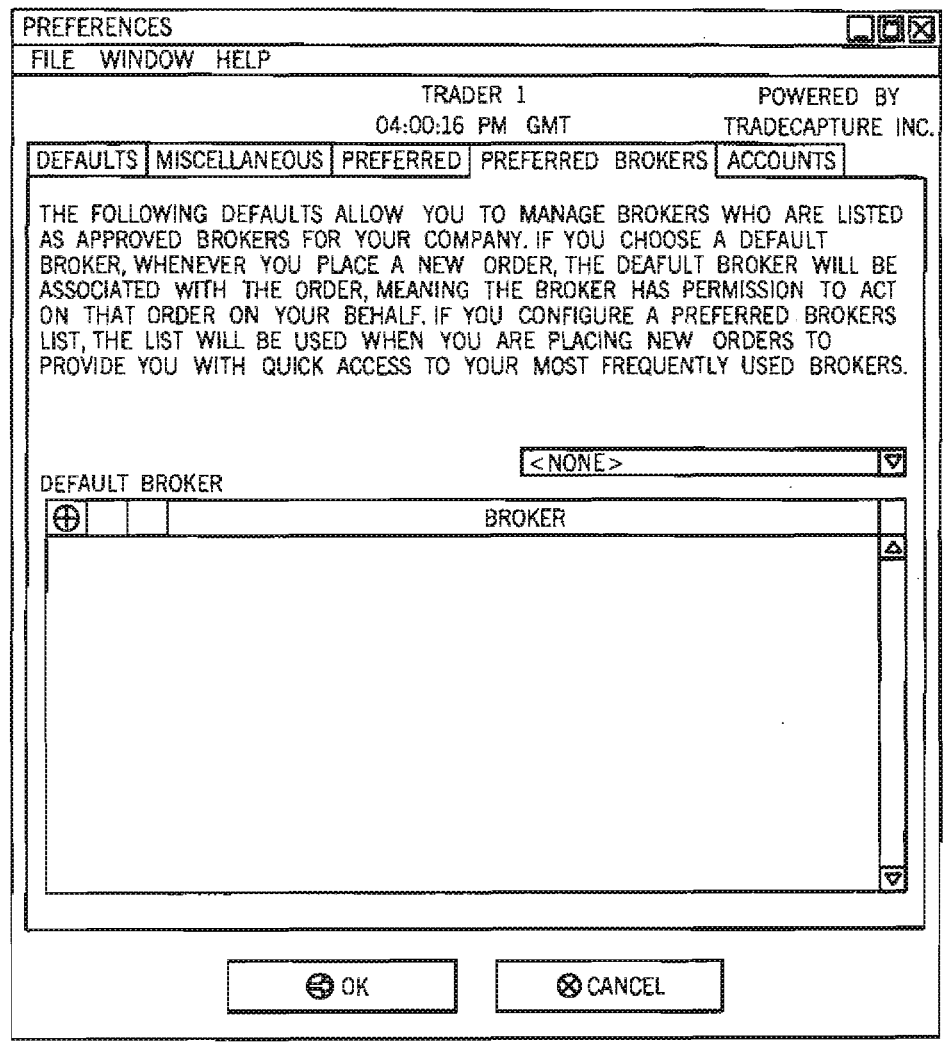

If there are brokers on the user's exchange, a user can give one or more brokers permission to act on their behalf. Users can create a list of preferred brokers, as well as a select a default broker, by clicking on the 'preferred brokers' tab, an example of which is seen in FIG. 62. If the 'add' button is clicked, then a panel opens that displays a list of brokers that have been given permission to act on the user's behalf, an example of which is seen in FIG. 63. Users can highlight one or more brokers and click the 'OK' button to add the broker(s) to their preferred broker list. A user can delete a broker from their preferred broker list by highlighting the broker and clicking on the 'remove' button.

A user can sort their preferred broker list by highlighting a broker and clicking on the 'up' or 'down' arrow. There is a 'preferred brokers' drop-down menu available on the 'place order' panels throughout the exchange, an example of which is seen in FIG. 64. Optionally, users can select a broker from this list when the order is placed. Users can also select a default broker by clicking on the 'down' arrow located at the right side of the 'default broker' drop-down menu. If a default broker is selected, then orders placed by the user can be automatically assigned to the default broker; however, users have the ability to de-select the default broker at the time the order is placed and assign it to another broker, or the user can choose not to assign the order to a broker.

Figure 65:
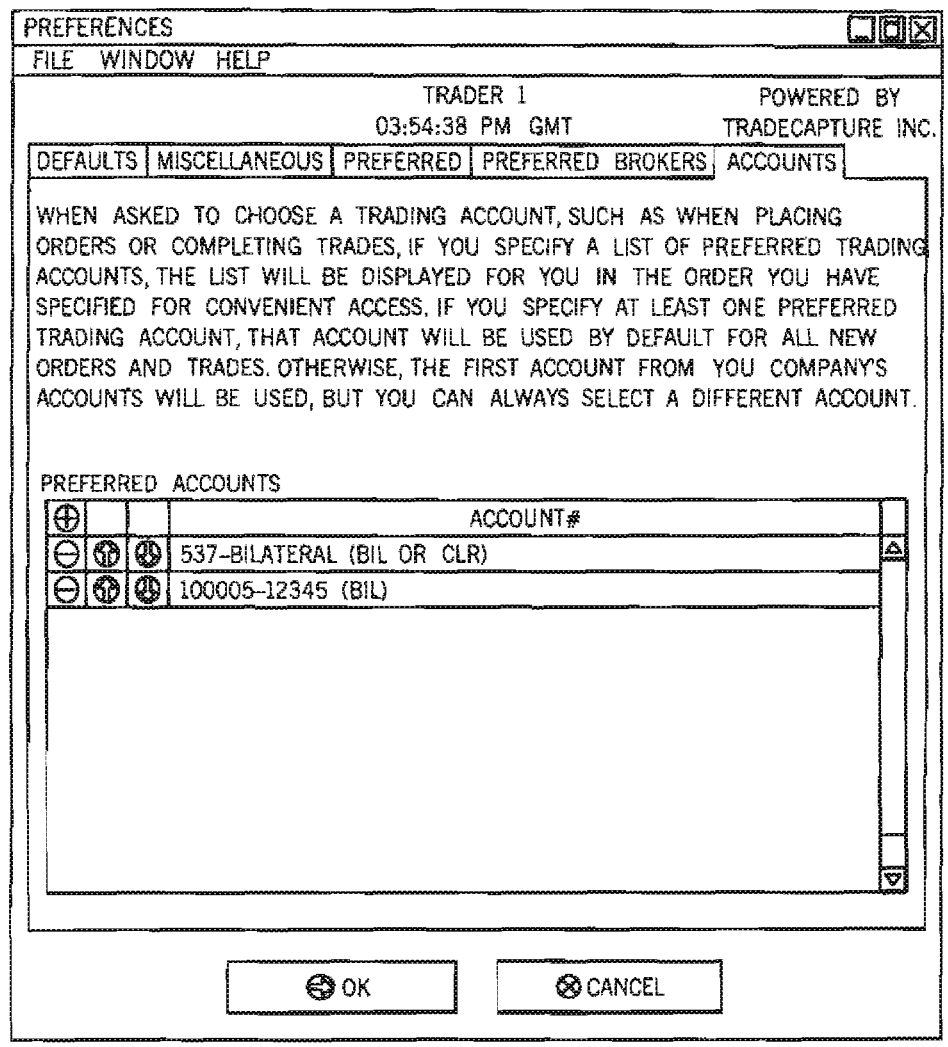
Figure 66:
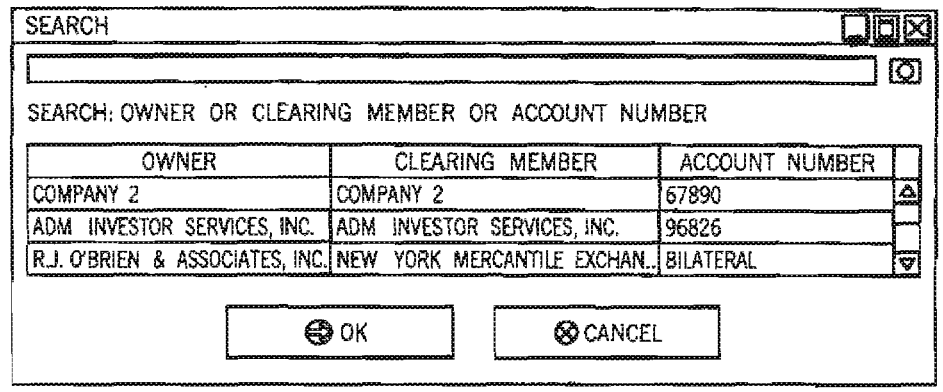

An example of the 'accounts' tab of the 'preferences' panel is seen in FIG. 65. When a user and the user's company are set up on the exchange, one or more trading accounts can be assigned to the user. The system supports cleared and bilateral trades. If a user clicks on the 'add' button, then a panel opens that displays the trading accounts available to the user, an example of which is seen in FIG. 66. Users can highlight one or more accounts and click the 'OK' button. The selected accounts appear in the user's preferred account list. A user can remove an account by highlighting that account on the preferred account list and clicking the 'remove' button. A user can resort their preferred account list by highlighting an account and clicking the 'up' or 'down' arrow. The user's preferred account list appears in panels that allow a user to place or trade an order. To save changes, a user clicks on the 'OK' button of the 'user preference' panel. The 'cancel' button cancels changes.

Figure 67:
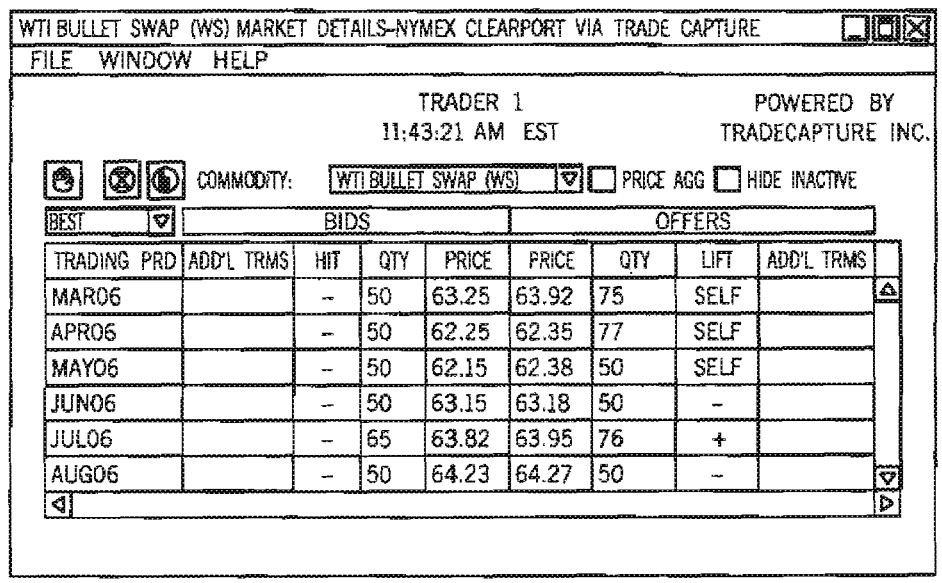
FIGS. 67-69 show the market details screen of the present invention.

Referring to FIGS. 67-160, the trading screens are described. The trading screens can include: market details, markets grid, markets summaries, and spread matrix. The trading screens include a number of icons. A 'hand' icon puts the open orders on that screen on hold with one click. The 'compress' icon switches the screen view from both top and bottom to bottom only. The 'bar graph' icon adds or removes market depth information in graphical format. Trading can be initiated directly through the graphical view by double-clicking a bar. A pull-down menu is provided to change the view of the market depth from best bid/best offer to for example top three, five or ten. A 'scroll' arrow can be used to scroll through various views.

The steps required to place, trade, edit, hold, reinstate, and cancel orders can be the same for each trading screen. A user can have one or more of the trading screens, as well as multiple versions of the same trading screen, open simultaneously. Each trading screen has a selection for bids and offers. Each section has as columns 'hit' (for bids), 'lift' (for offers), 'quantity', and 'price'.

Figure 68:
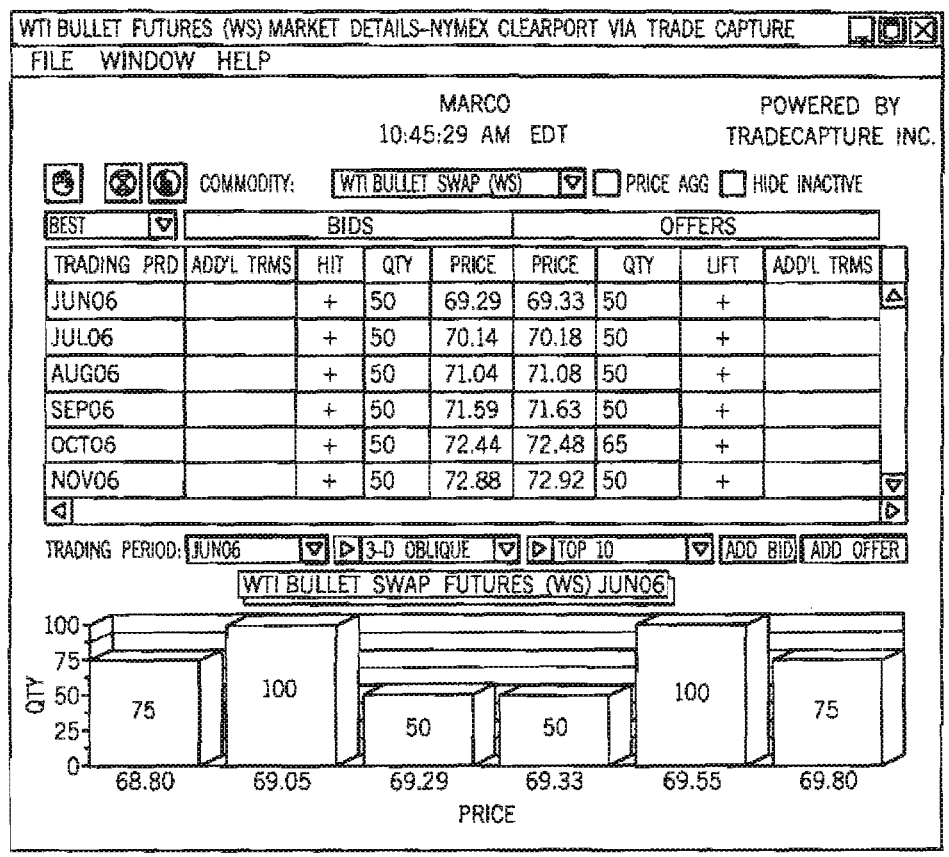
Figure 69:
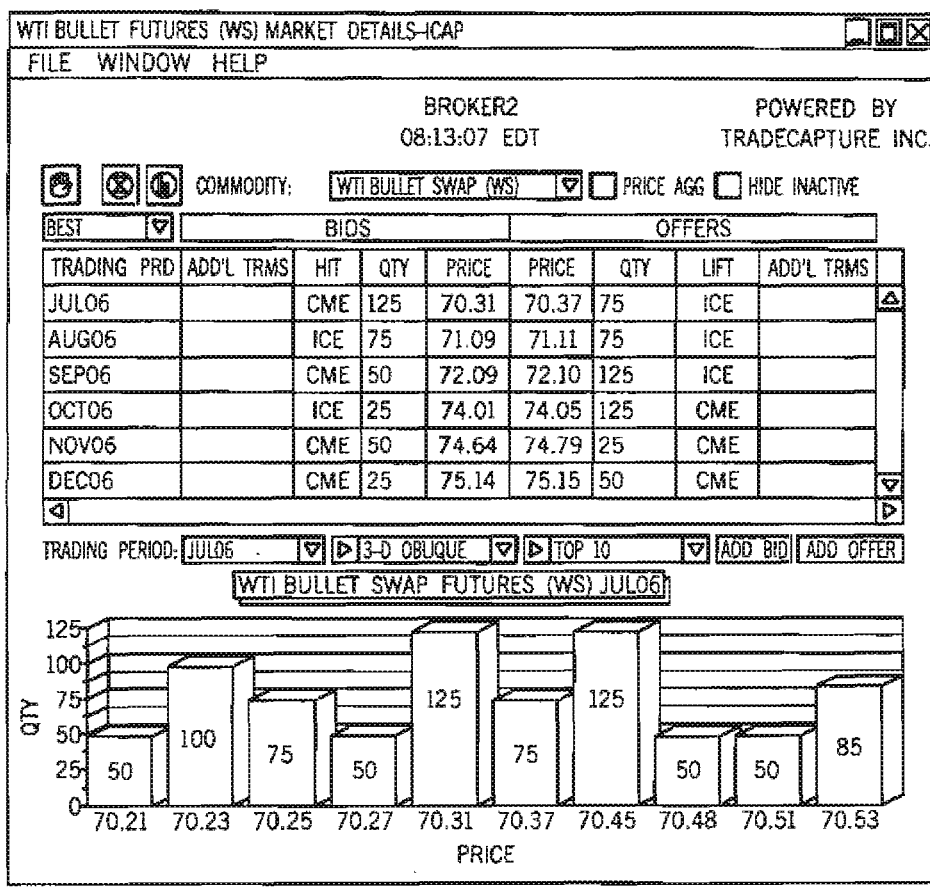
Figure 72:
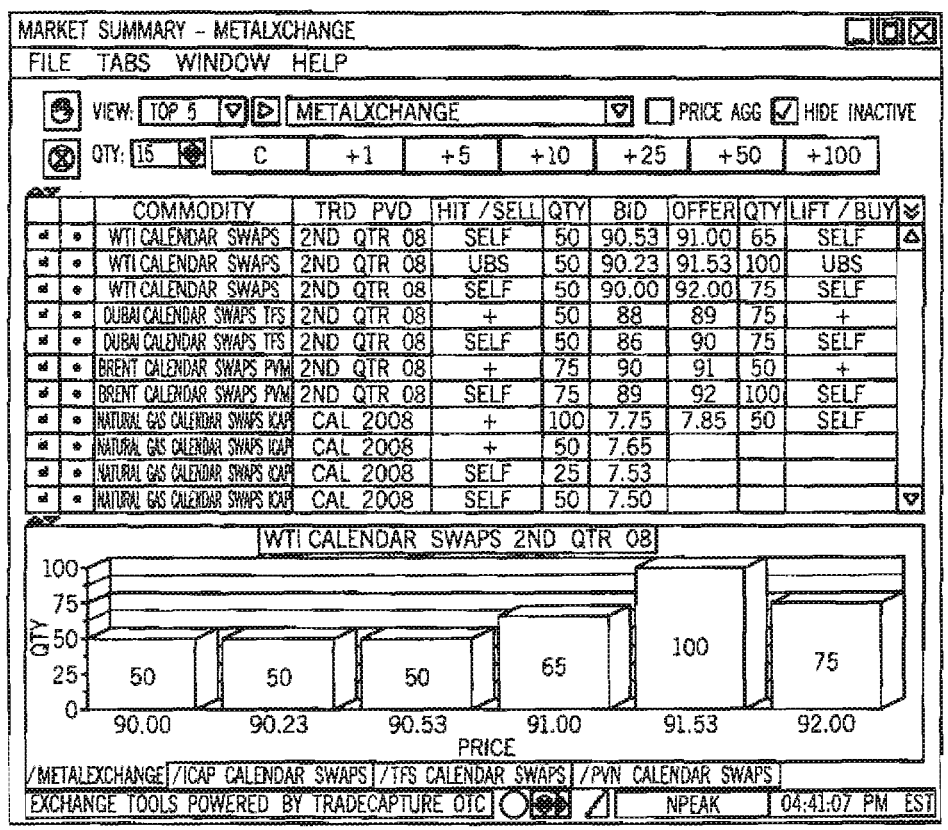
FIG. 72-75 shows examples of the market summary screen of the present invention.

In FIGS. 67-69, examples of the market details screen are seen. FIG. 67 shows an example market detail display for a WT (1) Bullet Swap (WS). The market details screen shows market information for one commodity at a time. The market details screen is a preformatted screen with pull-down menus for selecting commodities or commodity groups. More than one market details screen can be opened at once for each different commodity. The commodities available can be viewed and selected by opening a drop-down menu. A broker can see trader's information such as company name in the 'hit/lift' columns, and trader's information such as trader name, phone number, and order details while mousing over an order. The user can toggle between full market depth or the best bids and offers.

The market details example shown in FIG. 68 shows an example of three best bids/offers and a graph view for additional market depth. For a trader's perspective, the 'hit' and 'lift' columns show a '+' icon if a trade can be made with the counterparty or 'self' if it is the trader's own order. In addition, users are able to click on the graph bars and trade from the graph bars.

The market details example shown in FIG. 69 shows the details for the commodity WTI Bullet Swap Futures. In this example of FIG. 69, the commodity WTI Bullet Swap Futures is traded on the Chicago Mercantile Exchange (CME), 20 South Wacker Drive, Chicago, Ill. 60606 and the Inter Continental Exchange (ICE), 2100 RiverEdge Parkway, Suite 500, Atlanta, Ga. 30328. While in this example, the market details designates from which exchange the quote is obtained, in other embodiments the quotes from different exchanges can be listed but not identified as from a particular exchange. Thus, the market details screen permits member traders and brokers of various groups to post and view bids and offers and negotiate and consummate transactions on commodities from one or more exchanges in an integrated presentation that pools order liquidity from the various exchanges. While the CME and ICE are example exchanges, different exchanges can be used; indeed, the different exchanges can include other existing "public" exchanges as well as private "proprietary" exchanges.

In FIGS. 70 and 71, examples of the market grid screen are seen. The markets grid screen allows a user to view multiple markets with commodities listed for example horizontally and trading periods for example vertically. The market grid screen is a preformatted screen with pull-down menus for selecting commodities or commodity groups. An 'arrow' icon can be clicked to automatically increase/decrease the number of displayed markets from the group. A 'scroll' bar can be utilized to access commodities in a group. The commodities groups that can be viewed can be predefined and can be selected using a pull-down menu in the 'view' field. Additional commodity groups can be added.

In the example of the markets grid screen of FIG. 71, Panhandle Eastern, Chicago City Gate, and Northwest Rockies are separate commodities. Panhandle Eastern and Chicago City Gate come from different exchanges; Northwest Rockies is listed on both exchanges. Thus, the present invention permits member traders and brokers of various groups to post and view bids and offers and negotiate and consummate transactions on commodities from one or more exchanges in an integrated presentation that pools order liquidity from the various exchanges.

Figure 73:
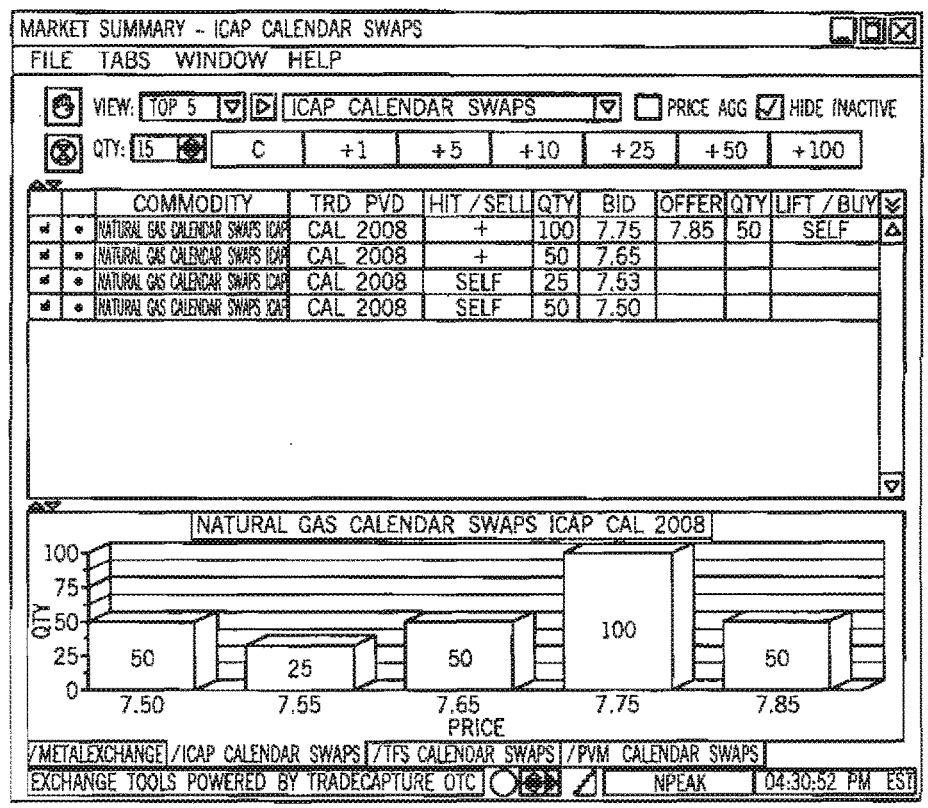
Figure 74:
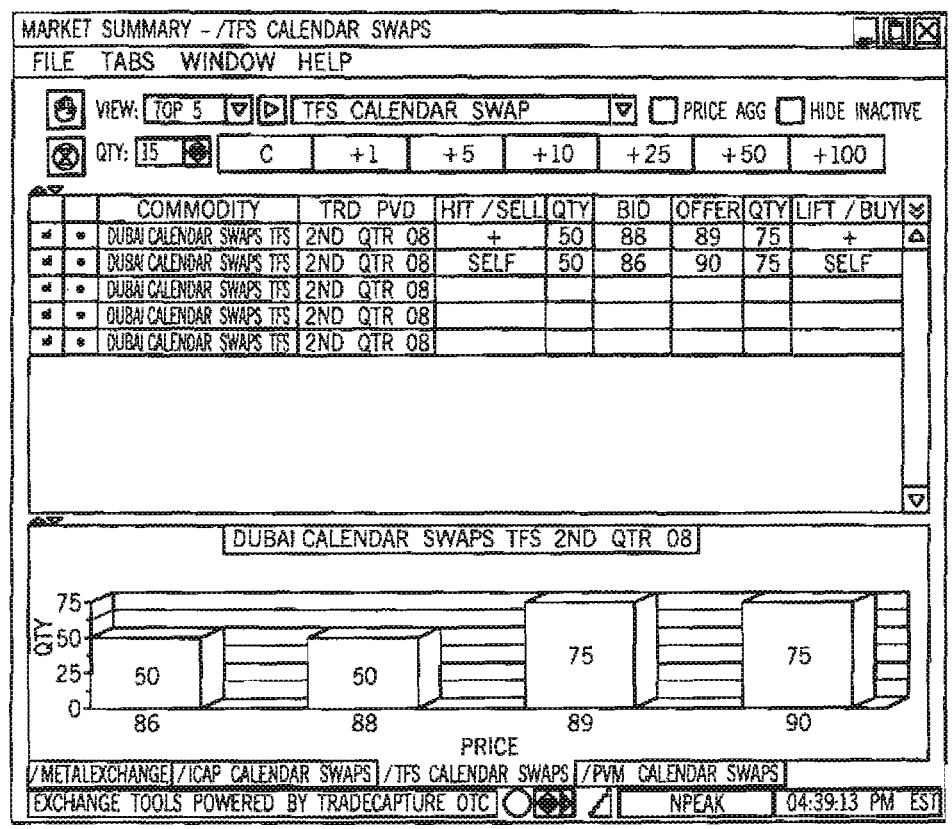
Figure 75:
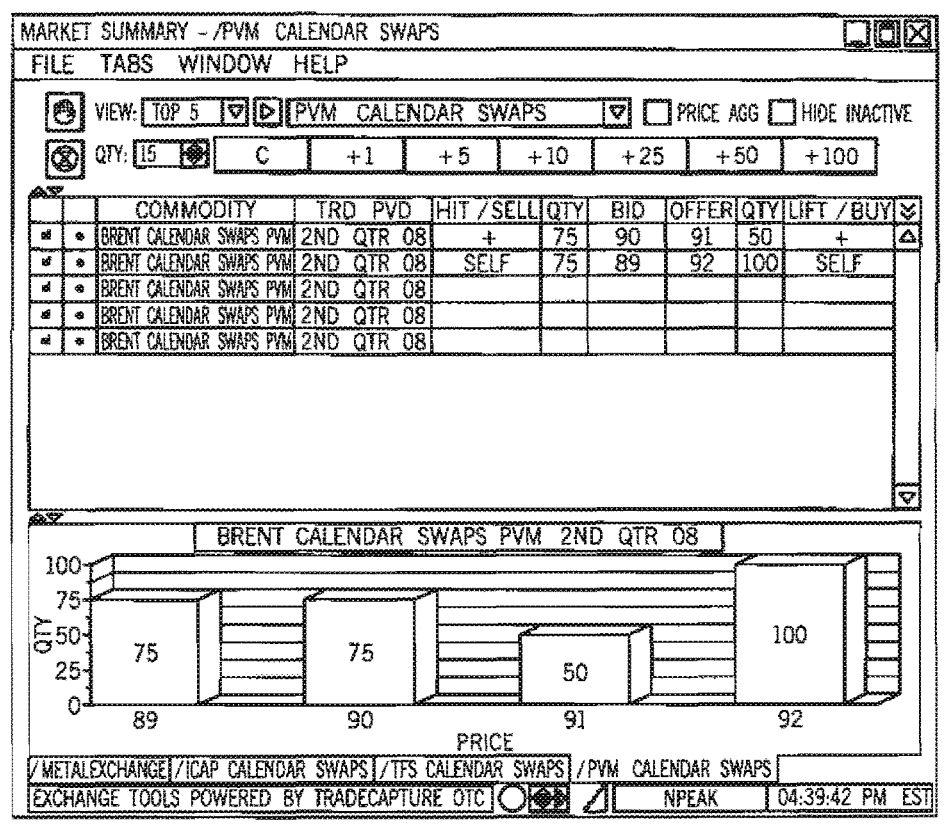

Examples of the market summaries screen are seen in FIGS. 72-75 with examples from both a trader's point of view and three different separate broker exchanges' points of view. The market summaries screen lists commodities and trading periods for example vertically based on the order the commodities are listed in the group being viewed. The market summaries screen is a preformatted screen with pull-down menus for selecting commodities or commodity groups. FIG. 73 shows a market summary screen from a trader's viewpoint displaying all three different broker exchanges in one window. FIGS. 74 and 75 show the trader's view of the three-broker exchange.

Figure 76:
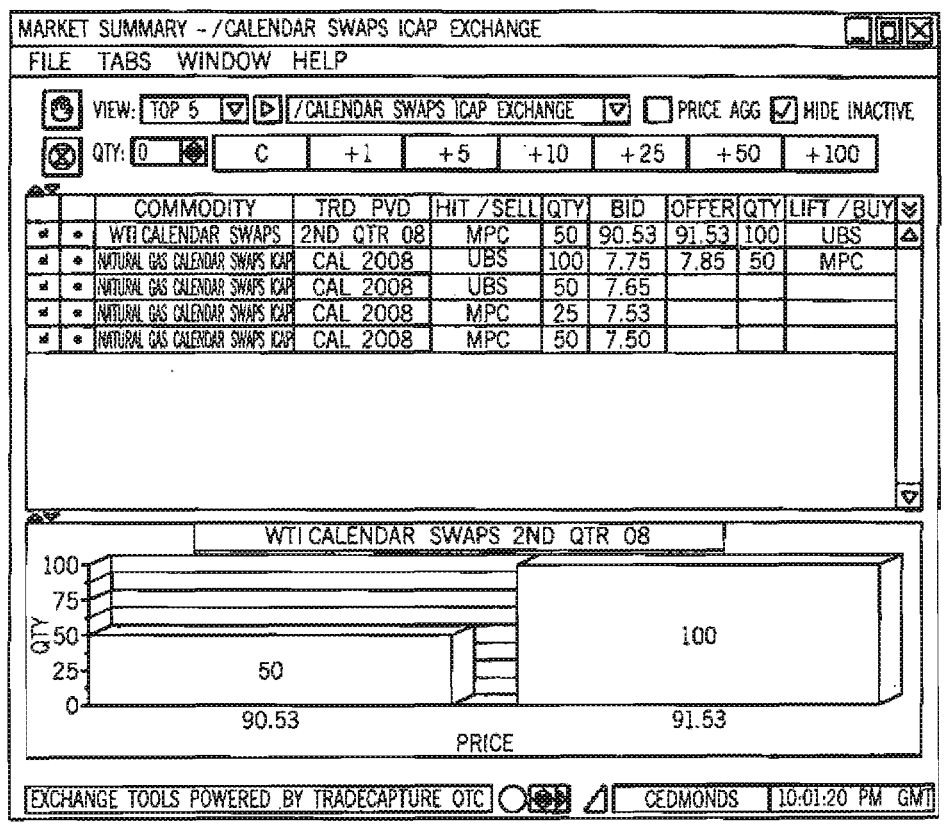
FIGS. 76-78 show each broker exchange in its own tab window.
Figure 77:
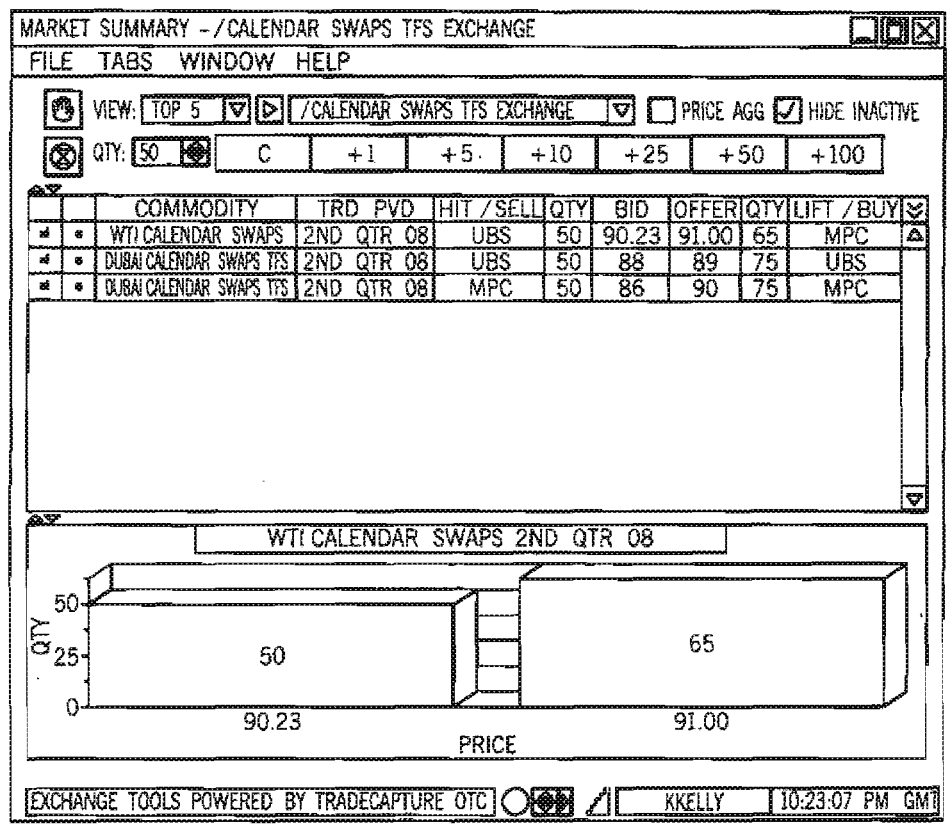
Figure 78:
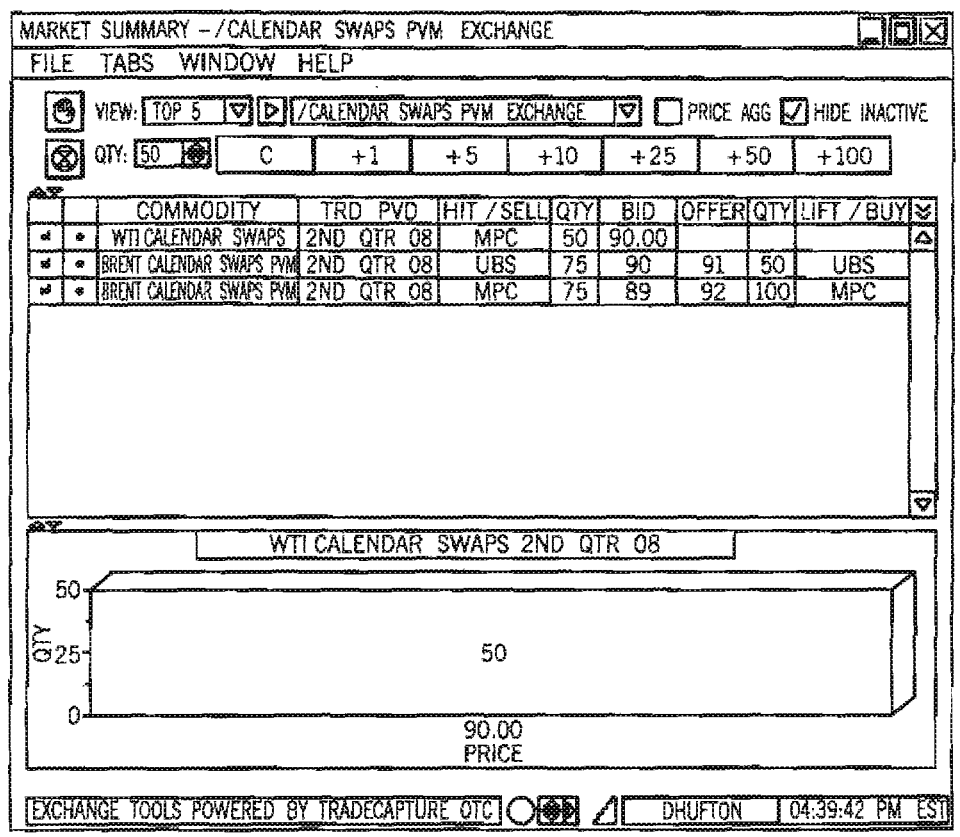

FIGS. 76-78 show each broker exchange in its own tab window. FIG. 76 shows a first broker exchange seeing only ICAP broker exchange commodities; FIG. 77 shows a second broker exchange seeing only TFS broker exchange commodities; and FIG. 78 shows a third broker exchange seeing only PVM broker exchange commodities. The trader can see all commodities from all three brokers whereas the brokers also can see the commodities listed on their own exchange. Since WTI Calendar Swaps are listed as a commodity on all three broker exchanges, the trader sees that commodity with the combined liquidity from all three brokers in one window. The trader is also able to see each brokers exchange in separate tabs as per the screen snapshots.

Figure 79:
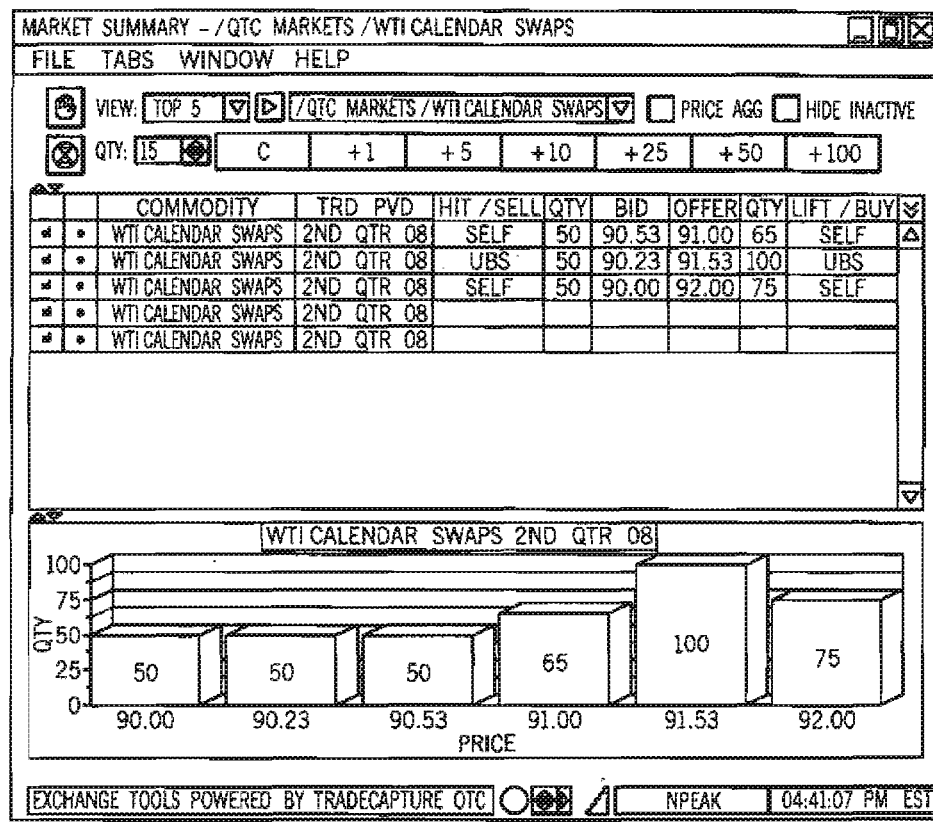
Figures 80, 81:
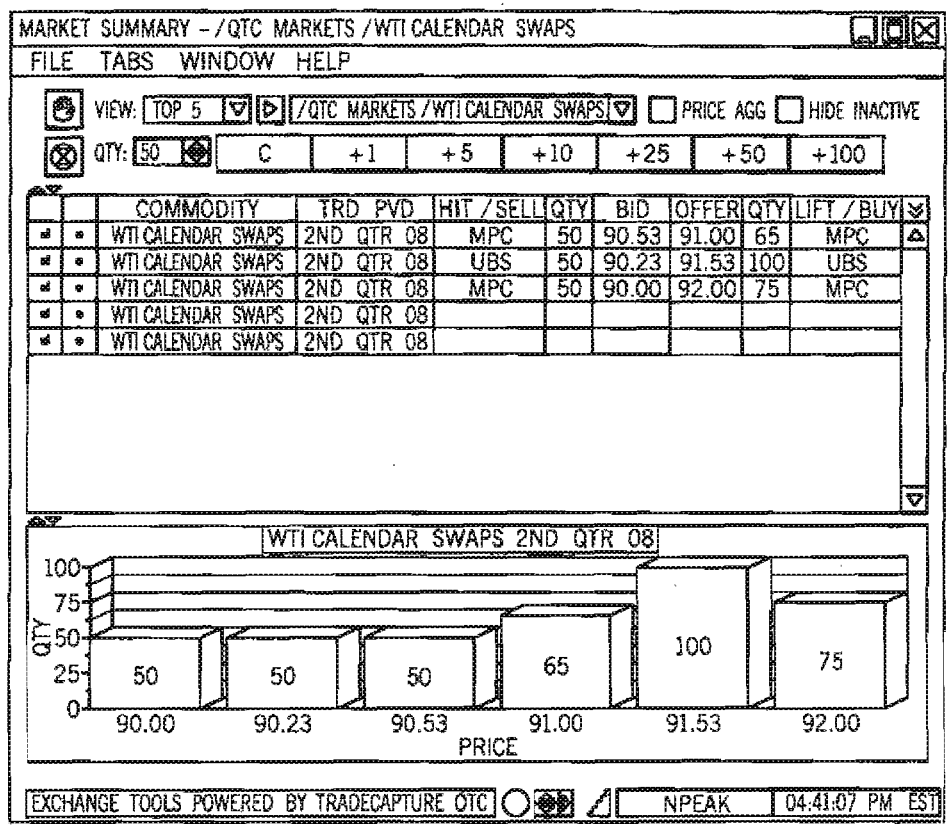

Referring to FIGS. 79-89, bids and offers for an example commodity called WTI Calendar Swaps that is common across the three broker exchanges of FIGS. 72-78. The example commodity is displayed as a commodity for the trader and for a special category of brokers referred to here as "super broker". FIG. 79 is an example of a screen in which a trader sees all open bids and offers combined from each of the broker exchanges combined onto one screen. FIG. 80 is an example of a screen in which a super broker sees all open bids and offers combined from each of the broker exchanges combined onto one screen. Traders and super brokers see all bids and offers from all three different brokers whereas the brokers only see the bids and offers from their own exchange. FIG. 81 is an edit bid screen for a first broker with a bid of 90.53; FIG. 82 is an edit offer screen for a second broker with an offer of 91.00; FIG. 83 is an edit bid screen for a third broker with a bid of 90.00; FIG. 84 is an edit offer screen for the trader with an offer of 92.00; FIG. 85 is an edit bid screen for the second broker with a bid of 90.23; and FIG. 86 is an edit offer screen for the first broker with an offer of 91.53.

Figure 87:
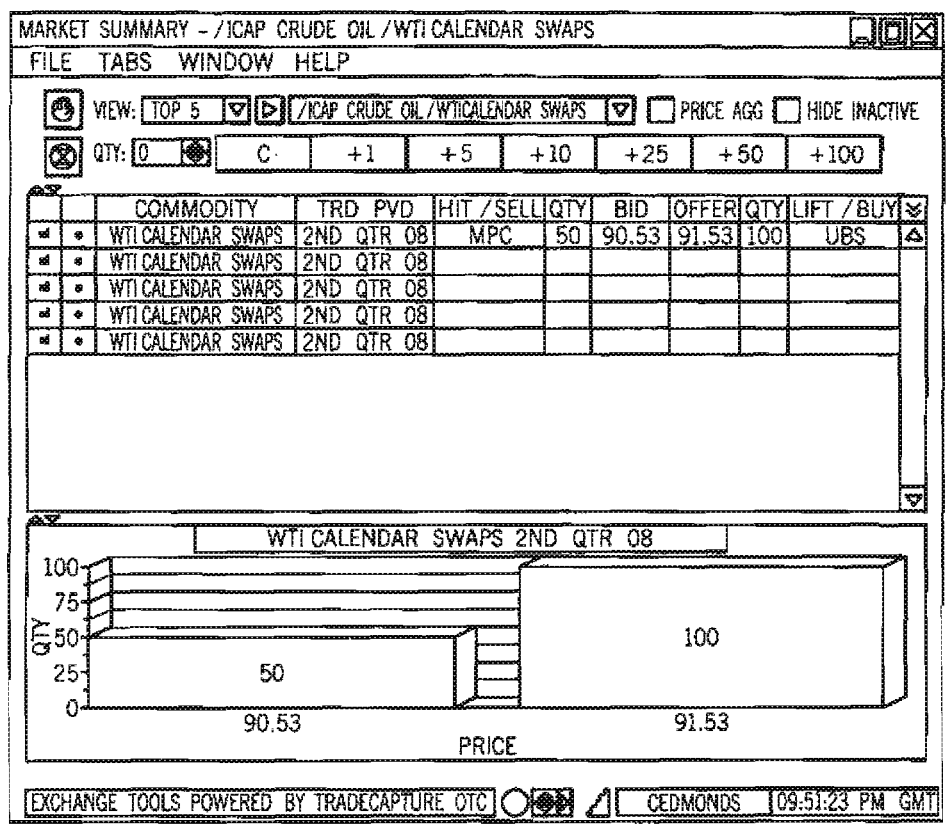
Figure 88:
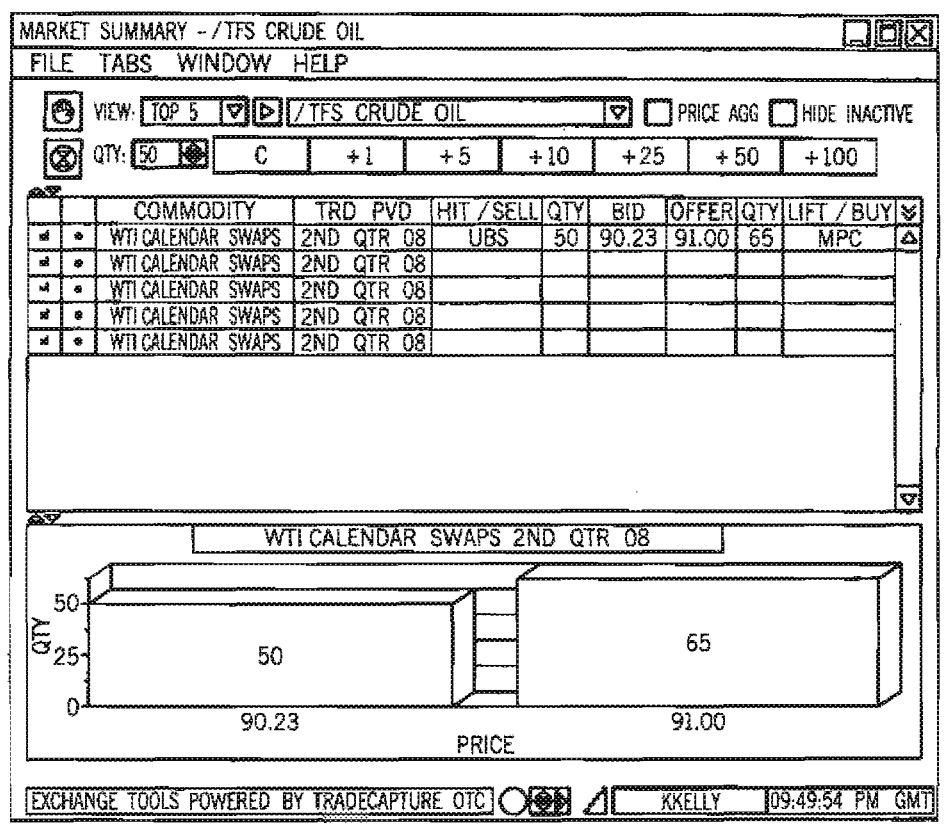
Figure 89:
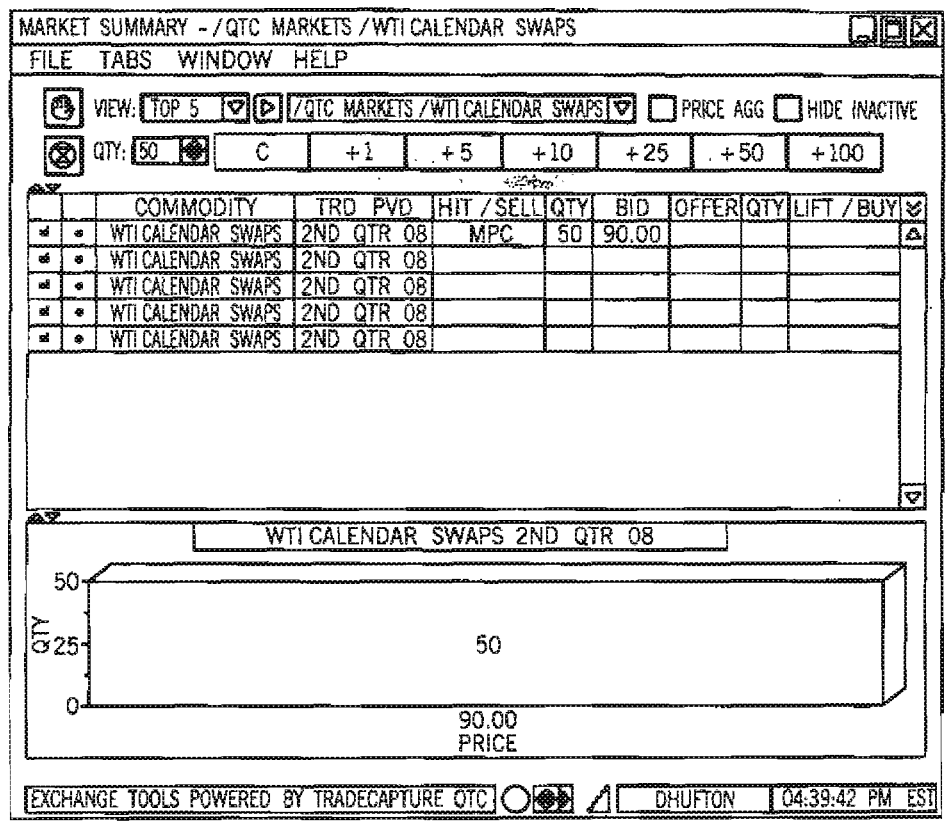

FIG. 87 is an example of a screen in which the first broker sees only those bids and offers in which that broker is named as the broker from his exchange. Thus, only the edit bid screen for the first broker of FIG. 81 and the edit offer screen for the first broker of FIG. 86 can be seen. FIG. 88 is another example of a screen in which the second broker sees only those bids and offers in which that broker is named as the broker from his exchange. Thus, only the edit offer screen for the second broker of FIG. 82 and the edit bid screen for the second broker of FIG. 85 can be seen. FIG. 89 is another example of a screen in which the third broker sees only those bids and offers in which that broker is named as the broker from his exchange. Thus, only the edit bid screen for the third broker of FIG. 83 can be seen.

Figure 90:
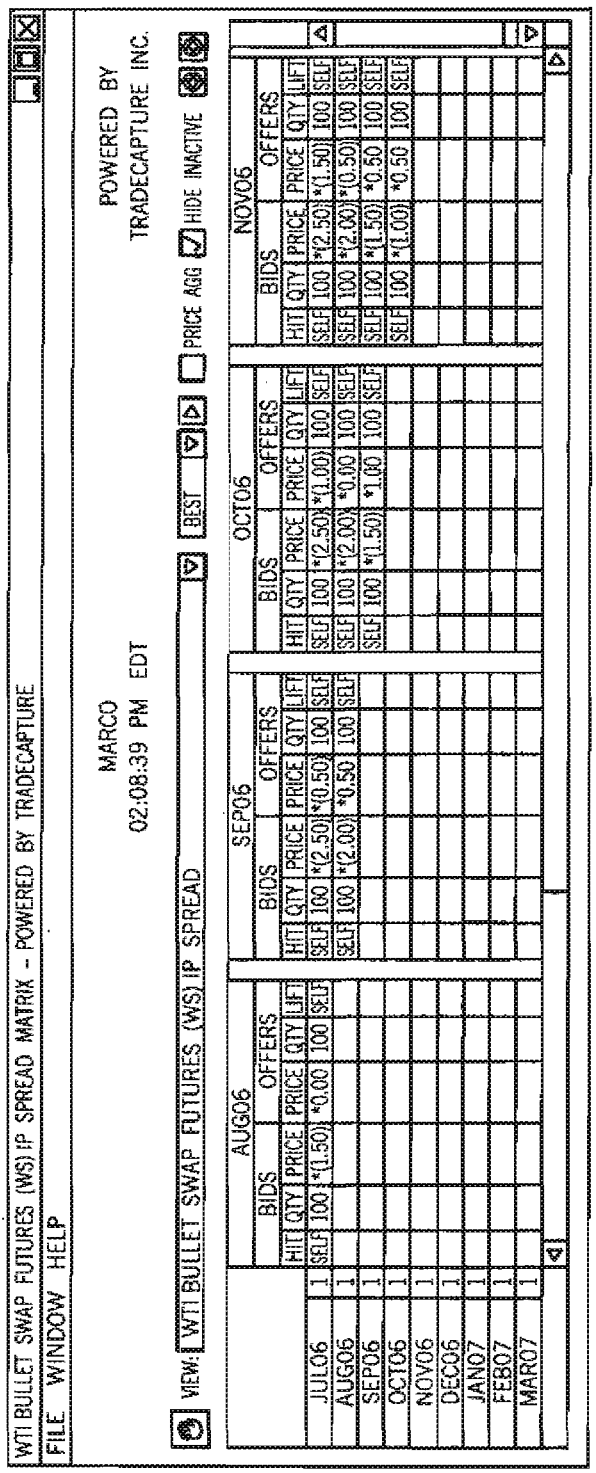
FIG. 90 shows the spread matrix screen of the present invention.

An example of the spread matrix screen is seen in FIG. 90. The spread matrix screen displays implied and outright inter-period (or calendar) spread markets. The spread matrix screen is a preformatted screen with pull-down menus for selecting commodities or commodity groups.

The system of the present invention makes use of color-coding and notation to designate specific attributes of orders in the system. Referring back to FIG. 67, in the 'hit/lift' column, a '+' icon indicates that the user has credit approval with the owner of the order in the specific commodity/trading period combination, a '−' icon indicates there is no credit approval. A designated color such as for example red designates a firm order subject to clearing, a designated color such as for example dark blue designates a firm bilateral order, a designated color such as for example light purple designates an indicative order, and 'self' indicates the user is the owner of the order. Mousing over 'self' launches a 'tooltip' panel that displays the account the user selected for the order.

In the 'quantity' column, a quantity with a designated color such as for example dark blue text accepts partial fills; a quantity displayed with a designated color such as for example red bold text does not accept partial fills. Orders that accept partial fill quantities can have minimum partial fill requirements. A user can mouse over the quantity cell of an order to open a 'tooltip' panel that displays any minimum partial fill requirements. A commodity/trading period combination can support multiple trading period periodicities. For example, a swap can support periodicities such as for example per day, per week, per month, per quarter, per year, etc. A periodicity abbreviation (/D, /M, /Q, /Y, etc.) can be included in the quantity cell, where applicable.

In the 'price' column, a price in a designated color such as for example blue text designates a bilateral order and a price in a designated color such as for example red text designates an order subject to clearing. Orders with a designated color such as for example light blue text designates that the order is part of an OCO chain. Mousing over the cell in the 'hit or lift' column of an order that is part of an OCO chain opens a 'tooltip' panel. The 'tooltip' panel displays the legs of the OCO chain, including the commodity, trading period, quantity and periodicity (if applicable), order number, clearing status, and bid or offer. Orders with a designated color such as for example green text designates that the order is part of a linked order chain. Mousing over the cell in the 'hit or lift' column of an order that is part of a linked order chain opens a 'tooltip' panel that displays the legs of the linked order chain, including the commodity, trading period, quantity and periodicity (if applicable), order number, clearing status, and bid or offer. Mousing over the price of an order launches a 'tooltip' panel that displays the order start and expiry times. Mousing over the price of an implied or outright spread order displays the order start and expiry times, as well as the primary and secondary leg price information.

Held orders can appear in like manor such as a designated background color such as for example light green. New orders can be designated in like manor such as a designated color such as for example yellow. The field remains the designated color until a new order appears, or until the user clicks in the screen to perform a function. 'Quantity' fields can be designated to indicate that partial fills are not accepted and that partial fills are accepted by for example bold/regular typeface. Mousing over a quantity cell can provide information detail for the order. Implied and synthetic orders can be designated by for example an asterisk (*) icon.

Referring to FIGS. 91-94, the placing an order application is described. Brokers and traders can amend orders belong to them or for which they have permission by clicking on the price cell. The panel that opens when a price cell for an order belonging to a broker or trader is clicked allows the user to place a new order or amend an existing order. Existing orders can remain active while being edited or can be cancelled while being edited. If an order at the same price level is cancelled while being edited, then that order looses its place in line; but, if an order is kept active, then that order keeps its place in line. Users can also cancel orders or place orders on hold using. The panel also allows the user to raise or lower order price rapidly.

When a user clicks on an empty price cell, an 'add bid/offer' order panel opens. If a cell with an existing order has been clicked that is not the user's order, then the price and 'quantity' fields of the 'add order' panel fills with an existing order price and a default preference for 'order quantity'. A broker can use the pull-down menu to select the 'trader account' in the 'on behalf of' field. To enter a 'new order', the 'price' and 'quantity' fields are filled and the 'place/sweep' button can be clicked to enter the order. To place an individual order, the price cell appropriate for the commodity/trading period combination and side of the market (bid or offer) can be clicked. For example, if a user wants to enter a bid in the April 2006 Brent Calendar Swap market, the user clicks on the corresponding cell. This opens a menu to an 'add/edit bid' (or 'add offer') pane, an example of which is seen in FIG. 91. After selecting 'add bid' (or 'add offer'), a 'quick order' panel opens, an example of which is seen in FIG. 92. A single click on a price cell brings up the 'quick order' panel. The user only needs to enter the price and quantity of order then click the 'OK' button to place an order.

Figures 93, 94:
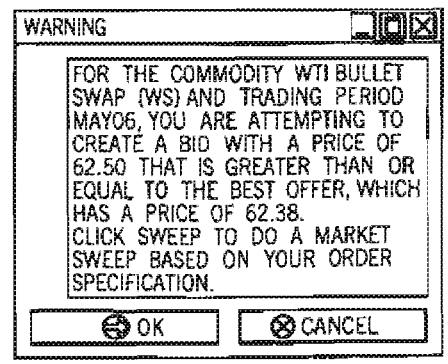

A 'full 'order' panel can be brought up by a double click in a price cell, an example of which is seen in FIG. 93. Alternatively, the user can click on 'details' on the 'quick order' panel to enter or edit additional order information. If additional details are not amended, then the default choices selected in the user preferences can be used as default information for 'broker', 'partial fills', and 'account' fields. Additional defaults can include: 'subject to clearing' can be the default choice if the commodity is clearable, 'fill or kill type' can be '<none>', 'order type' can be 'firm', and 'min qty' (minimum quantity) for 'partial fills' can be one or minimum quantity for default setup in the terms for the commodity. If the 'full order' panel is used, the user can leave default information as is or amend the fields and then click the 'OK' button to enter the order.

A trader can use the same procedure as a broker to enter an order on their own behalf. 'Price' and 'quantity' fields can be edited with on-screen key pads beneath the 'price' and 'quantity' fields for rapid entry, or keyboard number pads.

If the price cell in a trading screen on which the user clicks contains an order that does not belong to the user, then the 'add bid' (or 'add offer') panel opens, with the same price and quantity from the original order. Both of these fields can be modified by the user before submitting the order. If the price cell the user clicked on is empty, then the 'price' and 'quantity' fields can be blank. When a price cell containing an order is clicked, the 'quick order entry' panel appears with duplicate price and quantity information.

The full 'order entry' panel with order details can be displayed by clicking on the 'details' drop-down menu. There can be several editable fields within the 'add order' panels. These can include 'price'; 'quantity'; 'periodicity' (if applicable); 'broker' (optional); 'subject to clearing'; 'fill or kill type'; 'on hold'; 'partial fill' status; 'account'; and 'privacy type'. In the 'price' field, a user can enter the price manually, or can use their mouse and the keypad within the 'place order' panel. If the panel opens with the 'price' field already populated, users can edit the price by clicking the 'up' and 'down' arrow or by using the keypad to create a new price. Users can also click on one of the preset price change increments to the left of the keypad. In 'subject to clearing', checking the box makes the order subject to clearing; leaving the box unchecked makes the order subject to bilateral credit. This option appears for commodities that can be cleared or traded bilaterally. In 'fill or kill', 'fill or kill' orders can be supported with expirations such as for example 30, 60, or 90 second expirations. In 'on hold', users can input new orders that can be placed 'on hold' at inception. These orders can be activated, canceled, or edited at the discretion of the user. The exchange can support private and public trades. Private trades to not generate a public headline. Once the required data has been entered, the 'OK' button can be clicked.

Errors result in a 'warning' panel that describes the error, an example of which is seen in FIG. 94. A bid (offer) that is higher (lower) than the best offer (bid) in the selected commodity/trading period combination generates a panel informing the user. The user can be provided with the option of editing the order by clicking the 'OK' button or concluding the order by selecting 'sweep'.

Referring back to the 'add/edit bid' (or 'add offer') pane seen in FIG. 91, a user with an order on the platform has several options displayed in a panel when the user clicks on the price cell of their order. These can include 'add bid/offer'; 'edit bid/offer'; 'edit bid/offer-keep active'; 'cancel bid/offer'; 'hold bid/offer'; 'reinstate order' (in the case of clicking on a held order); and 'preset price increment shifts, up and down'. In 'edit bid/offer-cancel first', the order is canceled and removed from the marketplace and an 'edit order' panel can be launched. In 'edit bid/offer-keep active', the order can be traded by another user while it is being edited. The owner of the order can be notified of the trade and the user can receive a warning that the original order has been concluded if the user attempts to submit an edited order. In 'cancel bid/offer', the order can be removed from the market. In 'hold bid/offer', the order is withheld. The owner of the held order, other users from the owner's company, and brokers approved to act on behalf of the specific order can see the held order appear with a designated color such as for example a green background in the 'price' field. The held order disappears from the view of other users. In 'reinstate order', the order status returns to live. In 'preset price increment shifts, up and down', the levels can be set at the commodity level and can not be configurable by the user.

Figure 95:
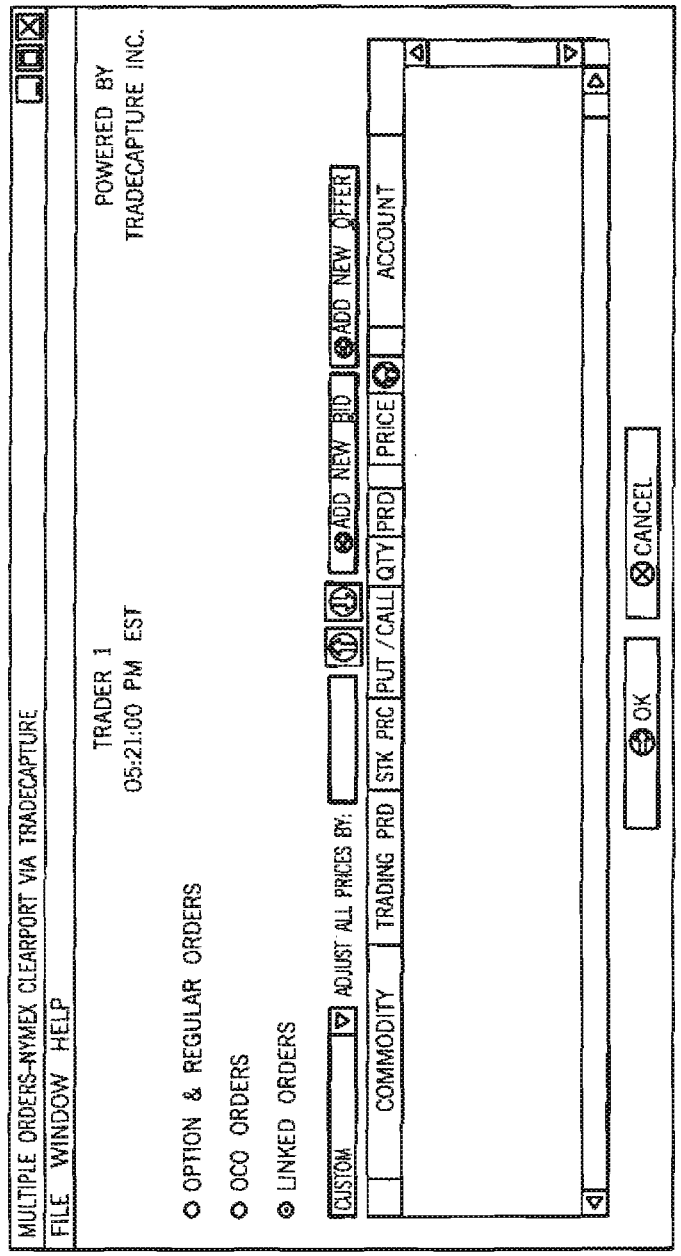
Figure 96:
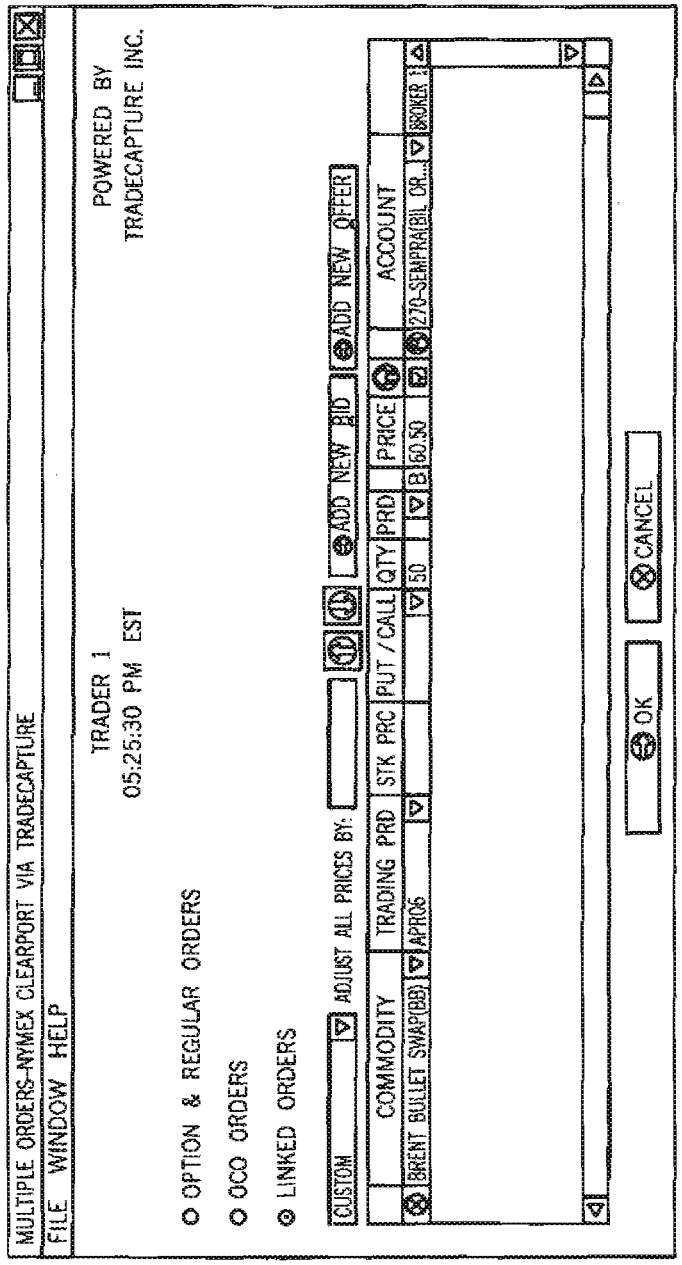
Figure 97:
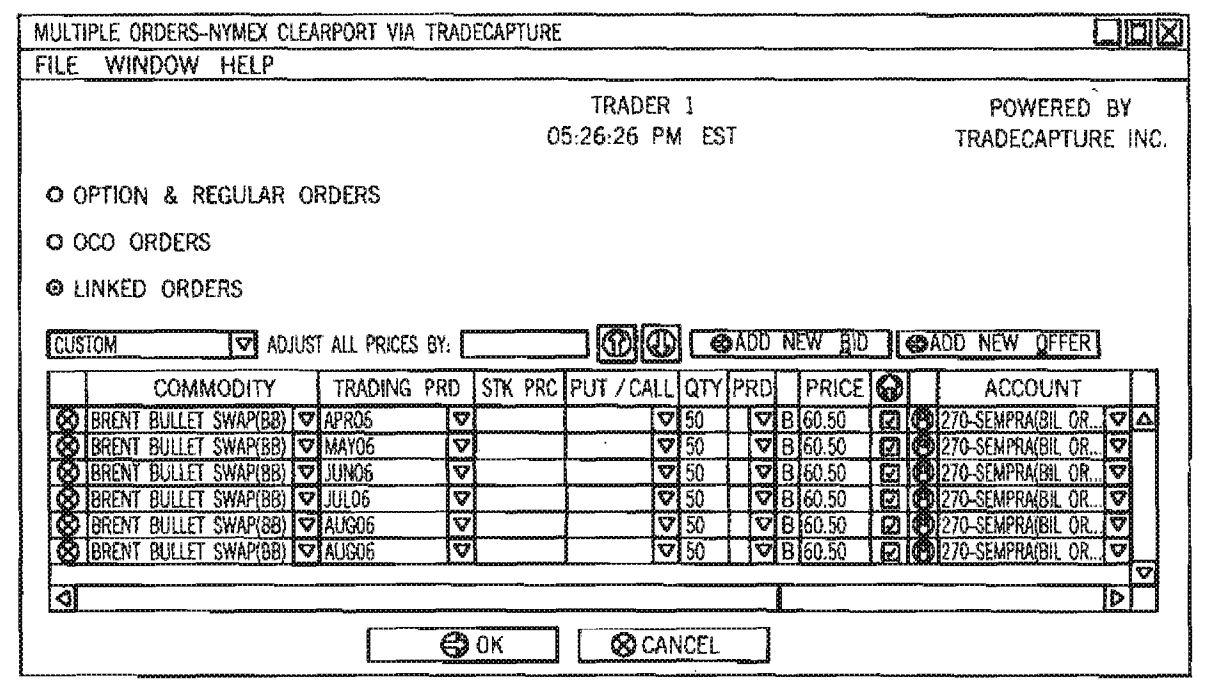
Figure 99:
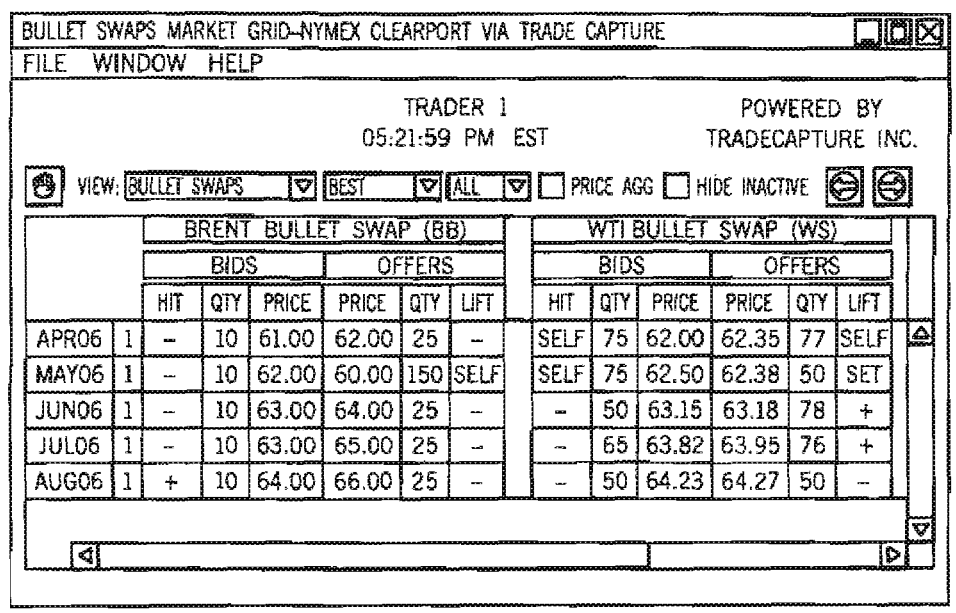

A user can enter a linked order chain by selecting the 'place multiple orders' option from the 'file' drop-down menu of the 'menu' bar, as seen in FIG. 57. Referring to FIGS. 95-102, the placing a linked order chain application is described. An example of a multiple orders screen is seen in FIG. 95. The user can select 'linked orders' by clicking in the radio button associated with this option, thereby activating the 'add new bid' and 'add new offer' buttons. The user can combine commodities and trading periods available on the user's exchange when creating a linked order chain, including commingling purchases and sales. The user clicks the 'add new bid' and 'add new offer' buttons for each leg of the chain. If a user makes a mistake or opens too many rows, the unwanted row can be deleted by clicking on the 'X' icon at the side of the row. The first rows populate with default information such as the user's default commodity, the first trading period for the default commodity, default quantity, and default trading account, an example of which is seen in FIG. 96.

These fields can be edited. When 'add new bid' is selected again, subsequent rows populate with the same commodity and successive trading periods, the same quantity, price, clearing status, and account information. When the user is satisfied with the information assigned to each leg of the linked order chain, the user can click the 'OK' button to place the order and the multiple orders screen of FIG. 97 appears. Linked order chains can be displayed with a designated color such as for example green text in the 'price' cell. If a user mouses over the cell in the 'hit or lift' column of a linked order chain, then a 'tooltip' panel opens displaying legs of the linked order chain.

Figure 98:
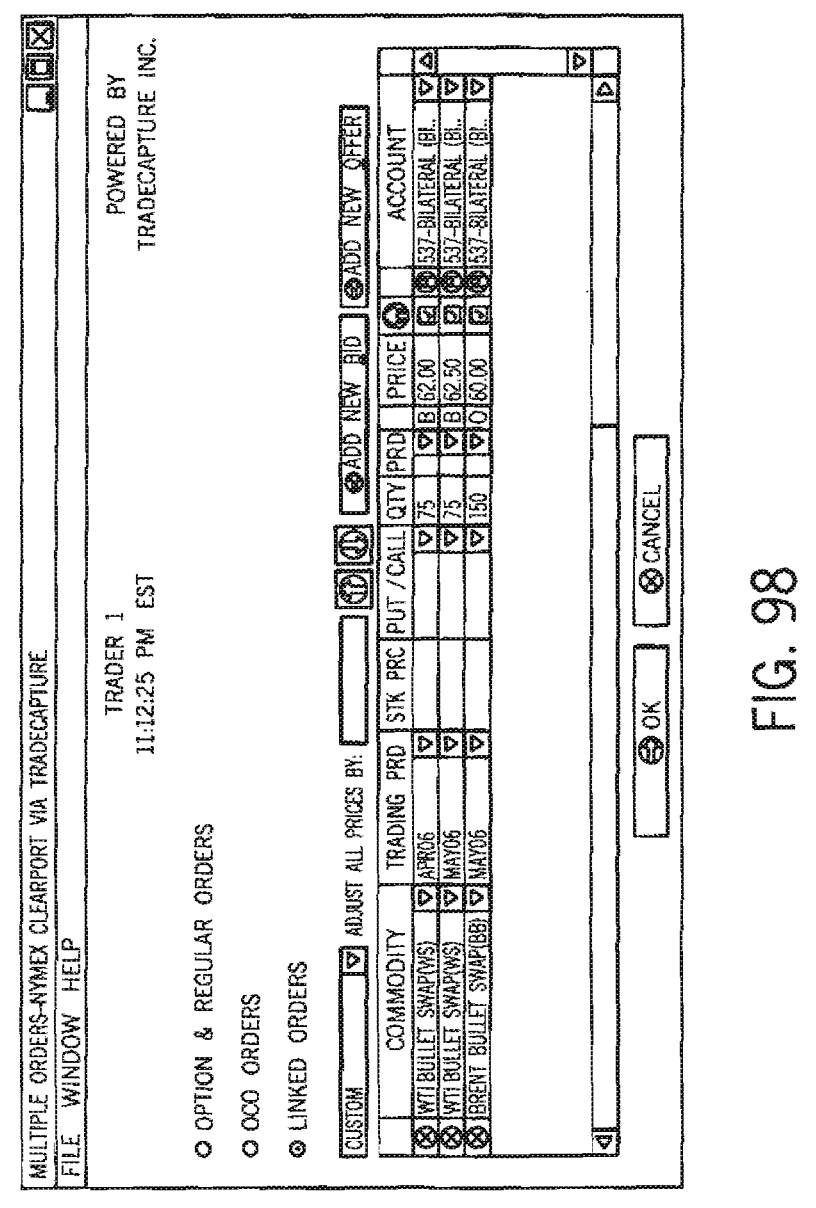

A linked order chain can have multiple legs as well as bids and offers, or mixed options and commodities orders, an example of which is seen in FIG. 98. The linked order chain appears in the market when the user clicks the 'OK' button to place the order. Legs of a linked order chain are "all or none" by definition; in other words, no partial fills are permitted. Therefore, quantities of a linked order chain can be displayed in a designated color such as for example red bold text, an example of which is seen in the completed place linked order screen example of FIG. 99. When concluding a linked order, a user agrees to trade each leg of the chain.

Figure 100:
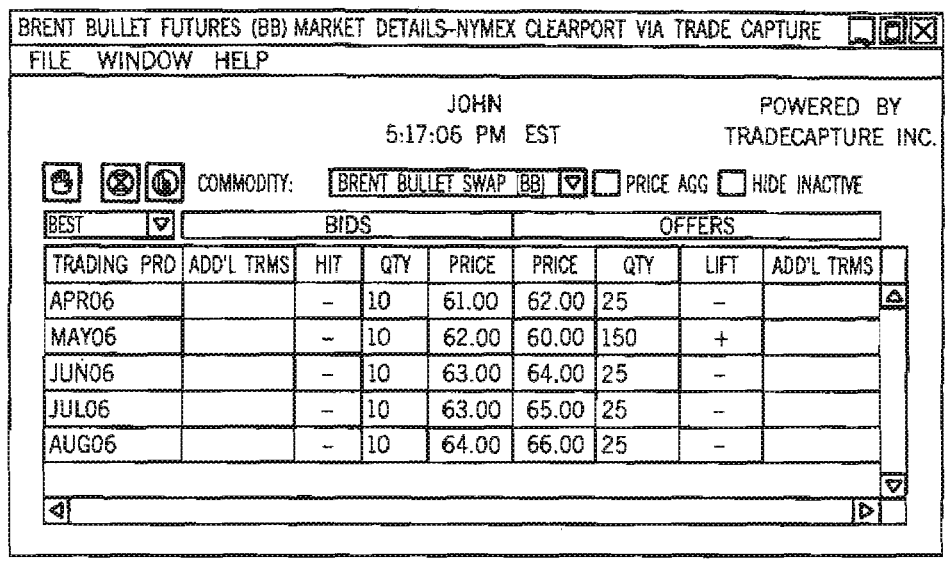

When another user on the system mouses over the 'hit/lift' column, a panel an example of which is seen in FIG. 100 is displayed with the legs of the linked order. In this example, the other user sees the legs (Brent and WTI Bullet Swaps) even though the user is using the market details view and is only looking at one of the two commodities in the linked trade. A 'confirm' panel re-capping the order and warning the trader that the order is a linked order can be displayed, an example of which is seen in FIG. 101, before the trade is concluded. Details of each of the legs can be displayed when the commodity is highlighted. If the trader clicks the 'OK' linked button and completes the transaction, then an 'order confirm' panel can be displayed re-capping the legs of the trades, an example of which is seen in FIG. 102.

Figure 104:
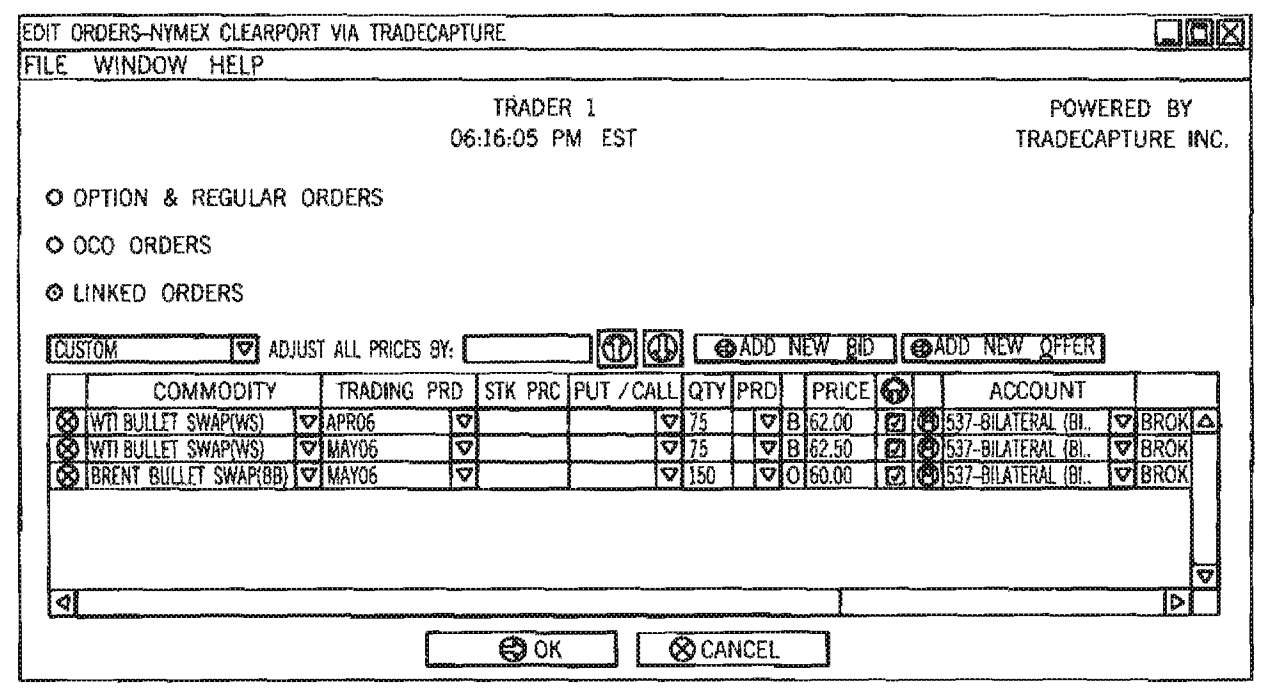

Referring to FIGS. 103 and 104, the edit, cancel, hold, and reinstate a linked order chain application is described. As seen in FIG. 103, a user with an order on the platform has several options displayed in a panel when the price cell of the order is clicked, including: 'add bid; 'add linked orders'; 'edit linked orders-cancel first'; 'edit linked orders-keep active'; 'cancel linked orders'; 'hold linked orders'; 'reinstate held linked orders' (only if linked order is on hold); 'edit linked orders-cancel first'; and 'edit linked orders-keep active'. In 'edit linked orders-cancel first' the linked order chain can be canceled and removed from the marketplace and an 'edit order chain orders' panel is launched. In 'edit linked orders-keep active' the linked order chain can be traded by another user while it is being edited. The owner of the order can be notified of the trade and the user receives a warning that the original order has been concluded if the user attempts to submit an edited order. An 'edit order chain orders' panel is launched, an example of which is seen in FIG. 104.

Fields in the 'edit order chain orders' panel that can be edited can include: 'strike price', 'quantity', 'price', 'clearing status', and 'account'. There can also be a uniform price shift feature available by entering a price change increment in the 'Adjust All Prices by . . . ' field and clicking the 'up' or 'down' arrow. Users can also add additional legs to the chain by clicking on the 'add new bid' or 'add new offer' buttons and entering the details for the new legs. Once the edit is complete and the user is satisfied with the changes, the user clicks on the 'OK' button to submit the changes to the market. If the user decides not to make changes after beginning the edit process, the user can click on the 'cancel' button and the original linked order chain can be re-submitted. Clicking 'cancel' from the edit screen only cancels the edit—it will not cancel the order. A held linked order chain can also be edited. When the edit changes are complete and submitted, the linked order chain maintains its held linked order status. The legs of a held linked order chain also appear with a designated color such as for example green background in the 'price' field. To reinstate a held linked order chain the user clicks on the price cell of a leg of the chain and selects 'reinstate held linked order'. A held linked order chain can be viewed by the owner of the order chain, other traders from the owner's company, and brokers with permission to act on the order. Only the owner of an order (or a broker with permission to act on behalf of the trader) can reinstate a held order.

Figure 105:
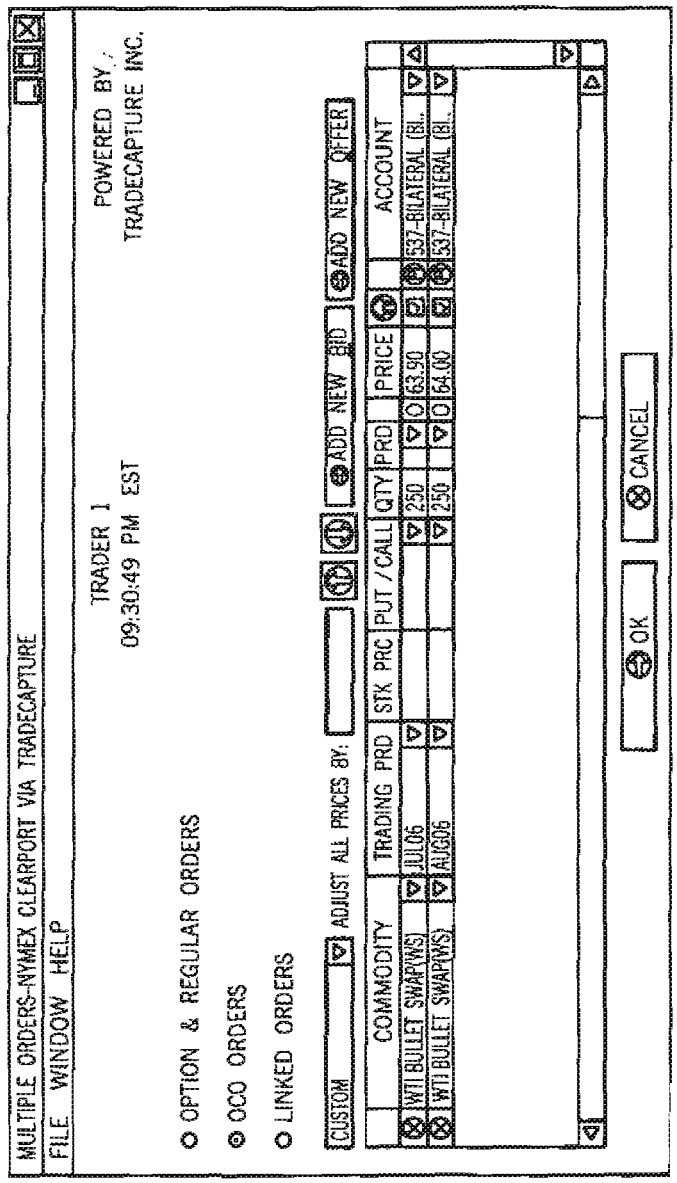

Referring to FIGS. 105-108, the placing an OCO order chain application is described. A user can enter an OCO order chain by selecting the 'place multiple/opt orders' option from the 'file' drop-down menu of the 'menu' bar, as seen in FIG. 57. To place an OCO order the radio button associated with this option can be clicked. This activates the 'add new bid' and 'add new offer' buttons, an example of which is seen in FIG. 105. The user can combine commodities and trading periods available on the user's exchange when creating an OCO order chain, including co-mingling purchases and sales. The user clicks the 'add new bid' and 'add new offer' buttons for each leg of the chain. If a user makes a mistake or opens too many rows, the unwanted row can be deleted by clicking on the 'X' icon at the side of the row. Initially the rows populate with default information such as the user's default commodity, the first trading period for the default commodity, default quantity, and default trading account. When the first rows fields are edited to certain selected data, the subsequent rows can be populated with the same data in the fields except the 'trading period' field. The 'trading period' field can be populated with successive trading periods. This example of FIG. 105 shows two offers for a WTI Bullet Swap. When the user is satisfied with the information assigned to each leg of the OCO order chain, the user can click the 'OK' button to place the order.

Figure 106:
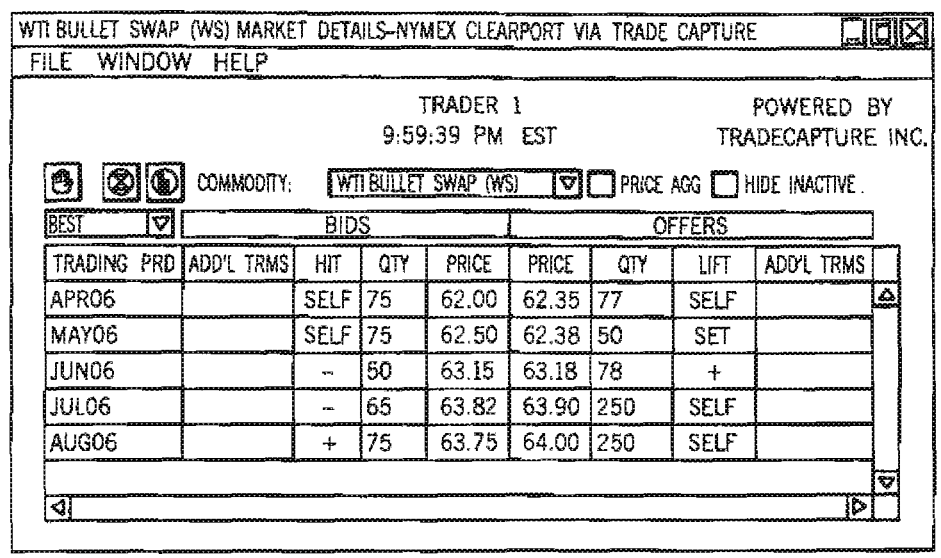
Figure 107:
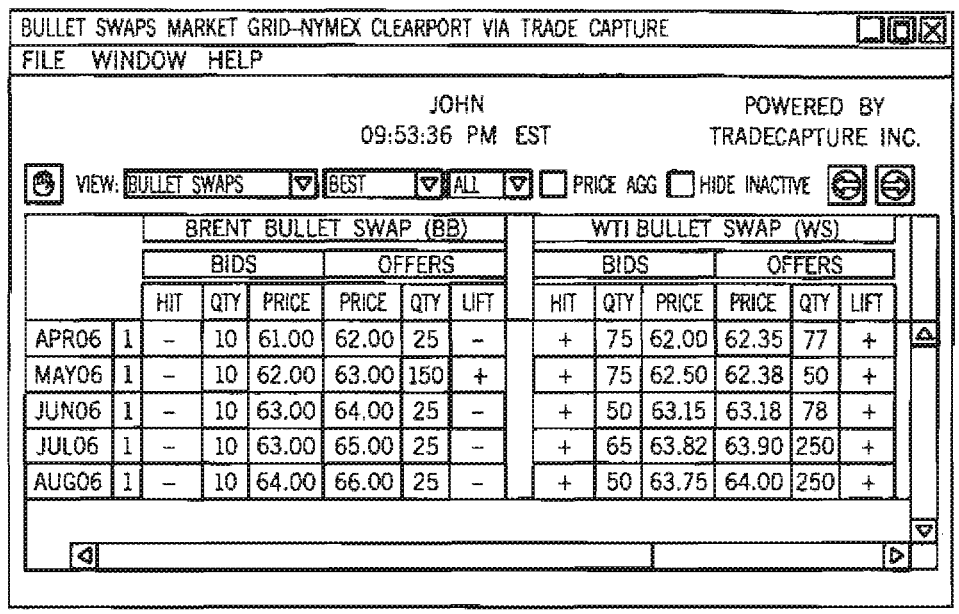

Referring to FIG. 106, new orders appear on a designated color such as for example a yellow background first. OCO order chains can be displayed with a designated color such as for example light blue text in the 'price' cell. Legs of an OCO order chain are "all or none" by definition—again, there are no partial fills. Therefore, quantities of an OCO order chain can be displayed in a designated color such as for example red bold text. When user mouses over the cell in the 'hit or lift' column of an OCO order chain, a 'tooltip' panel opens displaying legs of the OCO order chain, an example of which is shown in FIG. 107, from another trader's view.

Figures 108, 109:
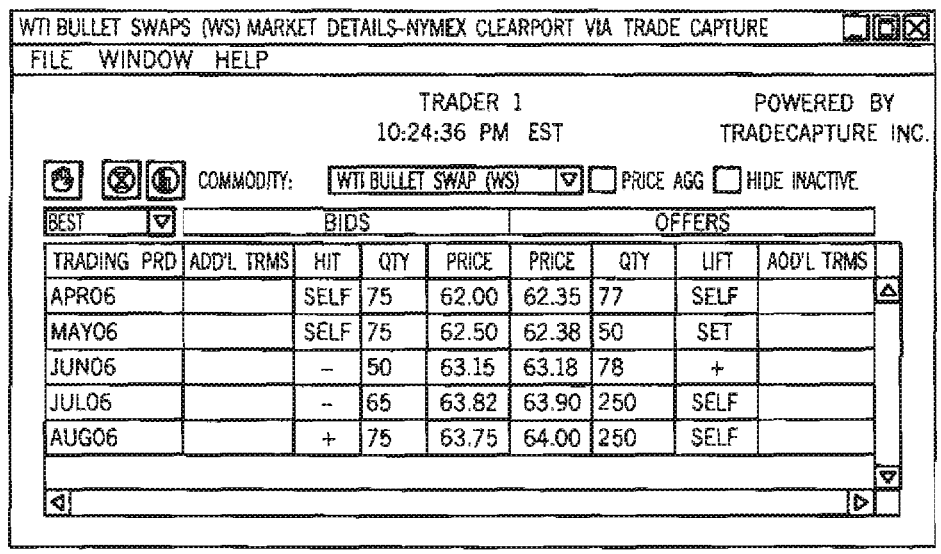

An OCO order chain can be edited with respect to price, quantity, clearing status, and account. To edit the user clicks on the 'price' cell of a leg of the OCO chain and select one of the 'edit' options. This launches an 'edit OCO' panel, an example of which is seen in FIG. 108. A user can also perform a uniform price shift for legs of the OCO chain by entering a price in the 'adjust all prices by' field and clicking the 'up' or 'down' arrow. User can also cancel a leg of the OCO chain by clicking on the 'X' icon corresponding to the order at the side of the screen. Once the changes have been submitted, the user clicks the 'OK' button, which returns the edited OCO chain to the market. A user reinstates a held edited OCO chain to reactivate the chain. In other words, like other orders in the system, the order maintains its status throughout the edit process. An OCO chain can be held by clicking on the 'price' cell of a leg of the OCO chain and selecting the 'hold OCO' option. An OCO chain can be reinstated by clicking on the price cell of a leg of a held OCO chain and selecting 'reinstate OCO'. Clicking 'cancel' from the edit order chains screen only cancels the edit—it will not cancel the order. An OCO chain can be cancelled by clicking on the price cell of a leg of an OCO chain and selecting the 'cancel OCO' option.

Referring to FIGS. 109-111, the trading an order without single click trading selected application is described. Referring to FIG. 109, a user can trade a firm order by clicking on the '+' icon in the ' hit' (or 'lift') column. If the user did not flag 'single click trading' in the 'miscellaneous' tab of preferences, then a 'please confirm the following purchase (or sale)' panel can be launched, an example of which is seen in FIG. 110, which contains the relevant data related to the trade. If the user wishes to conclude the trade, the 'OK' button can be clicked. If the user wishes to cancel the transaction, the 'cancel' button can be clicked. If the user clicks the 'OK' button and the trade is concluded, then both users that are involved in the trade receive a 'trade notification' panel, an example of which is seen in FIG. 111.

The 'trade notification' panels can be generated and automatically displayed after a trade has been concluded. Trade notification can be turned off if a user desires. A 'repeat order' button re-enters a duplicate of the original order. If the execution was a partial fill, then the duplicate order can be placed (not balance); if execution was a partial fill, then the balance still remains as an open order.

If the user has flagged the 'single click trading' option in their preferences, then the user will not receive the 'please confirm trade' panel of FIG. 110, and will not have the opportunity to cancel a trade if clicked on erroneously. Instead, if 'single click trading' has been selected as a preference, then trades can be concluded immediately upon clicking in the 'hit/lift' panel.

The example of the 'trade notification' panel seen in FIG. 111 can include: 'trade date and time'; 'trade #; input order #; accepted order #; buyer'; 'buyer contact'; 'buyer account'; 'seller; seller contact'; 'seller account' (null in the FIG. 111 example); 'commodity'; 'trading period'; 'type (purchase or sale)'; 'price'; 'quantity and periodicity'; 'total quantity'; 'net cost' (notion value of the contracts traded); 'commissions', if applicable; and 'additional terms', if permitted and included in the transaction. The user can click the 'OK' button to close the panel. The panel disappears but can be reopened through another screen described below. The owner of the order also gets an option to repeat the order. If the owner clicks the 'repeat order' button, then a 'repeat order' panel opens.

Referring to FIGS. 112 and 113, the partial fills application is described. FIG. 112 shows an example of a partial fills screen. The fields for 'partial fill quantity and account' can be editable. In the FIG. 112 example, the user could amend the quantity in the 'partial fill quantity' field to for example only 25 if preferred. In that case, when the user clicks on the 'hit' button the trade can be a 'partial fill' and a 'trade notification' for the 'partial fill quantity' can be generated. The other buttons located at the bottom of the panel for 'add to cart', 'negotiate', and 'sweep' are discussed below. A view of the trade screen would show a remaining bid of for example 50, an example of which is seen in FIG. 113.

Figure 114:
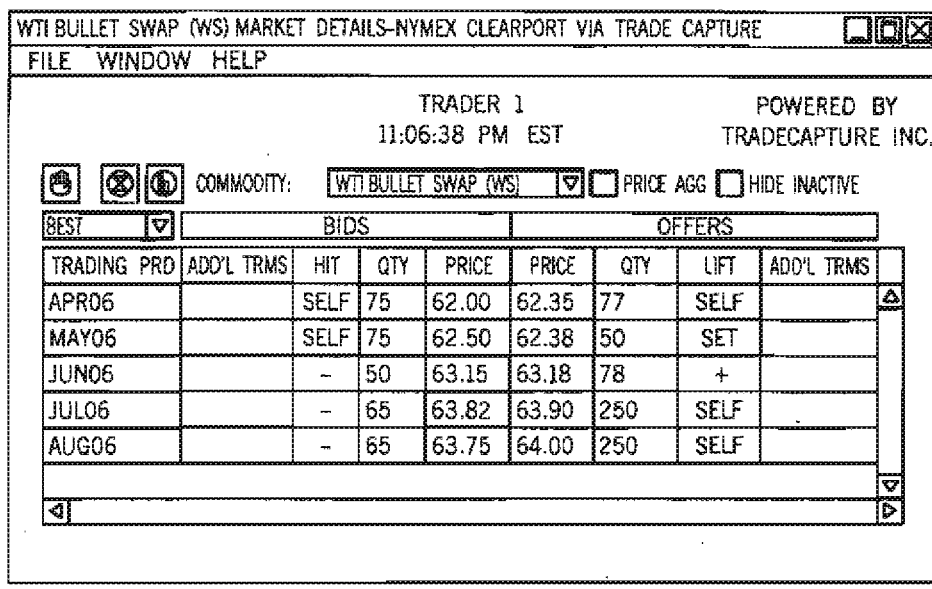
Figure 116:
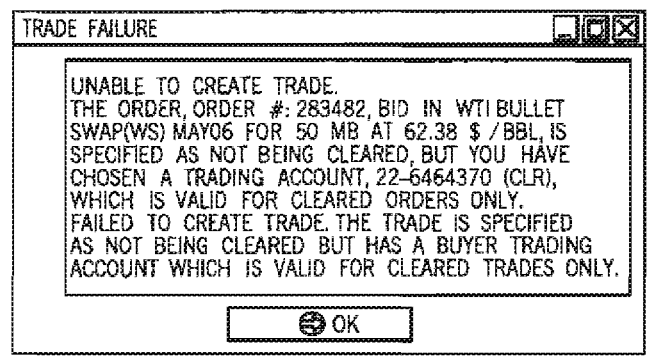

Referring to FIGS. 114-120, the 'trade notification' panel with 'repeat order' function application is described. A trader trying to lift an 'anonymous bilateral' trade can click on the '+' icon in the 'lift' column, an example of which is seen in FIG. 114: a '+' icon in the 'lift' column designates that the user's company has approved credit terms in place. In the example seen in the 'confirm purchase' panel of FIG. 115, the user's preferred account is for cleared trades and the order being traded can be color coded in a designated color such as for example dark blue which signifies a firm bilateral order. After 'lift' is clicked in the 'confirm purchase' panel, the user receives a 'trade failure' notice, an example of which is seen in FIG. 116, informing the user that the account selected is not valid for bilateral trades.

The user can click the 'OK' button to dismiss the notice and the 'please confirm the following purchase' panel re-opens, allowing the user an opportunity to correct the account type. Referring to FIG. 117, the user can click on the drop-down menu in the 'account' field and select an alternate account which allows bilateral trades. Clicking the 'lift' button at the bottom of the panel concludes the transaction and launches a 'trade notification' panel. In this example, the buyer receives the 'notification' panel seen in FIG. 118 displaying the sellers account name and contact information, and the user can acknowledge the transaction by clicking the 'OK' button.

Figures 120, 121:
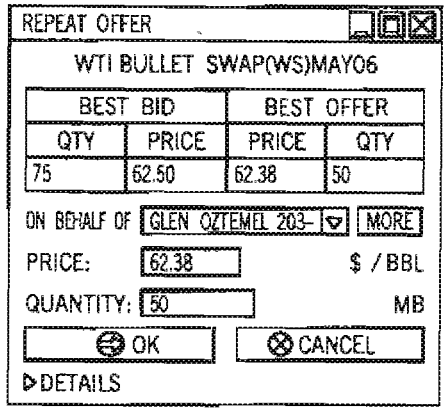

The seller receives a similar panel an example of which is seen in FIG. 119 displaying the name and account information of the buyer. The seller can also be given an opportunity to repeat the order that has been traded from this 'notification' panel before clicking the 'OK' button. A user may not want to show their size to the market, so this can be a way to reduce keystrokes and re-enter orders. A seller can click 'repeat offer' to launch the 'repeat offer' panel, an example of which is seen in FIG. 120. The fields of the 'order' panel can have the same terms as the original transaction. The user can edit some, all or none of the fields in the 'repeat order' panel, and then click the 'OK' button to submit the order; or, the owner could decide to cancel the request altogether.

For cleared transactions, the buyer will not see the account information of the seller in the 'trade notification' panel, and the seller will not see the account information of the buyer in the 'trade notification' panel. Trades that can be cleared display 'subject to clearing' as the counterparty. A user only sees their own account information in the panel. An approved broker that has been given permission to act on an order can receive the same 'trade notification' panel that the original owner receives. If the original owner is offline when the trade occurs, then the owner receives a 'trade notification' panel for trades concluded while they were offline at their next login.

An e-mail trade confirmation can be sent to the same users that get a 'trade notification' panel. The e-mail trade confirmation contains the same data as the 'trade notification' panel, with the addition of the commodity specification language associated with the commodity that was traded. The system has the capacity to send multiple e-mail trade confirmations to the same company. For instance, an e-mail trade confirmation message could be sent to the trader and the trader's back office or risk manager simultaneously.

Referring to FIGS. 121-124, the trading a linked order application is described. As previously described, a linked order is displayed with a designated color such as for example a green text in the 'price' field. If a user mouses over the '+' column, then a 'tooltip' panel displaying the linked order legs can be displayed, an example of which is seen in FIG. 121. When the user clicks on the '+' icon in the 'hit or lift' column on a leg of a linked order, a 'please confirm purchases and sales' panel opens, an example of which is seen in FIG. 122. Legs of the linked order chain can be displayed at the top of the panel, including the 'order #', 'commodity', 'trading period', 'credit status', 'quantity/periodicity', 'bid or offer', 'price', and 'account'. Legs of a linked order are "all or none" quantities by definition and so, do not accept partial fills. Since linked order chains can include both cleared and bilateral legs, a user assigns an appropriate account to each leg. This can be done by highlighting the row of a leg in the chain and selecting an account from the 'account' drop-down menu. If necessary, it can be done for each leg of the linked order chain. Linked orders can not be included in market sweep transaction. Linked orders can be added to a shopping cart. Shopping carts are discussed below.

A user concludes a linked order by clicking on the 'OK' button. Each leg of the linked order chain must be accepted. The owner of the linked order receives a 'trade notification' panel, an example of which is seen in FIG. 123. The user can launch a 'repeat order' panel by clicking on the 'repeat chain' panel, an example of which is seen in FIG. 124. An entire chain can be repeated without making changes, or a user can edit the panel and submit a different linked order chain. The changes can include: uniform price shift up or down; individual price changes up or down; change commodity; change the trading period; change the quantity and periodicity; deletion of entire legs of the chain altogether by clicking on the 'X' icon in the circle; add new legs to the chain by clicking on the 'add new bid' or 'add new offer' buttons; change clearing status and trading accounts; and change the strike price in the case of an option.

Figure 125:
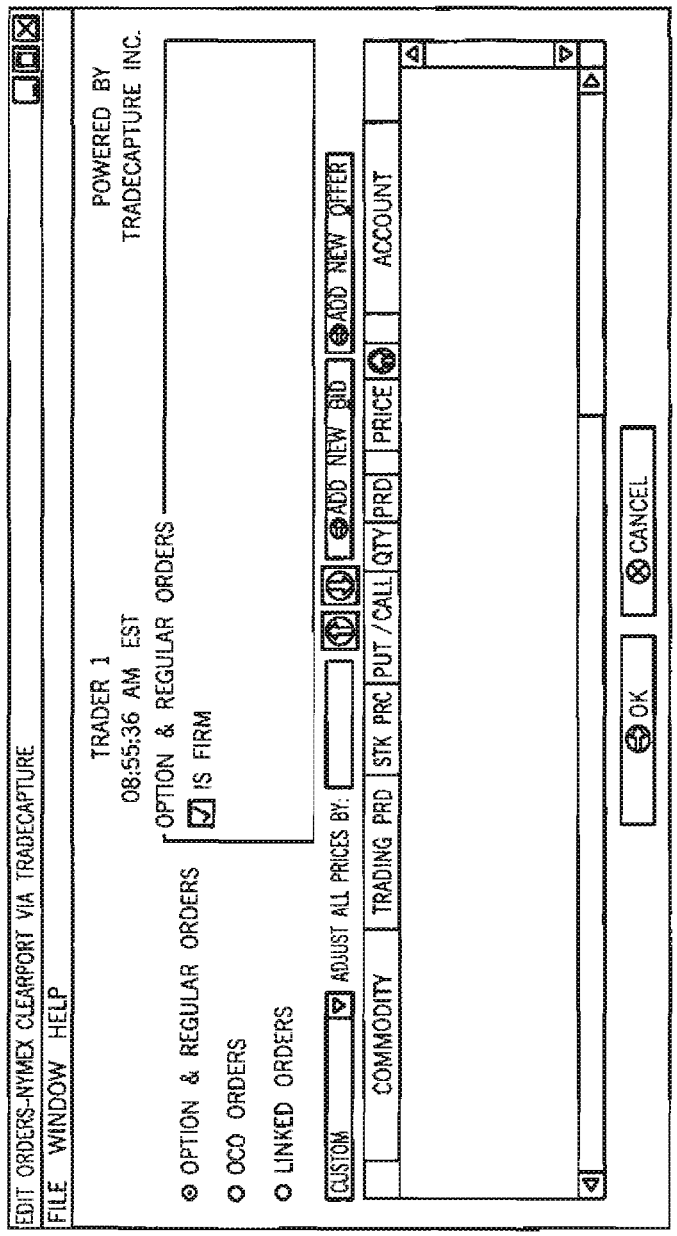
Figure 126:
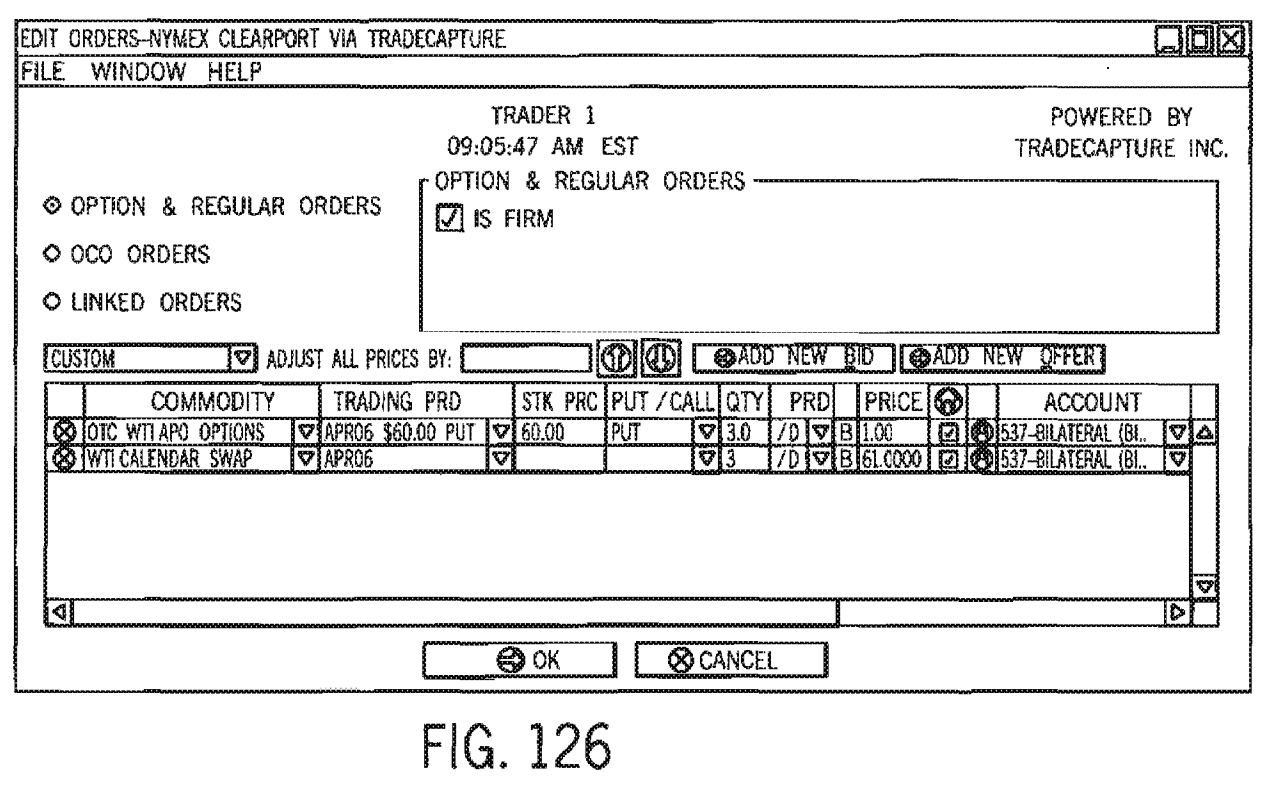

Referring to FIGS. 125-129, the place an option order application is described. A user can enter an option order by selecting 'place multiple/option orders' from the 'file' drop-down menu of the 'menu' bar, as seen in FIG. 57. Clicking the 'option & regular orders' radio button activates the 'add new bid' and 'add new offer' buttons, an example of which is seen in FIG. 125. A user can place orders for futures, swaps or physical commodities in combination with options when creating a linked or OCO order chain. New fields can be activated when entering data for an option order. Specifically, the user can enter the strike price and select put or cell, an example of which is seen in FIG. 126.

Figure 127:
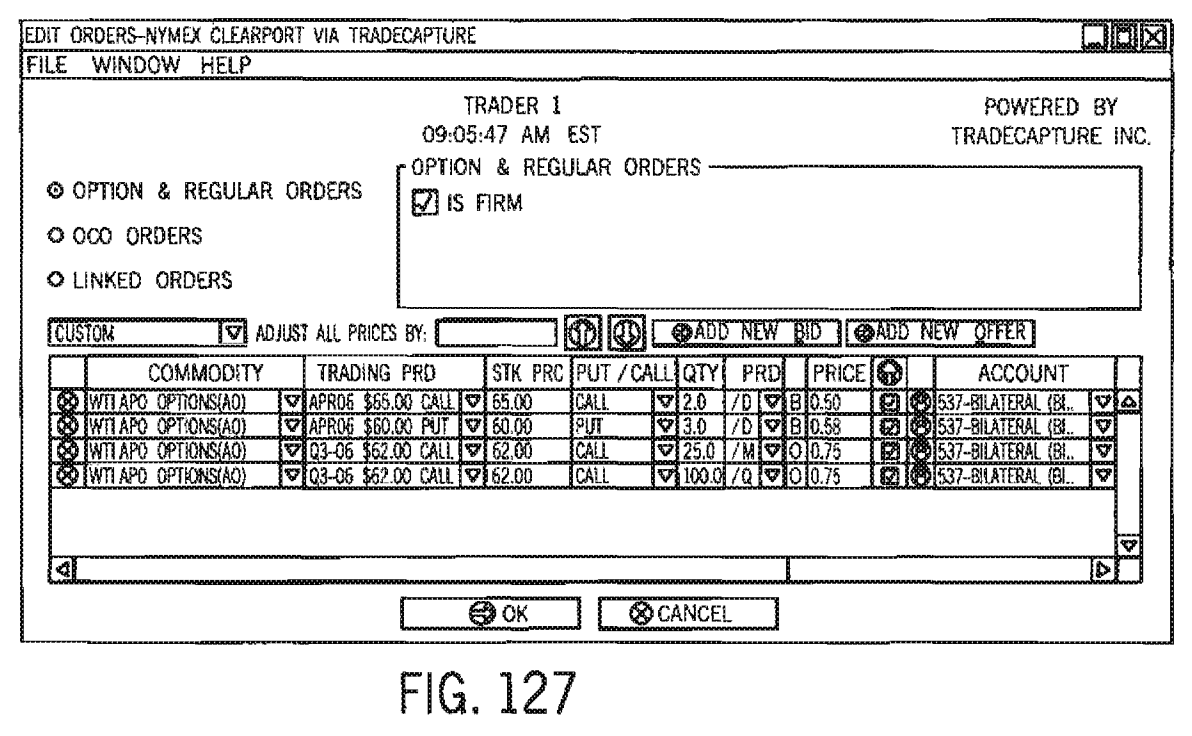
Figure 129:
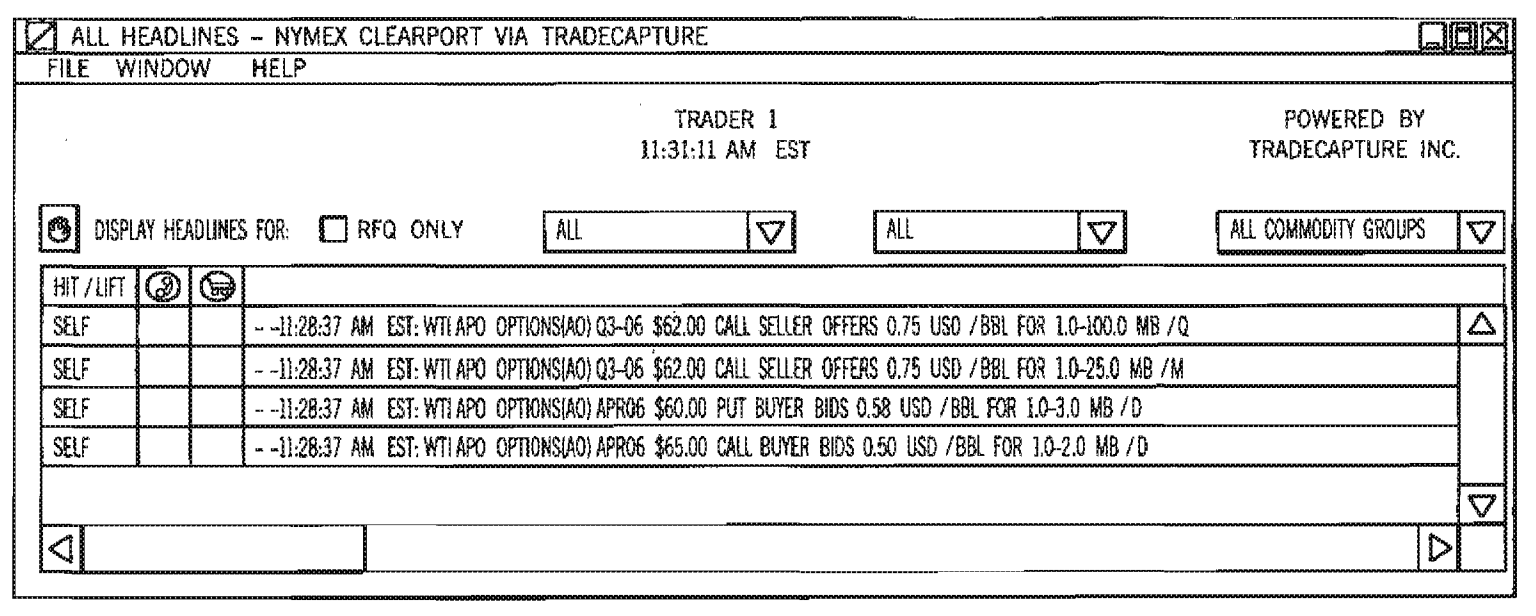

The option order screen, an example of which is seen in FIG. 127, allows for entry of both bids and offers on different option classes as well as different periodicities for the same instrument. To enter the order, the 'OK' button can be clicked. Option order can be viewed in the 'market summaries' page, an example of which is seen in FIG. 128, by selecting the desired option commodity group. The options can be displayed based on the sorting priority setup for each option commodity. A 'price agg' check-box aggregates bids and offers at the same price. Aggregated prices can be displayed in like manor such as a like color such as blue. A 'hide inactive' hides inactive trading periods in order to condense the screen size. The system creates a new structure for each new non-standardized option. The headlines screen, an example of which is seen in FIG. 129, displays new orders as they are entered into the market. The filters on the headline screen are discussed below.

Figure 130:
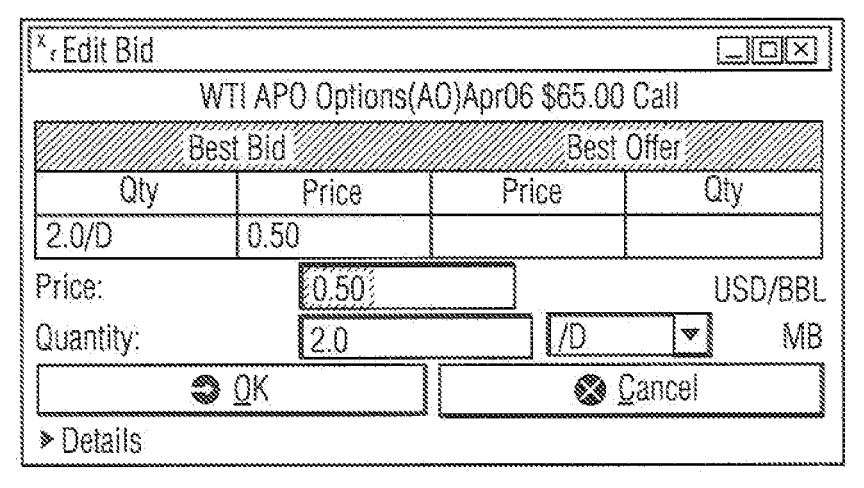
Figure 131:
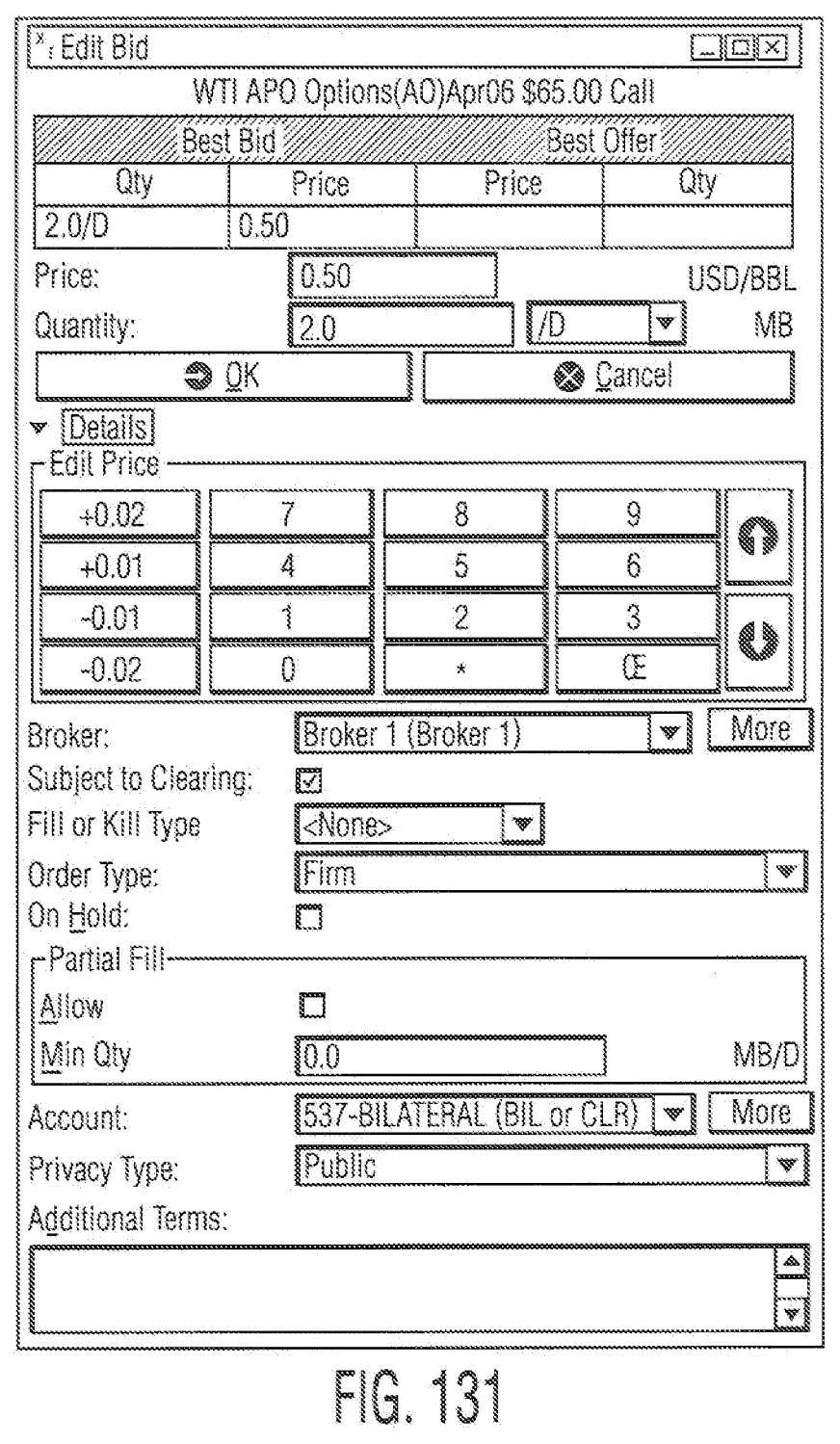

When a user clicks on an empty price cell an 'add bid/offer' order panel opens. Referring to FIGS. 130 and 131, the edit, hold, cancel and reinstate an option order application is described. An option order can be edited like other orders; however, the class, strike price, and trading period can not be edited. If the only changes are price or quantity, a mini version of the 'edit order' panel is sufficient, an example of which is seen in FIG. 130. Clicking the 'details' button expands the 'edit order' panel to show the 'order details' and 'price increment' buttons in the 'full edit' panel, an example of which is seen in FIG. 131. If items other than price and quantity need to be amended, the 'full edit' panel provides access to order details such as for example; 'broker', 'clearing', 'order and fill' type, and 'account' information. Users can switch from the 'full order' panel to the 'mini order' panel by clicking on a 'switch' arrow in the middle of the 'full order' panel If a cell with an existing order that is not the user's is selected, then the 'price' and 'quantity' fields of the 'add order' panel can be automatically filled with existing order price and a default preference for 'order quantity'. The pull-down menu can be used to select the 'trader account' in the 'on behalf of' field. To enter a new order, 'price' and 'quantity' fields can be filled and a 'place/sweep' button can be selected. A trader uses the same procedure as a broker to enter an order on their own behalf. 'Price' and 'quantity' fields can be edited with on-screen key pads for rapid entry or keyboard number pads.

Figure 132:
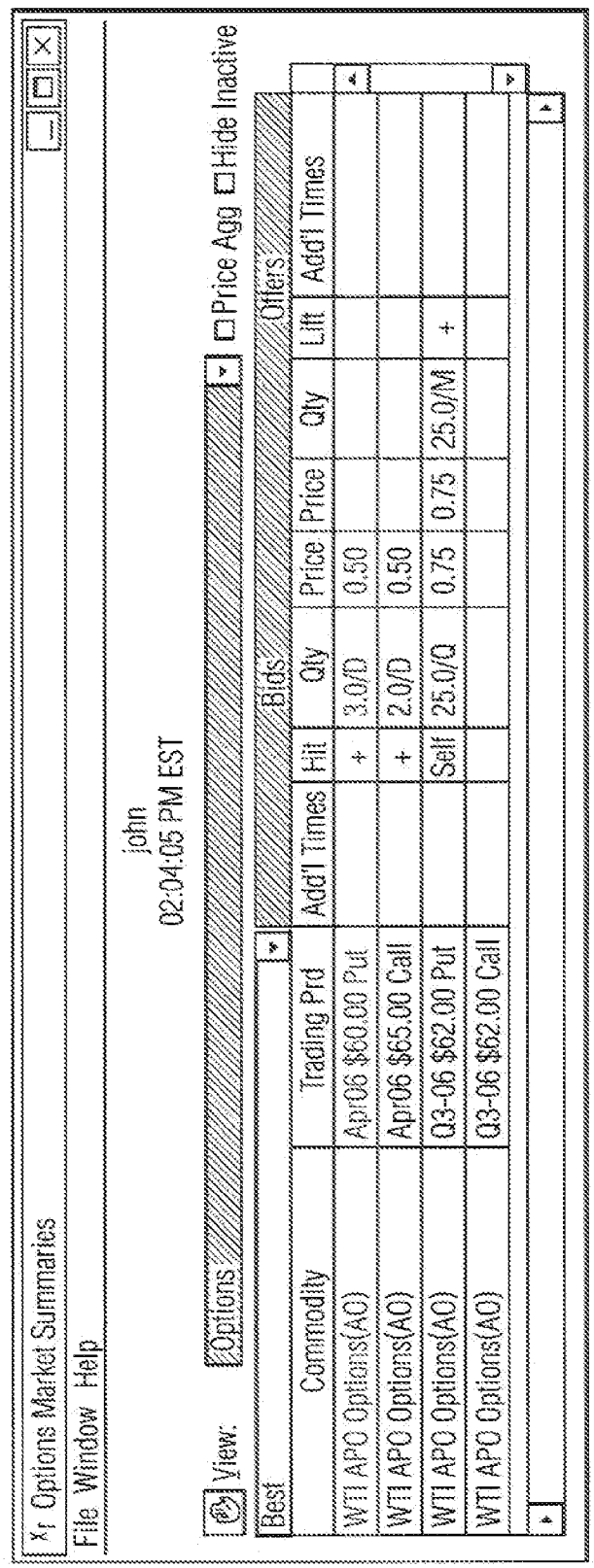

Referring to FIGS. 132-135, the trade an option order application is described. An option order can be traded like other orders in the system. Referring to FIG. 132, clicking on the '+' icon in the 'hit/lift' column opens a 'confirm the following sale (or purchase)' panel, an example of which is seen in FIG. 133. The user can click on the 'confirm panel' buttons. If the user clicks 'hit', then the trade is concluded and a 'notification' panel can be generated, an example of which is seen in FIG. 134. A concluded trade generates a 'trade notification' panel for both parties to the transaction. This can include two additional pieces of information for strike price and put or call. A concluded option order generates a 'trade notification' panel to the trader posting the initial bid, an example of which is seen in FIG. 135. That 'notification' panel can include the opportunity to repeat an order. A newly created option structure remains active for trading for the remainder of the current trading day, even if there are no active bids/offers in the structure.

Figure 136:
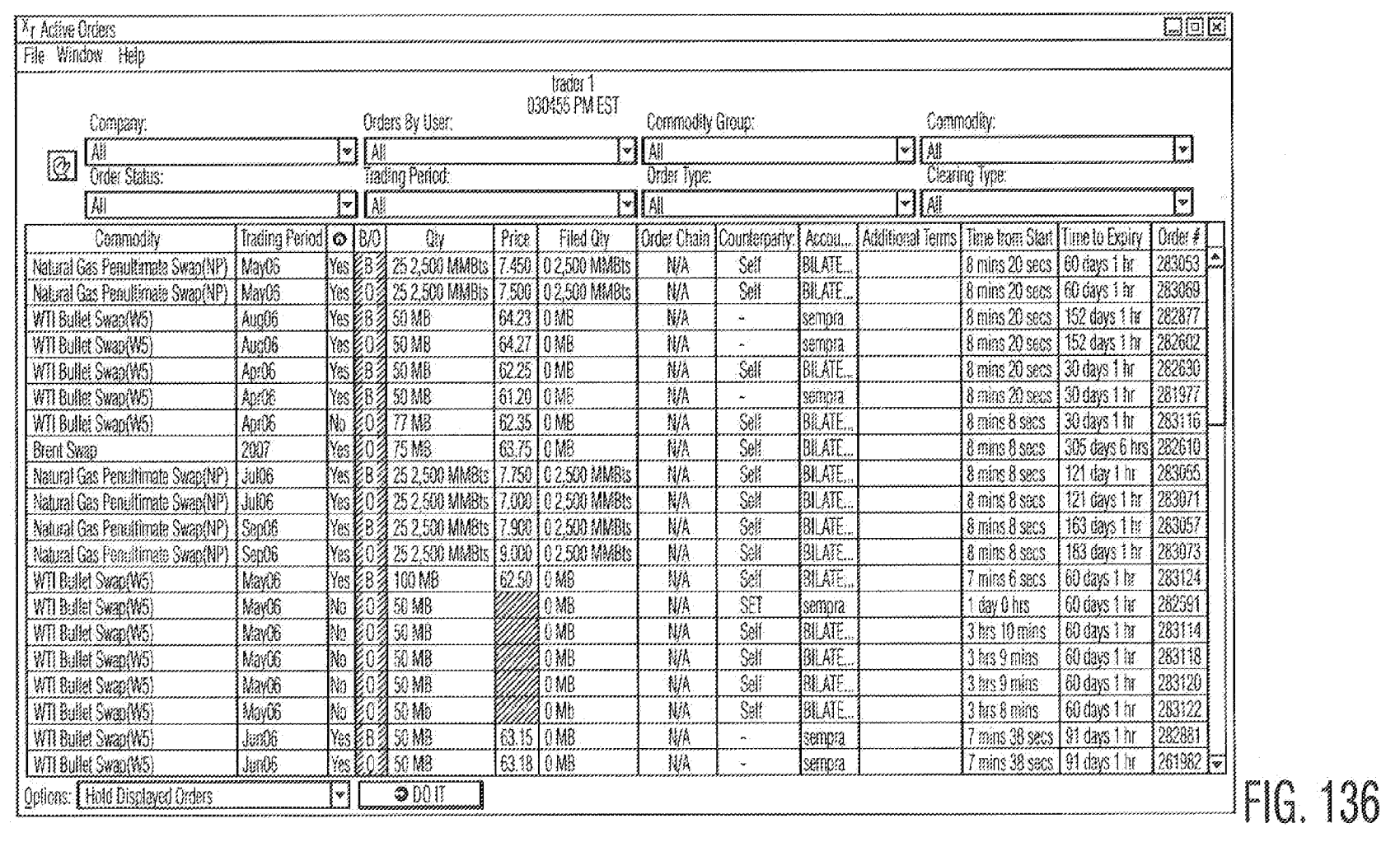
Figure 137:
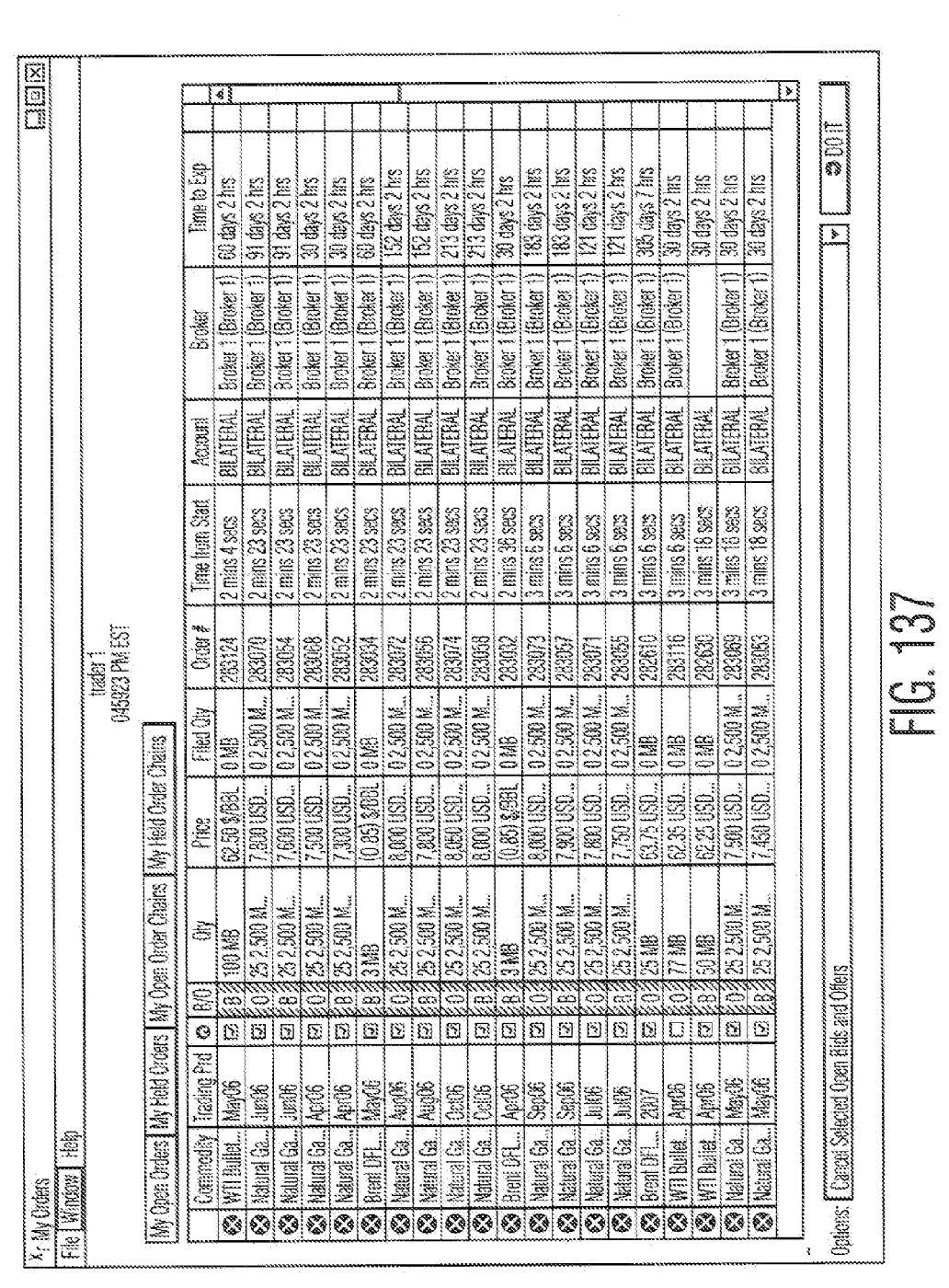

Referring to FIGS. 136 and 137, the active order and my orders application is described. In FIG. 136, there are two applications, active orders and my orders, which allow users to manage their order book. The active orders application can include the following filters: 'company'; 'orders by user'; 'commodity group'; 'commodity'; 'orders status'; 'trading period'; 'order type'; and 'clearing type'. Columns in this application can be resized and re-ordered. The columns can display the following information: 'commodity'; 'trading period'; 'clearing status'; 'bid or offer'; 'quantity'; 'price (active button)'; 'filled quantity'; 'order chain #' (if applicable); 'owner'; 'account #'; 'additional terms'; 'time from start'; 'time to expiry'; and 'order number'. Several action options can be applied to one or more orders. These orders are highlighted before selecting the action. The actions can include: 'cancel selected orders'; 'hold selected orders'; 'reinstate selected orders'; 'edit selected orders—cancel first'; and 'edit selected orders—keep active'.

Referring to FIG. 137, my orders application uses tabs to select the desired view, including for example: 'my open orders'; 'my held orders'; 'my open order chains'; and 'my held order chains'. The columns in the application present the same information that is displayed in the active orders screen, except for owner information and additional terms, and the 'price' field is not an active button. Several action options can be available. The user highlights the orders to be acted upon and selects an option, for example: 'cancel selected bids and offers'; 'hold (or reinstate) selected bids and offers'; 'edit selected bids and offers—cancel first'; and 'edit selected bids and offers—keep active'.

Figure 138:
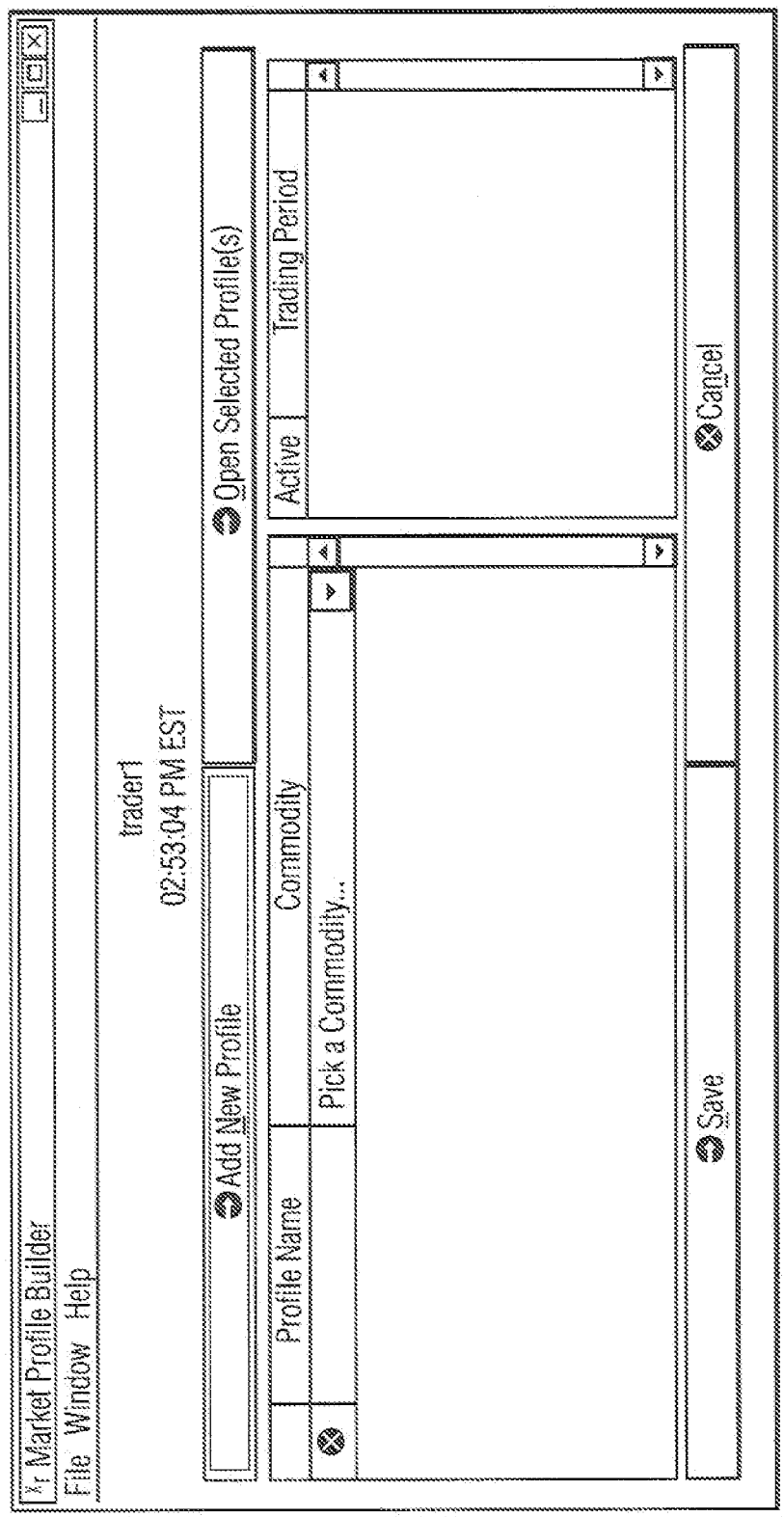
FIGS. 138-141 show the market profile builder application of the present invention.
Figure 139:
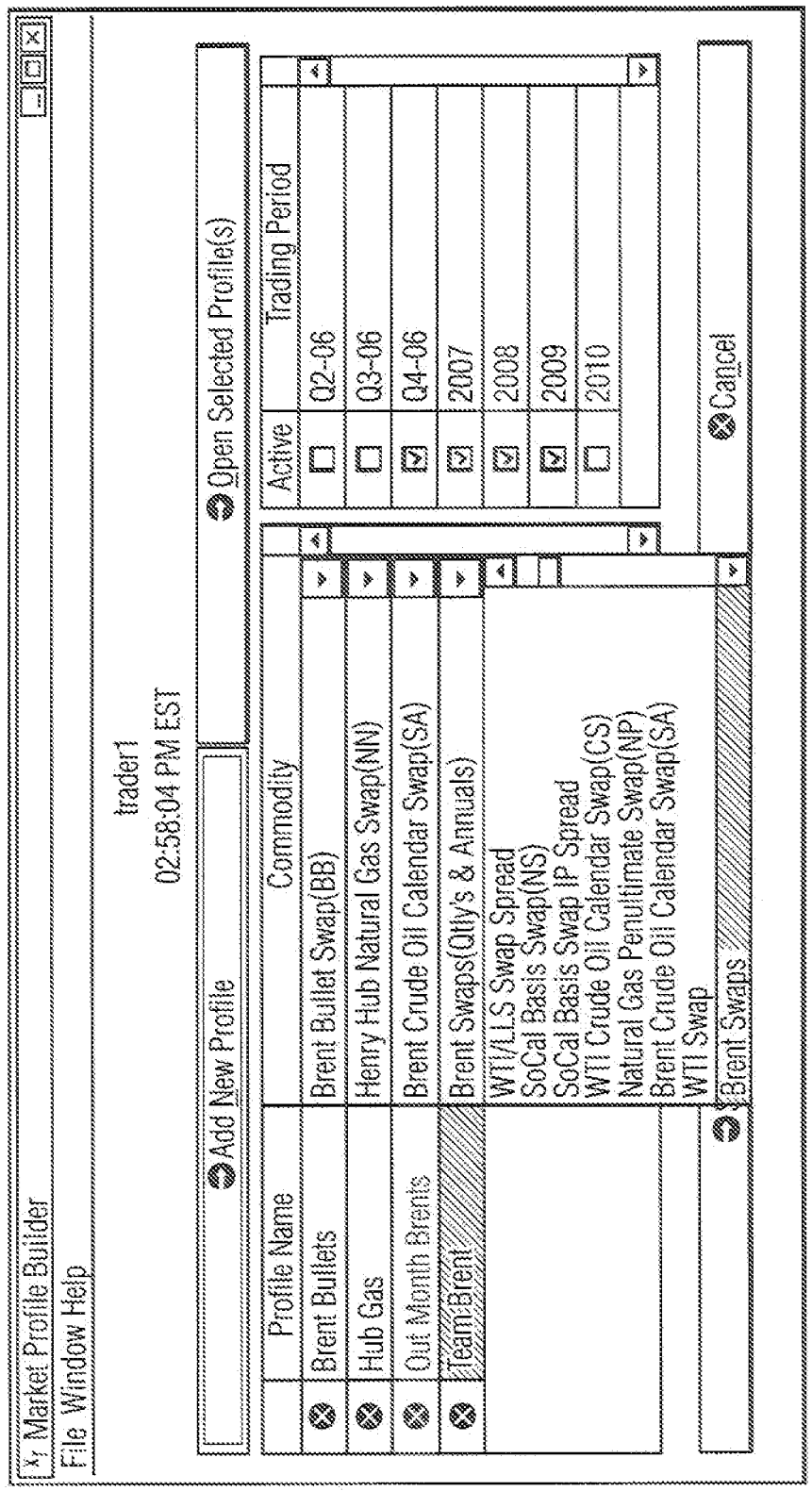

Referring to FIGS. 138-141, the market profile builder application is described. Users can customize trading screens with respect to commodities and trading periods with the market profile builder. A user can define and view multiple market profile screens at the same time. In FIG. 138, an example of the market profile builder screen is seen, which can be launched from the 'file' drop-down menu of the 'menu' bar, as seen in FIG. 57. Referring to FIG. 139, a user can click on 'add new profile' once for each new profile they wish to create. The profile name can be entered free form. The user selects the desired commodity from the 'commodity' drop-down menu. Once a commodity is selected, the system can display active trading periods for that commodity, with a checkbox, on the side of the screen. The user clicks the checkbox that corresponds to each commodity they wish to see in the custom view. The user can select 'save' to retain market profiles that have been created. New or existing profiles can be deleted by clicking on the 'X' icon at the side of the corresponding row.

Figure 140:
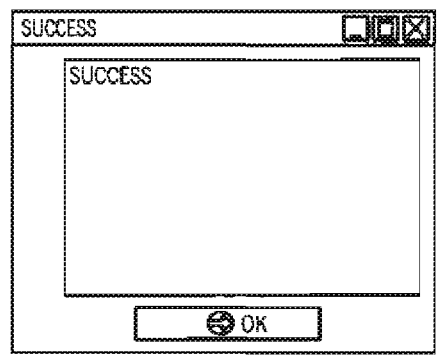
Figure 141:
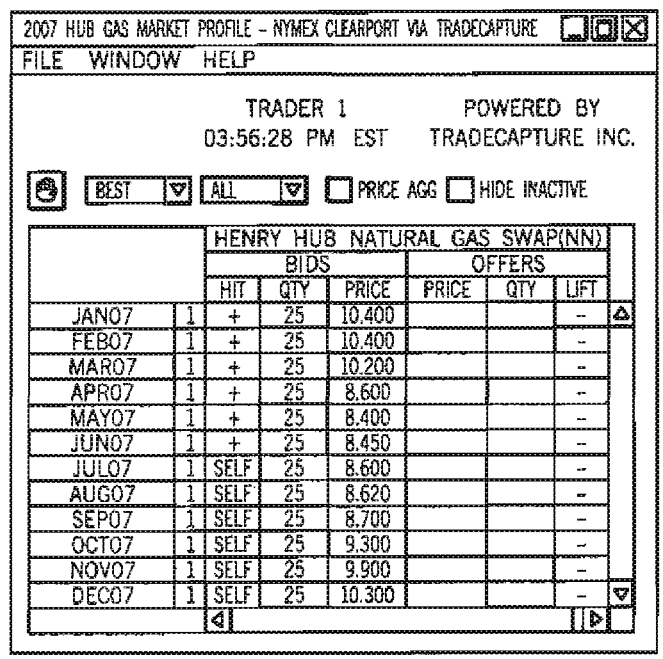

After saving a market profile, a user receives the panel notice, an example of which is seen in FIG. 140. A user can open market profile trading screens, an example of which is seen in FIG. 141, by highlighting the profile and clicking on 'open selected profile(s)'. Market profile screens can be functioning trading screens with the same features and functionality as the markets grid application. The setup for specific market profile can be edited by the user.

Figure 142A:
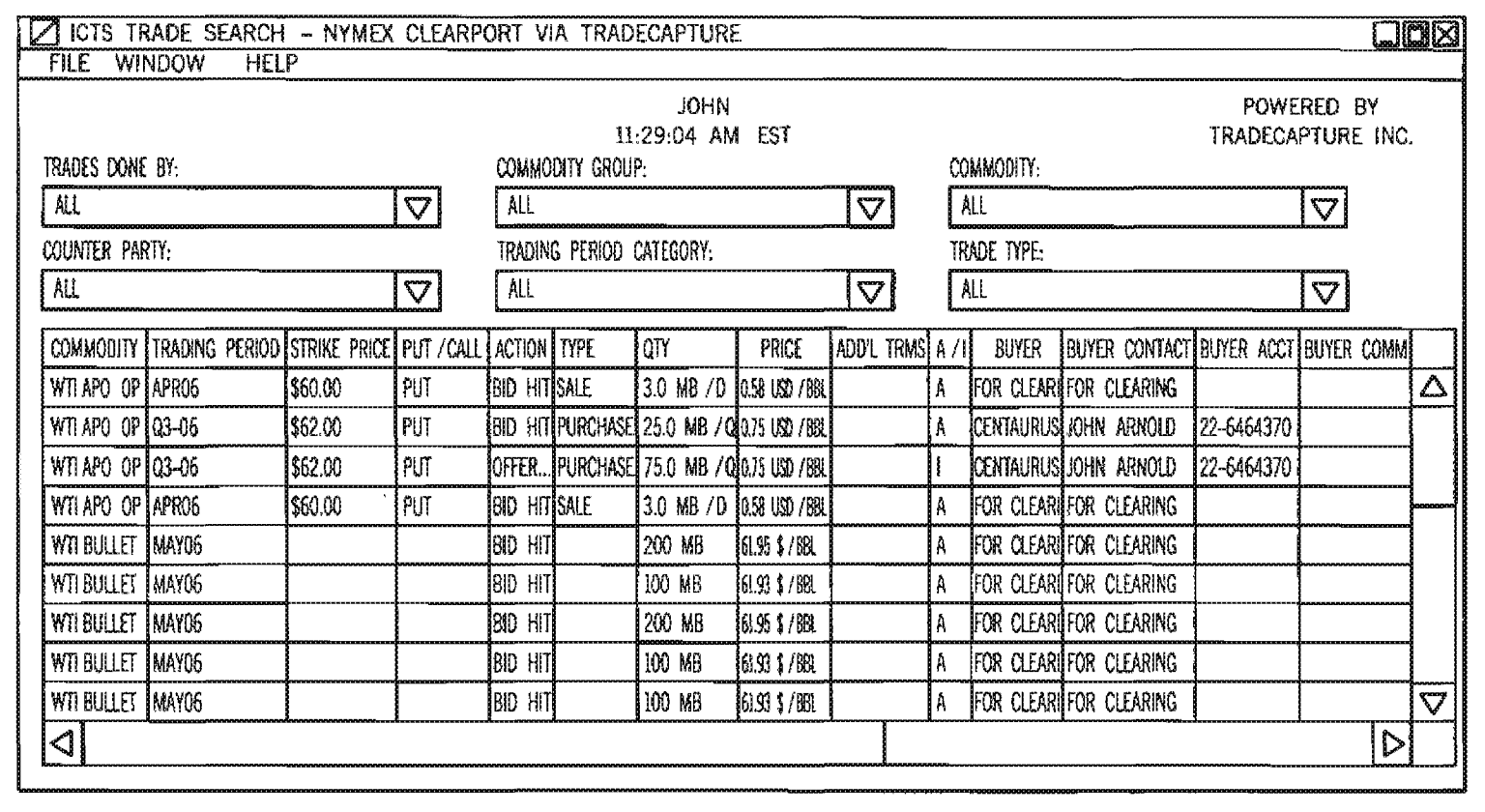

Referring to FIG. 142, the ICTS trade search application is described. This application displays public trades concluded during the current trading day. ICTS trade search can be opened by clicking on 'ICTS trade search' in the 'file' drop-down menu of the 'menu' bar, as seen in FIG. 57. FIG. 142a shows a first partial view while FIG. 142b shows a view scrolled to the right. This application can include filters for the following: 'trades done by'; 'commodity group'; 'commodity; 'counterparty'; 'trading period category'; and 'trade type'. The columns display relevant information related to the trade. 'Buyer' and 'seller' fields are populated when the trader, or a trader from his/her company, is involved in a bilateral transaction. When a transaction is sent to clearing the deal is anonymous.

Figure 143:
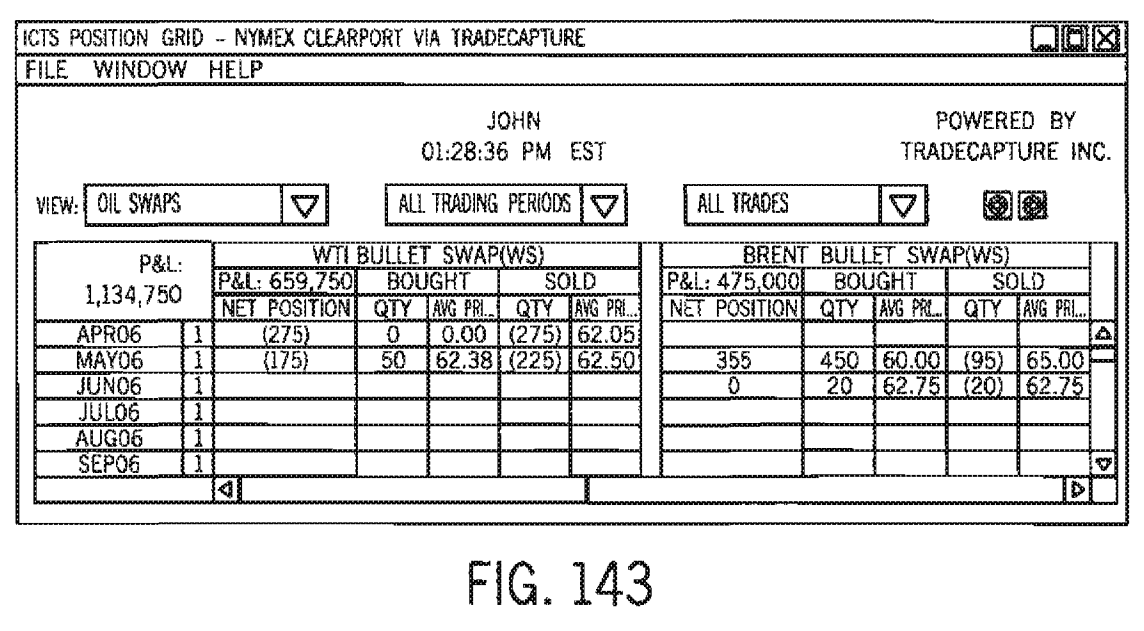

Referring to FIGS. 143-145, the ICTS position grid application is described. The ICTS position grid allows a user to view their net position for commodity and trading period combinations for trades concluded on the platform. Trades on the system can be recorded in the position grid which can be viewed/sorted by commodity group and trading period. Users can view their position and profit/loss in a commodity as well as see their average buy price and average sell price for their trades by commodity. The app can be launched by selecting 'ICTS position grid' from the 'file' drop-down menu of the 'menu' bar, as seen in FIG. 57. Drop-down menus available to customize the view can include: 'view preferred commodities or preset commodity group'; 'trading periods for my positions or all trading periods'; and 'all trades' or 'today's trades'. The information the application can display for commodity and trading period combinations can include: 'net position'; 'quantity bought with average price'; and 'quantity sold with average price'.

The 'net position' button is active and when clicked launches a reference inspector that displays transactions which comprise that commodity and trading periods position, an example of which is seen in FIG. 144. By clicking on the 'magnifying glass' icon a user can open the 'trade notification' panel associated with a concluded trade, an example of which is seen in FIG. 145. This application updates in real time. Profit and loss calculations can be based on the last price traded for each commodity and trading period combination.

Referring to FIG. 146, an example of a position inspector is seen. The position inspector displays the individual transaction details which make up the net position for a commodity for a user.

Referring to FIGS. 147-153, the headlines application is described. Headlines act as instant messages of information regarding available order liquidity and concluded transactions. Headlines pools order liquidity from various exchanges into a single window. Users can have multiple headlines windows open with various filtering in each window. The headlines application can be opened by selecting 'headlines' from the 'file' drop-down menu of the 'menu' bar, as seen in FIG. 57. Headlines can be color-coded with designated colors such as for example: white—concluded transaction; blue—new offer; green—new bid; yellow—held order; and grey—canceled order. Headlines can include the time and relevant information for each action. The filter options available in this screen can include: 'RFQ' (request for quote)—an order that can be marked as an indication rather than a firm order can be categorized as a request for quote; 'transaction type'; and 'order type'; users can also filter for all commodity groups or a specific commodity group. Transaction type can include: 'all'; 'straddle'; 'strangle'; 'volume trade'; 'fence'; 'vertical spread'; 'calendar spread'; and 'diagonal spread'. Order types can include: ' all'; 'bids and offers'; 'offers'; 'bids'; and 'trades'.

Figure 147:
Figure 150:
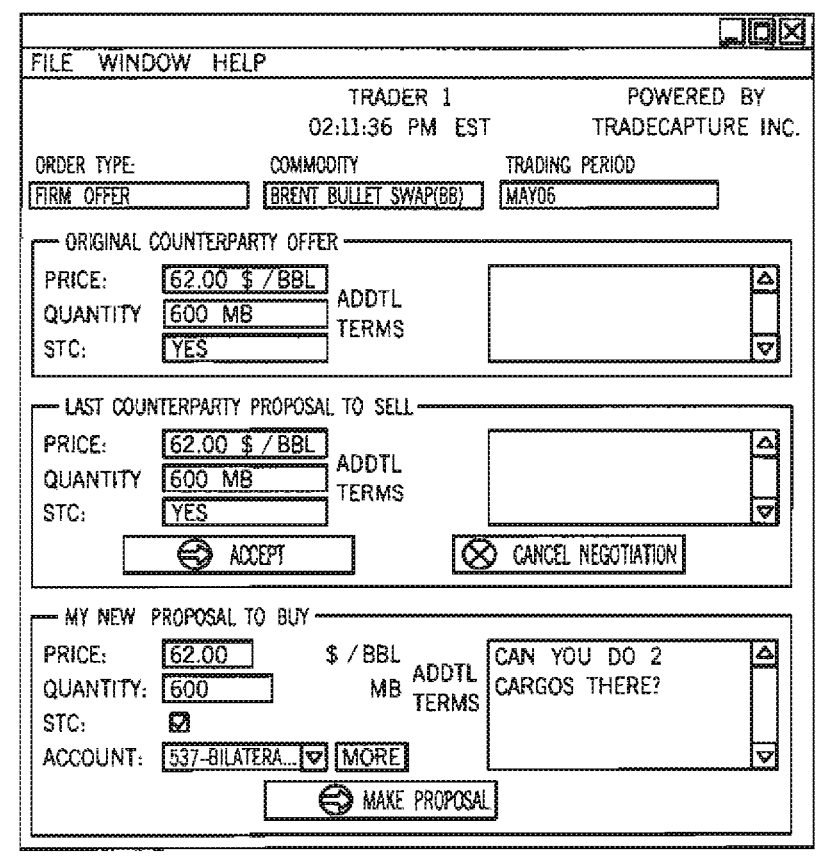

Trading can be conducted directly from the headlines screen by clicking in the 'hit/lift' column. Referring to FIG. 147, an example of the headlines screen is seen. The headlines screen records bids/offers placed as well as trades and amendments to orders. Trading can be conducted directly from the headlines screen by clicking in the 'hit/lift' column. A '+' icon in the column indicates an approved trading partner. Anonymous online negotiations can be conducted directly from the headlines screen. If a user clicks on the 'phone' icon, then the 'negotiation initiator' panel and the original 'order owner' panels launch, examples of which are seen in FIGS. 148 and 149, respectively. If the original order owner is willing to accept a negotiation, he or she has the option of putting the original order on hold or not, and can click 'accept'. If original order owner accepts negotiation, then the negotiation initiator receives a panel allowing the terms of the negotiation to be proposed. The negotiation initiator receives a panel allowing him to enter the terms for the new proposal, an example of which is seen in FIG. 150. Clicking 'make proposal' transmits the proposed new terms. The original order owner then receives the corresponding panel allowing either acceptance or the opportunity to negotiate further. These negotiations can be done anonymously.

Figure 151:
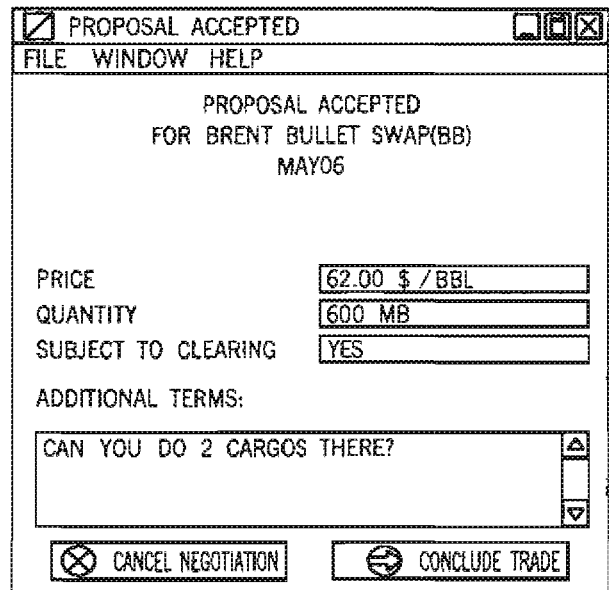
Figure 152:
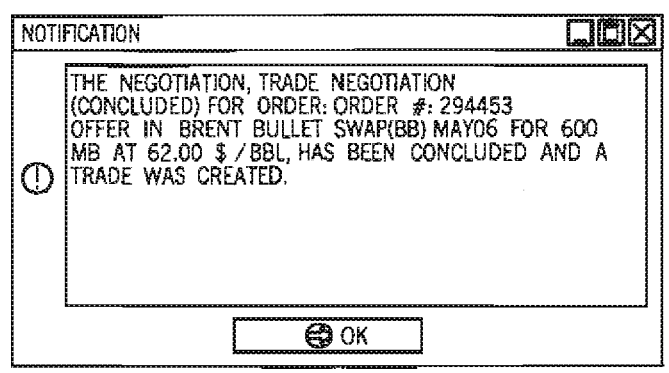

An accepted negotiation generates a 'proposal accepted' panel, an example of which is seen in FIG. 151, and the initiator of the negotiation can conclude or cancel the transaction. A 'notification' panel can be provided, an example of which is seen in FIG. 152. In the 'trade notification' panel, an example of which is seen in FIG. 153, headlines can be color-coded by designated colors such as for example: white—concluded transaction; blue—: new offer; green—new bid; yellow—held order; and grey—canceled order. Headlines can include the time and relevant information for each action.

Figure 154:
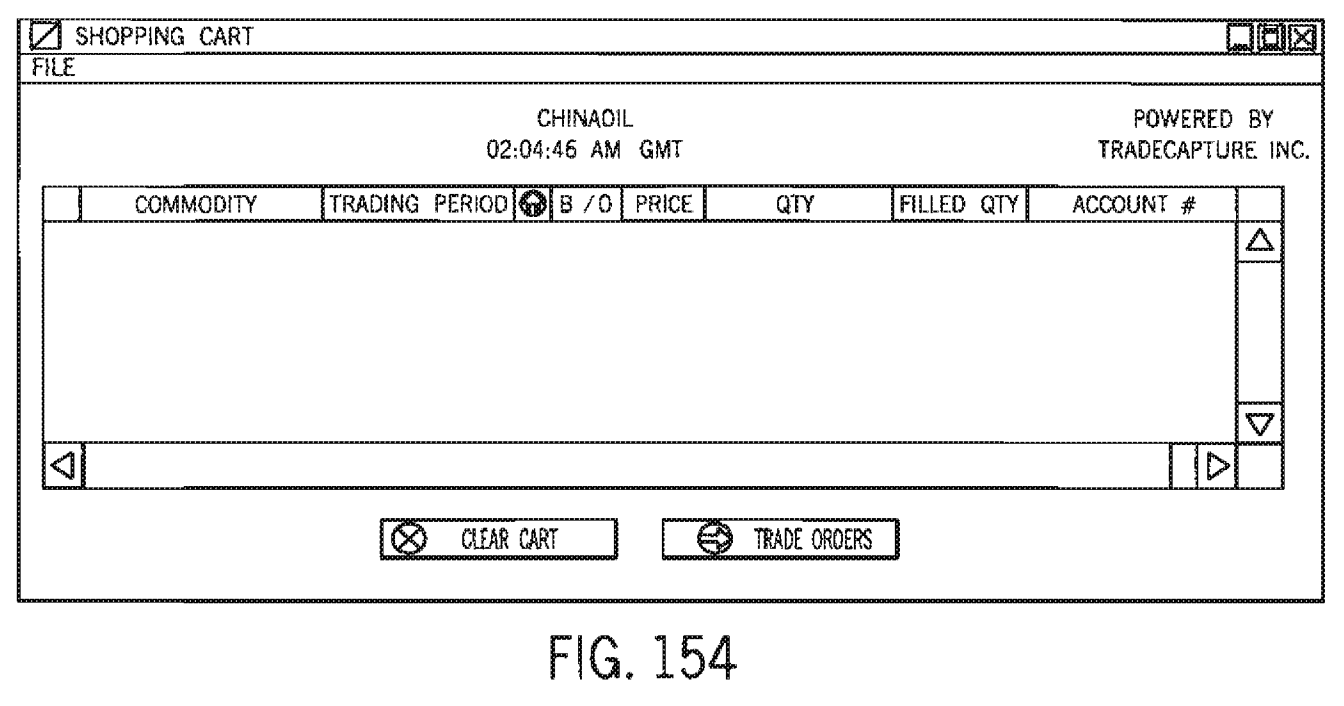
Figure 156:
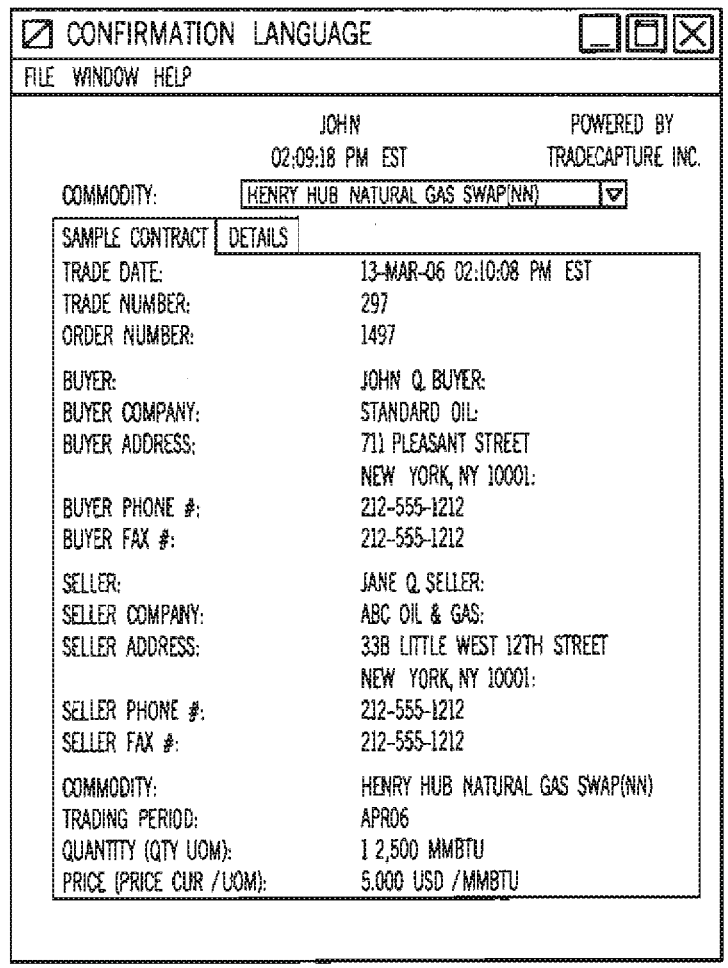

Referring to FIGS. 154-155, the shopping cart application is described. The shopping cart is an application that permits a user to select multiple orders, combining various commodity and trading period combinations, and place them in a basket. This basket can be executed simultaneously. If all of the orders cannot be executed, then none of the orders in the basket will be executed. A user can launch the shopping cart from the 'file' drop-down menu of the 'menu' bar, as seen in FIG. 57, or by clicking on 'add to cart' in the 'please confirm the following purchase (or sale)', an example of which is seen in FIG. 156. If an order that has been placed in the cart either trades, is cancelled, is held, or is being edited, then that order appears with a designated color such as for example a red background. The user can delete an order from the shopping cart by clicking on the 'X' icon at the left hand side of the order. A user can conclude the transaction by clicking 'trade orders'. A 'trade notification' panel can be generated for each order. The shopping cart can be cleared automatically after a predetermined number of minutes. Partial fill quantities can also be supported.

Figures 157, 158:
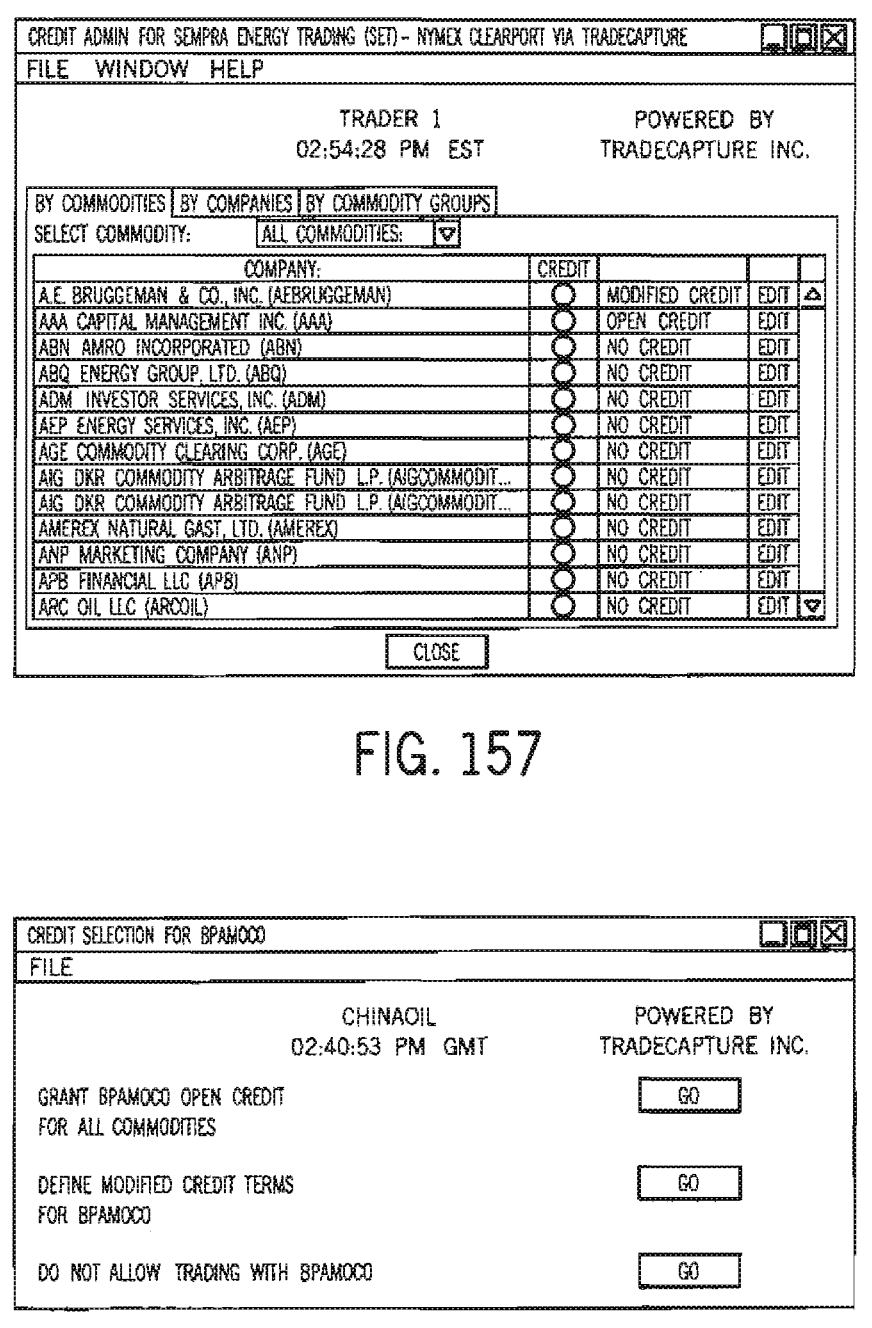

Referring to FIG. 157, an example of a confirmation language screen is seen. The confirmation language screen can be opened from the 'file' drop-down menu of the 'menu' bar, as seen in FIG. 57. A 'sample contract' tab and a 'details' tab can be provided. The 'details' tab displays the commodity specification language for the selected commodity. The commodity can be selected from the 'commodity' menu. The sample contract displays an example for a trade confirmation. The commodity specification language can also be included in the e-mailed trade confirmation.

Referring to FIGS. 158-160, the credit administration application is described. Users who have been assigned credit administration privileges can access this application. If so, the credit administration application can be launched from the 'file' drop-down menu of the 'menu' bar, as seen in FIG. 57. Referring to FIG. 158, tabs that permit the user to view/edit credit by commodity, by company, and by commodity group can be provided. Credit can be modified by clicking the 'edit' button. Referring to FIG. 159, first and third options listed can either turn credit on or off for commodities and trading periods. The second option can open a panel that permits the credit administrator to modify credit by commodity, by trading period and by purchase or sale. Clicking on the 'edit' button launches this screen, an example of which is seen in FIG. 160. Credit administration changes take effect in real-time. The system also allows a user to make their orders non-anonymous to specific companies by checking the 'non-anonymous' option for a specific company/commodity combination.

It should be understood that various changes and modifications preferred in to the embodiment described herein would be apparent to those skilled in the art. Such changes and modifications can be made without departing from the spirit and scope of the present invention and without demising its attendant advantages. It is therefore intended that such changes and modifications be covered by the appended claims.

The invention claimed is:

1. A system comprising:
   at least one client device;
   at least two independent computerized exchanges, each of said computerized exchanges configured to execute electronic transactions involving a group of commodities; and
   a computer server positioned between, and in communication with, the at least one client device and the at least two computerized exchanges, the computer server executing programming instructions that cause the computer server to:
   receive a plurality of indications from the at least two computerized exchanges;
   pool said received plurality of indications by combining all of the received plurality of indications;
   group the combined plurality of indications according to commodity type;
   store the grouped plurality of indications in a database that is communicatively coupled to the computer server;
   receive, from the at least one client device, a request for indications relating to a specific commodity among the commodity types stored in the database;
   search, within the database, only the grouped commodity types to which the requested indications pertain;
   retrieve, from the database, only those of the requested indications that comply with a predetermined privilege level; and
   prompt the at least one client device to generate a single interactive display window that simultaneously displays an aggregate presentation of the retrieved indications, said retrieved indications comprising at least one indication from each of two or more of the at least two computerized exchanges,
   said single interactive display window further configured to receive input and initiate a transaction across any of said at least two computerized exchanges.

2. The system of claim 1, wherein indications involving commodity types that are common to said at least two exchanges are grouped together, by commodity type, thereby providing a market depth across multiple exchanges.

3. The system of claim 1, further comprising a communications link between the computer server and the Internet, said computer server executing software that further causes said computer server to:
   prompt the at least one client device to generate the single interactive display window via the communications link.

4. A computerized method comprising:
providing a computer server, said computer server positioned between, and in communication with at least one client device and at least two independent computerized exchanges, each of said computerized exchanges configured to execute electronic transactions involving a group of commodities;
receiving, by the computer server, a plurality of indications from the at least two computerized exchanges;
pooling, by the computer server, said received plurality of indications by combining all of the received plurality of indications;
grouping, by the computer server, the combined plurality of indications according to commodity type;
storing, by the computer server, the grouped plurality of indications in a database that is communicatively coupled to the computer server;
receiving, by the computer server, from the at least one client device, a request for indications relating to a specific commodity among the commodity types stored in the database;
searching, by the computer server, within the database, only the grouped commodity types to which the requested indications pertain;
retrieving, by the computer server, from the database, only those of the requested indications that comply with a predetermined privilege level; and
prompting, by the computer server, the at least one client device to generate a single interactive display window that simultaneously displays an aggregate presentation of the retrieved indications, said retrieved indications comprising at least one indication from each of two or more of the at least two computerized exchanges,
said single interactive display window further configured to receive input and initiate a transaction across any of said at least two computerized exchanges.

5. The method of claim 4, wherein said aggregated presentation is an interactive presentation that enables users to manipulate said aggregated presentation.

6. The method of claim 4, further comprising displaying a market depth across multiple exchanges by grouping indications involving commodity types that are common to said at least two exchanges together.

7. The method of claim 4, wherein the computer server is configured to initiate, in response to a user command, via the interactive display window, at least one transaction involving at least one of the retrieved indications displayed in the aggregated display.

* * * * *